United States Patent
Lauritzen et al.

(10) Patent No.: US 12,437,853 B2
(45) Date of Patent: Oct. 7, 2025

(54) USER INTERFACES TO TRACK MEDICATIONS

(71) Applicant: Apple Inc., Cupertino, CA (US)

(72) Inventors: Christopher D. Lauritzen, San Francisco, CA (US); Andrea F. Ayres, San Jose, CA (US); Kunal Bhuwalka, Ambridge, PA (US); Pablo F. Caro, San Francisco, CA (US); Andrea Fieger, San Francisco, CA (US); Siu Kuen Lee, San Jose, CA (US); Christopher Maury, Pittsburgh, PA (US); Eric J. Mertz, Santa Clara, CA (US); Leila Minowada, San Francisco, CA (US); Santosh K. Murugan, Fort Worth, TX (US); Jessica Pease, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 18/204,897

(22) Filed: Jun. 1, 2023

(65) Prior Publication Data

US 2023/0395223 A1  Dec. 7, 2023

Related U.S. Application Data

(60) Provisional application No. 63/462,631, filed on Apr. 28, 2023, provisional application No. 63/349,114, filed on Jun. 5, 2022.

(51) Int. Cl.
*G16H 20/10* (2018.01)
*G06F 3/0482* (2013.01)
*G06F 3/0485* (2022.01)
*G16H 10/60* (2018.01)

(52) U.S. Cl.
CPC .......... *G16H 20/10* (2018.01); *G06F 3/0482* (2013.01); *G06F 3/0485* (2013.01); *G16H 10/60* (2018.01)

(58) Field of Classification Search
CPC ...... G16H 20/10; G16H 70/40; G06F 3/0482; G06F 3/0485
See application file for complete search history.

(56) References Cited

U.S. PATENT DOCUMENTS

| | | | | |
|---|---|---|---|---|
| 2005/0027560 | A1* | 2/2005 | Cook | G16H 20/10 705/2 |
| 2008/0238666 | A1* | 10/2008 | Loncar | G16H 70/40 715/810 |
| 2013/0304500 | A1* | 11/2013 | Tripoli | G06Q 10/06 705/2 |
| 2014/0098645 | A1* | 4/2014 | Mularczyk | A61J 7/0481 368/10 |

(Continued)

OTHER PUBLICATIONS

How it works—mediteo-App, Available online at: https://www.mediteo.com/en/features/, retrieved on Apr. 5, 2022, 3 pages.

(Continued)

*Primary Examiner* — Asher D Kells
(74) *Attorney, Agent, or Firm* — DLA Piper LLP (US)

(57) ABSTRACT

The present disclosure generally relates to methods and user interfaces for tracking medications, managing logging actions (e.g., for tracked medications), and/or displaying summaries of tracked medications.

54 Claims, 49 Drawing Sheets

(56) References Cited

U.S. PATENT DOCUMENTS

| | | | | |
|---|---|---|---|---|
| 2015/0040069 | A1* | 2/2015 | Gunaratnam | G16H 20/10 |
| | | | | 715/834 |
| 2017/0024531 | A1 | 1/2017 | Malaviya | |
| 2020/0135314 | A1* | 4/2020 | Gostyla | G16H 15/00 |
| 2020/0135319 | A1 | 4/2020 | Meugels | |
| 2020/0135331 | A1* | 4/2020 | Mohebbi | G16H 70/20 |
| 2020/0185075 | A1* | 6/2020 | Goyal | G16H 20/10 |
| 2021/0043294 | A1* | 2/2021 | Dickens | G16H 10/60 |
| 2022/0215909 | A1 | 7/2022 | Raj | |
| 2022/0253537 | A1 | 8/2022 | Yao et al. | |
| 2022/0254469 | A1* | 8/2022 | Farr | H04W 4/14 |
| 2022/0270727 | A1 | 8/2022 | Ananda | |
| 2022/0399089 | A9* | 12/2022 | Tapadar | G16H 10/60 |
| 2022/0406422 | A1 | 12/2022 | Crowley et al. | |
| 2023/0178234 | A1* | 6/2023 | Bedell | A61M 5/427 |
| | | | | 705/3 |
| 2023/0420090 | A1* | 12/2023 | Martin | G16H 40/63 |
| 2024/0005009 | A1 | 1/2024 | Khanal et al. | |

OTHER PUBLICATIONS

Mango Health, Version 4.1.5.18644,.
Care Zone Inc., "Manage your health, without the headache", Available online at: https://carezone.com/, 2020, 3 pages.
Careclinic Software Inc., "CareClinic—Tracker, Reminder", Version 3.5, retrieved on Jun. 14, 2022, 2 pages.
Circadian Design, Inc.,"Round Health", Version 2.5.5, retrieved on Jun. 14, 2022, 1 page.
Devpost, "RxMinder", Availabe online at: https://devpost.com/software/rxminder-jocltp, retrieved on Apr. 5, 2022, 7 pages.
Groove Health, "EveryDose: Medication Reminder", Version 3.1.12,14, retrieved on Jun. 14, 2022, 1 page.
Licea Sergio, "Pill Reminder—All in One", retrieved on Jun. 14, 2022, 1 page.
Medfox Digital, S.R.O.,"Medfox Pill Reminder & Tracker", Version 1.5, retrieved on Jun. 14, 2022, 1 page.
Medisafe Project Ltd., "Medisafe", Version 8.0.23, Build 11241, 2020, 1 page.
Selby Karen, "10 Best Medication Tracker Apps", Available online at: https://www.asbestos.com/treatment/drugs/medication-tracker-apps/, retrieved on Apr. 5, 2022, 18 pages.
Smartpatient GMBH, "MyTherapy: Medication Reminder", Version 3.89, retrieved on Jun. 14, 2022, 2 pages.
International Search Report and Written Opinion received for PCT Patent Application No. PCT/US2023/024338, mailed on Oct. 26, 2023, 16 pages.
Notice of Allowance received for U.S. Appl. No. 17/832,499, mailed on Sep. 30, 2024, 11 pages.
Notice of Allowance received for U.S. Appl. No. 17/832,499, mailed on Apr. 28, 2025, 10 pages.
International Preliminary Report on Patentability received for PCT Patent Application No. PCT/US2023/024338, mailed on Dec. 19, 2024, 11 pages.

* cited by examiner

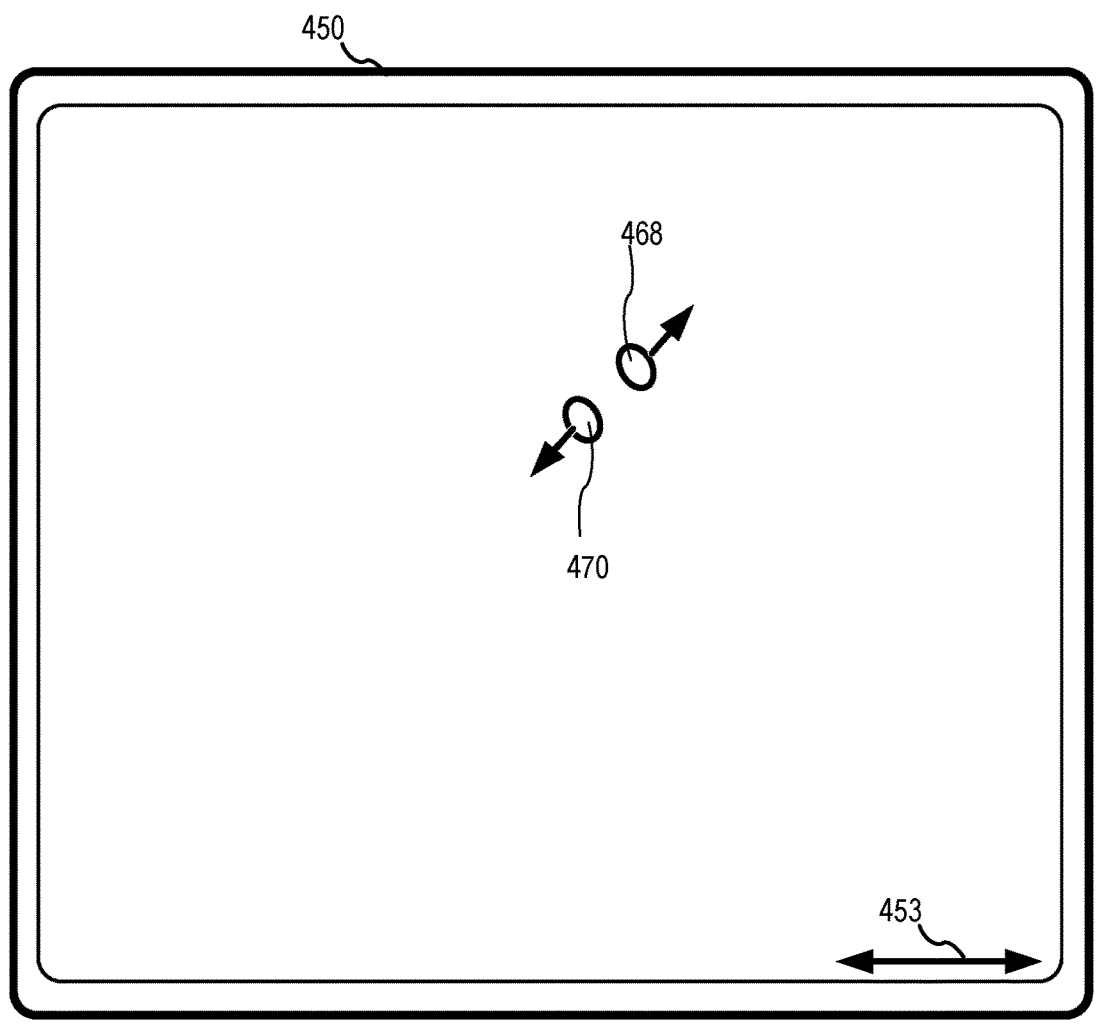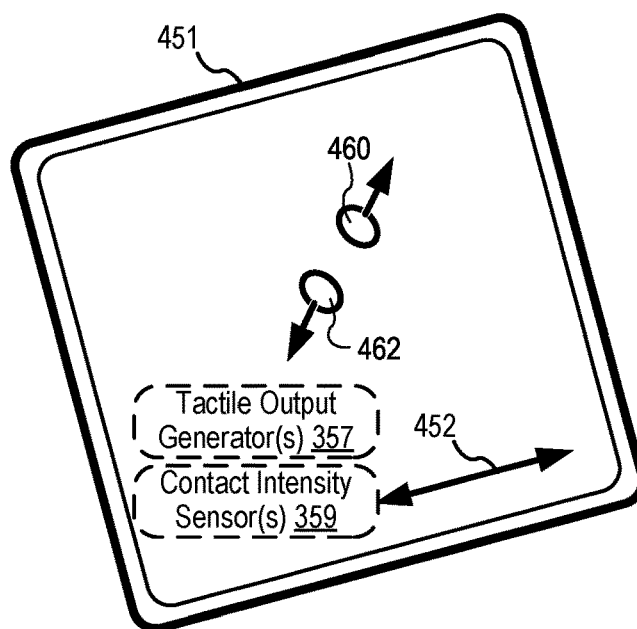
FIG. 4B

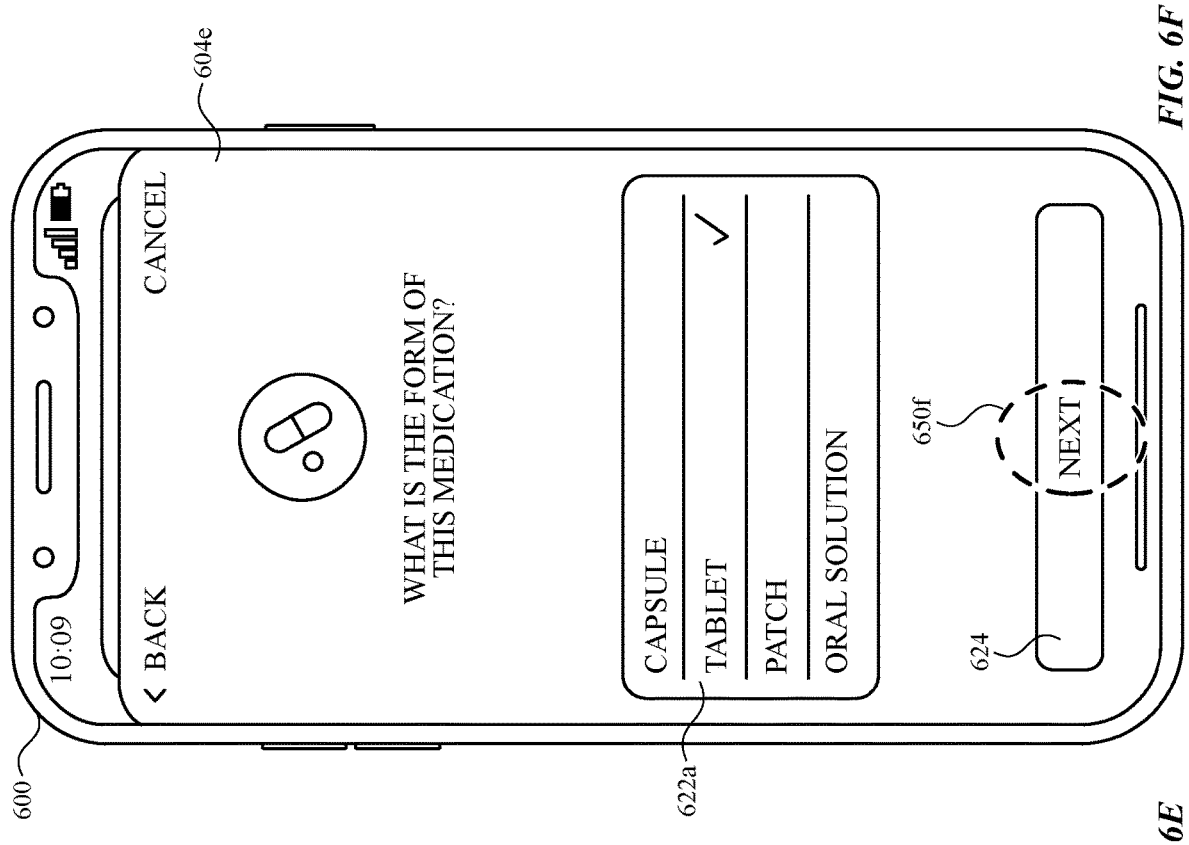
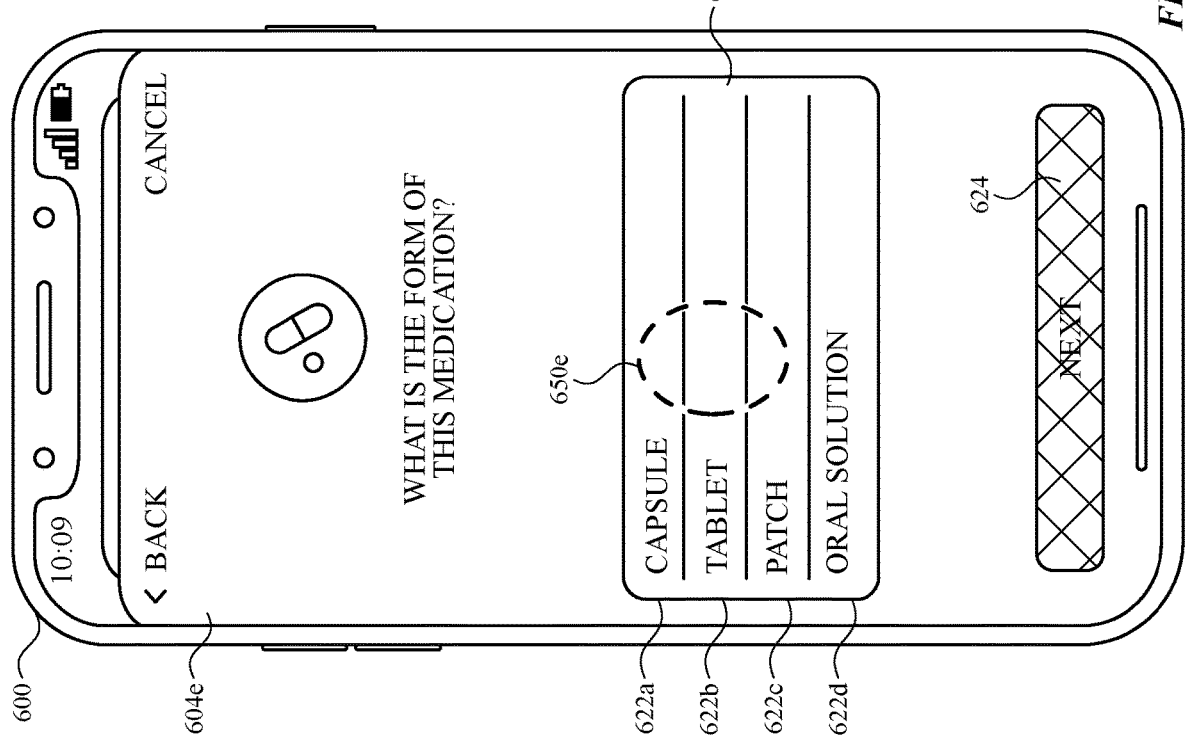

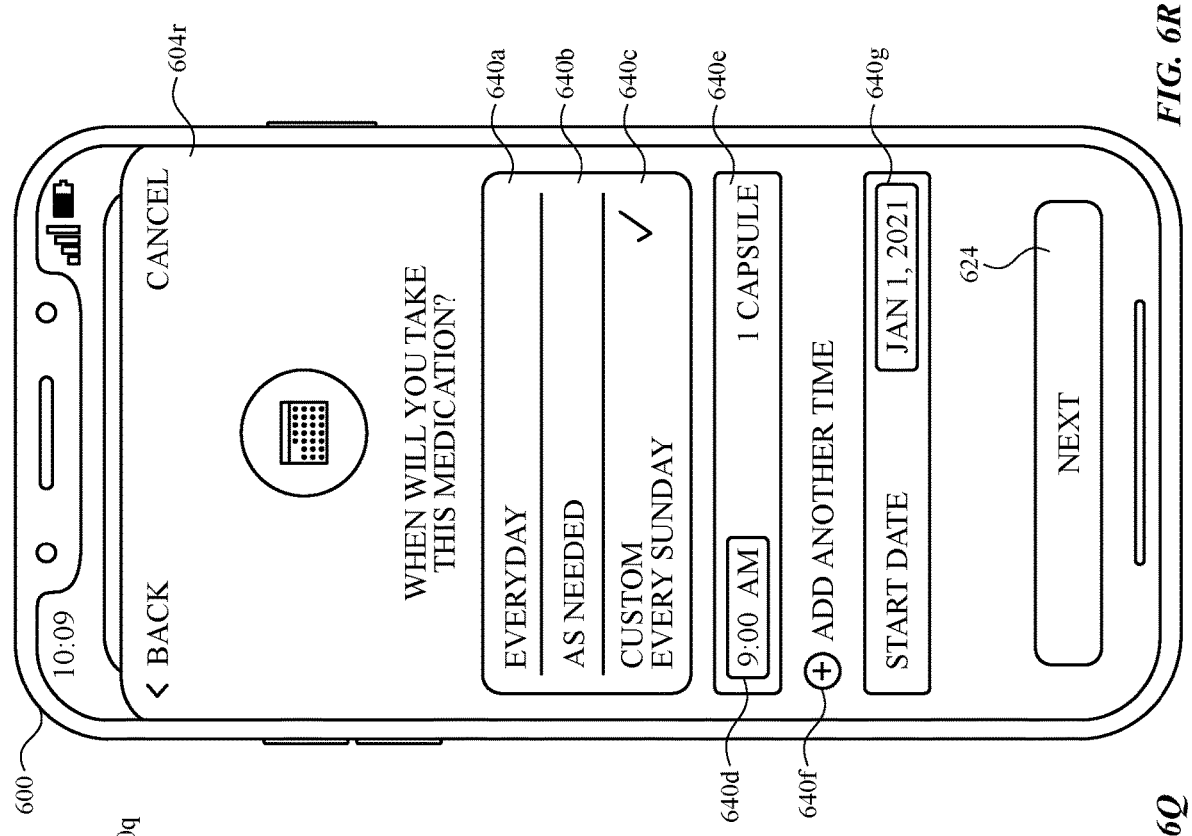
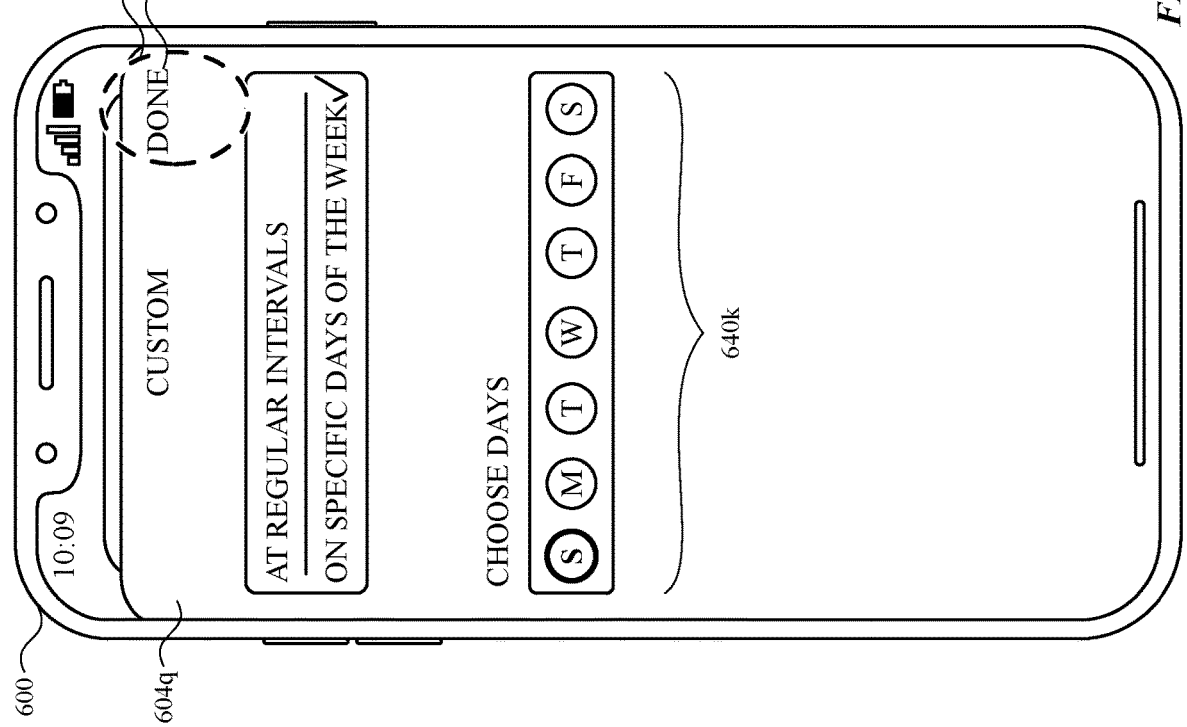
FIG. 6R
FIG. 6Q

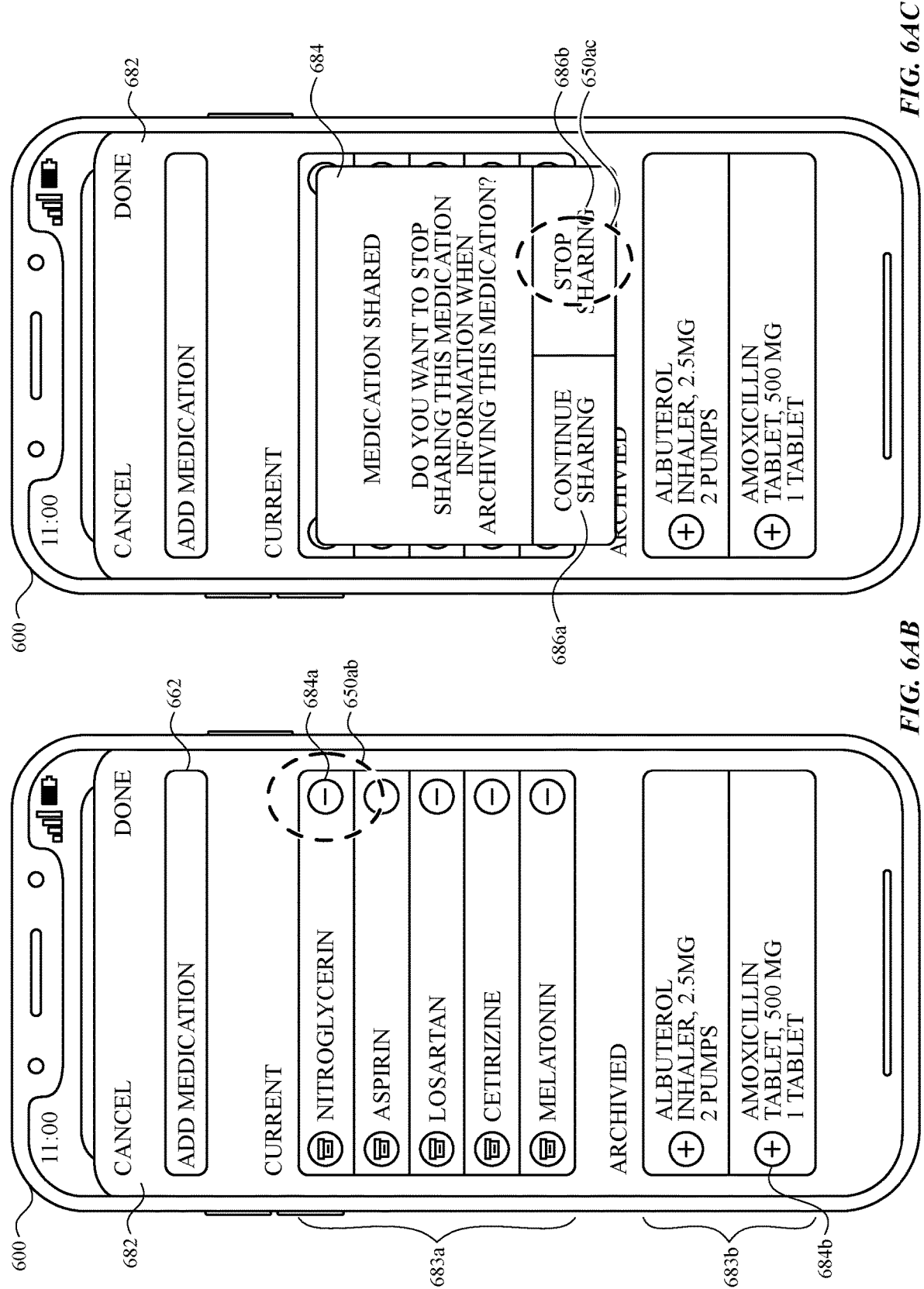

712
While displaying the second user interface, detect, via the one or more input devices, a second set of one or more inputs that includes a second input corresponding to a selection of a respective medication form.

714
In response to detecting the second set of one or more inputs, display, via the display generation component, a third user interface including:

716
In accordance with a determination that a first set of strength criteria is satisfied, wherein the first set of strength criteria includes a first strength criterion that is satisfied when the respective medication form corresponds to the first medication form, a first set of at least two medicinal strength options that are based on the first medication form.

718
In accordance with a determination that a second set of strength criteria is satisfied, wherein the second set of strength criteria includes a second strength criterion that is satisfied when the respective medication form corresponds to the second medication form, a second set of at least two medicinal strength options based on the second medication form, wherein the second set of at least two medicinal strength options are different than the first set of at least two medicinal strength options.

902
Detect, via the one or more input devices, a set of one or more inputs corresponding to a request to add a respective medication as a medication to be tracked in a medication tracking application.

904
In response to detecting the set of one or more inputs corresponding to the request to add the respective medication as a medication to be tracked, display, via the display generation component, a user interface of the medication tracking application, wherein displaying the user interface includes:

906
In accordance with a determination that the respective medication has a first drug interaction that satisfies a first set of criteria, display an indication of the first drug interaction in a first portion of the user interface.

908
In accordance with a determination that the respective medication has a second drug interaction that satisfies a second set of criteria different from the first set of criteria, display an indication of the second drug interaction in a second portion of the user interface different from the first portion of the user interface.

1102
Display, via the display generation component, a first user interface, wherein displaying the first user interface includes:

1104
Display, in a first portion of the first user interface, a representation of a respective medication that is scheduled to be taken at a scheduled time.

1106
Detect a first set of one or more inputs corresponding to a request to log an action associated with the respective medication that includes at least one detected while displaying the first user interface.

1108
In response to detecting the first set of one or more inputs corresponding to the request to log an action associated with the respective medication, move the representation of the respective medication from the first portion of the first user interface to a second portion of the first user interface different from the first portion.

*FIG. 11*

1300 

1302
Detect, via the one or more input devices, an input corresponding to a request to display a summary of logs for actions associated with a respective medication.

1304
In response to detecting the input corresponding to the request to display the summary of logs for actions associated with the respective medication, display, via the display generation component, a user interface including a time scale, wherein displaying the user interface includes:

1306
In accordance with a determination that the respective medication has a first type of logged action for a first logged action of the plurality of logged actions, display a first indicator for the first logged action as having a first appearance on the time scale.

1308
In accordance with a determination that the respective medication has a second type of logged action different from the first type of logged action for the first logged action of the plurality of logged actions, display a second indicator for the first logged action as having a second appearance on the time scale, the second appearance different from the first appearance

*FIG. 13*

USER INTERFACES TO TRACK MEDICATIONS

CROSS-REFERENCE TO RELATED APPLICATIONS

This application claims priority to U.S. Provisional Patent Application No. 63/462,631, entitled "USER INTERFACES TO TRACK MEDICATIONS," filed Apr. 28, 2023, and claims priority to U.S. Provisional Patent Application No. 63/349,114, entitled "USER INTERFACES TO TRACK MEDICATIONS," filed Jun. 5, 2022, the contents of which are hereby incorporated by reference in their entirety.

FIELD

The present disclosure relates generally to computer user interfaces, and more specifically to techniques for tracking medications.

BACKGROUND

Electronic devices, and software applications operating on such devices, are used to track medications a user needs to take and when the user needs to take them.

BRIEF SUMMARY

Some techniques for tracking medications using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for tracking medications. Such methods and interfaces optionally complement or replace other methods for tracking medications. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method comprises: displaying, via the display generation component, a first user interface for selecting a first medication to add to a medication tracking application; while displaying the first user interface, detecting, via one or more input devices, a first set of one or more inputs that includes a first input corresponding to a selection of the first medication; in response to detecting the first set of one or more inputs, displaying, via the display generation component, a second user interface including: a first option for a first medication form that is based on the first medication; and a second option for a second medication form that is based on the first medication, the second medication form different from the first medication form; while displaying the second user interface, detecting, via the one or more input devices, a second set of one or more inputs that includes a second input corresponding to a selection of a respective medication form; and in response to detecting the second set of one or more inputs, displaying, via the display generation component, a third user interface including: in accordance with a determination that a first set of strength criteria is satisfied, wherein the first set of strength criteria includes a first strength criterion that is satisfied when the respective medication form corresponds to the first medication form, a first set of at least two medicinal strength options that are based on the first medication form; and in accordance with a determination that a second set of strength criteria is satisfied, wherein the second set of strength criteria includes a second strength criterion that is satisfied when the respective medication form corresponds to the second medication form, a second set of at least two medicinal strength options based on the second medication form, wherein the second set of at least two medicinal strength options are different than the first set of at least two medicinal strength options.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a first user interface for selecting a first medication to add to a medication tracking application; while displaying the first user interface, detecting, via one or more input devices, a first set of one or more inputs that includes a first input corresponding to a selection of the first medication; in response to detecting the first set of one or more inputs, displaying, via the display generation component, a second user interface including: a first option for a first medication form that is based on the first medication; and a second option for a second medication form that is based on the first medication, the second medication form different from the first medication form; while displaying the second user interface, detecting, via the one or more input devices, a second set of one or more inputs that includes a second input corresponding to a selection of a respective medication form; and in response to detecting the second set of one or more inputs, displaying, via the display generation component, a third user interface including: in accordance with a determination that a first set of strength criteria is satisfied, wherein the first set of strength criteria includes a first strength criterion that is satisfied when the respective medication form corresponds to the first medication form, a first set of at least two medicinal strength options that are based on the first medication form; and in accordance with a determination that a second set of strength criteria is satisfied, wherein the second set of strength criteria includes a second strength criterion that is satisfied when the respective medication form corresponds to the second medication form, a second set of at least two medicinal strength options based on the second medication form, wherein the second set of at least two medicinal strength options are different than the first set of at least two medicinal strength options.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a first user interface for selecting a first medication to add to a medication tracking application; while displaying the first user interface, detecting, via one or more input devices, a first set of one or more inputs that includes a first input corresponding to a selection of the first medication; in response to detecting the first set of one or more inputs, displaying, via the display generation component, a second user interface including: a first option for a first medication form that is based on the first medication; and a second option for a second medication form that is based on the first medication, the second medication form different from the first medication form; while displaying the second user interface, detecting, via the one or more input devices, a second set of one or more inputs that includes a second input corresponding to a selection of a respective medication form; and in response to detecting the second set of one or more inputs, displaying, via the display generation component, a third user interface including: in accordance with a determination that a first set of strength criteria is satisfied, wherein the first set of strength criteria includes a first strength criterion that is satisfied when the respective medication form corresponds to the first medication form, a first set of at least two medicinal strength options that are based on the first medication form; and in accordance with a determination that a second set of strength criteria is satisfied, wherein the second set of strength criteria includes a second strength criterion that is satisfied when the respective medication form corresponds to the second medication form, a second set of at least two medicinal strength options based on the second medication form, wherein the second set of at least two medicinal strength options are different than the first set of at least two medicinal strength options.

In accordance with some embodiments, a computer system configured to communicate with a display generation component and one or more input devices is described. The computer system comprises: one or more processors; and memory storing one or more programs configured to be executed by the one or more processors, the one or more programs including instructions for: displaying, via the display generation component, a first user interface for selecting a first medication to add to a medication tracking application; while displaying the first user interface, detecting, via one or more input devices, a first set of one or more inputs that includes a first input corresponding to a selection of the first medication; in response to detecting the first set of one or more inputs, displaying, via the display generation component, a second user interface including: a first option for a first medication form that is based on the first medication; and a second option for a second medication form that is based on the first medication, the second medication form different from the first medication form; while displaying the second user interface, detecting, via the one or more input devices, a second set of one or more inputs that includes a second input corresponding to a selection of a respective medication form; and in response to detecting the second set of one or more inputs, displaying, via the display generation component, a third user interface including: in accordance with a determination that a first set of strength criteria is satisfied, wherein the first set of strength criteria includes a first strength criterion that is satisfied when the respective medication form corresponds to the first medication form, a first set of at least two medicinal strength options that are based on the first medication form; and in accordance with a determination that a second set of strength criteria is satisfied, wherein the second set of strength criteria includes a second strength criterion that is satisfied when the respective medication form corresponds to the second medication form, a second set of at least two medicinal strength options based on the second medication form, wherein the second set of at least two medicinal strength options are different than the first set of at least two medicinal strength options.

In accordance with some embodiments, A computer system configured to communicate with a display generation component and one or more input devices is described. The computer system comprises: means for displaying, via the display generation component, a first user interface for selecting a first medication to add to a medication tracking application; means for, while displaying the first user interface, detecting, via one or more input devices, a first set of one or more inputs that includes a first input corresponding to a selection of the first medication; means for, in response to detecting the first set of one or more inputs, displaying, via the display generation component, a second user interface including: a first option for a first medication form that is based on the first medication; and a second option for a second medication form that is based on the first medication, the second medication form different from the first medication form; means for, while displaying the second user interface, detecting, via the one or more input devices, a second set of one or more inputs that includes a second input corresponding to a selection of a respective medication form; and means for, in response to detecting the second set of one or more inputs, displaying, via the display generation component, a third user interface including: in accordance with a determination that a first set of strength criteria is satisfied, wherein the first set of strength criteria includes a first strength criterion that is satisfied when the respective medication form corresponds to the first medication form, a first set of at least two medicinal strength options that are based on the first medication form; and in accordance with a determination that a second set of strength criteria is satisfied, wherein the second set of strength criteria includes a second strength criterion that is satisfied when the respective medication form corresponds to the second medication form, a second set of at least two medicinal strength options based on the second medication form, wherein the second set of at least two medicinal strength options are different than the first set of at least two medicinal strength options.

In accordance with some embodiments, a computer program product is described. The computer program product comprises: one or more programs configured to be executed by one or more processors of a computer system that is in communication with a display generation component and one or more input devices, the one or more programs including instructions for: displaying, via the display generation component, a first user interface for selecting a first medication to add to a medication tracking application; while displaying the first user interface, detecting, via one or more input devices, a first set of one or more inputs that includes a first input corresponding to a selection of the first medication; in response to detecting the first set of one or more inputs, displaying, via the display generation component, a second user interface including: a first option for a first medication form that is based on the first medication; and a second option for a second medication form that is based on the first medication, the second medication form different from the first medication form; while displaying the second user interface, detecting, via the one or more input devices, a second set of one or more inputs that includes a second input corresponding to a selection of a respective medication form; and in response to detecting the second set of one or more inputs, displaying, via the display generation component, a third user interface including: in accordance with a determination that a first set of strength criteria is satisfied, wherein the first set of strength criteria includes a first strength criterion that is satisfied when the respective medication form corresponds to the first medication form, a first set of at least two medicinal strength options that are based on the first medication form; and in accordance with a determination that a second set of strength criteria is satisfied, wherein the second set of strength criteria includes a second strength criterion that is satisfied when the respective medication form corresponds to the second medication form, a second set of at least two medicinal strength options based on the second medication form, wherein the second set of at least two medicinal strength options are different than the first set of at least two medicinal strength options.

In accordance with some embodiments, a method performed at a computer system that is in communication with a display generation component and one or more input devices is described. The method comprises: detecting, via the one or more input devices, a first set of one or more inputs corresponding to a request to add a medication to be tracked in a medication tracking application for a first user; and in response to detecting the first set of one or more inputs corresponding to the request to add a medication to be tracked, displaying, via the display generation component, a first user interface of the medication tracking application, wherein displaying the first user interface includes: displaying a graphical user interface object to search for a medication; in accordance with a determination that a first user has a clinical health record that identifies a respective medication, displaying an option to add the respective medication from the clinical health record to be tracked in the medication tracking application; and in accordance with a determination that the first user does not have a clinical health record that identifies a respective medication, forgoing display of an option to add a medication from a clinical health record as a medication to be tracked in the medication tracking application.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a first set of one or more inputs corresponding to a request to add a medication to be tracked in a medication tracking application for a first user; and in response to detecting the first set of one or more inputs corresponding to the request to add a medication to be tracked, displaying, via the display generation component, a first user interface of the medication tracking application, wherein displaying the first user interface includes: displaying a graphical user interface object to search for a medication; in accordance with a determination that a first user has a clinical health record that identifies a respective medication, displaying an option to add the respective medication from the clinical health record to be tracked in the medication tracking application; and in accordance with a determination that the first user does not have a clinical health record that identifies a respective medication, forgoing display of an option to add a medication from a clinical health record as a medication to be tracked in the medication tracking application.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a first set of one or more inputs corresponding to a request to add a medication to be tracked in a medication tracking application for a first user; and in response to detecting the first set of one or more inputs corresponding to the request to add a medication to be tracked, displaying, via the display generation component, a first user interface of the medication tracking application, wherein displaying the first user interface includes: displaying a graphical user interface object to search for a medication; in accordance with a determination that a first user has a clinical health record that identifies a respective medication, displaying an option to add the respective medication from the clinical health record to be tracked in the medication tracking application; and in accordance with a determination that the first user does not have a clinical health record that identifies a respective medication, forgoing display of an option to add a medication from a clinical health record as a medication to be tracked in the medication tracking application.

In accordance with some embodiments, a computer system configured to communicate with a display generation component and one or more input devices is described. The computer system comprises one or more processors; and memory storing one or more programs configured to be executed by the one or more processors, the one or more programs including instructions for: detecting, via the one or more input devices, a first set of one or more inputs corresponding to a request to add a medication to be tracked in a medication tracking application for a first user; and in response to detecting the first set of one or more inputs corresponding to the request to add a medication to be tracked, displaying, via the display generation component, a first user interface of the medication tracking application, wherein displaying the first user interface includes: displaying a graphical user interface object to search for a medication; in accordance with a determination that a first user has a clinical health record that identifies a respective medication, displaying an option to add the respective medication from the clinical health record to be tracked in the medication tracking application; and in accordance with a determination that the first user does not have a clinical health record that identifies a respective medication, forgoing display of an option to add a medication from a clinical health record as a medication to be tracked in the medication tracking application.

In accordance with some embodiments, a computer system configured to communicate with a display generation component and one or more input devices is described. The computer system comprises: means for detecting, via the one or more input devices, a first set of one or more inputs corresponding to a request to add a medication to be tracked in a medication tracking application for a first user; and means for, in response to detecting the first set of one or more inputs corresponding to the request to add a medication to be tracked, displaying, via the display generation component, a first user interface of the medication tracking application, wherein displaying the first user interface includes: displaying a graphical user interface object to search for a medication; in accordance with a determination that a first user has a clinical health record that identifies a respective medication, displaying an option to add the respective medication from the clinical health record to be tracked in the medication tracking application; and in accordance with a determination that the first user does not have a clinical health record that identifies a respective medication, forgoing display of an option to add a medication from a clinical health record as a medication to be tracked in the medication tracking application.

In accordance with some embodiments, a computer program product is described. The computer program product comprises: one or more programs configured to be executed by one or more processors of a computer system that is in communication with a display generation component and one or more input devices, the one or more programs including instructions for: detecting, via the one or more input devices, a first set of one or more inputs corresponding to a request to add a medication to be tracked in a medication tracking application for a first user; and in response to detecting the first set of one or more inputs corresponding to the request to add a medication to be tracked, displaying, via the display generation component, a first user interface of the medication tracking application, wherein displaying the first user interface includes: displaying a graphical user interface object to search for a medication; in accordance with a determination that a first user has a clinical health record that identifies a respective medication, displaying an option to add the respective medication from the clinical health record to be tracked in the medication tracking application; and in accordance with a determination that the first user does not have a clinical health record that identifies a respective medication, forgoing display of an option to add a medication from a clinical health record as a medication to be tracked in the medication tracking application.

In accordance with some embodiments, a method performed at a computer system that is in communication with a display generation component and one or more input devices is described. The method comprises: detecting, via the one or more input devices, a set of one or more inputs corresponding to a request to add a respective medication as a medication to be tracked in a medication tracking application; in response to detecting the set of one or more inputs corresponding to the request to add the respective medication as a medication to be tracked, displaying, via the display generation component, a user interface of the medication tracking application, wherein displaying the user interface includes: in accordance with a determination that the respective medication has a first drug interaction that satisfies a first set of criteria, displaying an indication of the first drug interaction in a first portion of the user interface; and in accordance with a determination that the respective medication has a second drug interaction that satisfies a second set of criteria different from the first set of criteria, displaying an indication of the second drug interaction in a second portion of the user interface different from the first portion of the user interface.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, a set of one or more inputs corresponding to a request to add a respective medication as a medication to be tracked in a medication tracking application; in response to detecting the set of one or more inputs corresponding to the request to add the respective medication as a medication to be tracked, displaying, via the display generation component, a user interface of the medication tracking application, wherein displaying the user interface includes: in accordance with a determination that the respective medication has a first drug interaction that satisfies a first set of criteria, displaying an indication of the first drug interaction in a first portion of the user interface; and in accordance with a determination that the respective medication has a second drug interaction that satisfies a second set of criteria different from the first set of criteria, displaying an indication of the second drug interaction in a second portion of the user interface different from the first portion of the user interface.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, a set of one or more inputs corresponding to a request to add a respective medication as a medication to be tracked in a medication tracking application; in response to detecting the set of one or more inputs corresponding to the request to add the respective medication as a medication to be tracked, displaying, via the display generation component, a user interface of the medication tracking application, wherein displaying the user interface includes: in accordance with a determination that the respective medication has a first drug interaction that satisfies a first set of criteria, displaying an indication of the first drug interaction in a first portion of the user interface; and in accordance with a determination that the respective medication has a second drug interaction that satisfies a second set of criteria different from the first set of criteria, displaying an indication of the second drug interaction in a second portion of the user interface different from the first portion of the user interface.

In accordance with some embodiments, a computer system configured to communicate with a display generation component and one or more input devices is described. The computer system comprises: one or more processors; and memory storing one or more programs configured to be executed by the one or more processors, the one or more programs including instructions for: detecting, via the one or more input devices, a set of one or more inputs corresponding to a request to add a respective medication as a medication to be tracked in a medication tracking application; in response to detecting the set of one or more inputs corresponding to the request to add the respective medication as a medication to be tracked, displaying, via the display generation component, a user interface of the medication tracking application, wherein displaying the user interface includes: in accordance with a determination that the respective medication has a first drug interaction that satisfies a first set of criteria, displaying an indication of the first drug interaction in a first portion of the user interface; and in accordance with a determination that the respective medication has a second drug interaction that satisfies a second set of criteria different from the first set of criteria, displaying an indication of the second drug interaction in a second portion of the user interface different from the first portion of the user interface.

In accordance with some embodiments, a computer system configured to communicate with a display generation component and one or more input devices is described. The computer system comprises: means for detecting, via the one or more input devices, a set of one or more inputs corresponding to a request to add a respective medication as a medication to be tracked in a medication tracking application; means for, in response to detecting the set of one or more inputs corresponding to the request to add the respective medication as a medication to be tracked, displaying, via the display generation component, a user interface of the medication tracking application, wherein displaying the user interface includes: in accordance with a determination that the respective medication has a first drug interaction that satisfies a first set of criteria, displaying an indication of the first drug interaction in a first portion of the user interface; and in accordance with a determination that the respective medication has a second drug interaction that satisfies a second set of criteria different from the first set of criteria, displaying an indication of the second drug interaction in a second portion of the user interface different from the first portion of the user interface.

In accordance with some embodiments, a computer program product is described. The computer program product comprises: one or more programs configured to be executed by one or more processors of a computer system that is in communication with a display generation component and one or more input devices, the one or more programs including instructions for: detecting, via the one or more input devices, a set of one or more inputs corresponding to a request to add a respective medication as a medication to be tracked in a medication tracking application; in response to detecting the set of one or more inputs corresponding to the request to add the respective medication as a medication to be tracked, displaying, via the display generation component, a user interface of the medication tracking application, wherein displaying the user interface includes: in accordance with a determination that the respective medication has a first drug interaction that satisfies a first set of criteria, displaying an indication of the first drug interaction in a first portion of the user interface; and in accordance with a determination that the respective medication has a second drug interaction that satisfies a second set of criteria different from the first set of criteria, displaying an indication of the second drug interaction in a second portion of the user interface different from the first portion of the user interface.

In accordance with some embodiments, a method performed at a computer system that is in communication with a display generation component and one or more input devices is described. The method comprises: displaying, via the display generation component, a first user interface, wherein displaying the first user interface includes: displaying, in a first portion of the first user interface, a representation of a respective medication that is scheduled to be taken at a scheduled time; detecting a first set of one or more inputs corresponding to a request to log an action associated with the respective medication that includes at least one detected while displaying the first user interface; and in response to detecting the first set of one or more inputs corresponding to the request to log an action associated with the respective medication, moving the representation of the respective medication from the first portion of the first user interface to a second portion of the first user interface different from the first portion.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying, via the display generation component, a first user interface, wherein displaying the first user interface includes: displaying, in a first portion of the first user interface, a representation of a respective medication that is scheduled to be taken at a scheduled time; detecting a first set of one or more inputs corresponding to a request to log an action associated with the respective medication that includes at least one detected while displaying the first user interface; and in response to detecting the first set of one or more inputs corresponding to the request to log an action associated with the respective medication, moving the representation of the respective medication from the first portion of the first user interface to a second portion of the first user interface different from the first portion.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying, via the display generation component, a first user interface, wherein displaying the first user interface includes: displaying, in a first portion of the first user interface, a representation of a respective medication that is scheduled to be taken at a scheduled time; detecting a first set of one or more inputs corresponding to a request to log an action associated with the respective medication that includes at least one detected while displaying the first user interface; and in response to detecting the first set of one or more inputs corresponding to the request to log an action associated with the respective medication, moving the representation of the respective medication from the first portion of the first user interface to a second portion of the first user interface different from the first portion.

In accordance with some embodiments, a computer system configured to communicate with a display generation component and one or more input devices is described. The computer system comprises: one or more processors; and memory storing one or more programs configured to be executed by the one or more processors, the one or more programs including instructions for: displaying, via the display generation component, a first user interface, wherein displaying the first user interface includes: displaying, in a first portion of the first user interface, a representation of a respective medication that is scheduled to be taken at a scheduled time; detecting a first set of one or more inputs corresponding to a request to log an action associated with the respective medication that includes at least one detected while displaying the first user interface; and in response to detecting the first set of one or more inputs corresponding to the request to log an action associated with the respective medication, moving the representation of the respective medication from the first portion of the first user interface to a second portion of the first user interface different from the first portion.

In accordance with some embodiments, a computer system configured to communicate with a display generation component and one or more input devices is described. The computer system comprises: means for displaying, via the display generation component, a first user interface wherein displaying the first user interface includes: displaying, in a first portion of the first user interface, a representation of a respective medication that is scheduled to be taken at a scheduled time; means for detecting a first set of one or more inputs corresponding to a request to log an action associated with the respective medication that includes at least one detected while displaying the first user interface; and means for, in response to detecting the first set of one or more inputs corresponding to the request to log an action associated with the respective medication, moving the representation of the respective medication from the first portion of the first user interface to a second portion of the first user interface different from the first portion.

In accordance with some embodiments, a computer program product is described. The computer program product comprises: one or more programs configured to be executed by one or more processors of a computer system that is in communication with a display generation component and one or more input devices, the one or more programs including instructions for: displaying, via the display generation component, a first user interface, wherein displaying the first user interface includes: displaying, in a first portion of the first user interface, a representation of a respective medication that is scheduled to be taken at a scheduled time; detecting a first set of one or more inputs corresponding to a request to log an action associated with the respective medication that includes at least one detected while displaying the first user interface; and in response to detecting the first set of one or more inputs corresponding to the request to log an action associated with the respective medication, moving the representation of the respective medication from the first portion of the first user interface to a second portion of the first user interface different from the first portion.

In accordance with some embodiments, a method performed at a computer system that is in communication with a display generation component and one or more input devices is described. The method comprises: detecting, via the one or more input devices, an input corresponding to a request to display a summary of a plurality of logged actions associated with a respective medication; and in response to detecting the input corresponding to the request to display the summary of logs for actions associated with the respective medication, displaying, via the display generation component, a user interface including a time scale, wherein displaying the user interface includes: in accordance with a determination that the respective medication has a first type of logged action for a first logged action of the plurality of logged actions, displaying a first indicator for the first logged action as having a first appearance on the time scale; and in accordance with a determination that the respective medication has a second type of logged action different from the first type of logged action for the first logged action of the plurality of logged actions, displaying a second indicator for the first logged action as having a second appearance on the time scale, the second appearance different from the first appearance.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, an input corresponding to a request to display a summary of a plurality of logged actions associated with a respective medication; and in response to detecting the input corresponding to the request to display the summary of logs for actions associated with the respective medication, displaying, via the display generation component, a user interface including a time scale, wherein displaying the user interface includes: in accordance with a determination that the respective medication has a first type of logged action for a first logged action of the plurality of logged actions, displaying a first indicator for the first logged action as having a first appearance on the time scale; and in accordance with a determination that the respective medication has a second type of logged action different from the first type of logged action for the first logged action of the plurality of logged actions, displaying a second indicator for the first logged action as having a second appearance on the time scale, the second appearance different from the first appearance.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, an input corresponding to a request to display a summary of a plurality of logged actions associated with a respective medication; and in response to detecting the input corresponding to the request to display the summary of logs for actions associated with the respective medication, displaying, via the display generation component, a user interface including a time scale, wherein displaying the user interface includes: in accordance with a determination that the respective medication has a first type of logged action for a first logged action of the plurality of logged actions, displaying a first indicator for the first logged action as having a first appearance on the time scale; and in accordance with a determination that the respective medication has a second type of logged action different from the first type of logged action for the first logged action of the plurality of logged actions, displaying a second indicator for the first logged action as having a second appearance on the time scale, the second appearance different from the first appearance.

In accordance with some embodiments, a computer system configured to communicate with a display generation component and one or more input devices is described. The computer system comprises: one or more processors; and memory storing one or more programs configured to be executed by the one or more processors, the one or more programs including instructions for: detecting, via the one or more input devices, an input corresponding to a request to display a summary of a plurality of logged actions associated with a respective medication; and in response to detecting the input corresponding to the request to display the summary of logs for actions associated with the respective medication, displaying, via the display generation component, a user interface including a time scale, wherein displaying the user interface includes: in accordance with a determination that the respective medication has a first type of logged action for a first logged action of the plurality of logged actions, displaying a first indicator for the first logged action as having a first appearance on the time scale; and in accordance with a determination that the respective medication has a second type of logged action different from the first type of logged action for the first logged action of the plurality of logged actions, displaying a second indicator for the first logged action as having a second appearance on the time scale, the second appearance different from the first appearance.

In accordance with some embodiments, a computer system configured to communicate with a display generation component and one or more input devices is described. The computer system comprises: means for detecting, via the one or more input devices, an input corresponding to a request to display a summary of a plurality of logged actions associated with a respective medication; and means for, in response to detecting the input corresponding to the request to display the summary of logs for actions associated with the respective medication, displaying, via the display generation component, a user interface including a time scale, wherein displaying the user interface includes: in accordance with a determination that the respective medication has a first type of logged action for a first logged action of the plurality of logged actions, displaying a first indicator for the first logged action as having a first appearance on the time scale; and in accordance with a determination that the respective medication has a second type of logged action different from the first type of logged action for the first logged action of the plurality of logged actions, displaying a second indicator for the first logged action as having a second appearance on the time scale, the second appearance different from the first appearance.

In accordance with some embodiments, a computer program product is described. The computer program product comprises: one or more programs configured to be executed by one or more processors of a computer system that is in communication with a display generation component and one or more input devices, the one or more programs including instructions for: detecting, via the one or more input devices, an input corresponding to a request to display a summary of a plurality of logged actions associated with a respective medication; and in response to detecting the input corresponding to the request to display the summary of logs for actions associated with the respective medication, displaying, via the display generation component, a user interface including a time scale, wherein displaying the user interface includes: in accordance with a determination that the respective medication has a first type of logged action for a first logged action of the plurality of logged actions, displaying a first indicator for the first logged action as having a first appearance on the time scale; and in accordance with a determination that the respective medication has a second type of logged action different from the first type of logged action for the first logged action of the plurality of logged actions, displaying a second indicator for the first logged action as having a second appearance on the time scale, the second appearance different from the first appearance.

In accordance with some embodiments, a method performed at a computer system that is in communication with a display generation component and one or more input devices is described. The method comprises: displaying a watch face user interface including an indication of a current time and a complication for a medication tracking application; while displaying the watch face user interface, detecting an input corresponding to a selection of the complication; and in response to detecting the input corresponding to the selection of the complication, displaying a user interface including: in accordance with a determination that a first medication satisfies a scheduling criteria, displaying a plurality of logging options for the first medication; and in accordance with a determination that a second medication and the first medication satisfies the scheduling criteria, displaying the plurality of logging options for the first medication and a plurality of logging options for the second medication.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: displaying a watch face user interface including an indication of a current time and a complication for a medication tracking application; while displaying the watch face user interface, detecting an input corresponding to a selection of the complication; and in response to detecting the input corresponding to the selection of the complication, displaying a user interface including: in accordance with a determination that a first medication satisfies a scheduling criteria, displaying a plurality of logging options for the first medication; and in accordance with a determination that a second medication and the first medication satisfies the scheduling criteria, displaying the plurality of logging options for the first medication and a plurality of logging options for the second medication.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: displaying a watch face user interface including an indication of a current time and a complication for a medication tracking application; while displaying the watch face user interface, detecting an input corresponding to a selection of the complication; and in response to detecting the input corresponding to the selection of the complication, displaying a user interface including: in accordance with a determination that a first medication satisfies a scheduling criteria, displaying a plurality of logging options for the first medication; and in accordance with a determination that a second medication and the first medication satisfies the scheduling criteria, displaying the plurality of logging options for the first medication and a plurality of logging options for the second medication.

In accordance with some embodiments, a computer system configured to communicate with a display generation component and one or more input devices is described. The computer system comprises: one or more processors; and memory storing one or more programs configured to be executed by the one or more processors, the one or more programs including instructions for: displaying a watch face user interface including an indication of a current time and a complication for a medication tracking application; while displaying the watch face user interface, detecting an input corresponding to a selection of the complication; and in response to detecting the input corresponding to the selection of the complication, displaying a user interface including: in accordance with a determination that a first medication satisfies a scheduling criteria, displaying a plurality of logging options for the first medication; and in accordance with a determination that a second medication and the first medication satisfies the scheduling criteria, displaying the plurality of logging options for the first medication and a plurality of logging options for the second medication.

In accordance with some embodiments, a computer system configured to communicate with a display generation component and one or more input devices is described. The computer system comprises: means for displaying a watch face user interface including an indication of a current time and a complication for a medication tracking application; means for, while displaying the watch face user interface, detecting an input corresponding to a selection of the complication; and means for, in response to detecting the input corresponding to the selection of the complication, displaying a user interface including: in accordance with a determination that a first medication satisfies a scheduling criteria, displaying a plurality of logging options for the first medication; and in accordance with a determination that a second medication and the first medication satisfies the scheduling criteria, displaying the plurality of logging options for the first medication and a plurality of logging options for the second medication.

In accordance with some embodiments, a computer program product is described. The computer program product comprises: one or more programs configured to be executed by one or more processors of a computer system that is in communication with a display generation component and one or more input devices, the one or more programs including instructions for: displaying a watch face user interface including an indication of a current time and a complication for a medication tracking application; while displaying the watch face user interface, detecting an input corresponding to a selection of the complication; and in response to detecting the input corresponding to the selection of the complication, displaying a user interface including: in accordance with a determination that a first medication satisfies a scheduling criteria, displaying a plurality of logging options for the first medication; and in accordance with a determination that a second medication and the first medication satisfies the scheduling criteria, displaying the plurality of logging options for the first medication and a plurality of logging options for the second medication.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for tracking medications, thereby increasing the effectiveness, efficiency, and user satisfaction with such devices. Such methods and interfaces may complement or replace other methods for tracking medications.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 7A-7B are a flow diagram illustrating methods for tracking medications, in accordance with some embodiments.

FIG. 9 is a flow diagram illustrating methods for tracking medications, in accordance with some embodiments.

FIG. 11 is a flow diagram illustrating methods for managing logging actions, in accordance with some embodiments.

FIG. 13 is a flow diagram illustrating methods of displaying a summary of tracked medications, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for tracking medications. Tracking medications, for example, provides users with an ability to schedule and record medications. Such techniques can reduce the cognitive burden on a user who tracks medications, thereby enhancing productivity. Further, such techniques can reduce processor and battery power otherwise wasted on redundant user inputs.

Figure 10A:
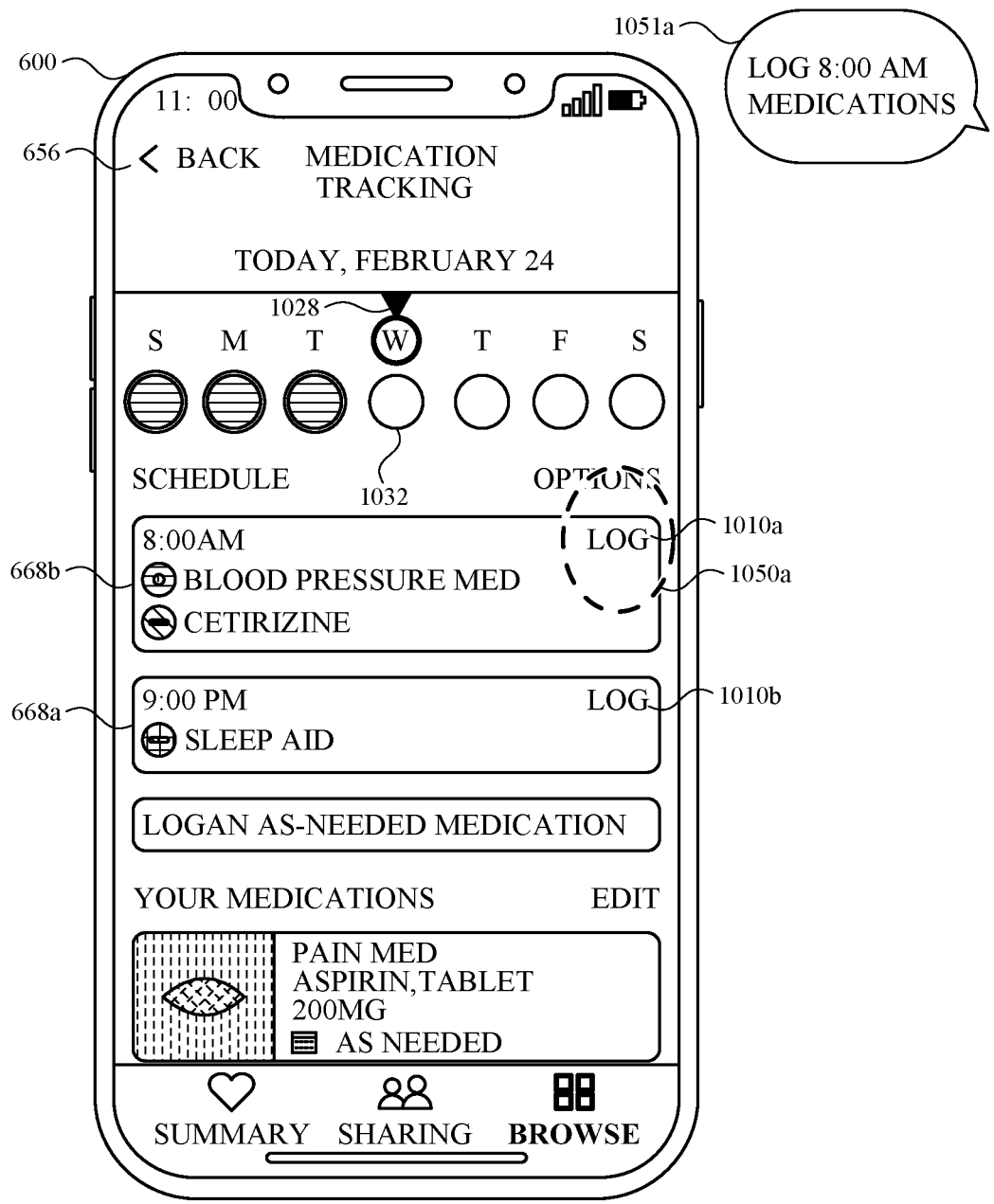
FIGS. 10A-10N illustrate exemplary user interfaces for managing logging actions, in accordance with some embodiments.
Figure 10B:
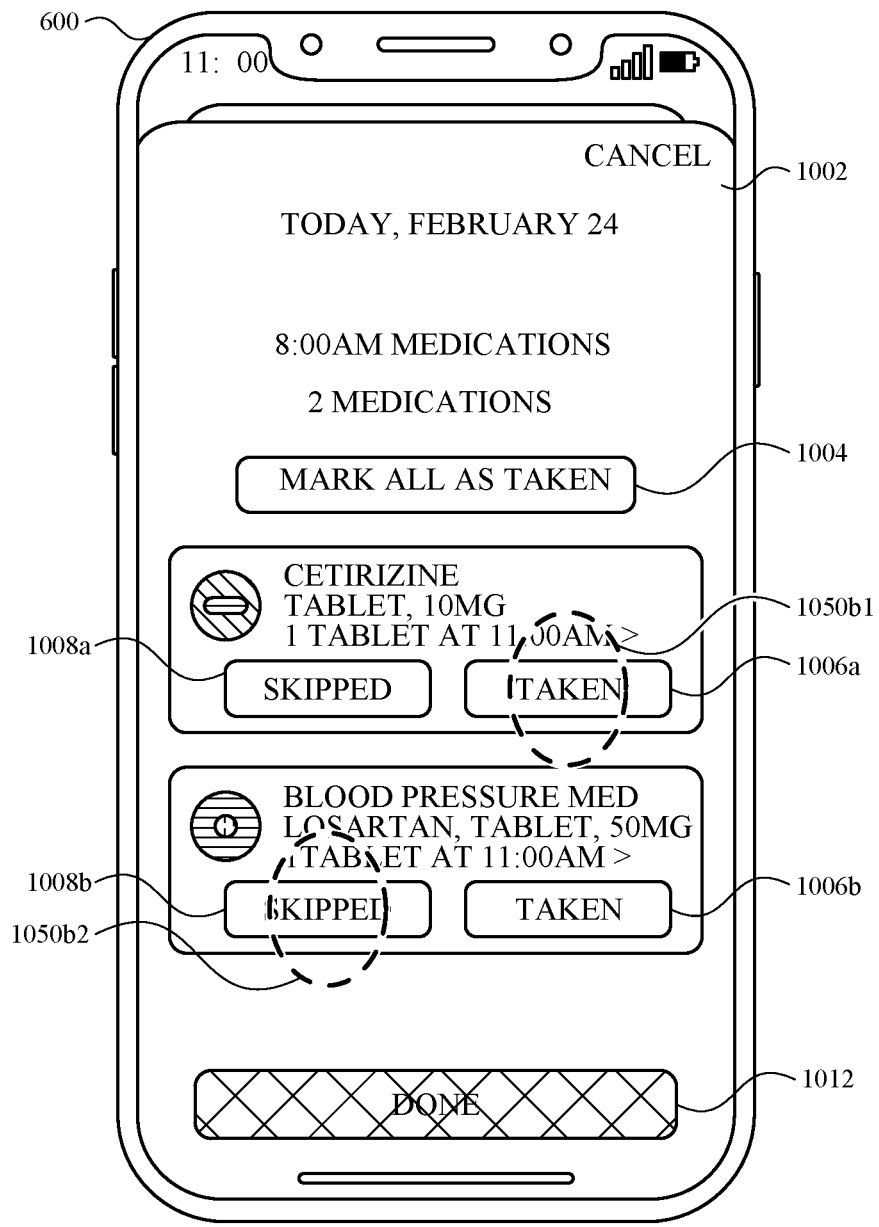

Below, FIGS. 1A-1B, 2, 3, 4A-4B, and 5A-5B provide a description of exemplary devices for performing the techniques for managing event notifications. FIGS. 6A-6AD illustrate exemplary user interfaces for tracking medications. FIGS. 7A-7B, 8, and 9 are flow diagrams illustrating methods for tracking medications in accordance with some embodiments. The user interfaces in FIGS. 6A-6AD are used to illustrate the processes described below, including the processes in FIGS. 7A-7B, 8, and 9. FIGS. 10A-10N illustrate exemplary user interfaces for managing logging actions. FIG. 11 is a flow diagram illustrating methods of managing logging actions in accordance with some embodiments. The user interfaces in FIGS. 10A-10N are used to illustrate the processes described below, including the processes in FIG. 11. FIGS. 12A-12E illustrate exemplary user interfaces for displaying a summary of tracked medications. FIG. 13 is a flow diagram illustrating methods for displaying a summary of tracked medications in accordance with some embodiments. The user interfaces in FIGS. 12A-12E are used to illustrate the processes described below, including the processes in FIG. 13. FIGS. 14A-14K illustrate exemplary user interfaces for tracking medications. FIG. 15 is a flow diagram illustrating methods for tracking medications in accordance with some embodiments. The user interfaces in FIGS. 14A-14K are used to illustrate the processes described below, including the processes in FIG. 15.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving how medications are tracked, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
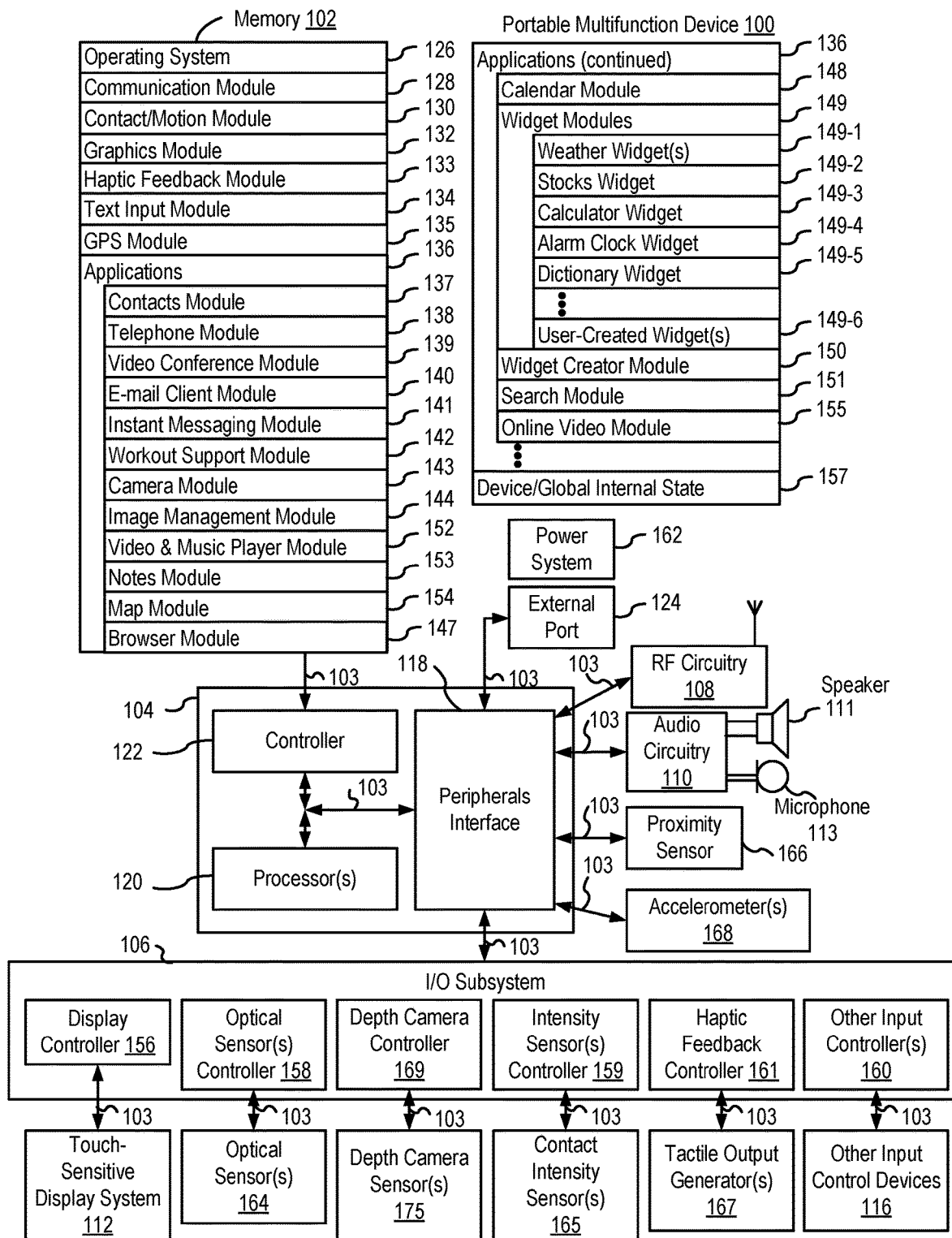
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
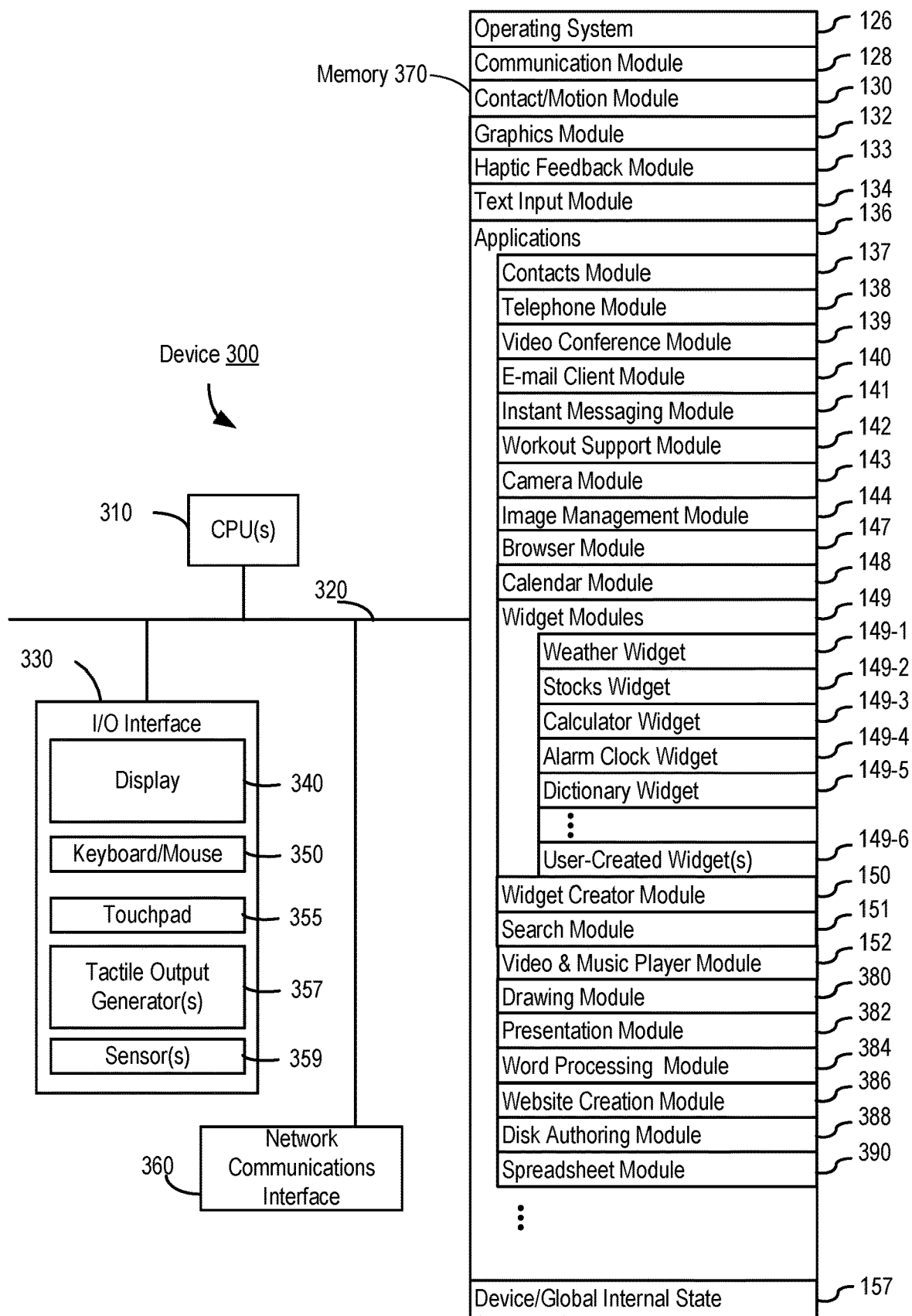
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
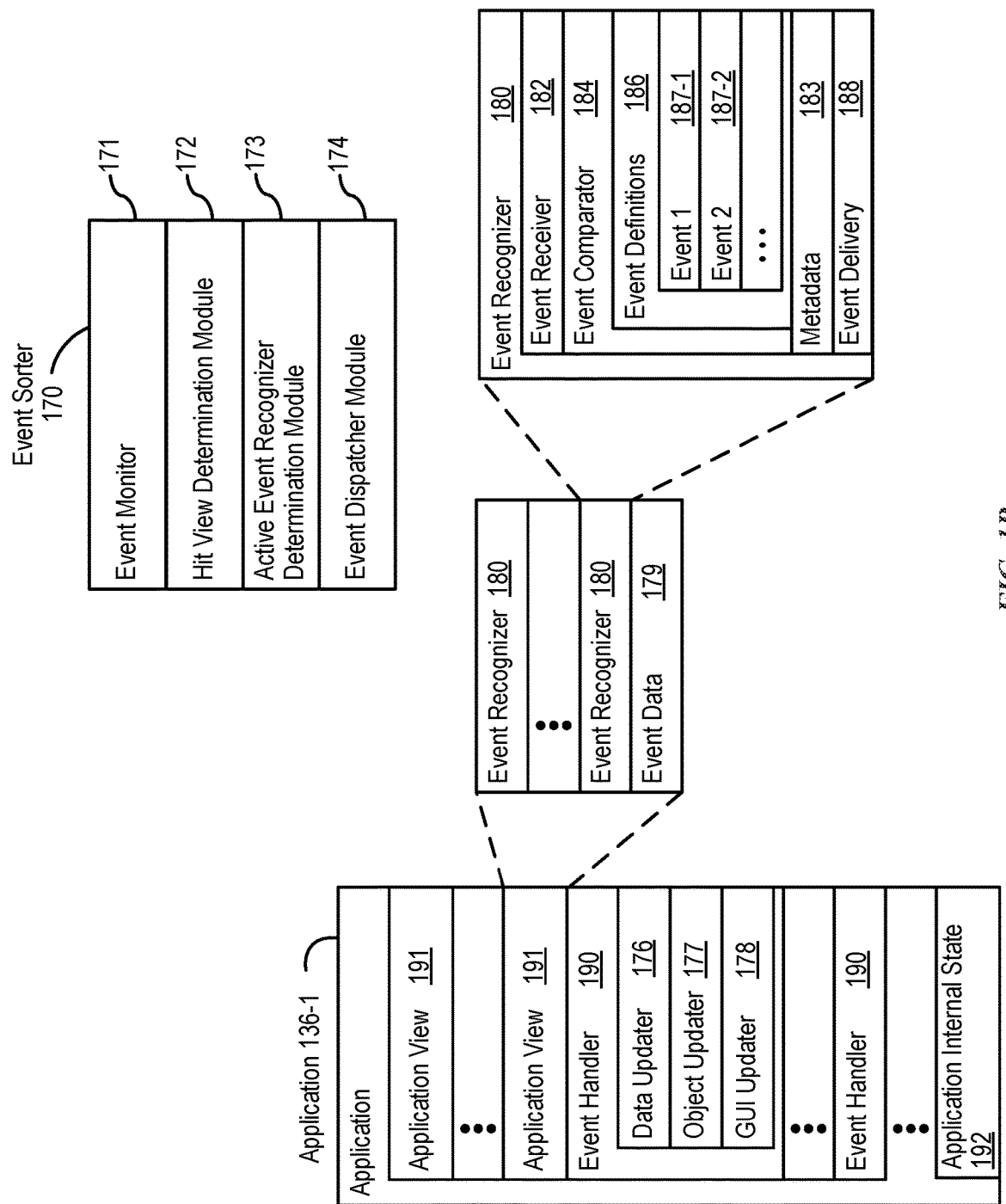
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
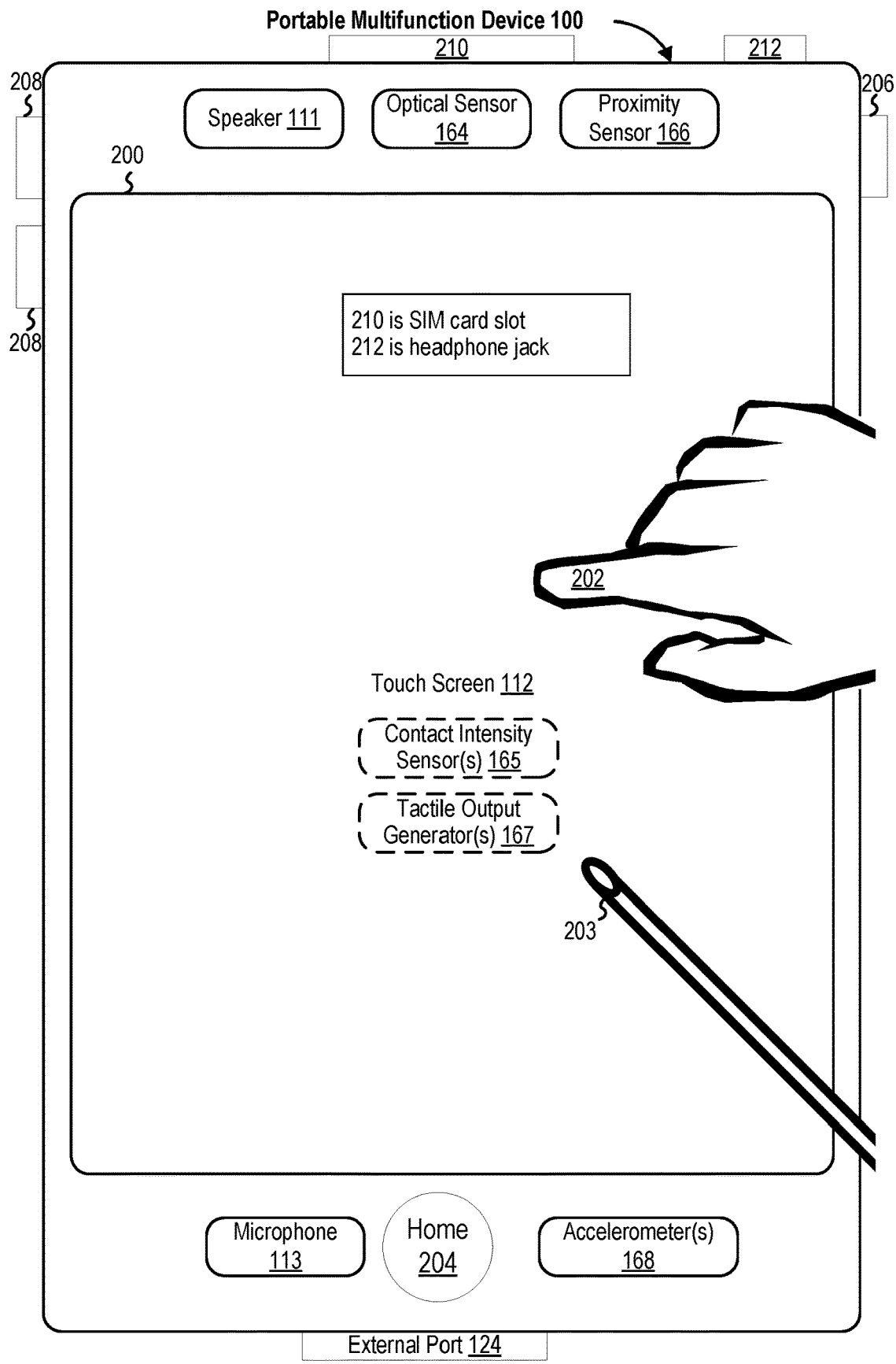
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
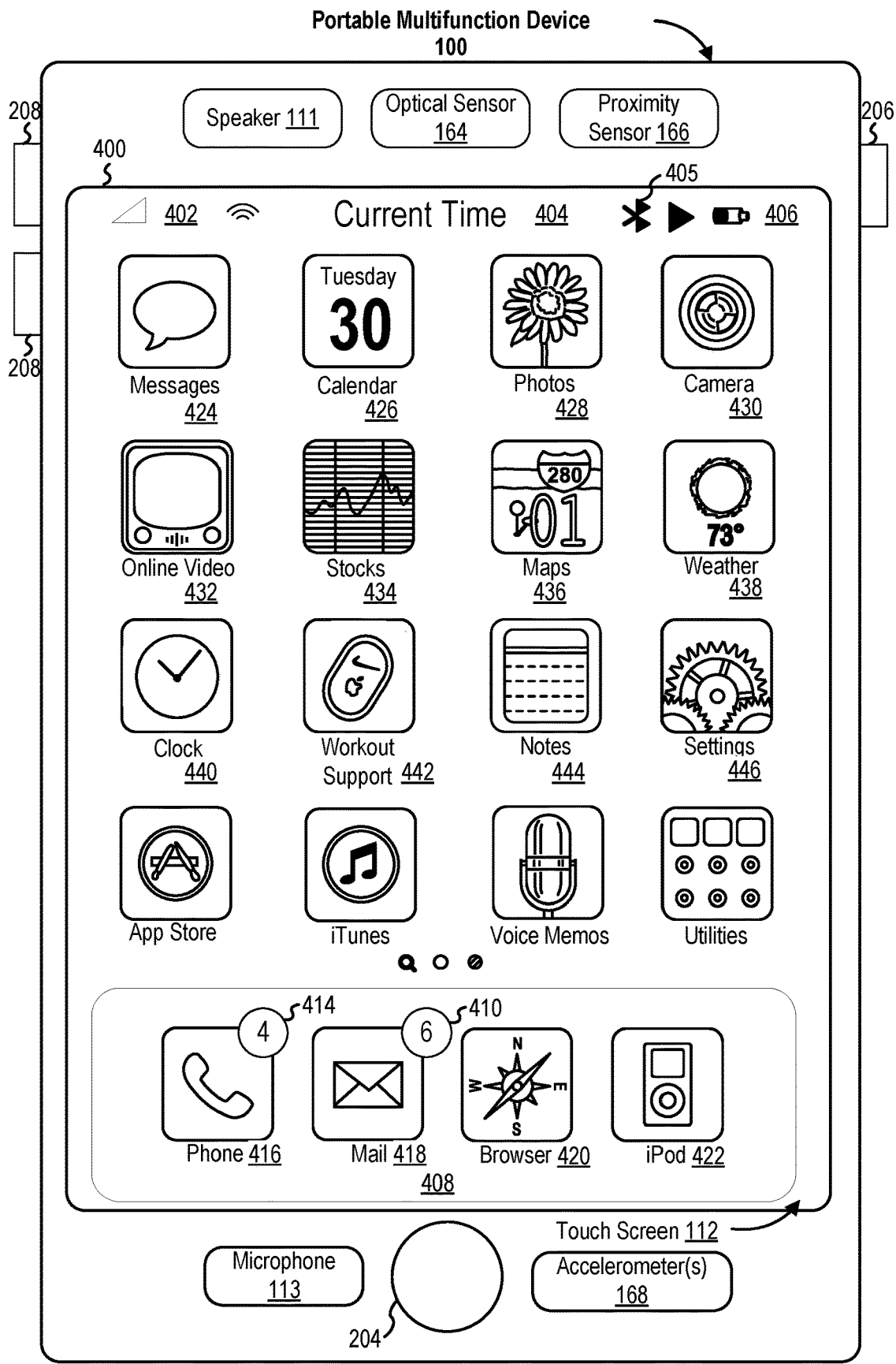
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
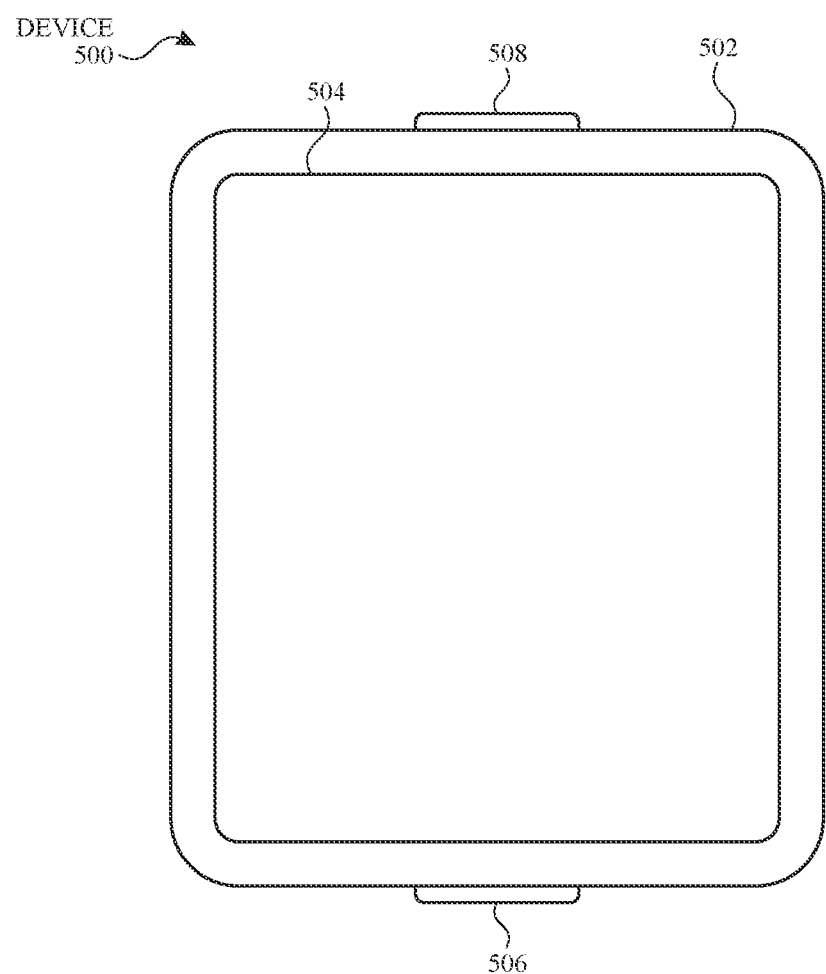
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
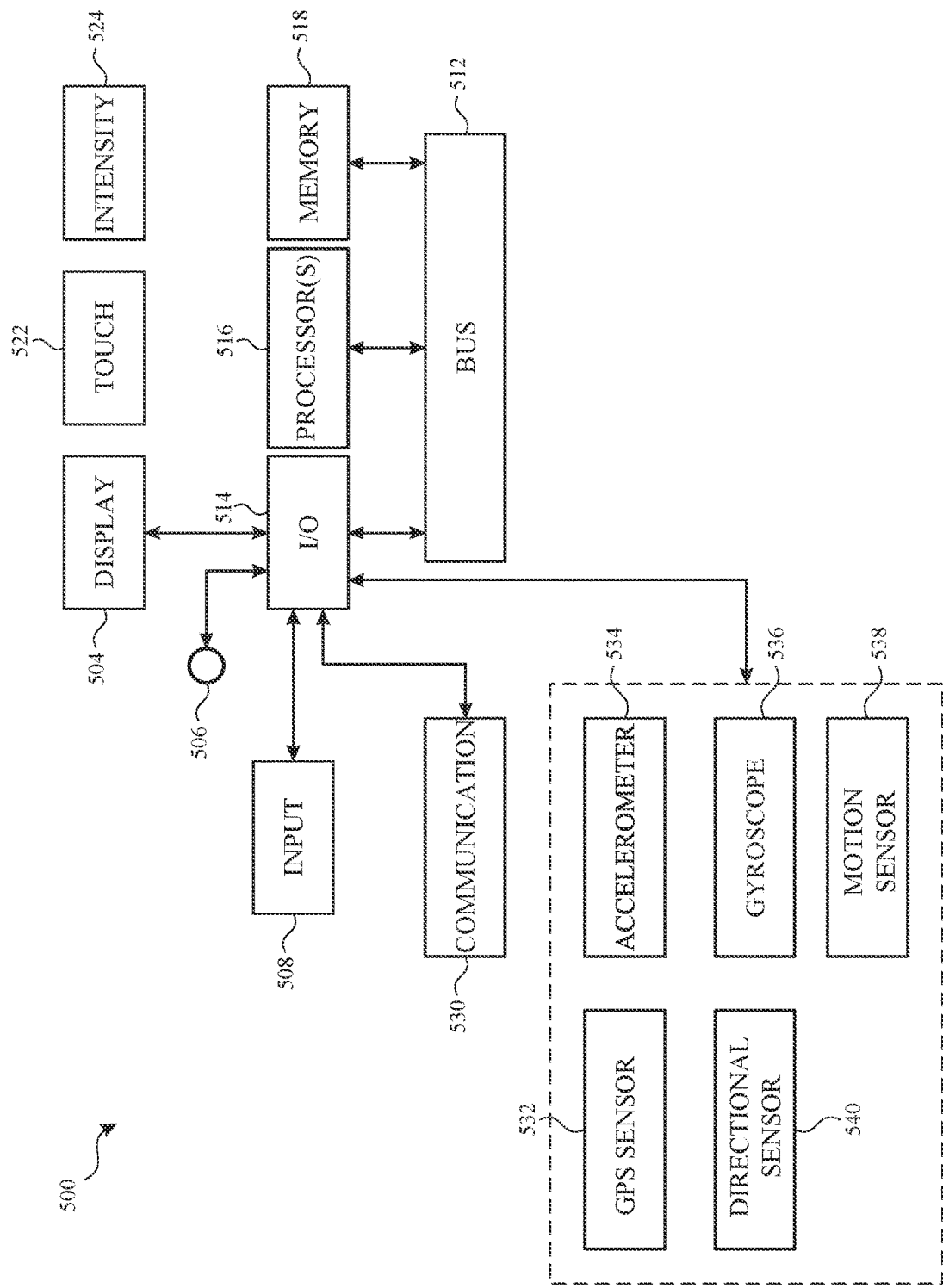
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-900, 1100, 1300, and/or 1500 (FIGS. 7A-7B, 8, 9, 11, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6AD illustrate example user interfaces for tracking medications, in accordance with some embodiments. The user interfaces in these figures are used to illustrate the processes described below, including the processes in FIGS. 7A-9.

At FIG. 6A, device 600 displays a home screen with health application icon 602 on display 601. In some embodiments, device 600 includes one or more features of devices 100, 300, and/or 500. While displaying health application icon 602, device 600 detects input 650a (e.g., a tap and/or a mouse click) directed at health application icon 602. In response to detecting input 650a, device 600 displays functions interface 604b of a health application associated with health application icon 602, as depicted in FIG. 6B.

Figure 6B:
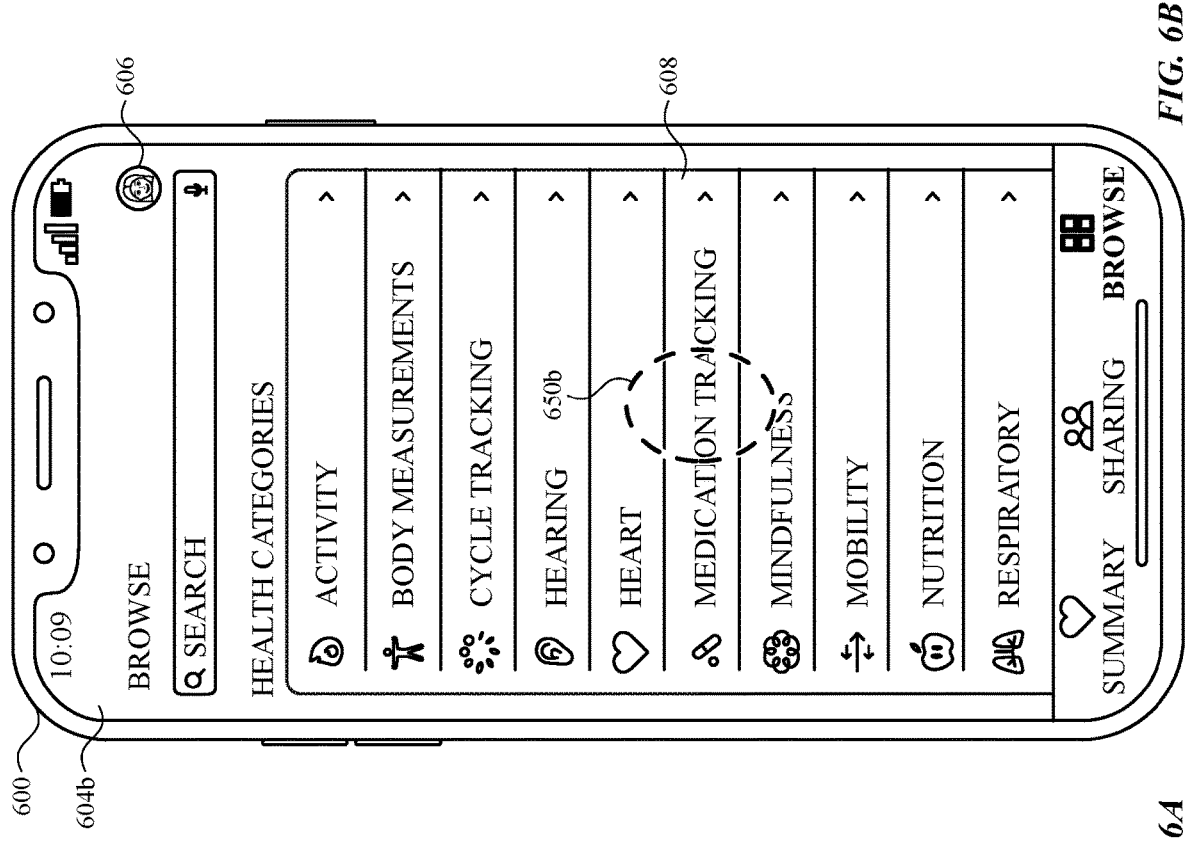
FIGS. 6A-6AD illustrate exemplary user interfaces for tracking medications, in accordance with some embodiments.
Figure 6A:
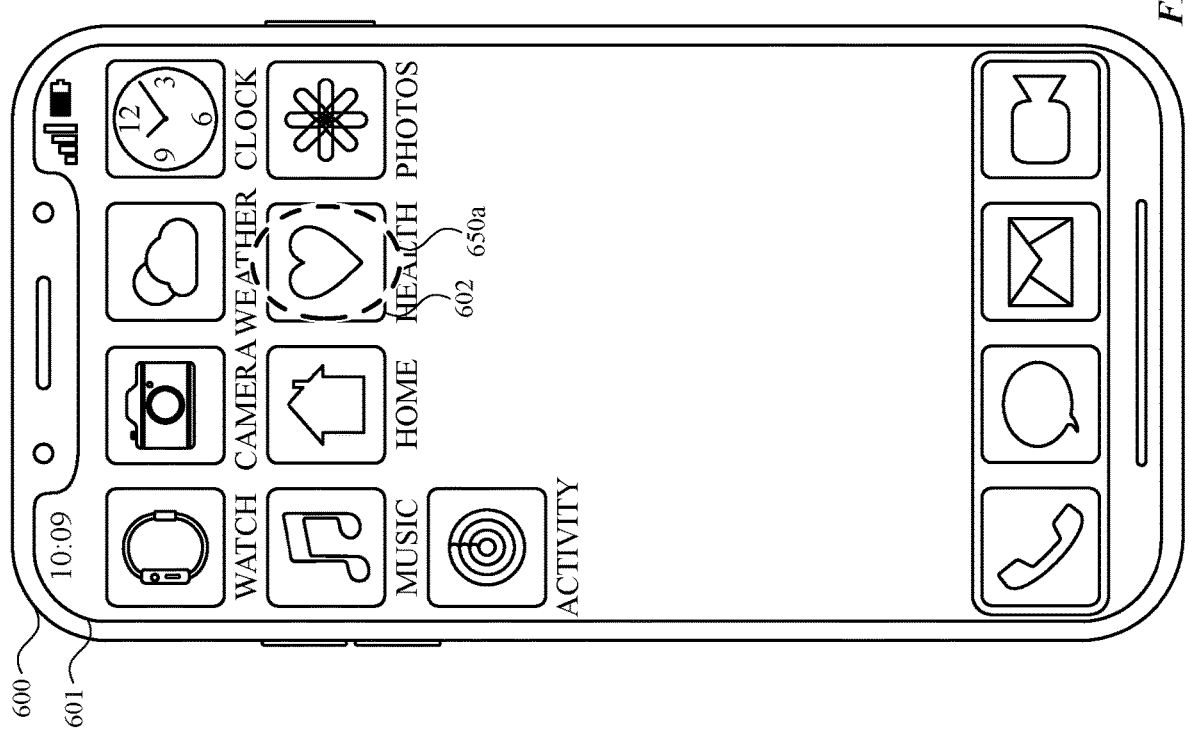

At FIG. 6B, functions interface 604b includes affordances for different functions of the health application, including medication tracker affordance 608 for a medication tracker function of the health application. A user associated with profile icon 606 is signed into a user account. As such, the medication tracker (or, optionally, the health application) is specific to the user, tracking medications specific to the user. In some embodiments, the medication tracker includes functions related to scheduling medications and/or recording logs of medications.

Figure 6D:
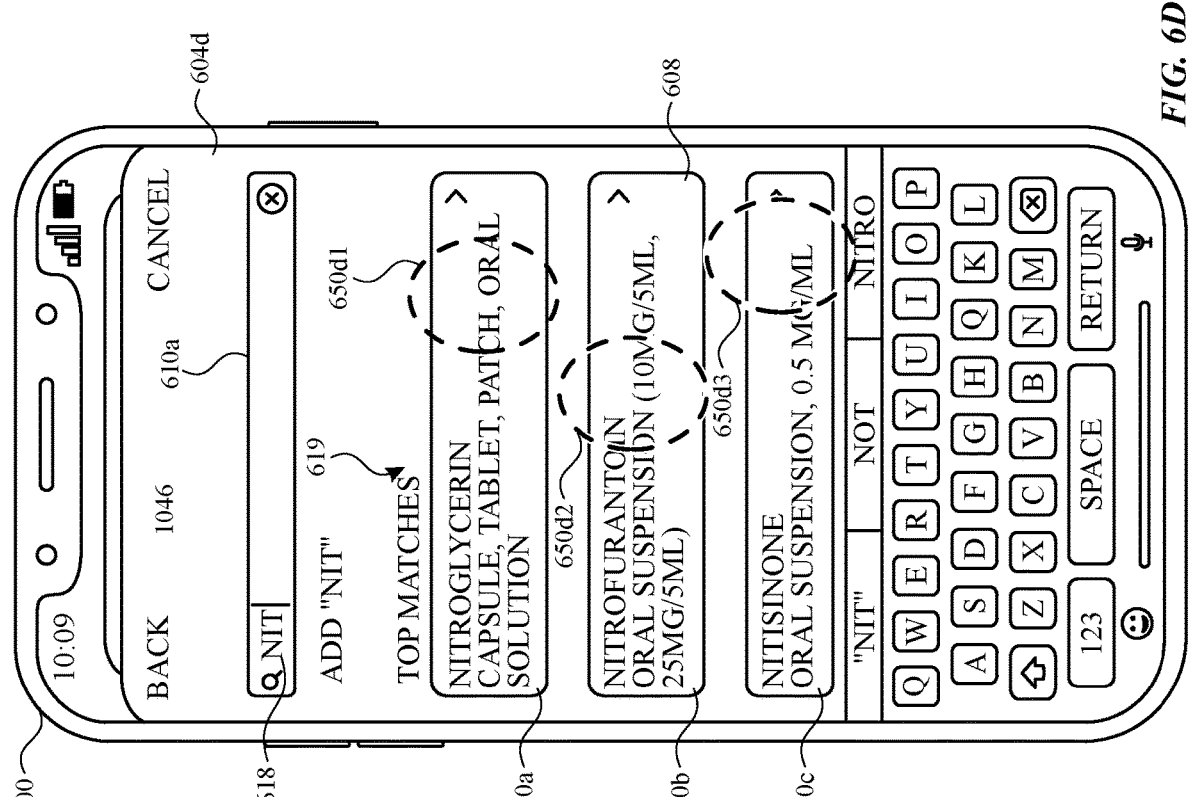
Figure 6C:
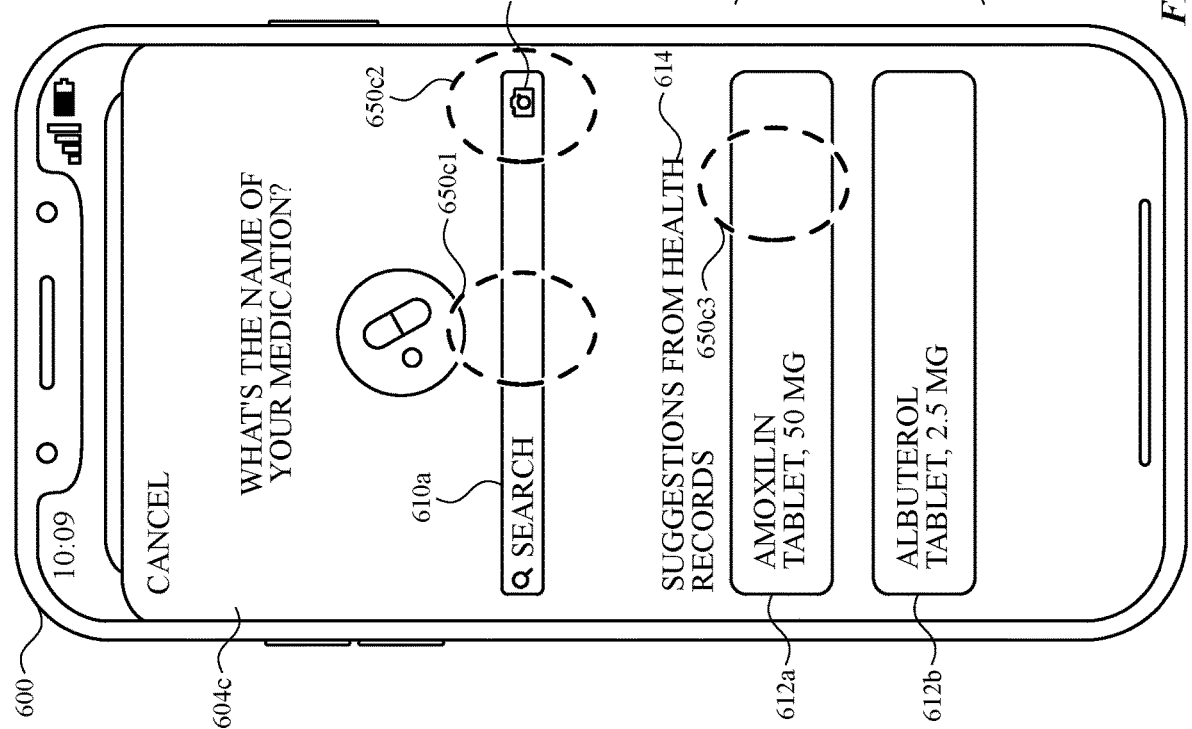

While displaying functions interface 604b, device 600 detects input 650b (e.g., tap and/or mouse click) directed at medication tracker affordance 608. In response to detecting input 650b, device 600 displays search interface 604c, as depicted in FIG. 6C. In some embodiments (e.g., during an initial set-up process of the medication tracker), search interface 604c is an initial interface of a process for adding a new medication that the user wishes to be tracked by the health application and device 600. FIGS. 6D-6V, discussed in more detail below, depict additional user interfaces of the process for adding the new medication. In some embodiments (e.g., after the initial set-up process of the medication tracker), in response to detecting input 650b, device 600 displays tracking interface 656, as depicted in FIG. 6W and/or FIG. 6X.

At FIG. 6C, search interface 604c includes different options to search for a medication to add to the medication tracker. Search interface 604c includes text search bar 610a and image search affordance 610b to search for a medication. Search interface 604c also includes clinical health record affordances 612. ("CHR affordances"). In some embodiments, CHR affordances 612 are based on clinical health records for the user. In some embodiments, device 600 has access to the user's CHR based on a wireless communication with a computer maintaining a care provider's records for the user (e.g., via an online portal provided by a care provider and/or via a server that maintains the care provider's records for the user). In some embodiments, device 600 has access to the user's CHR based on the care provider's records for the user being stored locally on device 600. In some embodiments, the care provider's records include a prescription and/or a care provider's notes, At FIG. 6C, device 600 prepopulates search interface 604c with CHR affordances 612, without requiring a search input (such as a text-based search via text search bar 610a and/or image-based search via image search affordance 610b). In some embodiments, CHR affordances 612 are associated with at least one of a medication name, a medication form, and/or a medicinal strength, if identified by device 600. As such, CHR affordances 612 allow a user to bypass providing input to search for a specific medication. Additionally, in embodiments where device 600 displays a respective CHR affordance based on identifying a medication form and/or a medicinal strength, such embodiments allow the user to bypass user interfaces and reduces the number of inputs to configure a medication form and/or medicinal strength. In some embodiments, prepopulating search interface 604c with CHR affordances 612a-b, reduces user input and preserves the battery life of device 600.

At FIG. 6C, in some embodiments, CHR affordance 612a and CHR affordance 612b are associated with medications that have been prescribed within the last year, based on information in the user's clinical health records. In some embodiments, search interface 604c does not include CHR affordances for medications that were prescribed prior to the last year.

At FIG. 6C, CHR affordance 612a and CHR affordance 612b both include a medication name, a medication form, and a medication strength. In some embodiments, CHR affordance 612a and/or CHR affordance 612b does not include a medication form and/or a medicinal strength (e.g., because they are missing from CHR 614 and/or cannot be identified by device 600).

At FIG. 6C, while displaying search interface 604c, device 600 detects input 650c3 (e.g., tap and/or mouse click) directed at CHR affordance 612a. In response to detecting input 650c3, device 600 displays scheduling interface 604n, as depicted in FIG. 6N. Accordingly, the user has bypassed not only searching for a medication, but also the user interfaces to configure a medication form and/or medicinal strength, which are described in greater detail herein. In some embodiments, device 600 does not identify a medication form and/or a medicinal strength from a user's CHR. In such embodiments, in response to detecting an input on a CHR affordance, device 600 would display form selection interface 604e and/or strength selection interface 604g (e.g., so that a user can provide the medication form and/or medicinal strength, respectively).

At FIG. 6C, a user can search for a medication using search bar 610. While displaying search interface 604c, device 600 detects input 650c1 (e.g., tap, mouse click, and/or keystroke) directed at text search bar 610a. In response to detecting input 650c1, device 600 displays a search user interface, similar to search interface 604d depicted in FIG. 6D but without text 618 (if the user has not provided a text input) and/or without search results 620a-620c. In some embodiments, in response to detecting input 650c1, device 600 ceases to display CHR affordances 612.

At FIG. 6C, while displaying search interface 604c, device 600 detects input 650c2 (e.g., tap and/or mouse click) directed at image search affordance 610b. In response to detecting input 650c2, device 600 displays instructional interface 604k, as depicted in FIG. 6K.

At FIG. 6D, in response to detecting user input that adds text search bar 610a (e.g., text 618), device 600 displays search interface 604d. Device 600 displays search results 620 for a medication in search interface 604d based on detected text 618. In some embodiments, search results include a brand name and/or a chemical name depending on text 618. In some embodiments, a respective medication having a plurality of forms and/or strengths is displayed in a single search result (e.g., as opposed to displaying multiple results for a single medication but having different forms and/or strengths). In some embodiments, device 600 displays a keyboard and/or search results in location 616a (e.g., an area previously occupied by CHR affordances 612). In some embodiments, device 600 moves text search bar 610a (e.g., with respect to the location of text search bar 610a in FIG. 6C).

At FIG. 6D, search results 620 include nitroglycerin affordance 620a for nitroglycerin, which is available in multiple forms (e.g., capsule, tablet, patch, and/or oral solution) and multiple strengths. While displaying search interface 604d, device 600 detects input 650d1 (e.g., tap and/or mouse click) directed at nitroglycerin affordance 620a. In response to detecting input 650d1, device 600 displays form selection interface 604e, as depicted in FIG. 6E.

At FIG. 6D, search results 619 include nitrofurantoin affordance 620b for nitrofurantoin, which is available in a single form (e.g., only) (e.g., oral suspension) and multiple strengths (e.g., 10 mg/5 mL and/or 25 mg/5 ml). While displaying search interface 604d, device 600 detects input 650d2 (e.g., tap and/or mouse click) directed at nitrofurantoin affordance 620b. In response to detecting input 650d2, device 600 displays a strength user interface similar to strength selection interface 604g, as depicted in FIG. 6G. The strength user interface includes affordances for one or more strengths (e.g., a plurality of strengths) in which the medication is available (e.g., 10 mg/5 mL and/or 25 mg/5 ml). In some embodiments, in response to detecting input 650d2, device 600 forgoes displaying form selection interface 604e.

At FIG. 6D, in some embodiments, search results 620 include nitisinone affordance 620c for nitisinone, which is available in a single form (e.g., only) (e.g., oral suspension) and a single strength (e.g., only) (e.g., 0.5 mg/mL). While displaying search interface 604d, device 600 detects input 650d3 (e.g., tap and/or mouse click) directed at nitisinone affordance 620c. In response to detecting input 650d3, device 600 displays a scheduling user interface similar to interface 604n, as depicted in FIG. 6N. In some embodiments, in response to detecting input 650d3, device 600 forgoes displaying form selection interface 604e and strength selection interface 604g.

At FIG. 6E, form selection interface 604e allows a user to select a suggested medication form for a particular medication. As illustrated, form selection interface 604e includes affordances 622a-d for medication forms for nitroglycerin, including capsule, tablet, patch, and oral solution. The medication forms include different types of forms of nitroglycerin for which nitroglycerin is available. In some embodiments, form selection interface 604e does not include affordances for medication forms for which nitroglycerin is not available. This simplifies the process of adding a medication to a medication tracker application as it reduces the number of options displayed in the user interface and allows the user to efficiently add the medication without further inputs to manually type out a medication form. In some embodiments, form selection interface 604e is displayed in response to a text-based search (e.g., a text-based search that did not identify a medication form and/or a user selected search result that had multiple forms) or an image-based search (e.g., an image-based search that did not identify a medication form, such as pill bottle scanning or an image of the medication packaging)), and/or a CHR suggestion (e.g., a CHR suggestion that does not include a medication form).

At FIG. 6E, form selection interface 604e includes next affordance 624a. In some embodiments, next affordance 624a is disabled until a user selects an affordance (e.g., tablet affordance 622b) for a medication form. In some embodiments, next affordance 624a has a first appearance (e.g., color and/or shading) while disabled. While displaying form selection interface 604e, device 600 detects input 650e (e.g., tap and/or mouse click) directed at tablet affordance 622b. In response to detecting input 650e, device 600 displays form selection interface 604e, as depicted in FIG. 6F.

At FIG. 6F, form selection interface 604e includes an indication that tablet 622a has been selected. In some embodiments, next affordance 624 is enabled in response to detecting a selection of a medication form (e.g., tablet). In some embodiments, next affordance 624a is displayed with a second appearance different from the first appearance in response to next affordance 624a being enabled. While displaying form selection interface 604e, device 600 detects input 650f (e.g., tap and/or mouse click) directed at next affordance 624. In response to detecting input 650f, device 600 displays strength selection interface 604g, as depicted in FIG. 6G.

At FIG. 6G, strength selection interface 604g allows a user to select a suggested medicinal strength based on a specific medication form. As illustrated, strength selection interface 604g includes affordances 626a-c for medicinal strengths (such as 0.2 mg, 0.4 mg, and 0.6 mg) based on device 600 previously detecting a selection of tablet affordance 622a. In some embodiments, a medicinal strength includes a strength value (e.g., 0.2, 0.4, and/or 0.6) and a strength unit (e.g., mg and/or mL). In some embodiments, the only medicinal strengths displayed in strength selection interface 604g are the available strengths for nitroglycerin in tablet form. In some embodiments, strength selection interface 604g does not include a strength that nitroglycerin is not available in tablet form. This simplifies the process of adding a medication to a medication tracker application as it reduces the number of options displayed in the user interface and allows the user to efficiently add the medication without further inputs to manually type out a strength value. In some embodiments, strength selection interface 604g is displayed in response to a text-based search (e.g., a text-based search that did not identify a medicinal strength and/or a user selected search result that had a single form that is available in multiple strengths) or an image-based search (e.g., an image-based search that did not identify a medicinal strength)), and/or a CHR suggestion (e.g., a CHR suggestion that does not include a medicinal strength).

At FIG. 6G, a user has selected medicinal strength 626a (0.2 mg). As illustrated, next affordance 624 is enabled. In some embodiments, while displaying strength selection interface 604g, device 600 detects an input (e.g., tap and/or mouse click) directed at next affordance 624. In response to detecting an input directed at next affordance 624, device 600 displays a scheduling interface similar to interface 604n of FIG. 6N. In some embodiments, in response to detecting an input directed at next affordance 624, device 600 displays a user interface other than interface 604n, such as icon edit interface 604s, icon edit interface 604t, add details interface 604u, or interaction factors interface 604v.

Figure 6H:
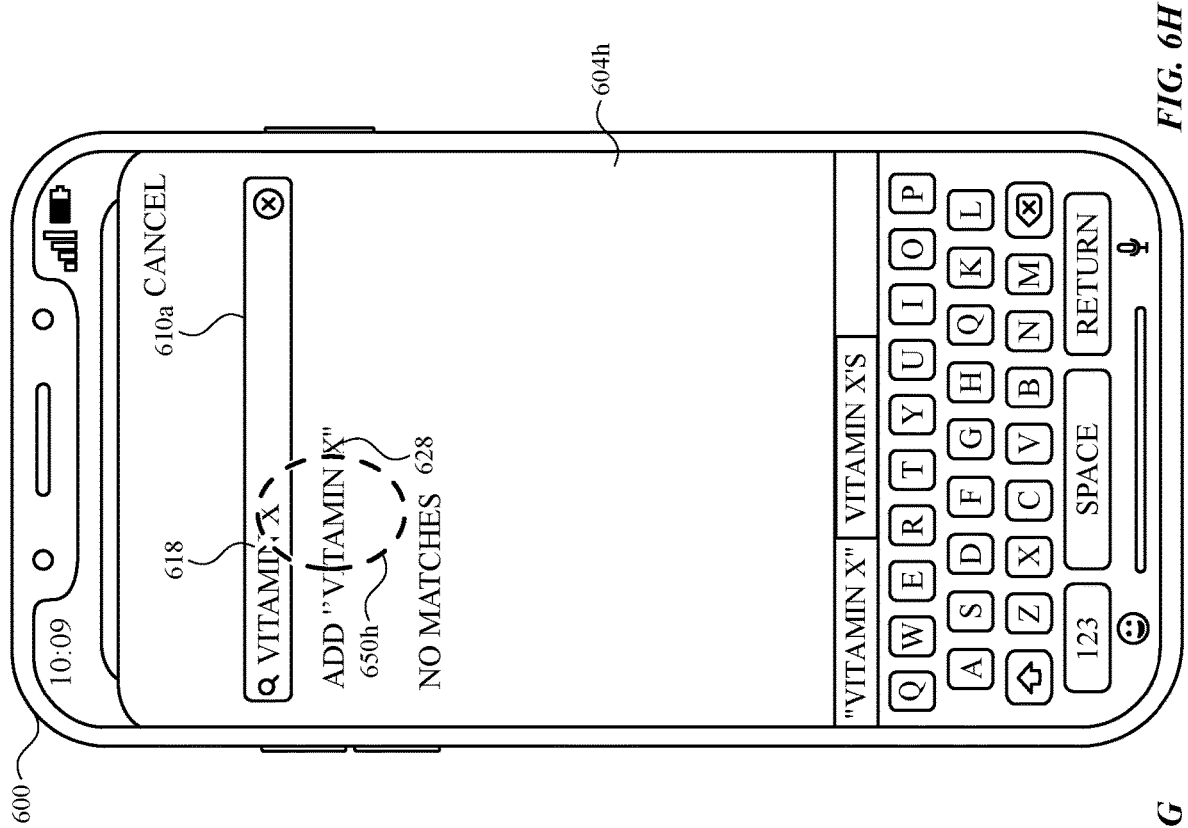
Figure 6G:
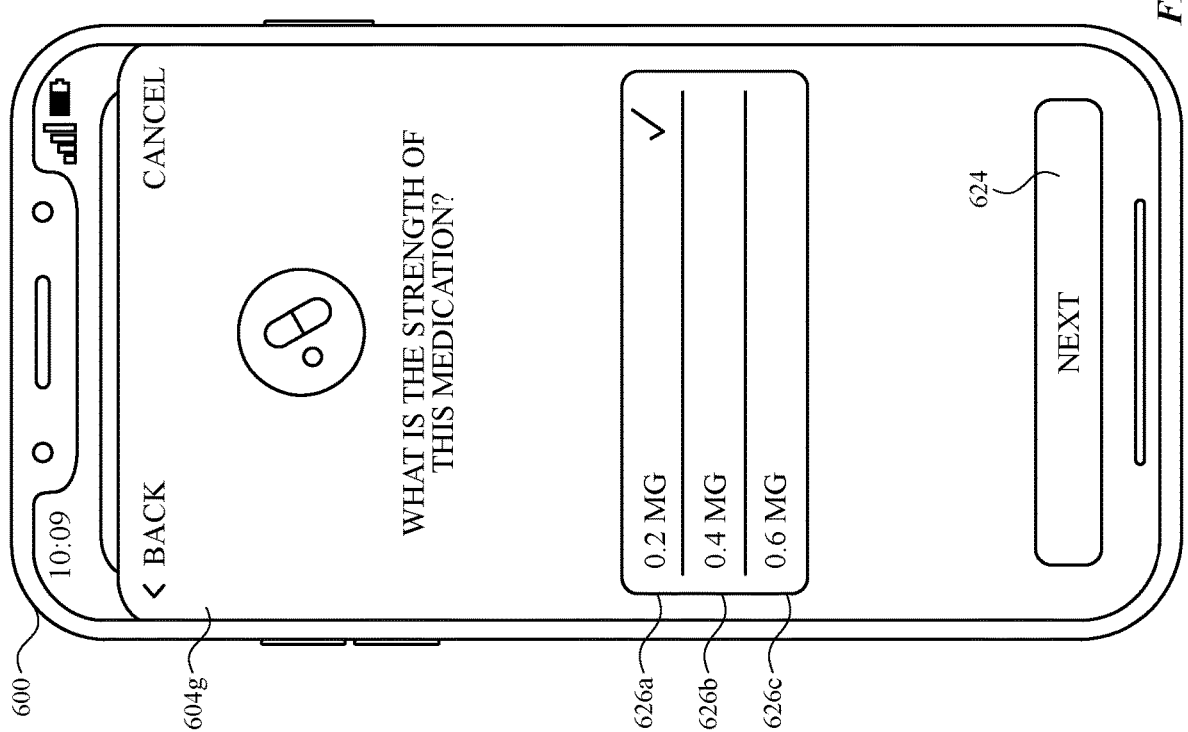
Figure 6J:
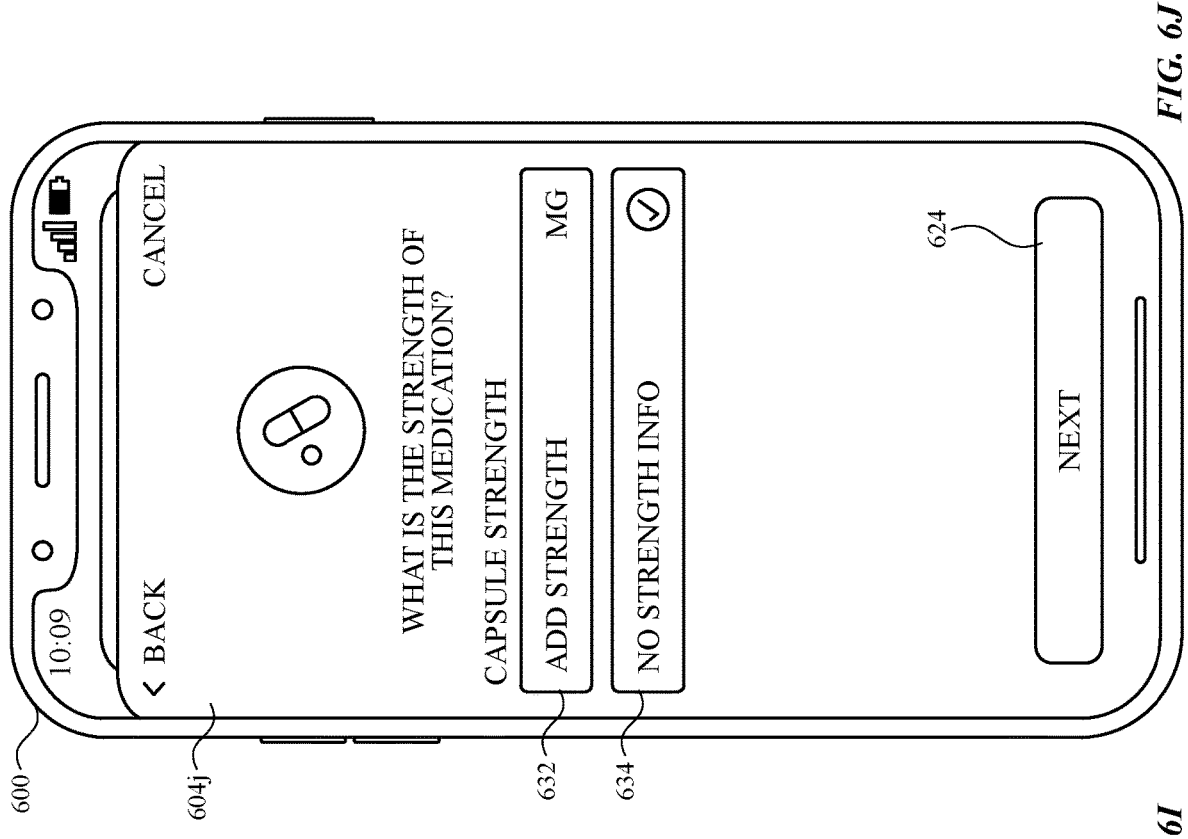

FIG. 6H depicts the search interface discussed with reference to FIG. 6D, after being populated with a different text string than shown in FIG. 6D. At FIG. 6H, device 600 has detected an update to text 618 in search bar 610 to search for Vitamin X, which does not return any search results. As illustrated, interface 604h indicates that there are no matches (e.g., Vitamin X is an unknown medication). Interface 604h includes a user interface object 628 to add Vitamin X as a tracked medication. While displaying interface 604h, device 600 detects input 650h (e.g., tap and/or mouse click) directed at user interface object 628. In response to detecting input 650h, device 600 displays strength selection interface 604i, as depicted in FIG. 6I.

Figure 6I:
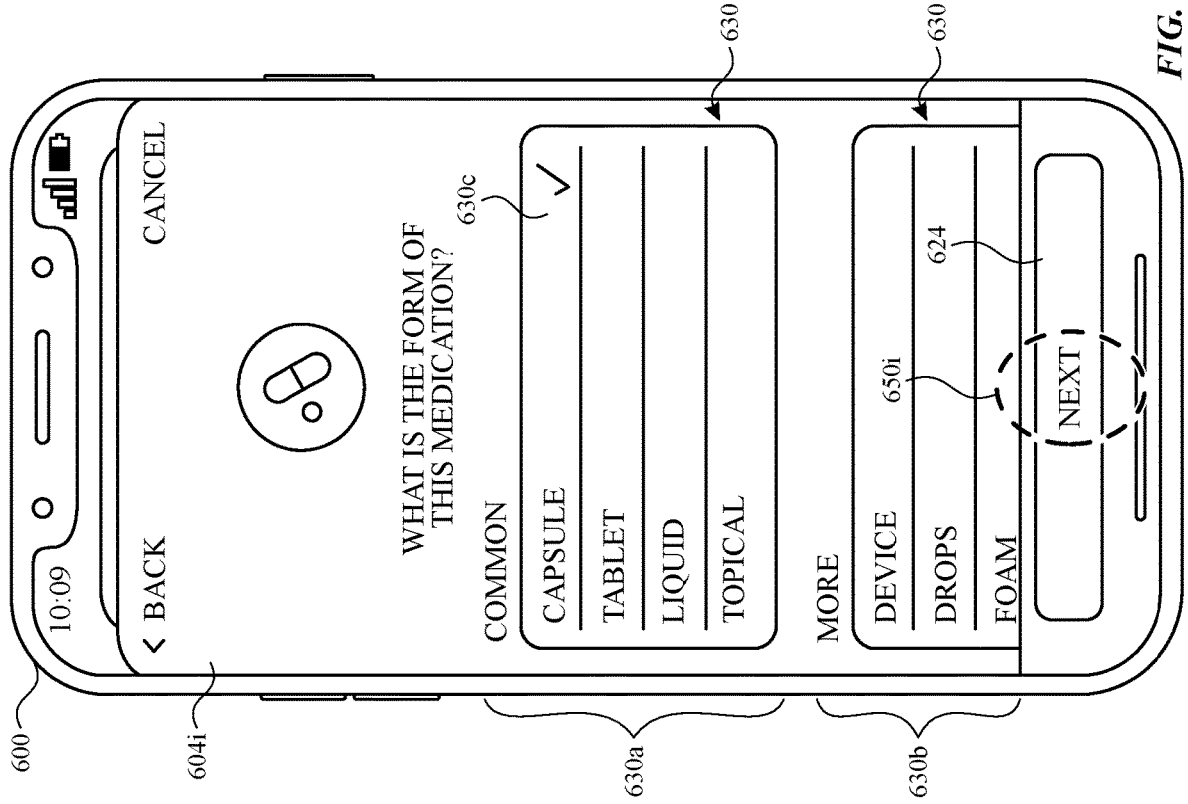

At FIG. 6I, strength selection interface 604i includes medication forms 630a-b. Because Vitamin X is an unknown medication, medication forms 630a-b are a generic set of medication forms, as opposed to the medication forms associated with affordances 622a-d, which are specific to a known medication. In some embodiments, medication forms 630a-b are separated into two subsets. As illustrated, subset 630a includes common medication forms (e.g., typical medication forms) and subset 630b includes medication forms that are not common (e.g., non-typical medication forms).

At FIG. 6I, strength selection interface 604i includes an indication that form 630c (e.g., capsule) has been selected. While displaying strength selection interface 604i, device 600 detects input 650i (e.g., tap and/or mouse click) directed at next affordance 624. In response to detecting input 650i, device 600 displays strength selection interface 604j, as depicted in FIG. 6J.

At FIG. 6J, strength selection interface 604j includes affordance 632 to add a medicinal strength (e.g., a strength value and/or a unit of strength). In some embodiments, while displaying strength selection interface 604j, device 600 detects an input (e.g., tap and/or mouse click) directed at affordance 632. In response to detecting the input directed at affordance 632, device 600 displays an interface for configuring a strength value and/or strength unit. In some embodiments, affordance 632 includes a suggested unit of strength based on the selected medication form (e.g., capsule). In some embodiments, affordance 632 does not include a suggested unit of strength based on the selected medication form.

At FIG. 6J, strength selection interface 604j includes no strength affordance 634 that a user can select when the user does not know the medicinal strength. In some embodiments, while displaying strength selection interface 604j, device 600 detects an input (e.g., tap and/or mouse click) on next affordance 624. In response to detecting the input on next affordance 624, device 600 displays a scheduling interface similar to scheduling interface 604n of FIG. 6N. In some embodiments, in response to detecting the input on next affordance 624, device 600 displays a user interface other than interface 604n, such as icon edit interface 604s, icon edit interface 604t, add details interface 604u, or interaction factors interface 604v.

At FIG. 6K, device 600 displays instructional interface 604k in response to input 650c2 directed at image search affordance 610b of FIG. 6C. Instructional interface 604k includes an indication of how to search for a medication using image data captured by one or more cameras of device 600. While displaying instructional interface 604k, device 600 detects input 650k (e.g., tap and/or mouse click) directed at continue affordance 636. In response to detecting input 650k, device 600 displays camera interface 604l, as depicted in FIG. 6L.

Figure 6L:
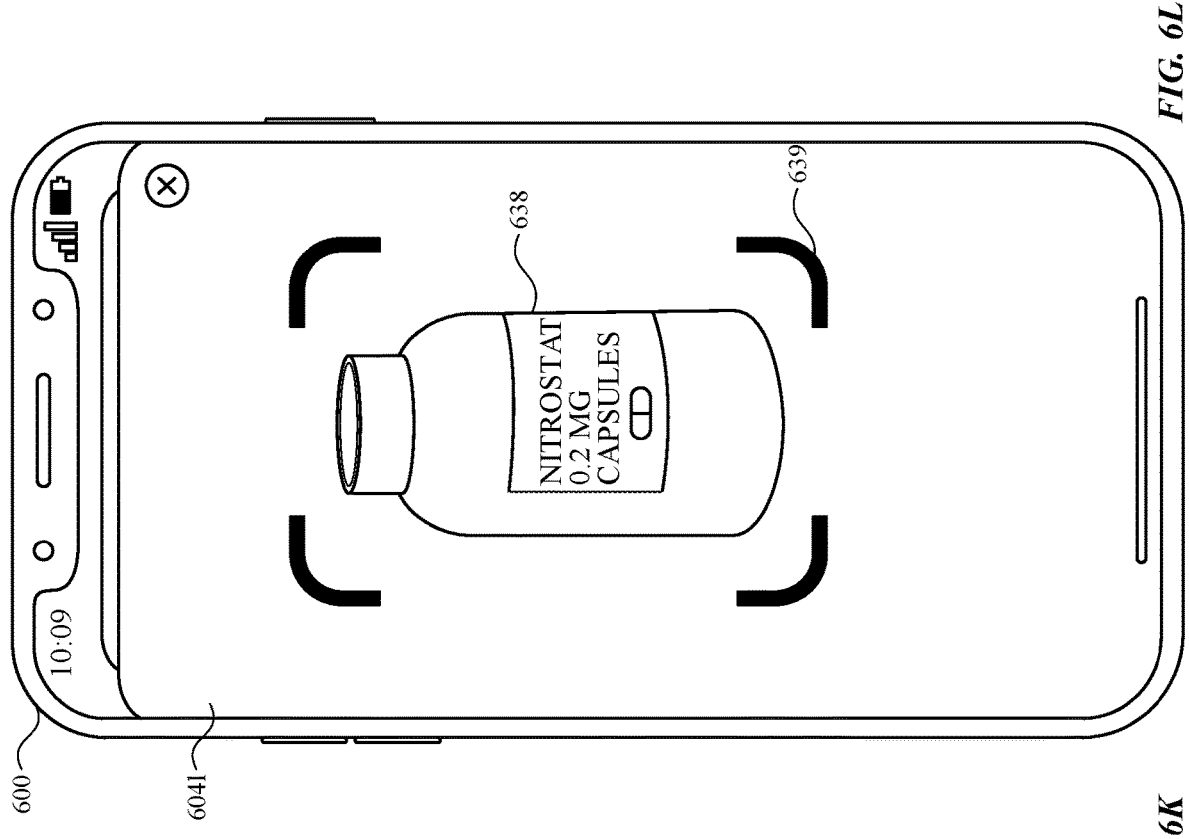
Figure 6K:
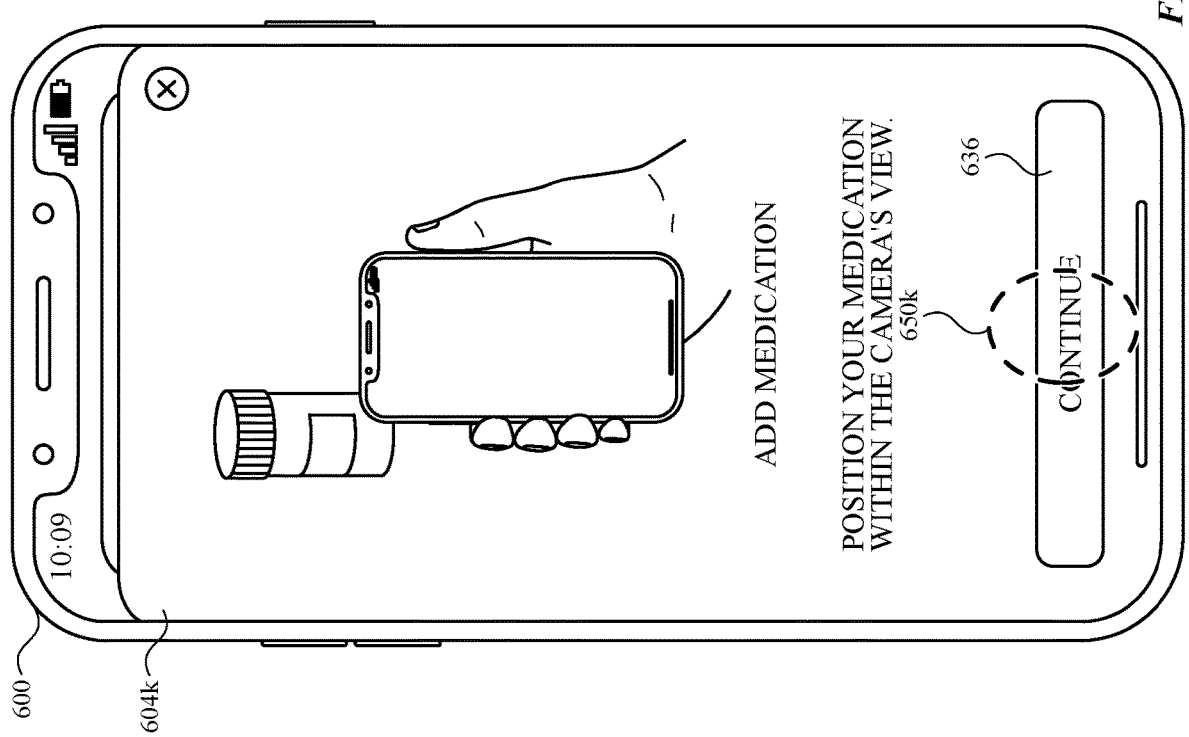
Figure 6N:
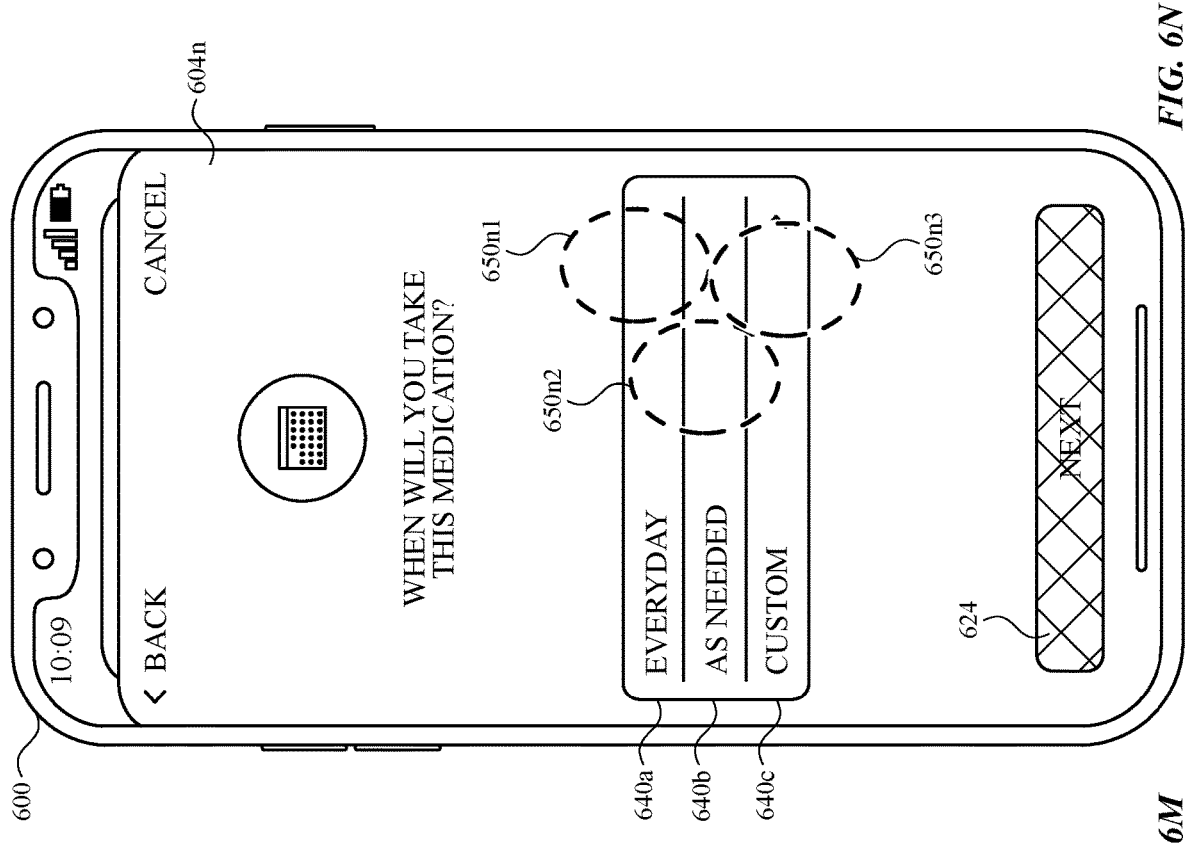
Figure 6M:
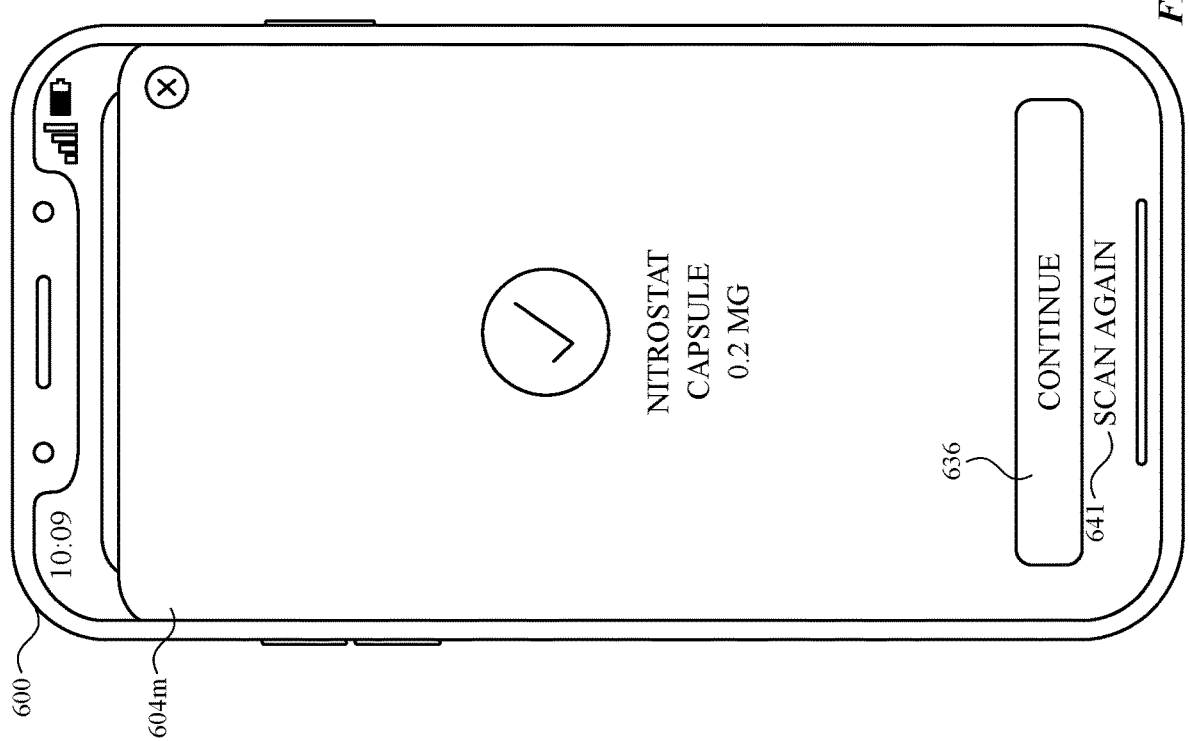

At FIG. 6L, camera interface 604l includes representation 638 of a container labeled Nitrostat based on image data (e.g., a live camera feed from one or more cameras of device 600). As illustrated, camera interface 604l includes indicators 639 that device 600 detects an object and/or a medication. In some embodiments, device 600 detects (e.g., from the image data) one or more characteristics of a medication, such as a medication brand name (e.g., Nitrostat), medication from (e.g., capsule), and/or medicinal strength (0.2 mg). In response to detecting the characteristics of Nitrostat, device 600 displays confirmation interface 604m, as depicted in FIG. 6M. In some embodiments, device 600 detects (e.g., from the image data) a machine-readable code that identifies the medication and/or one or more details of the medication (e.g., strength and/or form), such as a barcode, a national drug code (NDC), and/or a QR code.

At FIG. 6M, confirmation interface 604m includes an indication of the characteristics identified from image data, including the medication type, medication form, and/or medicinal strength. Accordingly, a user can confirm that device 600 correctly identified the medication. Confirmation interface 604m includes continue affordance 636 and scan again affordance 641. In some embodiments, in response to detecting an input on scan again affordance 641, device 600 displays camera interface 604l, depicted in FIG. 6L. In some embodiments, device 600 does not identify one or more characteristics of a medication (e.g., medication type, medication form, and/or medicinal strength). In such embodiments, device 600 displays a set of one or more user interface (e.g., interfaces 604e, 604g, 604i, and/or 604j) to allow a user to input (e.g., select) the respective characteristics (e.g., before detecting an input on continue affordance 636 and/or in response to detecting an input on continue affordance 636).

At FIG. 6M, in some embodiments, while displaying confirmation interface 604m, device 600 detects an input (e.g., tap and/or mouse click) on continue affordance 636. In response to detecting the input on continue affordance 636, device 600 displays a scheduling interface similar to interface 604n, as depicted in FIG. 6N. In some embodiments, in response to detecting the input on next affordance 624, device 600 displays a user interface other than interface 604n, such as icon edit interface 604s, icon edit interface 604t, add details interface 604u, or interaction factors interface 604v.

FIGS. 6N-6R depict scheduling interfaces to configure a schedule for a medication. In some embodiments, prior to displaying an interface to configure a schedule for a medication, device 600 detects that a medication having the same form and strength that is being added is the same as a medication that is already being tracked by the health application. In such embodiments, as a result of detecting that a duplicate medication is being added, device 600 displays a user interface providing one or more affordances to modify the type of medication, the medication form, and/or the medicinal strength of the medication being added. In some embodiments, health application does not allow two of the same medications to be added.

At FIG. 6N, scheduling interface 604n includes everyday affordance 640a, as-needed affordance 640b, and custom affordance 640c. Interface 604n includes next affordance 624 that is disabled.

Figure 6P:
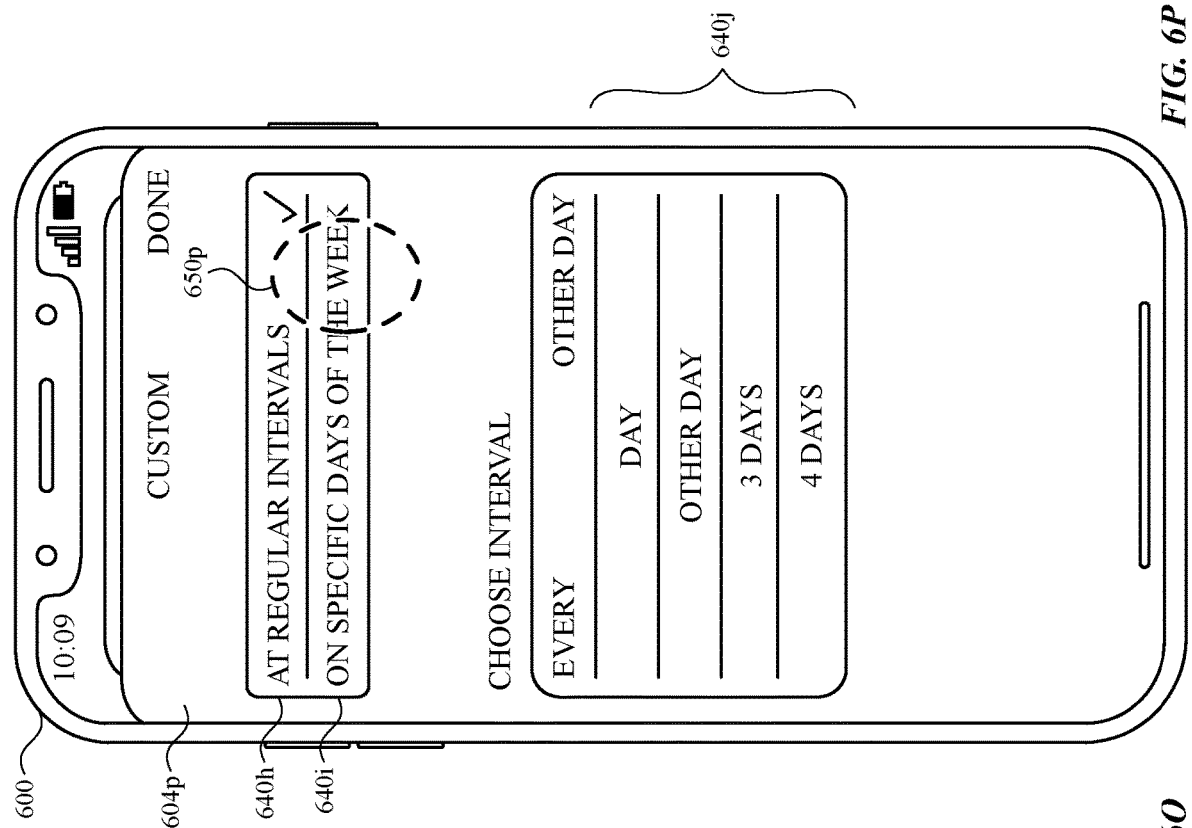
Figure 6O:
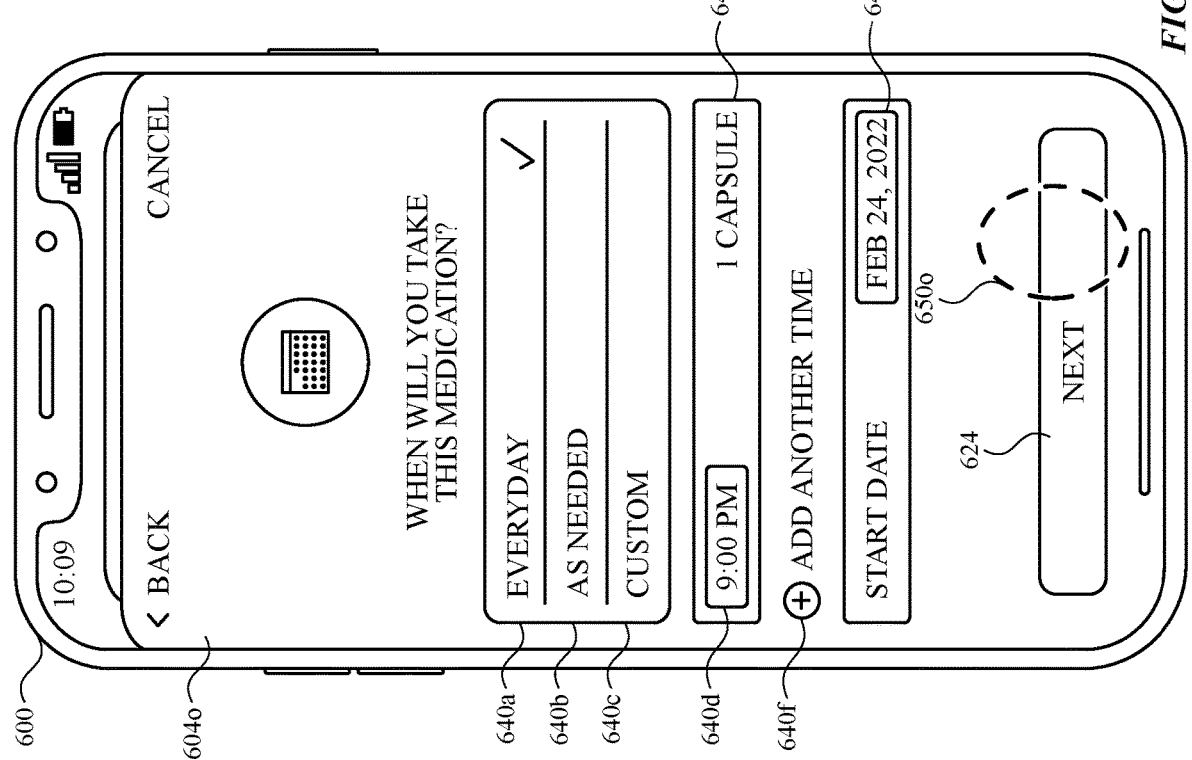

At FIG. 6N, while displaying scheduling interface 604n, device 600 detects input 650n1 (e.g., tap and/or mouse click) directed at everyday affordance 640a. In response to detecting input 650n1, device 600 displays scheduling interface 604o, as depicted in FIG. 6O. While displaying scheduling interface 604n, device 600 detects input 650n2 (e.g., tap and/or mouse click) directed at as needed affordance 640b. In response to detecting input 650n2, device 600 displays an icon interface similar to icon edit interface 604s of FIG. 6S. While displaying scheduling interface 604n, device 600 detects input 650n3 (e.g., tap and/or mouse click) directed at custom affordance 640c. In response to detecting input 650n3, device 600 displays scheduling interface 604p, as depicted in FIG. 6P.

At FIG. 6O, scheduling interface 640o includes time affordance 640d to configure a time to take a medication. In response to detecting an input directed to time affordance 640d, device 600 displays a user interface to modify a scheduled time for taking a medication.

At FIG. 6O, scheduling interface 640o includes dosage affordance 640e to configure a dosage of a medication that should be taken. For example, in response to detecting an input directed to dosage affordance 640e, device 600 displays a user interface to modify a dosage from one capsule to two capsules.

At FIG. 6O, scheduling interface 604o includes an add another time affordance 640f to schedule another time to take the medication. In response to detecting an input directed to add another time affordance 640f, device 600 displays another time affordance and dosage affordance. Interface 604p includes start date affordance 640g to configure a start date to take a medication. In response to detecting an input directed to start date affordance, device 600 displays a user interface to modify a start date.

At FIG. 6O, while displaying scheduling interface 604o, device 600 detects input 650o (e.g., tap and/or mouse click) directed at next affordance 624. In response to detecting input 650o, device 600 displays icon edit interface 604s, as depicted in FIG. 6S.

At FIG. 6P, device displays scheduling interface 604p in response to input 650n3 in FIG. 6N. Scheduling interface 604p includes regular intervals affordance 640j to schedule a medication at regular intervals (every day and/or every other day) and specific days affordance 640i to schedule a medication for specific days of the week. As illustrated, in response to detecting a selection of regular intervals affordance 640j, device 600 displays different interval affordances for taking a medication, including every day, every other day, every three days, and/or every four days.

At FIG. 6P, while displaying scheduling interface 604p, device 600 detects input 650p (e.g., tap and/or mouse click) directed at specific days affordance 640i. In response to detecting input 650p, device 600 displays scheduling interface 604q, as depicted in FIG. 6Q.

At FIG. 6Q, scheduling interface 604q includes days of the week affordances 640k. As illustrated, Sunday is selected (e.g., medication will be scheduled to be taken every Sunday). While displaying scheduling interface 604q, device 600 detects input 650q (e.g., tap and/or mouse click) directed at done affordance 642. In response to detecting input 650q, device 600 displays scheduling interface 604r, as depicted in FIG. 6R.

At FIG. 6R, scheduling interface 604r is similar to scheduling interface 604o. Scheduling interface 604r includes an indication that custom affordance 640c has been selected (e.g., using a symbol (e.g., checkmark) and/or including information about the custom configuration (e.g., "Every Sunday")). In some embodiments, device 600 detects an input directed at next affordance 624. In response to detecting the input directed at next affordance, device 600 displays an icon interface similar to icon edit interface 604s, as depicted in FIG. 6S.

Figure 6T:
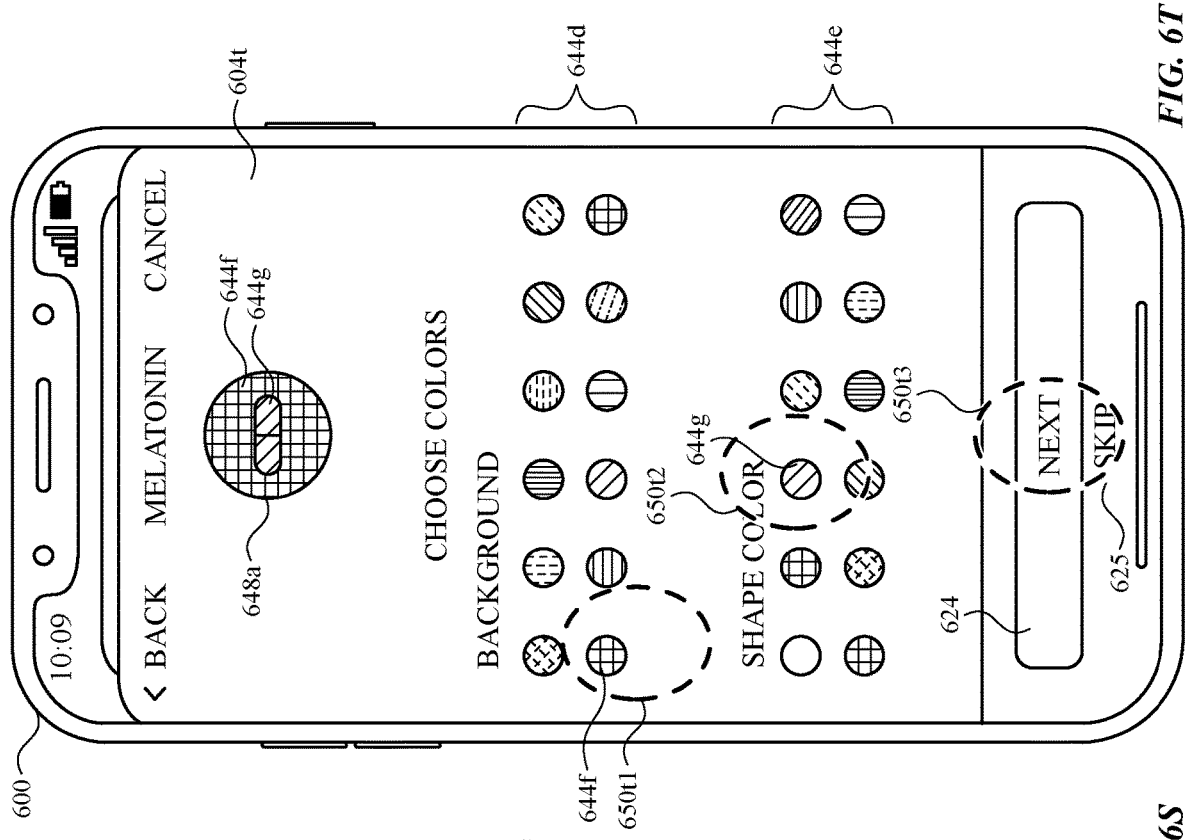
Figure 6S:
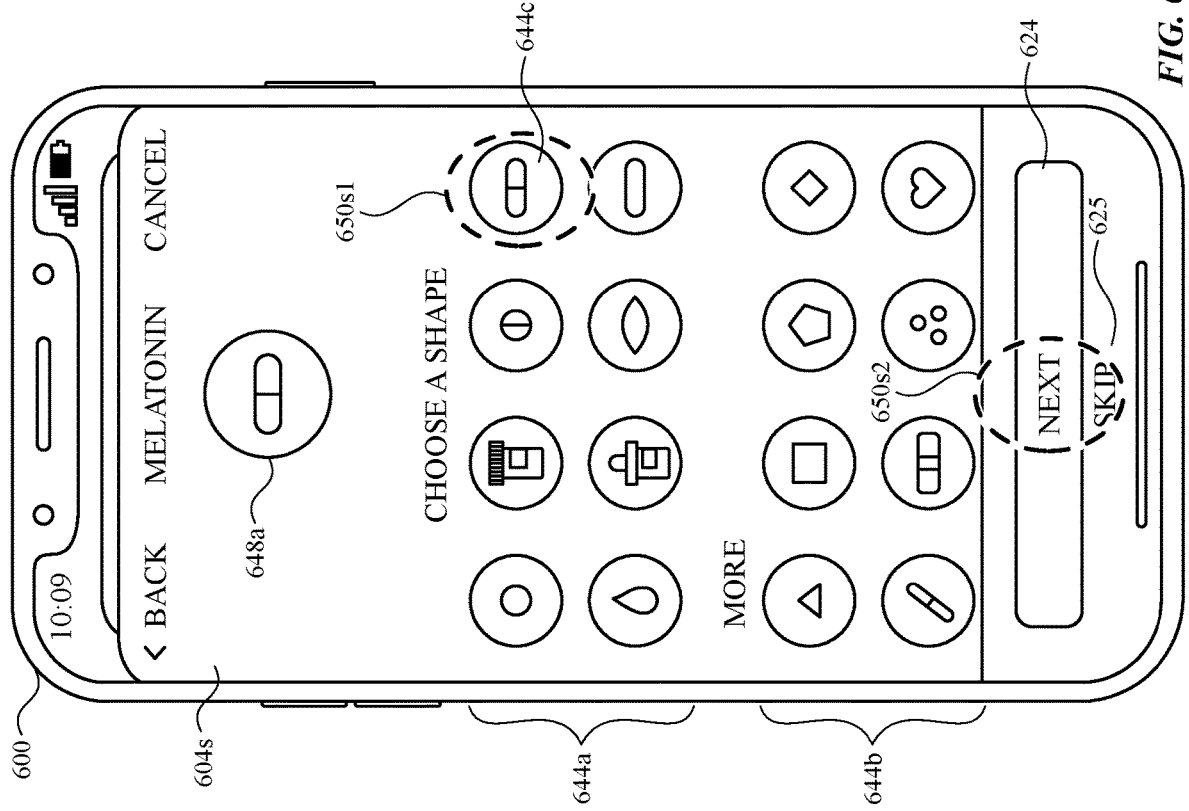
Figure 6V:
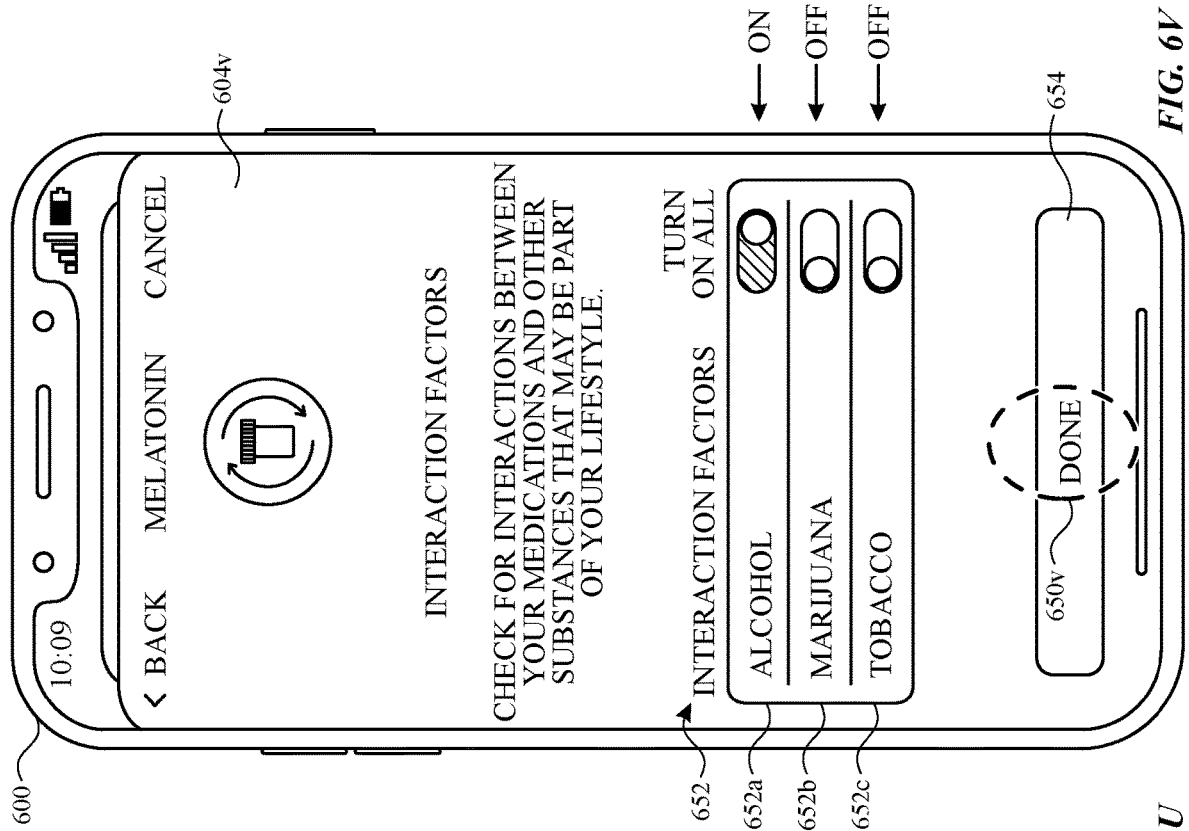

At FIGS. 6S-6T, device 600 displays interfaces to configure an icon (e.g., glyph and/or image) for a medication. At FIG. 6S, icon edit interface 604s includes a set of affordances to select a shape (e.g., symbol) to represent melatonin. In some embodiments, melatonin is selected based on one of the techniques described in FIGS. 6C-6M. In some embodiments, a schedule is selected for melatonin based on one of the techniques described in FIGS. 6P-6R. The affordances to select a shape include a first subset of shape affordances 644a associated with common shapes for medications (e.g., pill bottle, tablet, and/or liquid). The affordances to select a shape also include a second subset of shape affordances 644b associated with shapes that medications do not come in and/or are less common for medications (e.g., triangle, heart, and/or polygon). In response to detecting input 650s1 (e.g., tap and/or mouse click) directed at affordance 644c for a capsule, device 600 displays (e.g., updates and/or replaces a previous icon) icon 648a for melatonin. In some embodiments, in response to detecting a selection of skip affordance 625, device 600 skips the configuration process for the icon (e.g., and, optionally, display interaction factors interface 604v of FIG. 6V).

At FIG. 6S, while displaying icon edit interface 604s with affordance 644c selected, device 600 detects input 650s2 (e.g., tap and/or mouse click) directed at next affordances 624. In response to detecting input 650s2, device 600 displays icon edit interface 604t, as depicted in FIG. 6T.

At FIG. 6T, icon edit interface 604t includes a set of affordances to select one or more visual aspects (e.g., color, symbol, shapes, pattern, and/or symbols) for a background of icon 648a. In response to detecting input 650t1 (e.g., tap and/or mouse click) directed at visual aspect (e.g., grid) associated with affordance 644f, device 600 displays (e.g., updates and/or replaces a previous visual aspect of the background) the visual aspect for the background of icon 648a.

At FIG. 6T, the set of affordances includes affordances 644e for selecting a visual aspect (e.g., color, symbol, shapes, pattern, and/or symbols) for the capsule. In some embodiments, in response to detecting input 650t2 (e.g., tap and/or mouse click) directed at a visual aspect associated with affordance 644g, device 600 displays (e.g., updates and/or replaces a previous visual aspect of icon 648a) the capsule as having the selected visual aspect. In some embodiments, multiple colors can be selected for different portions of a shape. For example, in some embodiments, one color is selected for one end of a capsule and a different color for the other end of the capsule.

At FIG. 6T, while displaying icon edit interface 604t, device 600 detects input 650t3 (e.g., tap and/or mouse click) directed at next affordance 624. In response to detecting input 650t3, device 600 displays add details interface 604u, as depicted in FIG. 6U.

Figure 6U:
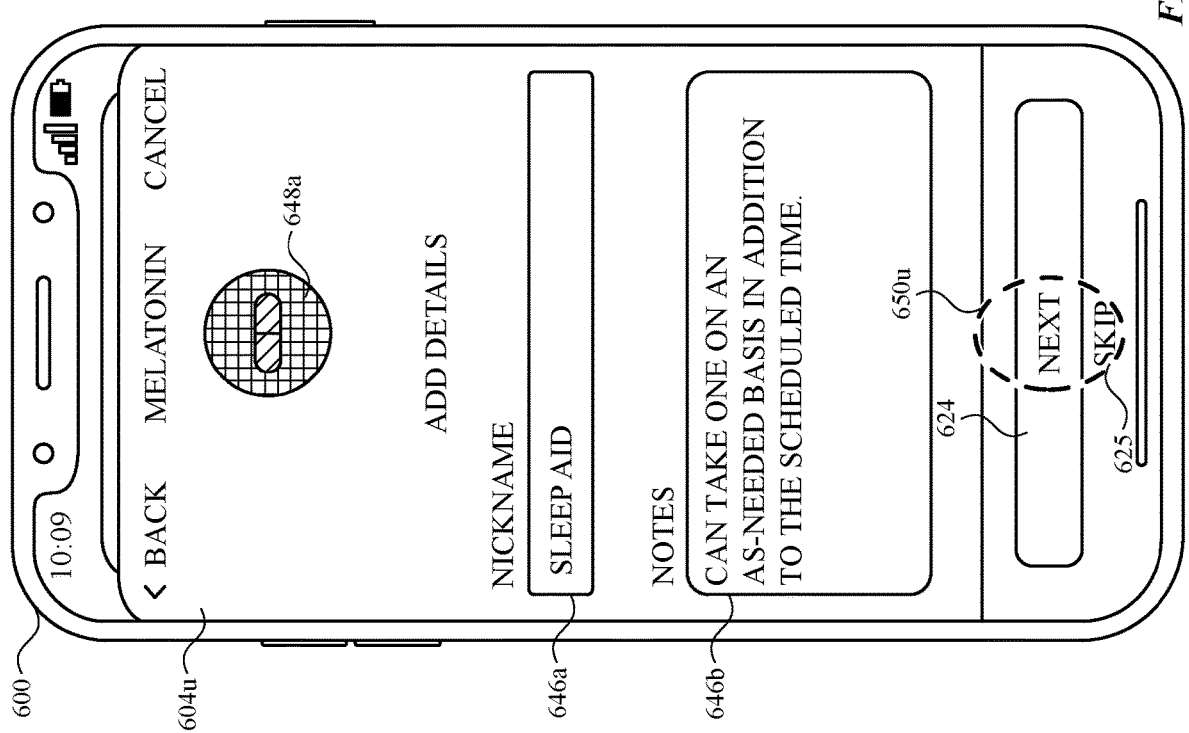
Figure 6W:
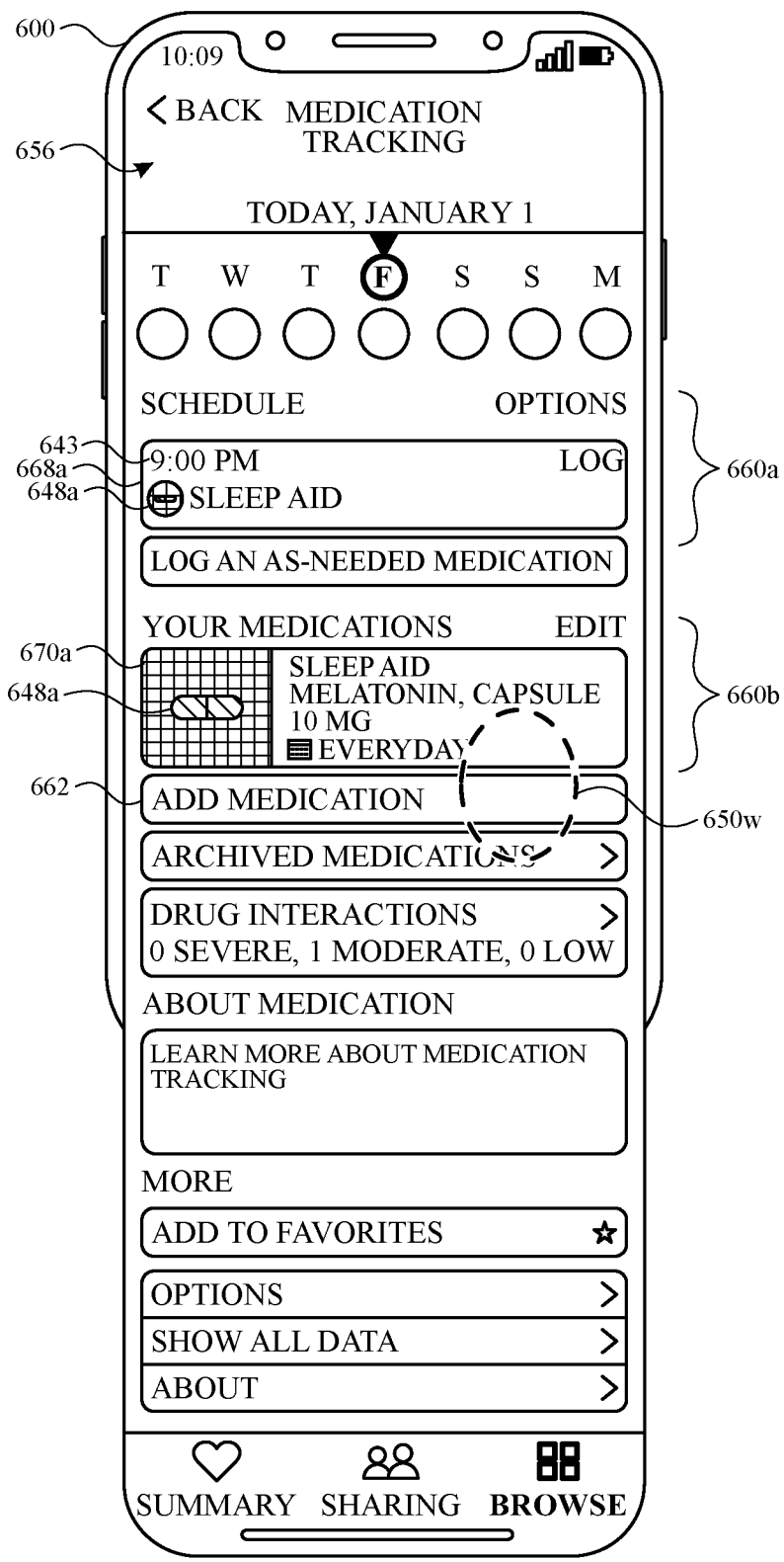

At FIG. 6U, add details interface 604u includes text fields to add details for a medication. In some embodiments, details interface 604u includes nickname text field 646a to allow a user to configure a nickname for melatonin. Add details interface 604u includes a notes text field 646b to allow a user to add notes for melatonin. While displaying add details interface 604u, device 600 detects input 650u (e.g., tap and/or mouse click) directed at next affordance 624. In response to detecting input 650u, device 600 displays interaction factors interface 604v, as depicted in FIG. 6V.

At FIG. 6V, interaction factors interface 604v includes affordances to enabled or disable interaction factors that are relevant to the user. In some embodiments, interaction factors 652 includes non-medicinal factors that potentially raises a risk (e.g., of a side effect and/or of an injury) when combined with taking a medication. In some embodiments, device 600 displays interaction factors interface 604v when the user is adding an initial medication to the health application. In some embodiments, interaction factors interface 604v is not displayed when the user adds subsequent medications (e.g., medications added after the initial medication). In some embodiments, the displayed interaction factors are selected/curated based on the specific medication, with different medications potentially having different interaction factors available for selection.

At FIG. 6V, an alcohol affordance 652a for alcohol is enabled (e.g., indicating a user consumes alcohol). An affordance 652b for marijuana is disabled (e.g., indicating a user does not consume marijuana). An affordance 652c for tobacco is disabled (e.g., indicating a user does not consume tobacco). While displaying interaction factors interface 604v, device 600 detects input 650v (e.g., tap and/or mouse click) directed at done affordance 654. In response to detecting input 650v, device 600 displays tracking interface 656, as depicted in FIG. 6W.

At FIG. 6W, tracking interface 656 includes melatonin as a tracked medication (e.g., active medication and/or enabled medication). In some embodiments, melatonin is included in scheduled medication portion 660a (e.g., as opposed to being added as an as-needed medication which does not have a schedule). In some embodiments, scheduled medication portion 660a includes an indication that a scheduled medication is due. In some embodiments, the indication that a scheduled medication is due includes scheduled medication tile 668a. In some embodiments, scheduled medication tile 668a includes one or more medications that are due. As illustrated, scheduled medication portion 660a includes a scheduled time 643 (e.g., 9:00 PM) for melatonin, icon 648a for melatonin, and the nickname for melatonin. In some embodiments, as illustrated, a medicinal name (e.g., "melatonin") is not displayed in scheduled medication portion 660a when a medication has a nickname (e.g., "sleep aid").

At FIG. 6W, tracking interface 656 includes active medication portion 660b. In some embodiments, active medication portion 660b includes a set of one or more medications that are actively being tracked by the health application. As illustrated, melatonin is included in active medication portion 660b, such as active medication tile 670a. In some embodiments, as illustrated, active medication tile 670a includes icon 648a for melatonin, the nickname of melatonin, medication form (e.g., "capsule") (e.g., a configurable option similar to selected form 630c) of melatonin, medicinal strength (e.g., "10 mg") (e.g., a configurable option similar to selected strength option 626a), and an indication of a frequency (e.g., a configurable option similar to everyday affordance 640a).

In some embodiments, tracking interface 656 includes add medication affordance 662 that allows a user to add a medication to the health application. While displaying tracking interface 656, device 600 detects input 650w (e.g., tap and/or mouse click) directed at add medication affordance 662. In response to detecting input 650w, device 600 displays search interface 604c, as depicted in FIG. 6C.

Figure 6X:
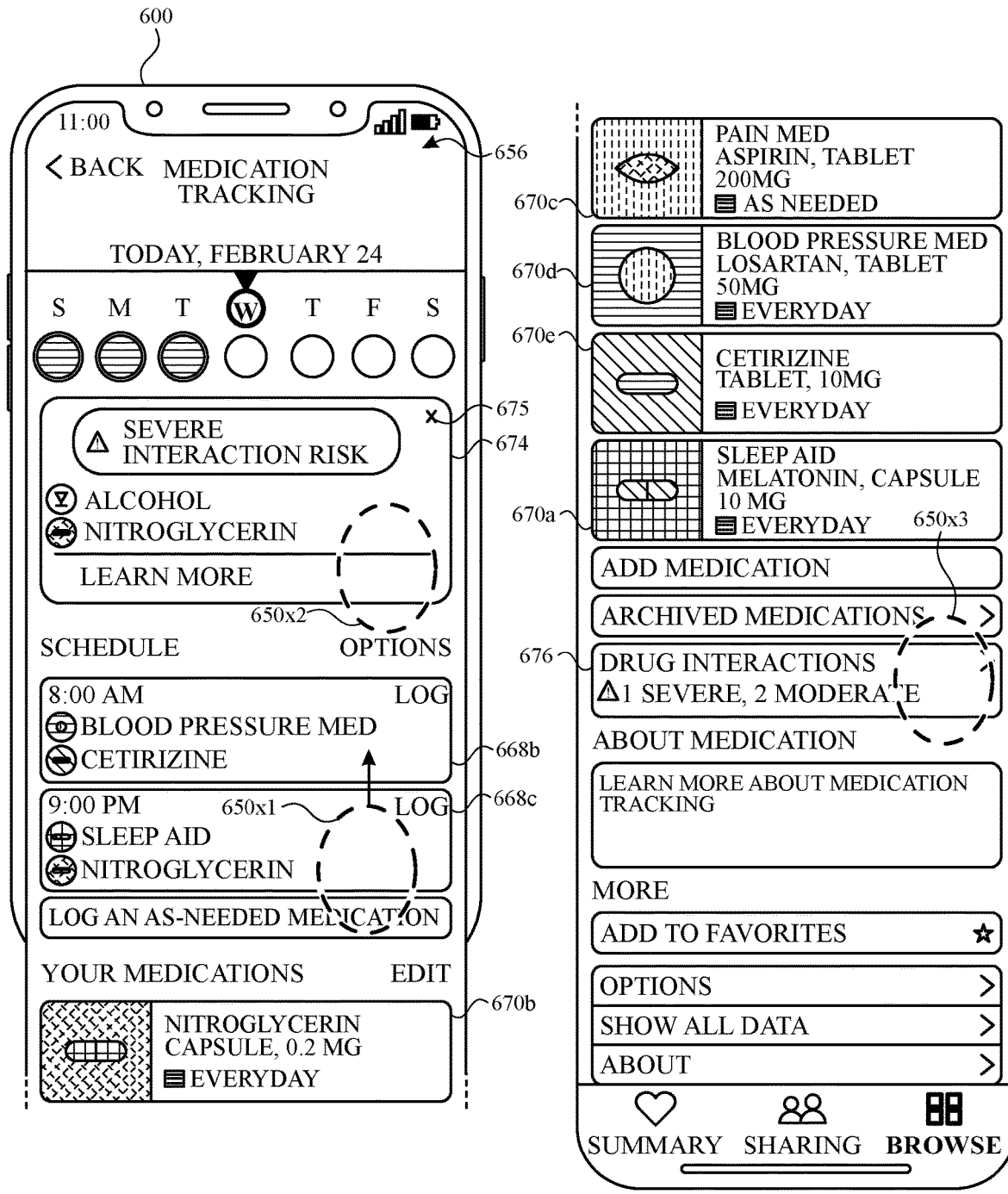

At FIG. 6X, time has passed since adding melatonin and a user has added multiple medications, including nitroglycerin, aspirin, losartan, and cetirizine as indicated by active medication tiles 670b-e. Active medication tiles 670b-e are similar to active medication tile 670a but have different states based on the user's selections when adding the respective medication. Nitroglycerin is the most recent medication added to the health application. As such, active medication tile 670b is positioned above active medication tiles 670a, c-e. In some embodiments, a user can later edit the order of active medications tiles. Additionally, because nitroglycerin, losartan, and cetirizine are schedule medications, scheduling information associated with the medications is displayed in scheduled medication tiles 668b-c, which are similar to scheduled medication tile 668a but have a different state based on the user's selections when adding the respective medication. As illustrated, scheduled medication tiles 668b-c are displayed in order of when the scheduled medications are due.

At FIG. 6X, tracking interface 656 includes first risk tile 674. As illustrated, first risk tile 674 is for nitroglycerin, which is the most recent medication added to the health application. First risk tile 674 shows a severe risk of a potential drug interaction with alcohol, which was an interaction factor that was previously selected by the user (e.g., via interaction factors interface 604v at FIG. 6V). In some embodiments, first risk tile 674 is non-persistent. For instance, first risk tile 674 is removable from the tracking interface 656 based on detecting a selection of remove affordance 675 to remove the notification from the indicator. In some embodiments, device 600 stops displaying first risk tile 674 after a period of time has passed. In some embodiments, first risk tile 674 persists until a user interacts with the tile.

At FIG. 6X, tracking interface 656 includes second risk tile 676. Second risk tile 676 includes an indication of two moderate risks and an indication of a severe risk. As illustrated, the indication of the severe risk of an interaction between nitroglycerin and alcohol appears differently (e.g., different amount of information and/or different visual characteristics) in second risk tile 676 than in first risk tile 674. In some embodiments, second risk tile 676 is persistent (e.g., cannot be removed). As illustrated, second risk tile 676 is located below first risk tile 674. In some embodiments, while displaying first risk tile 674, device 600 detects input 650x1 (e.g., swipe and/or drag). In response to detecting input 650x1, device 600 scrolls tracking interface 656 to display second risk tile 676 (e.g., and ceases to display first risk tile 674).

Figure 6Y:
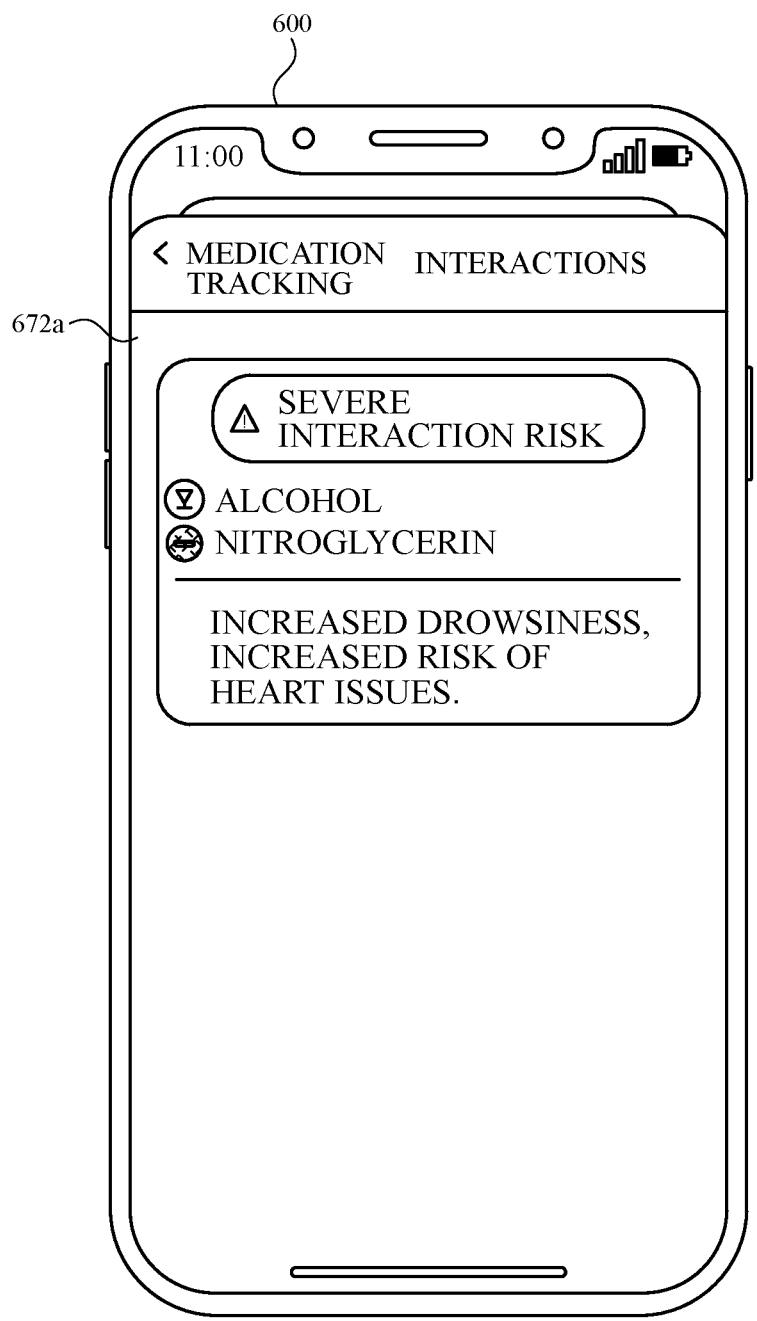

At 6X, first risk tile 674 and second risk tile 676 are user selectable. While displaying first risk tile 674, device 600 detects input 650x2 (e.g., tap and/or mouse click) directed at first risk tile 674. In response to detecting input 650x2, device 600 displays risk interface 672*a*, as depicted in FIG. 6Y. While displaying second risk tile 676, device 600 detects input 650x2 (e.g., tap and/or mouse click) directed at second risk tile 676. In response to detecting input 650x2, device 600 displays risk interface 672*b*, as depicted in FIG. 6Z.

At FIG. 6Y, risk interface 672*a* includes expanded details associated with the first risk tile 674. As illustrated, the details includes potential side effects of the interaction between melatonin and drinking alcohol.

Figure 6Z:
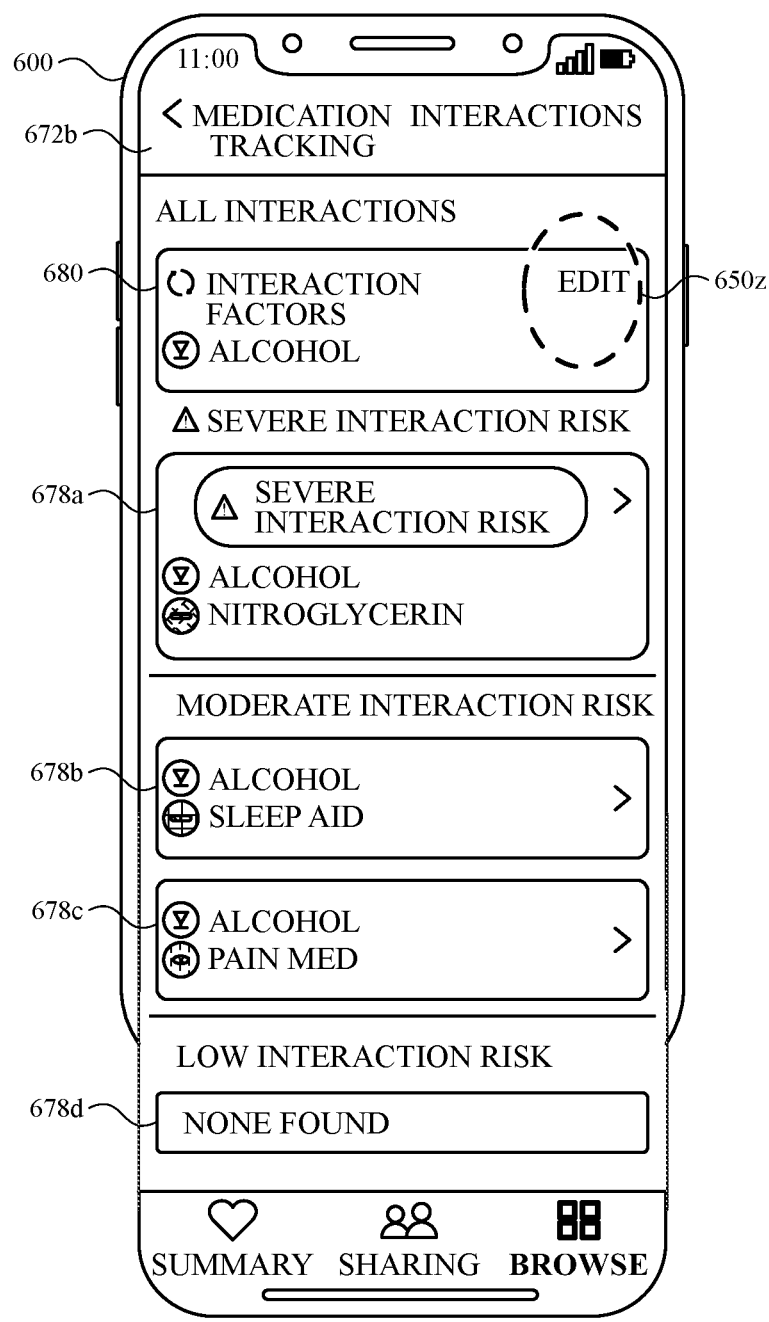
Figure 6A:
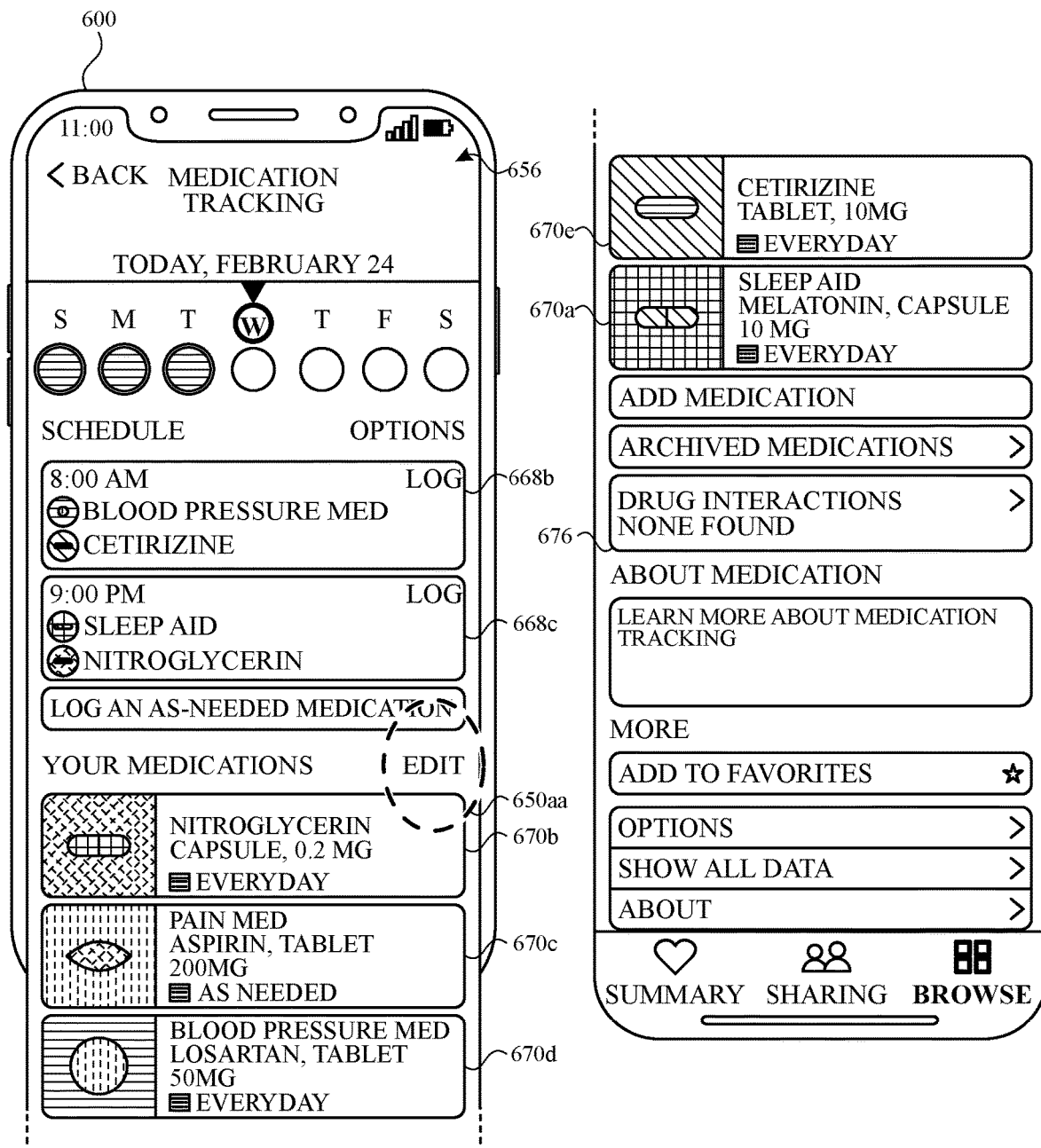
Figure 6A:
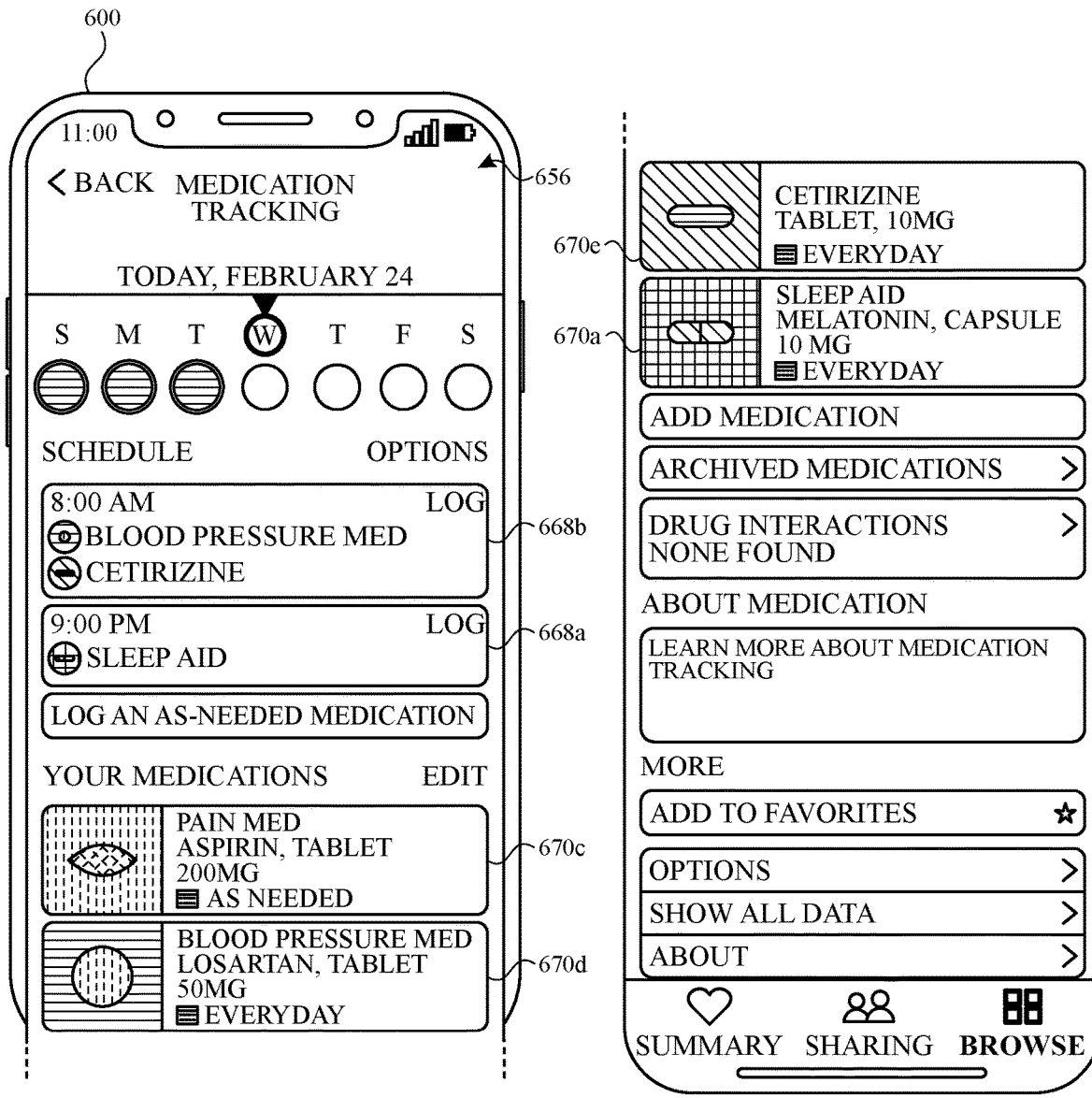

At FIG. 6Z, risk interface 672*b* includes selectable indicators of risks. As illustrated, risk interface 672*b* includes different categories of risks, including sever interaction risk, moderate interaction of risk, and low interaction risk. Under the sever interaction risk category, risk indicator 678*a* indicates an interaction between alcohol and nitroglycerin (similar to first risk tile 674). Selecting risk indicator 678*a* causes display of an interface similar to risk interface 672*a*. Under the moderate interaction risk category, risk indicator 678*b* indicates an interaction between alcohol and sleep aid while risk indicator 678*c* indicates an interaction between alcohol and pain medication. Selecting risk indicator 678*b* and/or risk indicator 678*c* causes device 600 to display a user interface including details about the interaction, similar to interface 672*a*, which includes additional information about the interaction. Risk interface 672*b* further includes risk indicator 678*d* indicating that there are no low risk interactions.

At FIG. 6Z, risk interface 672*b* includes interaction factors indicator 680 that indicates alcohol will potentially interact with an active medication. A user can modify interaction factors 652 by selecting an edit affordance. While displaying interaction factors indicator 680, device 600 detects input 650*z* (e.g., tap and/or mouse click) corresponding to a request to modify interaction factors 652. In response to detecting input 650*z*, device 600 displays an interaction factor interface similar to interaction factors interface 604*v* of FIG. 6V.

At FIG. 6AA, device 600 displays tracking interface 656 after a user modifies interaction factors 652 to disable alcohol affordance 652*a*. As illustrated, first risk tile 674 is no longer displayed based on alcohol affordance 652*a* being disabled. As a result of device 600 removing first risk tile 674, device 600 moves scheduled medication tiles 668*b-c* up. Additionally, device 600 updates second risk tile 676 based on alcohol affordance 652*a* being disabled. As illustrated, second risk tile 676 indicates that no drug interactions are found. While first risk tile 674 and second risk tile 676 are described as indicating a potential risk of an interaction between a medication and an interaction factors 652, in some embodiments, first risk tile 674 and second risk tile 676 indicates a potential risk of an interaction between two active medications. In some embodiments, first risk tile 674 and second risk tile 676 do not indicate a potential risk of an interaction an inactive medication and an active medication.

At FIG. 6AA, while displaying tracker interface 656, device 600 detects input 650*aa* (e.g., tap and/or mouse click) corresponding to an affordance to edit active medications. In response to detecting input 650*aa*, device 600 displays interface 682, as depicted in FIG. 6AB.

At FIG. 6AB, interface 682 includes active medications 683*a* (similar to active medications displayed in tiles 670*a-e* of FIG. 6X) and inactive medications 683*b*. In some embodiments, device 600 stores medication information for inactive medications 683*b* (e.g., medication form, medicinal strength, dosage, and/or scheduling information). As illustrated, amoxicillin, an inactive medication, can be activated in response to an input directed at activation affordance 684*b*. In some embodiments, activating amoxicillin causes device 600 to enable the medication, including displaying when amoxicillin is scheduled to be taken in tracking interface 656, displaying amoxicillin as an active medication in tracking interface 656, and/or displaying an indicator of a potential risk of taking amoxicillin in first risk tile 674 and/or second risk tile 676.

At FIG. 6AB, nitroglycerin, an active medication, is displayed with a deactivation affordance 684*a*. In some embodiments, deactivating nitroglycerin causes device 600 to deactivate the medication, including not displaying when nitroglycerin is scheduled to be taken in tracking interface 656, not displaying nitroglycerin in the active medication of tracking interface 656, and/or not displaying an indication of a potential risk of taking nitroglycerin in first risk tile 674 and/or second risk tile 676. Interface 682 also includes add medication affordance 662.

At FIG. 6AB, while displaying interface 682, device 600 detects input 650*ab* (e.g., tap and/or mouse click) directed at deactivation affordance 684*a*. In response to detecting input 650*ab*, device 600 displays sharing notification 684 indicating that the medication is shared with another user (e.g., a care provider and/or family member), as depicted in FIG. 6AC.

At FIG. 6AC, sharing notification 684 includes continue sharing affordance 686*a* and stop sharing affordance 686*b*. While displaying sharing notification 684, device 600 detects input 650*ac* (e.g., tap and/or mouse click) directed at stop sharing affordance 686*b*. In response to detecting input 650*ac*, device 600 ceases to share the medication. Additionally, in response to detecting input 650*ac*, device 600 displays tracking interface 656, as depicted in FIG. 6AD.

At FIG. 6AD, based on deactivating nitroglycerin, tracking interface 656 has been updated. As illustrated, nitroglycerin has been removed from scheduling tile 668*c* of FIG. 6AA, causing device 600 to display scheduled medication tile 668*a* at FIG. 6AD, which only includes sleep aid. Additionally, active medication tile 670*b* for nitroglycerin is no longer displayed, while active medication tiles 670*a*, 670*c-e* are displayed. Had nitroglycerin caused a potential risk of an interaction in a risk indicator (e.g., first risk tile 674 and second risk tile 676) of tracking interface 656 of FIG. 6AA, device 600 would update tracking interface 656 of FIG. 6AD based on deactivating nitroglycerin.

Figure 7A:
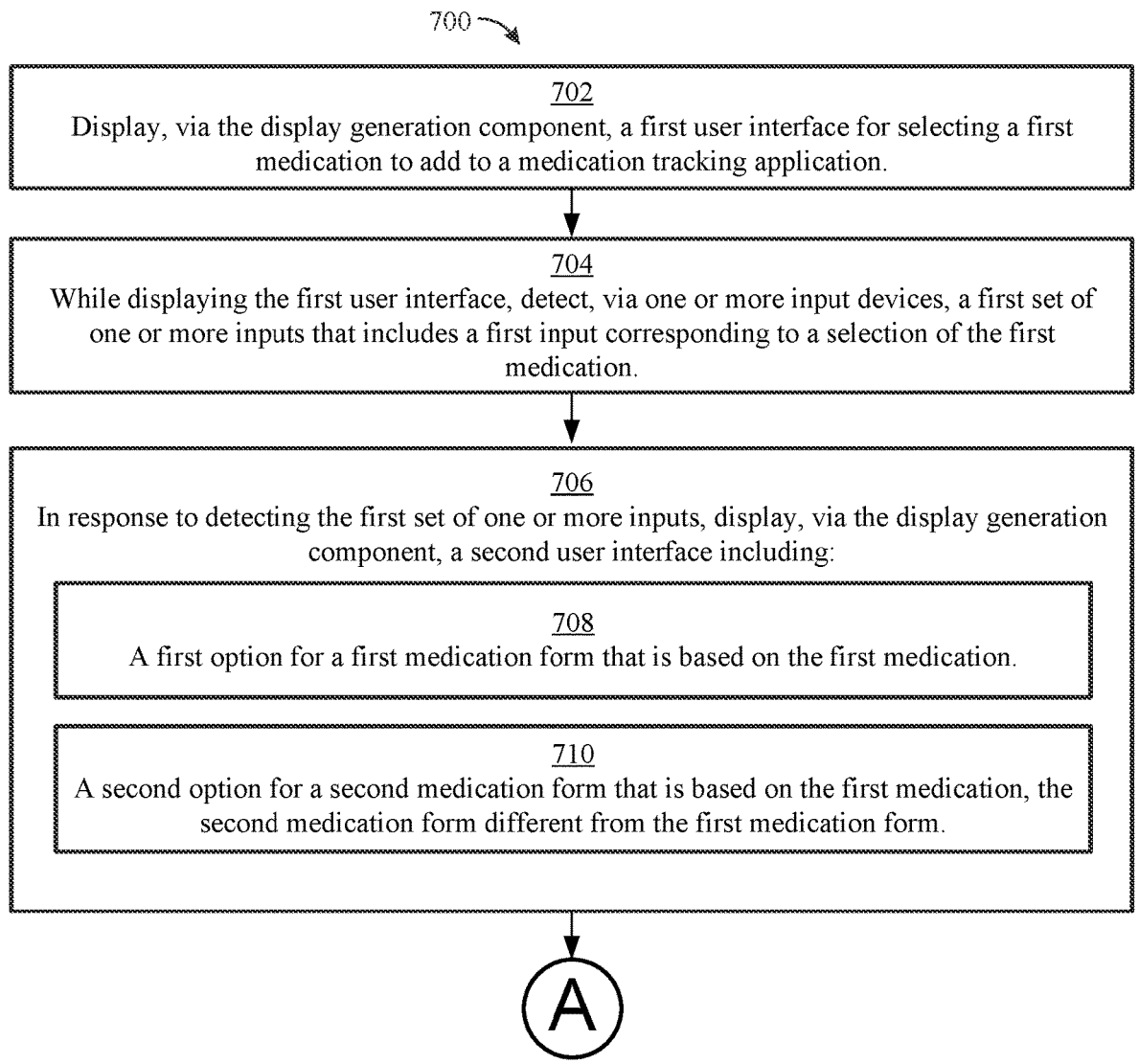

FIGS. 7A-7B are a flow diagram illustrating a method for tracking medications using a computer system in accordance with some embodiments. Method 700 is performed at a computer system (e.g., 100, 300, 500, 600 and/or 1400) (e.g., a smartwatch, a smartphone, a tablet, and/or a laptop computer) that is in communication with a display generation component (e.g., 601 and/or 1401) (e.g., a display controller, a touch-sensitive display system, and/or a monitor) and one or more input devices (e.g., 601 and/or 1401) (e.g., a touch-sensitive surface, a keyboard, a controller, a rotatable input device, microphone, and/or a mouse). Some operations in method 700 are, optionally, combined, the orders of some operations are, optionally, changed, and some operations are, optionally, omitted.

As described below, method 700 provides an intuitive way for configuring characteristics of medications. The method reduces the cognitive burden on a user to track medications, thereby creating a more efficient human-machine interface. For battery-operated computing devices, enabling a user to track medications faster and more efficiently conserves power and increases the time between battery charges.

The computer system displays (702), via the display generation component, a first user interface (e.g., 604c-604d) for selecting a first medication (e.g., nitroglycerin in FIG. 6D) (e.g., a scheduled medication and/or an as-needed medication) (e.g., a prescription or non-prescription medication; a digital therapeutic; a pharmaceutical compound) to add to a medication tracking application (e.g., an application that includes a schedule for taking one or more medications and/or an application that notifies a user when a medication is scheduled to be taken).

While displaying the first user interface, the computer system detects (704), via one or more input devices, a first set of one or more inputs that includes a first input (e.g., 650d1 and/or an input on CHR affordance (e.g., 612a-612b) that is associated with a medication that does not have a medication form) (e.g., a tap, a swipe, a mouse click, a speech input, and/or a key press; a selection of an affordance corresponding to a medication; a confirmation input confirming a selection; a textual input specifying a medication) corresponding to a selection of the first medication.

In response to detecting the first set of one or more inputs, the computer system displays (706), via the display generation component, a second user interface (e.g., 604e) (e.g., the same as the first user interface and/or different from the first user interface) including: a first option (708) (e.g., 622a-622d) (e.g., a user-selectable graphical object) for a first medication form (e.g., capsule, tablet, patch, and/or oral solution) (e.g., a form in which a medication is taken (e.g., consumed and/or applied)) (e.g., a dosage form (e.g., a shape, formulation (e.g., capsule, suspension, liquid, and/or tablet) (in some embodiments, including fillers, binders, and/or adjuvants)) in which a medication is taken (e.g., consumed and/or applied)) that is based on the first medication (e.g., the first medication form is a form in which the first medication is available (e.g., as indicated by a reference database)); and a second option (710) (e.g., 622a-622d) (e.g., a user-selectable graphical object) for a second medication form (e.g., capsule, tablet, patch, and/or oral solution) that is based on the first medication (e.g., the second medication form is a different form in which the first medication is available), the second medication form different from the first medication form; In some embodiments, a third option for a third medication form that the first medication is not available in is not displayed in response to the set of inputs corresponding to the request to add the first medication.

While displaying the second user interface, the computer system detects (712), via the one or more input devices, a second set of one or more inputs that includes a second input (e.g., 650e and/or 650f) (e.g., a tap, a swipe, a mouse click, a speech input, and/or a key press) corresponding to a selection of a respective medication form.

In response to detecting the second set of one or more inputs, the computer system displays (714), via the display generation component, a third user interface (e.g., 604g) (e.g., the same as the first user interface and/or second user interface, or, optionally, different from the first user interface and/or second user interface) and in accordance with (716) a determination that a first set of strength criteria is satisfied, wherein the first set of strength criteria includes a first strength criterion that is satisfied when the respective medication form corresponds to the first medication form, a first set of at least two medicinal strength options (e.g., 622a-622d) (e.g., an affordance; an amount and/or concentration of one or more active ingredients in a medication form and/or a unit of a medication form) (e.g., 50 mg (e.g., for a capsule medication form) and/or 250 mg/5 mL (e.g., for a suspension medication form)) that are based on the first medication form (e.g., the first set of at least two medicinal strength options are strengths in which the first medication form of the first medication is available in).

In response to detecting the second set of one or more inputs, the computer system displays (714), via the display generation component, a third user interface (e.g., 604g) (e.g., the same as the first user interface and/or second user interface, or, optionally, different from the first user interface and/or second user interface) and, in accordance with (718) a determination that a second set of strength criteria is satisfied, wherein the second set of strength criteria includes a second strength criterion that is satisfied when the respective medication form corresponds to the second medication form, a second set of at least two medicinal strength options based on the second medication form (e.g., the second set of at least two medicinal strength options are strengths in which the second medication form of the first medication is available in) (in some embodiments, the second set of medicinal strength options includes a third medicinal strength and a fourth medicinal strength different from the third medicinal strength. In some embodiments, the third medicinal strength and/or the fourth medicinal strength is not available in the first medication form.). In some embodiments, the second set of at least two medicinal strength options are different than the first set of at least two medicinal strength options (e.g., options similar to affordances 626a-626d but which at least two of the option correspond medicinal strength options other than 0.2 MG, 0.4 MG, and/or 0.6 MG) (e.g., the second set includes a medicinal strength option not in the first set or vice versa. In some embodiments, the second set includes at least one medicinal strength option that is in the first set). In some embodiments, the first set of medicinal strength options include a first medicinal strength and a second medicinal strength different from the first medicinal strength. Displaying a second user interface including options for different medication forms depending on what medication is selected provides a curated experience without cluttering the user interface as the user specifies aspects while adding a medication to a medication tracking application, thereby providing improved visual feedback to the user and performing an operation when a set of conditions has been met without requiring further user input. Displaying a third user interface including a different set of medicinal strength options depending on which medication form is selected provides a curated experience without cluttering the user interface as the user specifies aspects while adding a medication to a medication tracking application, thereby providing improved visual feedback to the user and performing an operation when a set of conditions has been met without requiring further user input.

In some embodiments, in response to detecting the second set of one or more inputs, the computer system ceases to display the second user interface and/or an option for the medication form (e.g., the first option for the first medication form and/or the second option for the second medication form). In some embodiments, a medicinal strength is not displayed in the second user interface. In some embodiments, an option for a medicinal strength is not selectable (and/or displayed) until a medication form is selected. In some embodiments, an option for a medicinal strength is not displayed prior to selecting a medication form.

In some embodiments, the first user interface includes a second medication (in some embodiments, the first user interface is displayed in response to a search for a medication; in some embodiments, the first user interface includes a first set of search results with the first medication and the second medication). In some embodiments, while displaying the first user interface, the computer system detects, via one or more input devices, a third set of one or more inputs that includes a third input corresponding to a selection of the second medication (e.g., a medication other than nitroglycerin in FIG. 6D). In some embodiments, in response to detecting the third set of one or more inputs, the computer system displays, via the display generation component, a fourth user interface including a third option for a third medication form that is different from the first medication form (e.g., oral suspension, foam, device, inhaler, topical, drops, and/or oral solution), wherein the fourth user interface does not include an option selected from the group consisting of the first option and the second option. Displaying a first user interface for selecting between different medications to display different medication forms depending on which medication is selected provides a curated experience without cluttering the user interface as the user specifies aspects while adding a medication from multiple medications to a medication tracking application, thereby providing improved visual feedback to the user and performing an operation when a set of conditions has been met without requiring further user input.

In some embodiments, the first set of strength criteria includes a third strength criterion that is satisfied when the first medication is a medication of a first type (e.g., a specific medication/pharmaceutical composition (e.g., nitroglycerin, aspirin, losartan, and/or cetirizine)). In some embodiments, the third user interface includes, in accordance with a determination that a third set of strength criteria is satisfied, wherein the third set of strength criteria includes a fourth strength criterion that is satisfied when the respective medication form corresponds to the first medication form and a fifth strength criterion that is satisfied when the first medication is a medication of a second type (e.g., if the first medication is nitroglycerin then the second type of medication is a medication other than nitroglycerin in FIG. 6D), different from the first type, a third set of at least two medicinal strength options (e.g., oral suspension, foam, device, inhaler, topical, drops, and/or oral solution) that is different from the first set of at least two medicinal strength options. In some embodiments, provided strength options are based on both the selected form and the selected medication. In some embodiments, the first set of at least two medicinal strength options and the second set of at least two medicinal strength options do not include a medicinal strength option that is not associated with the first medication (e.g., a medicinal strength option that is identified to not be relevant to the first medication and/or a medicinal strength option for which the first medication is not available) (in some embodiments, only strengths for which a medication is available in are displayed in the third user interface). Providing medicinal strength options that are based on the medication type as well as selected medication form performs an operation (e.g., providing relevant medicinal strength options) when a set of conditions (selection of a specific medication type and a specific form) has been met without requiring further user input.

In some embodiments, in accordance with a determination that a fourth set of strength criteria is satisfied, wherein the fourth set of strength criteria includes a fifth strength criterion that satisfied when the respective medication form (e.g., the first medication form and/or the second medication form) is associated with less than two medicinal strengths (e.g., nitrofurantoin and/or nitisinone in FIG. 6D) (e.g., the first medication form and/or the second medication form is associated with a single medicinal strength), the third user interface does not include a medicinal strength option (e.g., does not include affordances 622a-622d) (e.g., does not include any medicinal strength options) (in some embodiments, the third user interface includes one or more options for a medicinal characteristic other than medicinal strength (e.g., shape options or nickname options). Omitting medicinal strength options from the third user interface when is only one possible medicinal strength option, reduces the number of inputs needed to perform an operation and performs an operation when a set of conditions has been met without requiring further user input.

In some embodiments, in response to detecting the second set of one or more inputs, displaying the third user interface including and in accordance with a determination that a fourth set of strength criteria is satisfied, wherein the fourth set of strength criteria includes a sixth strength criterion that satisfied when the respective medication form (e.g., the first medication form and/or the second medication form) is associated with at least two active ingredients in a medication form (e.g., a single medication form and/or a single unit of a medication form has at least two chemical ingredients of a particular amount and/or particular concentration), the computer system displays an option to define a medicinal strength value for a medicinal strength as being unknown (e.g., there is no strength and/or there is no known strength). In some embodiments, in accordance with the determination that the third set of criteria that includes the fifth criterion that satisfied when the respective medication form is associated with less than two medicinal strength, the computer system displays an option to define a medication characteristic other than a medicinal strength (e.g., an option to designate a schedule and/or an option to select visual characteristics for a representation of the first medication).

In some embodiments, the computer system detects, via one or more input devices, a fourth set of one or more inputs that includes a fourth input corresponding to a selection of a first medicinal strength option for a first medicinal strength (e.g., 626a-626c), wherein the first medicinal strength option is included in the first set of at least two medicinal strength options. In some embodiments, in response to detecting the fourth set of one or more inputs and in accordance with a determination that a first set of medication tracking criteria is satisfied, wherein the first set of medication tracking criteria includes a first medication tracking criterion that is satisfied when the medication tracking application does not include an existing medication (e.g., an active medication and/or an archived medication) that matches (e.g., corresponds to) at least the first medication form and the first medicinal strength, the computer system adds the first medication to the medication tracking application (e.g., in FIG. 6G, nitroglycerin in tablet form at 0.2 MG is added to the medication tracking application when the medication tracking application does not include the same medication having the same form and strength (e.g., nitroglycerin in tablet form at 0.2 MG)).

In some embodiments, in response to detecting the fourth set of one or more inputs and in accordance with a determination that the first set of medication tracking criteria is not satisfied, the computer system forgoes adding the first medication to the medication tracking application (e.g., in FIG. 6G, nitroglycerin in tablet form at 0.2 MG is not added to the medication tracking application when the medication tracking application includes the same medication having the same form and strength (e.g., nitroglycerin in tablet form at 0.2 MG)) (e.g., the medication tracking application prohibits a user from add a duplicate medication having the same form and medicinal strength). In some embodiments, in accordance with a determination that the first set of existing medication criteria that includes the first existing medication criterion is not satisfied, the computer system displays an option to modify a previously selected medication characteristic (e.g., the first medication, the first medication form, and/or the first medicinal strength). Conditionally continuing to add a medication to a medication tracking application based on whether there is another medication with the same medication form and medicinal strength allows the computer system to prevent duplicative entries in the medication tracking application, thereby providing improved feedback to the user about the state of the system (e.g., that the system either includes or does not include a medication entry with the same medication form and medicinal strength) and performing an operation when a set of conditions has been met without requiring further user input.

In some embodiments, in response to detecting the fourth set of one or more inputs, the computer system displays, via the display generation component and in accordance with a determination that a second set of medication tracking criteria is satisfied, wherein the second set of medication tracking criteria includes a second medication tracking criterion that is satisfied when an inactive medication (e.g., an archived medication and/or a medication that is not actively tracked, including a medication that is not scheduled medication and/or is not included as an as needed medication) of the medication tracking application matches (e.g., corresponds to) at least the first medication form and the first medicinal strength, an option to activate the inactive medication (e.g., in FIG. 6G, an option to activate nitroglycerin in tablet form at 0.2 MG is displayed when the medication tracking application includes the same medication having the same form and strength (e.g., nitroglycerin in tablet form at 0.2 MG) but the medication is inactive (e.g., 683*b*)) (e.g., modify a medication that is not actively tracked to a medication that is actively tracked, including either a scheduled medication and/or an as needed medication). Displaying an option to activate an inactive medication notifies the user that there was a medication previously added to the medication tracking application with the same medication form and medicinal strength as the one that the user is currently trying to add, thereby providing improved visual feedback to the user (e.g., about the state of the system, such as that the system either includes or does not include a medication entry with the same medication form and medicinal strength) and performing an operation when a set of conditions has been met without requiring further user input.

In some embodiments, the computer system detects, via one or more input devices, a fifth set of one or more inputs (e.g., an input directed at 624 in FIG. 6G) (e.g., the same as and/or different from the fourth set of inputs) that includes a fifth input (e.g., the same as and/or different from the fourth input) corresponding to a selection of a second medicinal strength option (e.g., 626*a*-626*c*) (e.g., the same as and/or different from the first medicinal strength option) for a second medicinal strength (e.g., the same as and/or different from the first medicinal strength), wherein the second medicinal strength option is included in the first set of at least two medicinal strength options. In some embodiments, in response to detecting the fifth set of one or more inputs (in some embodiments, in accordance with a determination that the first medication is to be added to the medication tracking application (e.g., the user has selected a medication form and medicinal strength and/or the first medication does not correspond to an existing medication that is tracked by the medication tracking application)), the computer system displays one or more options to configure a schedule (e.g., an option for designating a schedule for a logging action and/or an option for defining a frequency of a reminder to log an action for the first medication) in which the first medication should be taken (e.g., 640*a*-640*k*). In some embodiments, the one or more options to configure the schedule includes an option to designate the first medication as a non-scheduled medication (e.g., an as-needed medication). In some embodiments, the one or more options to configure the schedule includes an everyday option for scheduling the first medication for every day of the week. In some embodiments, selection of the everyday option causes concurrent display of an option for setting a first scheduled time (e.g., to take the first medication and/or record a logging action), an option for configuring a scheduled dosage (e.g., quantity or amount) (e.g., 1 tablet and/or 2 tablets) of the first medication, an option for configuring adding a second scheduled time different than the first scheduled medication, and an option for configuring a start date for taking the first medication. Displaying one or more options to configure a schedule in which the first medication should be taken provides a curated experience without cluttering the user interface as the user specifies aspects while adding a medication to a medication tracking application, thereby providing improved visual feedback to the user and performing an operation when a set of conditions has been met without requiring further user input.

In some embodiments, the computer system forgoes adding (e.g., does not add) the first medication until a schedule for the first medication has been configured (e.g., including designating the first medication as a non-scheduled medication, such as an as-needed medication) (e.g., the first medication cannot be added without configuring a schedule for the first medication).

In some embodiments, in response to detecting a request to configure the first medication as a non-scheduled medication, the computer system displays an option for configuring a visual characteristic (e.g., 604*s* and/or 604*t*) (e.g., color, shape, symbol, and/or icon) of a representation for the first medication. In some embodiments, the one or more options to configure the schedule include a first scheduling option that, when selected, causes display of an option for scheduling the first medication at regular intervals (e.g., once every other day and/or once every three days). In some embodiments, the one or more options to configure the schedule include a second scheduling option that, when selected, causes display of an option for scheduling the first medication on specific days of the week (e.g., every Sunday and/or every Wednesday). In some embodiments, selecting the second scheduling option causes display of respective options for each day of the week, that, when selected schedules the medication for the selected day. In some embodiments, selecting the second scheduling option defaults to a respective option for Sunday being selected.

In some embodiments, the computer system displays (in some embodiments, after the computers system detects the selection of the respective medication form (e.g., the first medication form and/or the second medication form) and a respective medicinal strength for the first medication (e.g., a medicinal strength option of the first set of at least two medicinal strength options and or the first set of at least two medicinal strength options)) one or more options (e.g., 644a-644e) to configure a visual appearance (e.g., color, shading, texture, and/or symbols) of a representation (e.g., 648a (e.g., icon, capsule icon, tablet icon, and/or pill bottle icon) of the first medication, wherein an option of the one or more options corresponds to a background for the representation (e.g., 644d and/or 644f). In some embodiments, the background for the icon includes an area surrounding the icon (e.g., and not a color of and/or inside the icon). Displaying one or more options to configure a visual appearance of a background for a representation of a first medication allows a user to customize how the computer system will present information, thereby providing improved visual feedback to the user, providing additional control options without cluttering the user interface with additional displayed controls, and performing an operation when a set of conditions has been met without requiring further user input.

In some embodiments, while adding the first medication, the computer system displays different color options for configuring a visual appearance of the icon depending on what icon is selected (e.g., 604s and/or 604t) (e.g., detecting a selection of a capsule icon will results in options for customizing color for both ends of the capsule whereas selecting a pill will present options for customizing a color of the entire pill).

In some embodiments, in response to detecting an input of confirming the schedule in which the first medication should be taken, the computer system displays one or more options to configure the visual appearance (e.g., color, shading, texture, and/or symbols) of a representation of the first medication. In some embodiments, the computer system forgoes displaying the one or more options to configure the visual appearance (e.g., color, shading, texture, and/or symbols) of the representation of the first medication until detecting an input of confirming the schedule in which the first medication should be taken.

In some embodiments, while adding the first medication, the computer system displays an option for configuring a title (e.g., a nickname and/or tag) for the first medication. In some embodiments, the title is editable after the first medication has been added as a tracked medication to the medication tracking application. In some embodiments, while adding the first medication, the computer system displays an option for configuring a note about the first medication. In some embodiments, the note is editable after the first medication has been added as a tracked medication to the medication tracking application. In some embodiments, one or more medication characteristics (e.g., clinical name, medication form, and/or medicinal strength) cannot be edited after the first medication has been added as a tracked medication to the medication tracking application. In some embodiments, at least two tracked medications have the same title and/or notes.

In some embodiments, after the first medication is added to the medication tracking application, the computer system displays a fifth user interface (e.g., 656) that includes: in a first portion (e.g., 668a) of the fifth user interface that corresponds to one or more scheduled medications, a first representation (e.g., 648a) (e.g., text, such as a medication name, and/or an image, such as an icon of the medication) of the first medication that includes an indication of a first time (e.g., 643) in which a logging action for the first medication is scheduled (e.g., due); and in a second portion (e.g., 660b) of the fifth user interface that corresponds to one or more medications that are being tracked (e.g., actively tracked) by the medication tracking application, a second representation (e.g., 648a) (e.g., text, such as a medication name, and/or an image, such as an icon of the medication) of the first medication (in some embodiments, that is different from the first representation). In some embodiments, the first representation in the fifth user interface is similar to the first user interface that includes the representation of the respective medication that is scheduled be taken at a scheduled time as described with reference to method 1100 of FIG. 11 and FIGS. 10A-10N). Displaying a fifth user interface including a first portion that includes a first representation of the first medication and a second portion that includes a second representation of the first medication separately notifies the user that the first medication has been added as an active medication well as when the first medication should be taken, providing improved visual feedback to the user, reducing the number of inputs needed to perform an operation, providing additional control options without cluttering the user interface with additional displayed controls, and performing an operation when a set of conditions has been met without requiring further user input.

In some embodiments, the first portion of the fifth user interface includes a first plurality of representations of a first plurality of medications (e.g., 668b and/or 668c) (e.g., including the first medication). In some embodiments, the first plurality of representations are ordered (e.g., arranged) in the first portion of the fifth user interface based on respective times in which logging actions are scheduled for the first plurality of medications (e.g., as depicted in FIG. 6X) (e.g., ordered based on their scheduled logging times). In some embodiments, the second portion of the fifth user interface includes a second plurality of representations of a second plurality of medications (e.g., 670a-670e). In some embodiments, a representation of a medication that was most recently added to the medication tracking application of the second plurality of medications is displayed at a predetermined position (e.g., at the top (e.g., at the top of an ordered list)) in the second portion of the fifth user interface (e.g., referring to FIG. 6X, nitroglycerin is optionally the medication that was most recently added to the medication tracking application). Displaying a fifth user interface including a first portion with medications ordered based on respective times in which logging actions are scheduled and a second portion with a most recently added medication that is displayed in a predetermined position in the second portion allows the computer system to present medications in different orders in a single user interface to help a user identify information quicker, thereby providing improved visual feedback to the user, reducing the number of inputs needed to perform an operation, and performing an operation when a set of conditions has been met without requiring further user input.

In some embodiments, the fifth user interface includes an indication (e.g., 674) (e.g., a notification about the drug interaction and/or information about the drug interaction) of a first drug interaction (e.g., alcohol and nitroglycerin in FIG. 6X) (e.g., an interaction (e.g., with a different medication and/or user-defined factors (e.g., alcohol, marijuana, and/or tobacco)) that changes (e.g., increases or decreases) the effectiveness the respective medication and/or an interaction that causes (e.g., introduces, increases, and/or decreases) a risk of a side effect by taking the respective medication) that corresponds to the first medication (e.g., as described in greater detail with reference method 900 of FIG. 9). Displaying an indication of a first drug interaction allows the computer system to provide visual feedback as to the state of the medication tracking application and whether it has identified a potential risk of taking the first medication, thereby providing improved visual feedback to the user and reducing the number of inputs needed to perform an operation.

In some embodiments, the computer system displays, via the display generation component, a sixth user interface (e.g., 604v) including a first user-selected interaction factor (e.g., 652a-652c) having a respective state (e.g., enabled and/or disabled). In some embodiments, the sixth user interface includes an option to modify (e.g., to deactivate and/or disable) the respective state of the first user-selected interaction factor (e.g., lifestyle factors, user-defined activities, and/or non-medication factors) (e.g., from an active state to an inactive state). In some embodiments, the sixth user interface is displayed during a process of adding the first medication to the medication tracking application (e.g., before or after displaying the third user interface, but before displaying a main tracking user interface (e.g., the fifth user interface) that includes an indication that the first medication is an active medication). In some embodiments, the sixth user interface is displayed after adding the first medication to the medication tracking application. In some embodiments the sixth user interface is displayed if the first medication is the very first medication that is added to the medication tracking application (e.g., as described in greater detail with reference method 900 of FIG. 9). Displaying a sixth user interface with a user-selected interaction factor in an active state and one or more options to modify a state of the user-selected interaction factor allows the computer system to perform an operation based on a user-selected preference, thereby providing improved visual feedback to the user, providing additional control options without cluttering the user interface with additional displayed controls, and performing an operation when a set of conditions has been met without requiring further user input.

In some embodiments, the computer system displays the one or more options to modify a state of the first user-selected interaction factor after displaying an option to select a medication form and a medicinal strength for the first medication. In some embodiments, the computer system displays the one or more options to modify a state of the first user-selected interaction factor prior to adding the first medication as a tracked medication to the medication tracking application (e.g., during a process to add the first medication to the medication tracking application). In some embodiments, the computer system displays the one or more options to modify a state of the first user-selected interaction factor during a process to add an initial medication (e.g., the very first medication to be tracked by the medication tracking application) to the medication tracking application. In some embodiments, the computer system forgoes displaying the one or more options to modify the state of the first user-selected interaction factor during a process to add a medication after the initial medication. In some embodiments, after adding the initial medication to the medication tracking application and in response to detecting a request to modify the state of the first user-selected interaction factor, the computer system displays the one or more options to modify the state of the first user-selected interaction factor.

Note that details of the processes described above with respect to method 700 (e.g., FIGS. 7A-7B) are also applicable in an analogous manner to the methods described below. For example, methods 800, 900, 1100, 1300, and/or 1500 optionally includes one or more of the characteristics of the various methods described above with reference to method 700. For example, the process of configuring various medication characteristics and/or adding medications in method 700 optionally occurs before and/or after methods 800, 900, 1100, 1300, and/or 1500. Further, methods 800, 900, 1100, 1300, and/or 1500 optionally utilize the various characteristics and medications that are configured in method 700. For brevity, these details are not repeated below.

Figure 8:
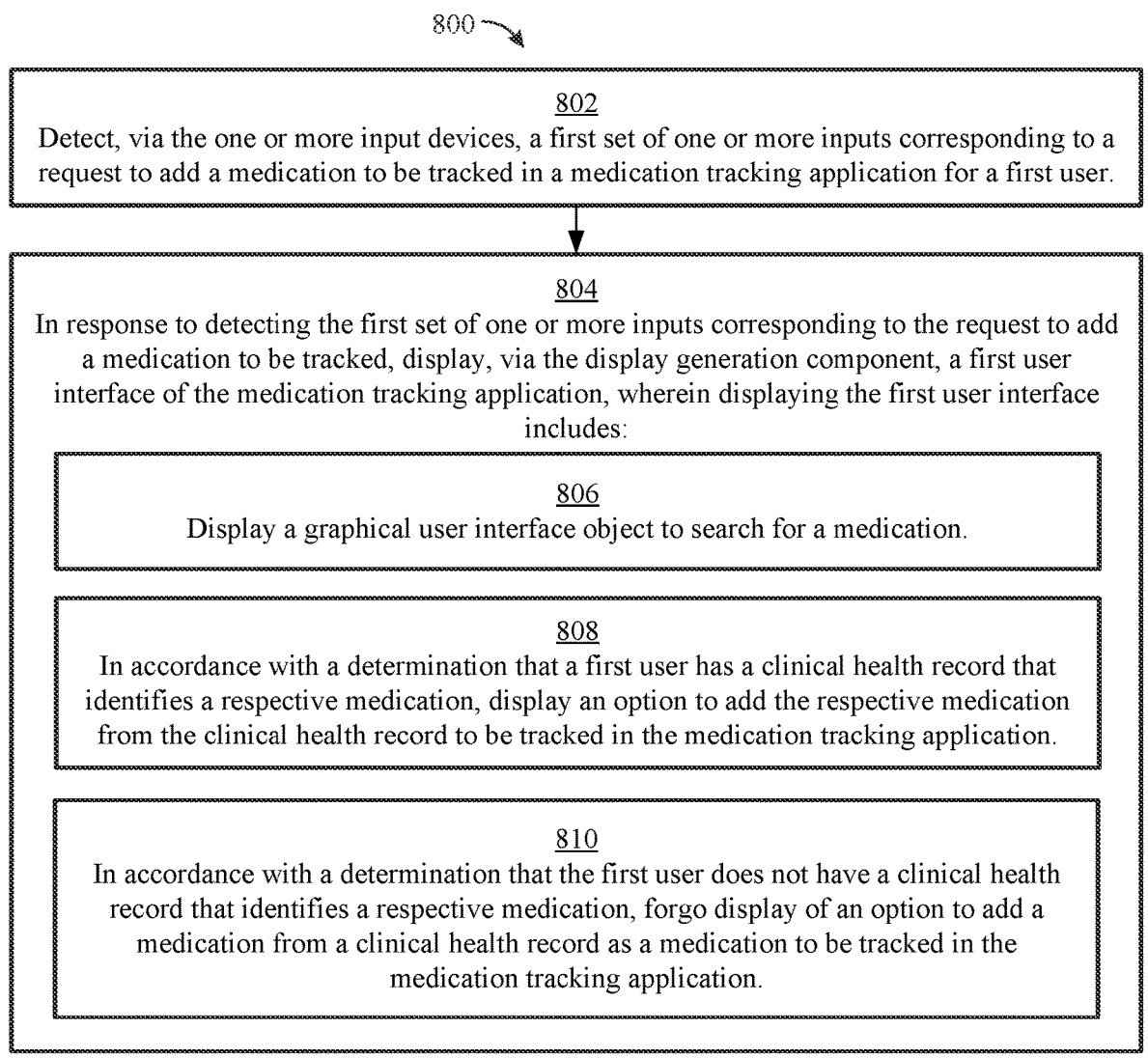
FIG. 8 is a flow diagram illustrating methods for tracking medications, in accordance with some embodiments.

FIG. 8 is a flow diagram illustrating a method for tracking medications in accordance with some embodiments. Method 800 is performed at a computer system (e.g., 100, 300, 500, 600 and/or 1400) (e.g., a smartwatch, a smartphone, a tablet, and/or a laptop computer) that is in communication with a display generation component (e.g., 601 and/or 1401) (e.g., a display controller, a touch-sensitive display system, and/or a monitor) and one or more input devices (e.g., 601 and/or 1401) (e.g., a touch-sensitive surface, a keyboard, a controller, a rotatable input device, microphone, and/or a mouse). Some operations in method 800 are, optionally, combined, the orders of some operations are, optionally, changed, and some operations are, optionally, omitted.

As described below, method 800 provides an intuitive way for tracking applications by surfacing relevant medications to be added to a medication tracking application. The method reduces the cognitive burden on a user for searching relevant medications to be added to a medication tracking application, thereby creating a more efficient human-machine interface. For battery-operated computing devices, enabling a user to search for relevant medications faster and more efficiently conserves power and increases the time between battery charges.

The computer system detects (802), via the one or more input devices, a first set of one or more inputs (e.g., a tap, a swipe, a mouse click, and/or a speech input) corresponding to a request (e.g., 650b, 650w) (e.g., a set of inputs that includes at least one input on a medication adding affordance) to add a medication to be tracked (e.g., a scheduled medication and/or an as-needed medication) (e.g., a prescription or non-prescription medication; a digital therapeutic; a pharmaceutical compound) in a medication tracking application for a first user (e.g., a user associated with device 600) (e.g., an application that includes a schedule for taking one or more medications and/or an application that notifies a user when a medication is scheduled to be taken). In some embodiments, the first set of one or more inputs includes an utterance corresponding to a request to add a medication to be tracked in a medication tracking application for the first user.

In response to detecting the first set of one or more inputs corresponding to the request to add a medication to be tracked, the computer system displays (804), via the display generation component, a first user interface (e.g., 604c) of the medication tracking application, wherein displaying the first user interface includes displaying (806) a graphical user interface object to search for a medication (e.g., 610a-610b) (e.g., a text field (e.g., a search bar) to search for a medication using text and/or an affordance to initiate a process to search for a medication using an image (e.g., an image captured by one or more cameras of the computer system and/or an image stored on the computer system, pill bottle scanning)) and in accordance with a determination that a first user has a clinical health record (e.g., a prescription, a clinical note, a correspondence with a care giver, and/or an electronic health record that is accessible to (e.g., stored on) the computer system and/or the medication tracking application) that identifies a respective medication (e.g., a clinical health record for amoxilin and/or albuterol in FIG. 6C and/or CHR affordances 1234) (e.g., a specific medication (in some embodiments, the specific medication includes a specific dosage form and/or strength based on information in the CHR)) (e.g., stored and/or accessible), the computer system displays (808) an option (e.g., 612*a*-612*b*) (e.g., an affordance and/or button) to add the respective medication from the clinical health record to be tracked (e.g., a scheduled medication and/or an as-needed medication) in the medication tracking application.

In response to detecting the first set of one or more inputs corresponding to the request to add a medication to be tracked, the computer system displays (804), via the display generation component, a first user interface (e.g., 604*c*) of the medication tracking application, wherein displaying the first user interface includes displaying (806) a graphical user interface object to search for a medication (e.g., 610*a*-610*b*) (e.g., a text field (e.g., a search bar) to search for a medication using text and/or an affordance to initiate a process to search for a medication using an image (e.g., an image captured by one or more cameras of the computer system and/or an image stored on the computer system, pill bottle scanning)) and in accordance with a determination that the first user does not have a clinical health record that identifies a respective medication, the computer system forgoes (810) display of an option to add a medication (e.g., the respective medication and/or not the respective medication) from a clinical health record as a medication to be tracked (e.g., a scheduled medication and/or an as-needed medication) in the medication tracking application (e.g., device 600 does not display a CHR affordance like CHR affordances 612*a*-612*b*). In some embodiments, the option to add the respective medication includes an indication of the type (e.g., name) of medication, an indication of a medication form, and/or an indication of a strength of the respective medication. In some embodiments, the option to add the respective medication does not include the indication of the type (e.g., name) of medication, the indication of a medication form, and/or the indication of a strength of the respective medication. In some embodiments, the computer system identifies a plurality of medications in one or more CHRs and displays at least two options for adding different medications (and/or different medications from different institutions (and/or caregivers)) as a scheduled medication. In some embodiments, the computer system identifies the clinical health record by accessing a health record that are stored locally (e.g., in association with the medication tracking application) and/or by accessing a health record stored externally (e.g., a caregiver's system). Displaying a user interface object to search for a medication concurrently with an identified medication from a clinical health record improves the computer system as it reduces the number of inputs necessary to add a medication to a medication tracking application, which reduces the number of inputs needed to perform an operation.

In some embodiments, the first set of one or more inputs includes detecting an input on an option to add the medication to the medication tracking application. In some embodiments, the first user interface is displayed in response to detecting the input on the option to add the medication. In some embodiments the option to add the medication is on a user interface including an active medication (e.g., actively tracked and/or an enabled medication) and/or an archived medication. In some embodiments the option to add the medication is on a user interface including a scheduled medication. Displaying a user interface in response to detecting input on an option provides the user with visual feedback that an input was detected and allows the user to add a medication to a medication tracking application, which provides improved visual feedback and improves the human-machine interface.

In some embodiments, the option to add the respective medication is displayed prior to (e.g., independently of; without) detecting an input on the graphical user interface object to search for the medication (e.g., CHR affordances 612*a*-612*b* are displayed without device 600 detecting a search for a medication). Displaying an identified medication from a clinical health record improves the computer system as it reduces the number of inputs necessary to add a medication to a medication tracking application, which reduces the number of inputs needed to perform an operation.

In some embodiments, while displaying the option to add the respective medication, the computer system detects a second set of one or more inputs that includes an input corresponding to (e.g., selecting and/or entering text within) the option to search for the medication (e.g., 650*c*1 and/or 650*c*2) (e.g., selecting the text field, detecting text entered in the text field, selecting the affordance to initiate the process to search for a medication using an image). In some embodiments, in response to detecting the second set of one or more inputs, the computer system ceases to display the option to add the respective medication (e.g., as depicted in FIG. 6D and/or FIG. 6K). In some embodiments, the option to add the respective medication is displayed in at least a portion of a respective area. In some embodiments, after ceasing to display the option to add the respective medication, an option for a search result (and/or a keyboard) is displayed in the at least a portion of the respective area. In some embodiments, the option to add the respective medication is displayed concurrently with a search result. Ceasing to display an identified medication from a clinical health record provides the user with visual feedback that an input to search for a medication has been detected and provide additional display area for search results in the user interface, which provides improved visual feedback and declutters the user interface.

In some embodiments, while displaying the first user interface, the computer system detects a first input (e.g., 650*c*3, 650*d*1, 650*d*2, and/or 650*d*3). In some embodiments, in response to detecting the first input and in accordance with a determination that the first input corresponds to a selection of the option to add the respective medication, the computer system displays a second user interface including a scheduling option (e.g., 604*n*-604*r*) (e.g., an option for setting a time to take a medication, a date to begin taking a medication, and/or a number of doses to take at a scheduled time). In some embodiments, in response to detecting the first input and in accordance with a determination that the first input corresponds to an option to add a medication from a search result (e.g., 620*a*-620*c*) (e.g., an option that is displayed in response to input(s) corresponding to the graphical user interface object to search for a medication), the computer system displays a third user interface that does not include a scheduling option (e.g., 604*e*, 604*g*, 604*i*, 604*j*) (e.g., the second user interface includes one or more options for defining characteristics of the respective medication (e.g., a medication form and/or a medicinal strength)). In some embodiments, in accordance with a determination that the third set of one or more inputs correspond to a selection of the option to add the respective medication, the computer system forgoes displaying one or more options for selecting a medication form and/or a medicinal strength. Displaying a user interface including a scheduling option if the identified medication from a clinical health record is selected improves the computer system as it reduces the number of inputs needed on intermediate user interfaces (such as an input to define a medication form and/or medicinal strength), which reduces the number of inputs needed to perform an operation.

In some embodiments, the computer system displays a search result for a respective medication (e.g., 620a-620c) (e.g., in response to a text-based search and/or in response to an image-based search). In some embodiments, while displaying the search result for the respective medication, the computer system detects a third set of one or more inputs that includes an input corresponding to a selection of the search result for the respective medication (e.g., 650d1, 650d2, and/or 650d3). In some embodiments, in response to detecting the third set of one or more inputs, the computer system displays an option that corresponds to a characteristic for the respective medication, wherein in accordance with a determination that the respective medication is a first medication, the characteristic for the respective medication is a first characteristic (e.g., a first medicinal strength, a first medicinal form). In some embodiments, in response to detecting the third set of one or more inputs, the computer system displays an option that corresponds to a characteristic for the respective medication, wherein in accordance with a determination that the respective medication is a second medication, the characteristic for the respective medication is a second characteristic, different from the first characteristic (e.g., a different medicinal strength; a different medicinal form). In some embodiments, in response to detecting the input corresponding to the selection of the search result for the respective medication, the computer system forgoes displaying an option for a characteristic that is not available for the respective medication (e.g., a form that the medication does not come in and/or a medicinal strength that the medication does not come in). In some embodiments, in response to detecting the input corresponding to the selection of the search result for the respective medication, the computer system forgoes displaying an option for a medicinal strength for the respective medication (as described in greater detail with reference method 700 of FIGS. 7A-7B). Displaying an option for a suggested characteristic based on the selected medication improves the computer system as it displays characteristics that are relevant to the selected medication (e.g., it removes characteristics that are not relevant to the selected medication), which reduces the number of inputs needed to perform an operation and declutters the user interface.

In some embodiments, the computer system detects a fourth set of one or more inputs (e.g., 650c2 and/or 650k) that includes an input corresponding to a request to search using an image (e.g., an image that is taken before detecting the fourth set of one or more inputs and/or an image captured while detecting the fourth set of one or more inputs (e.g., the fourth set of one or more inputs includes an input directed at a capture image option of a camera user interface and/or the computer system automatically captures the image in response to identifying one or more medication characteristics, such as a medication type, a medication form, and/or medicinal strength)). In some embodiments, in response to detecting the fourth set of one or more inputs corresponding to a request to search using an image and in accordance with a determination that the image includes an identified medication form and an identified medicinal strength (e.g., as depicted in FIG. 6M) (e.g., the image provides an indication of a medication form and medicinal strength (e.g., using a national drug code (NDC) and/or text indicating a medication form and/or medicinal strength)), the computer system displays the identified medication form and the identified medicinal strength. In some embodiments, in response to detecting the fourth set of one or more inputs corresponding to a request to search using an image and in accordance with a determination that the image includes an identified medication form (e.g., "capsule" in FIG. 6M is identified) and does not include an identified medicinal strength (e.g., "0.2 MG" in FIG. 6M is not identified) (e.g., the image does not provide an indication a medication form and/or medicinal strength), the computer system displays a selectable interface object for initiating a process to define a medicinal strength (e.g., 604g and/or 604j). In some embodiments, the image includes image data representing a label of a medication container (e.g., bottle, tube, and/or spray. In some embodiments, the image includes image data representing an image of a prescription and/or medical record (e.g., a prescription written by a care provider)). In some embodiments, in response to detecting the fourth set of one or more inputs corresponding to a request to search using an image and in accordance with a determination that the image includes an identified medicinal strength (e.g., "0.2 MG" in FIG. 6M is identified) and does not include an identified medicinal strength (e.g., "capsule" in FIG. 6M is not identified), the computer system displays a selectable interface object for initiating a process to define a medication form (e.g., 604e). In some embodiments, the set of criteria includes a criterion that a medication form be identified. In accordance with a determination that a medication form is not identified, the computer system displays a suggested medication form for a respective medication (e.g., a medication identified in the image and/or a brand name identified in the image). In some embodiments, the set of criteria includes a criterion that a medicinal strength be identified. In some embodiments, in accordance with a determination that a medicinal strength is not identified (and, optionally, in accordance with a determination that the medication form is identified), the computer system displays a suggested medicinal strength for the respective medication. In some embodiments, these process (e.g., the process to define a medicinal strength and/or the process to define a medication form) are similar as described in greater detail with reference method 700 of FIGS. 7A-7B. Displaying an option to confirm a medication identified in an image prevents adding a wrong medication to an application that the user would later need to delete and/or remove, which reduces the number of inputs needed to perform an operation.

In some embodiments, while displaying the option to add the respective medication, the computer system detects a fifth set of one or more inputs (e.g., 650c3) that includes an input corresponding to the option to add the respective medication. In some embodiments, in response to detecting the fifth set of one or more inputs and in accordance with a determination that a medication form is not identified in the clinical health record for the respective medication of the first user (e.g., "tablet" in 612a of FIG. 6C is not identified), the computer system displays a suggested medication form (e.g., 622a-622d) for the respective medication of the clinical health record. In some embodiments, in response to detecting the fifth set of one or more inputs and in accordance with a determination that a medicinal strength is not identified in the clinical health record for the respective medication of the first user (e.g., "50 MP" in 612a of FIG. 6C is not identified), the computer system displays a suggested medicinal strength for the respective medication of the clinical health record (e.g., 626a-626c). Displaying a suggested characteristic for an identified medication from a clinical health record if data is missing or cannot be determined from the health record improves the computer system since it displays suggested characteristics only when they are necessary, which reduces the number of inputs needed to perform an operation and declutters the user interface.

In some embodiments, the computer system displays (e.g., in the first user interface), via the display generation component, a second search result (e.g., 620a-620c) for a respective medication (in some embodiments, the second search result is displayed in response to a search performed using the graphical user interface object to search for a medication). In some embodiments, the computer system detects a sixth set of one or more user inputs that includes an input corresponding to the second search result for the respective medication. In some embodiments, in response to detecting the sixth set of one or more user inputs and in accordance with a determination that the second search result corresponds to a plurality of potential selections (e.g., 622a-622d and/or 626a-626c) (e.g., values, possibilities, choices, and/or options) for a first medicinal characteristic (e.g., strength and/or form) of the respective medication, the computer system displays a user interface (e.g., 640e and/or 604g) that includes one or more options for identifying a selection for the first medicinal characteristic of the respective medication. In some embodiments, in accordance with a determination that the second search result corresponds to a single selection for the medicinal characteristic, displaying a user interface other than the user interface that includes one or more options for identifying a selection for the first medicinal characteristic of the respective medication. Displaying a search result for the same medication that causes display of different user interfaces (e.g., a search result for the medication that, when selected, goes to scheduling user interface and a search result for the medication that, when selected goes to a non-scheduling user interface (e.g., a user interface for medication form and/or medicinal strength) based on the search criteria being satisfied improves the computer system as it limits the number of user inputs to navigate through unnecessary user interfaces and only displays relevant user interfaces, which reduces the number of inputs needed to perform an operation.

In some embodiments, the first medicinal characteristic of the respective medication is selected from the group consisting of a medicinal strength (e.g., 622a-622d) and a medicinal form (e.g., 626a-626c). In some embodiments, the fourth user interface does not include an option of a medication form and/or an option for medicinal strength. Displaying a user interface that includes an option for a medication form and/or medicinal strength based on the selected search result for the medication provides a user with visual feedback regarding the state of the computer system (e.g., the computer cannot detect a form or strength from the user-provided search and/or the computer determined that the medication is associated with multiple forms and/or strengths), which provides improved visual feedback.

In some embodiments, the computer system displays (e.g., in the first user interface), via the display generation component, a third search result (e.g., 620a-620c) for a respective medication (in some embodiments, the second search result is displayed in response to a search performed using the graphical user interface object to search for a medication). In some embodiments, the computer system detects a seventh set of one or more user inputs that includes an input corresponding to the third search result for the respective medication. In some embodiments, in response to detecting the seventh set of one or more user inputs and in accordance with a determination that the third search result for the respective medication has a plurality of potential selections for a second medicinal characteristic (e.g., nitroglycerin has multiple forms as depicted in FIG. 6D), the computer system displays a user interface (e.g., 604e) that includes one or more options (e.g., 622a-622d) for identifying a selection for the second medicinal characteristic of the respective medication (e.g., associated with the third search result). In some embodiments, in response to detecting the seventh set of one or more inputs and in accordance with a determination that the third search result for the respective medication has a single potential selection for the second medicinal characteristic (e.g., nitisinone has one medication form as depicted in FIG. 6D), the computer system displays a user interface (e.g., 604g) that includes one or more options (e.g., 626a0626c) for identifying a selection for a third medicinal characteristic, different from the second medicinal characteristic (e.g., similar to the process of method 700 described in reference to FIGS. 7A-7B). Displaying a search result for the medication that causes display of different options based on if a medication is associated with a single form or multiple forms reduces the number of inputs needed to select a form when a medication is only available in a single form, which reduces the number of inputs and/or simplifies the user-flow of adding a medication to a medication tracking application.

In some embodiments, the computer system displays (e.g., in the first user interface), via the display generation component, a fourth search result (e.g., 620b and/or 620c) for a respective medication (in some embodiments, the fourth search result is displayed in response to a search performed using the graphical user interface object to search for a medication). In some embodiments, the computer system detects an eighth set of one or more user inputs that includes an input corresponding to the fourth search result for the respective medication. In some embodiments, in response to detecting the eighth set of one or more user inputs and in accordance with a determination that the fourth search result for the respective medication has a plurality of potential selections for a medicinal strength (e.g., nitrofurantoin has multiple medicinal strengths as depicted in FIG. 6D), the computer system displays a user interface (e.g., 604g) that includes one or more options (e.g., 626a-626c) for identifying a selection for the medicinal strength of the respective medication (e.g., associated with the fourth search result). In some embodiments, in response to detecting the eighth set of one or more user inputs and in accordance with a determination that the fourth search result for the respective medication has a single potential selection for the medicinal strength (e.g., nitisinone has a single medicinal strength as depicted in FIG. 6D), the computer system displays a user interface (e.g., 604e) that includes one or more options (e.g., 622a-d) for identifying a selection for a fourth medicinal characteristic, different from the medicinal strength (e.g., similar to the process of method 700 described in reference to FIGS. 7A-7B). Conditionally displaying an option for a medicinal strength based on if a medication is associated with a single or multiple medicinal strengths reduces the number of inputs needed to select a form when a medication is only available in a single medicinal strength and reduces the number of options that are displayed, which reduces the number of inputs and/or simplifies the user-flow of adding a medication to a medication tracking application.

In some embodiments, the clinical health record for the respective medication is a clinical health record (e.g., the clinical health record associated with CHR affordances 612a-612b) that meets a predetermined record age criteria (e.g., is not older than a predetermined record age threshold (e.g., 3 months, 6 months, 1 year, 2 years, 5 years)) (in some embodiments, the record age is a prescription issuance/written date). Only displaying medications from a clinical health record if they are within a threshold period of time reduces the number of inputs needed to select a relevant medication and declutters the user interface, which reduces the number of inputs and/or simplifies the user-flow of adding a medication to a medication tracking application.

In some embodiments, the computer system detects a ninth set of one or more inputs (e.g., text 618 in text search bar 610a) that includes an input corresponding to a search for a respective medication. In some embodiments, in response to detecting the ninth set of one or more inputs and in accordance with a determination that a search that corresponds to the ninth set of one or more inputs does not correspond (e.g., match) to a known medication (e.g., as depicted in FIG. 6H) (e.g., a medication in a database accessible to the computer system), the computer system displays an option (e.g., 628) to add a user-specified medication (e.g., a custom medication). In some embodiments, the computer system receives a tenth set of one or more inputs (e.g., 650h) that includes an input corresponding to the option to add the user-specified medication. In some embodiments, in response to receiving the tenth set of one or more inputs, the computer system displays a medicinal form selection user interface (e.g., 604i) that includes, in a first portion of the medicinal form selection user interface, a first set of predetermined medicinal form options (e.g., 630a) (e.g., common forms). In some embodiments, in response to receiving the tenth set of one or more inputs, the computer system displays a medicinal form selection user interface that includes, in a second portion of the medicinal form selection user interface, a second set of predetermined medicinal form options (e.g., 630b) (e.g., less common forms), different from the first set of predetermined medicinal form options. In some embodiments, the second set includes more options than the first set. Displaying two different categories of medication forms that are separated from each other allows a user to quickly identify a relevant medication form, which reduces the number of inputs and/or simplifies the user-flow of adding a medication to a medication tracking application.

Note that details of the processes described above with respect to method 800 (e.g., FIG. 8) are also applicable in an analogous manner to the methods described below/above. For example, method 800 optionally includes one or more of the characteristics of the various methods described above with reference to methods 700, 900, 1100, 1300, and/or 1500. For example, the process of surfacing relevant medications and configuring characteristics of a relevant medication in method 800 optionally occurs before and/or after methods 700, 800, 900, 1100, 1300, and/or 1500. Further, methods 700, 900, 1100, 1300, and/or 1500 optionally rely on and/or utilize the medication selected in method 800. For brevity, these details are not repeated below.

FIG. 9 is a flow diagram illustrating a method for tracking a medication in accordance with some embodiments. Method 900 is performed at a computer system (e.g., 100, 300, 500, 600 and/or 1400) (e.g., a smartwatch, a smartphone, a tablet, and/or a laptop computer) that is in communication with a display generation component (e.g., 601 and/or 1401) (e.g., a display controller, a touch-sensitive display system, and/or a monitor) and one or more input devices (e.g., 601 and/or 1401) (e.g., a touch-sensitive surface, a keyboard, a controller, a rotatable input device, microphone, and/or a mouse). Some operations in method 900 are, optionally, combined, the orders of some operations are, optionally, changed, and some operations are, optionally, omitted.

As described below, method 900 provides an intuitive way for surfacing a drug interaction for tracked medications. The method reduces the cognitive burden on a user for to identify a drug interaction, thereby creating a more efficient human-machine interface. For battery-operated computing devices, enabling a user to identify a drug interaction faster and more efficiently conserves power and increases the time between battery charges.

The computer system detects (907), via the one or more input devices, a set of one or more inputs corresponding to a request to add a respective medication as a medication to be tracked (e.g., 650b and/or 650w) (e.g., a scheduled medication and/or an as-needed medication) in a medication tracking application (e.g., the medication tracking application associated with medication tracker affordance 608) (e.g., an application that includes a schedule for taking one or more medications and/or an application that notifies a user when a medication is scheduled to be taken).

In response to detecting the set of one or more inputs corresponding to the request to add the respective medication as a medication to be tracked, the computer system displays (904), via the display generation component, a user interface of the medication tracking application (e.g., 656). In some embodiments, displaying the user interface includes, in accordance with a determination that the respective medication has a first drug interaction (see e.g., FIG. 6X) (e.g., an interaction (e.g., with a different medication and/or user-defined factors (e.g., alcohol, marijuana, and/or tobacco)) that changes (e.g., increases or decreases) the effectiveness the respective medication and/or an interaction that causes (e.g., introduces, increases, and/or decreases) a risk of a side effect by taking the respective medication) that satisfies a first set of criteria (e.g., is a "severe" risk of a drug interaction and/or a high risk of a drug interaction), displaying (906) an indication (e.g., as depicted in FIG. 6X) (e.g., a notification about the drug interaction and/or information about the drug interaction) of the first drug interaction in a first portion (e.g., 674) (e.g., in first platter and/or first tile) of the user interface. In some embodiments, Displaying the user interface includes, in accordance with a determination that the respective medication has a second drug interaction (see e.g., FIG. 6X) (e.g. an indication that there is a risk of a drug interaction and/or an indication that there is no risk of a drug interaction) that satisfies a second set of criteria different from the first set of criteria (e.g., a "non-severe" risk of a drug interaction (e.g., a medium and/or low risk of a drug interaction) and/or there is no risk of a drug interaction), displaying (908) an indication (e.g., as depicted in FIG. 6X) of the second drug interaction in a second portion (e.g., 676) (e.g., in second platter and/or tile) of the user interface different from the first portion of the user interface. In some embodiments, the indication of the second drug interaction is not displayed in the first portion of the user interface (e.g., a "non-severe" risk is not displayed in "severe" risk platter and/or tile as the "severe"). Displaying a drug interaction at different positions depending on whether a medication satisfies different criteria (e.g., drug interaction is displayed at the top if it's severe and/or at the bottom if it's not severe) provides a user with improved visual feedback as it indicates how the medication interacts with other medications and/or life style factors (e.g., consuming alcohol and/or tobacco) and will draw the user's attention to a particular type of interaction (e.g., severe and/or high risk), which improves visual feedback and/or improves whether a medication should added or consumed with other medications of a medication tracking application.

In some embodiments, the first portion (and/or the indication of the first drug interaction) is separated (e.g., spaced apart) from the second portion (and/or the second drug interaction) by one or more graphical elements (e.g., platters, tiles, and/or affordances) of the user interface (e.g., one or more other scheduled medications, one or more logged medications, an option for logging an as-needed medication, one or more active medications, an option to initiate adding a medication, and/or an option to initiate archiving a medication). In some embodiments, the first portion (and/or the indication of the first drug interaction) is closer to a scheduled medication portion of the user interface (and/or an area of the user interface that includes one or more scheduled medications) than the second portion (and/or the indication of the second drug interaction). In some embodiments, the second portion (and/or the indication of the second drug interaction) is located below a graphical element for one or more active medications whereas the first portion (and/or the indication of the first drug interaction) is above the graphical element for one or more active medications. In some embodiments, the indication of the first drug interaction is positioned above the second drug interaction (and/or the first drug interaction is near the top of the user interface, while the second drug interaction is near the bottom of the user interface). In some embodiments, the indication of the first drug interaction displayed in the first portion of the user interface is not concurrently displayed with the second drug interaction displayed in the second portion of the user interface (e.g., a user has to scroll to view the second portion).

In some embodiments, in response to detecting the set of one or more inputs and in accordance with a determination that the respective medication has the first drug interaction (e.g., an interaction (e.g., with a different medication and/or user-defined factors (e.g., alcohol, marijuana, and/or tobacco)) that changes (e.g., increases or decreases) the effectiveness the respective medication and/or an interaction that causes (e.g., introduces, increases, and/or decreases) a risk of a side effect by taking the respective medication) that satisfies the first set of criteria, the computer system displays a second indication (e.g., as depicted in second risk tile 676 of FIG. 6X) (e.g., a notification about the drug interaction and/or information about the drug interaction) of the first drug interaction in the second portion (e.g. in addition to the first portion). Displaying a drug interaction at both positions (e.g., displaying a severe drug interaction at both the top and the bottom) provides a user with improved visual feedback as it prevents the user from overlooking a particular drug interaction (e.g., severe and/or high risk), which improves visual feedback and/or improves whether a medication should be added or consumed with other medications of a medication tracking application. Additionally, it provides improved visual feedback that a medication has been added to a medication tracking application and performs an operation when a set of conditions has been met without requiring further user input.

In some embodiments, the indication of the first drug interaction displayed in the first portion has a first appearance (e.g., as depicted in FIG. 6X) (e.g., size, shape, alphanumeric text, color, and/or symbol). In some embodiments, the second indication of the first drug interaction displayed in the second portion has a second appearance different from the first appearance (e.g., as depicted in FIG. 6X). Displaying a drug interaction in a particular position differently than the drug interaction in a different position (e.g., displaying a severe drug interaction differently at the top than at the bottom) provides a user with improved visual feedback so that the user does not overlook a particular drug interaction (e.g., severe and/or high risk), which improves visual feedback and/or improves whether a medication should added or consumed with other medications of a medication tracking application. Additionally, it provides improved visual feedback that a medication has been added to a medication tracking application.

In some embodiments, the first portion of the user interface includes (e.g., only includes) an indication of a drug interaction for a most recently added medication (e.g., nitroglycerin is a most recently added medication in FIG. 6X) (e.g., a newly added medication or most recent medication added). In some embodiments, the second portion of the user interface includes an indication of a drug interaction for a medication (e.g., second risk tile 676 of FIG. 6X includes an indication of a drug interaction for pain med, blood pressure med, cetirizine and/or sleep aid) (e.g., a medication that was added prior to the newly added medication or added prior most recent medication added) that was added prior to the most recently added medication. Displaying a particular drug interaction (e.g., severe and/or high risk) at a position for a recently added medication and drug interactions for previously added medications in another position provides a user with improved visual feedback since it draws the user's attention to the drug interaction for the recently added medication while allowing a user to still view drug interactions for previously added medications, which improves visual feedback and/or improves whether a medication should added or consumed with other medications of a medication tracking application. Additionally, it provides improved visual feedback that a medication has been added to a medication tracking application.

In some embodiments, the second portion of the user interface includes a second indication of the drug interaction for the most recently added medication (e.g., "1 severe" as depicted in FIG. 6X). Displaying a particular drug interaction (e.g., severe and/or high risk) for a recently added medication in both positions provides a user with improved visual feedback since it prevents to the drug interaction for the recently added medication while allowing a user to still view drug interactions for previously added medications, which improves visual feedback and/or improves whether a medication should be added or consumed with other medications of a medication tracking application.

In some embodiments, the first portion of the user interface does not include the indication of the drug interaction for the medication that was added prior to the most recently added medication (e.g., as depicted by first risk tile 674 of FIG. 6X). Not displaying a drug interaction for a previously added medication in a particular position (e.g., at the top of the user interface) provides a user with improved visual feedback since it declutters the user interface, which improves visual feedback and/or machine-human interface.

In some embodiments, the computer system displays an indication of a drug interaction (e.g., the first drug interaction and/or the second drug interaction) for a first medication in the user interface (e.g., 674 in FIG. 6X) (e.g., in the first portion of the user interface and/or in the second portion of the user interface). In some embodiments, the first medication is categorized as an active medication (e.g., 670*b*). In some embodiments, in response to detecting a set of one or more inputs (e.g., 650*aa*, 650*ab*, and/or 650*ac*) corresponding to a request to categorize the first medication as a non-active medication (e.g., 683*b*) (e.g., archive and/or deactivate active tracking of the medication), the computer system categorizes the first medication as a non-active medication. In some embodiments, in response to detecting a set of one or more inputs corresponding to a request to categorize the first medication as a non-active medication (e.g., archive and/or deactivate active tracking of the medication), the computer system ceases to display the indication of the drug interaction in the user interface (e.g., device 600 ceases to display first risk tile 674 in FIG. 6X). Not displaying a drug interaction for a particular drug that has been deactivated (e.g., archived) provides a user with improved visual feedback of user input that a medication has been archived and declutters the user interface, which improves visual feedback and/or improves the human-machine interface. In some embodiments, while displaying the indication of the first drug interaction in the first portion, the computer system detects a set of one or more inputs (e.g., 650x1) to scroll the user interface. In some embodiments, in response to detecting the set of one or more inputs to scroll the user interface in a first downward direction (and/or to move the first drug interaction and/or other elements up), the computer system displays the indication of the second drug interaction in the second portion. In some embodiments, the indication of the first drug interaction is not concurrently displayed with the second indication of the second drug interaction in the second portion. In some embodiments, the indication of the first drug interaction is concurrently displayed with the second indication of the second drug interaction in the second portion. Displaying a first type of drug interaction (e.g., severe and/or high risk) and then displaying second type of drug interaction (e.g., non-severe and/or medium/low risk) provides a user with improved visual feedback of detecting input and prioritizes an order of the first type of drug interaction in the user interface above the second type of drug interaction (e.g., the severe drug interaction will be displayed above a non-severe drug interaction in the user interface), which improves visual feedback.

In some embodiments, while displaying the indication of the first drug interaction in the first portion of the user interface, the computer system detects an input to remove the indication of the first drug interaction in the first portion (e.g., an input directed at remove affordance 675). In some embodiments, in response to detecting the input to remove the indication of the first drug interaction in the first portion, the computer system ceases to display the indication of the first drug interaction in the first portion. In some embodiments, in response to detecting the input to remove the first indication of the first drug in the first portion, the computer system moves a scheduled medication up (as described in method 1100 in FIG. 11). Removing a first type of drug interaction (e.g., severe and/or high risk) for the user interface in response to user input provides a user with improved visual feedback that input was detected and declutters the user interface, which improves visual feedback and improves the human-machine interface.

In some embodiments, in response to detecting the input to remove the indication of the first drug interaction in the first portion, the computer system maintains display of the indication of the first drug interaction in the second portion (e.g., 676 continues to be displayed in FIG. 6X after 674 is removed). In some embodiments, the second portion is always included in the user interface and/or cannot be removed from the user interface). In some embodiments, the first user interface does not include any selectable options to remove the indication of the second drug interaction. Maintaining display of the second drug interaction in the user interface even though the first drug interaction is removed provides a user with improved visual feedback as to the state of the medications being tracked by the medication tracking application and maintains display of risks identified by the computer system that the user should consider in taking particular medications, which improves visual feedback and improves the how medication tracking application functions.

In some embodiments, the indication of the second drug interaction corresponds to a second medication. In some embodiments, while displaying the indication of the second drug interaction in the second portion, the computer system detects a first input (e.g., 650x3) corresponding to the indication of the second drug interaction. In some embodiments, in response to detecting the first input corresponding to the indication of the second drug interaction, the computer system displays one or more indications (e.g., as depicted in FIG. 6Z) of one or more (e.g., all and/or multiple) drug interactions for medications (and, optionally, including the indication of the first drug interaction) different from the second medication. Displaying additional drug interactions (e.g., all interactions for actively tracked medications) in response to detecting an input on a particular drug interaction (e.g., non-severe and/or medium/low risk) provides a user with improved visual feedback that input was detected and provides improved visual feedback of how the tracked medications interact with each other, which improves visual feedback and improves how a medication tracker application tracks medications.

In some embodiments, while displaying the indication of the first drug interaction in the first portion, the computer system detects an input (e.g., 650x2) corresponding to the indication of the first drug interaction. In some embodiments, in response to detecting the input corresponding to the indication of the first drug interaction, the computer system displays information about a medication that corresponds to the indication of the first drug interaction (e.g., as depicted in FIG. 6Y) (and, optionally, the computer system forgoes display of information corresponding to other drug interactions (e.g., the second drug interaction)). Displaying information for a single drug interaction in response to detecting an input on a particular drug interaction (e.g., severe and/or high risk) provides a user with improved visual feedback that input was detected and provides improved visual feedback and declutters the user interface by limiting the amount information that is displayed for other types of drug interaction types, which improves visual feedback and declutters the user interface.

In some embodiments, displaying the user interface of the medication tracking application includes, in accordance with a determination that the respective medication has a third drug interaction that satisfies a third set of criteria different from the first set of criteria and the second set of criteria (e.g., there is no risk of a drug interaction), displaying an indication that no risk of a drug interaction has been identified in a third portion (e.g., 676 in FIG. 6AA) (e.g., the same and/or different than the second portion) of the user interface different from the first portion of the user interface. Displaying an indication that there is an absence of a risk (e.g., no risks are found) provides a user with improved visual feedback of a state of the medication tracker application (e.g., that the application is actively checking for drug interactions), which improves visual feedback.

In some embodiments, the second set of criteria includes a criterion that is satisfied when a first user-selected interaction factor (e.g., lifestyle factors, user-defined activities, and/or non-medication factors) is in an active state (e.g., is currently selected; is currently applicable to the user). In some embodiments, while displaying the indication of the second drug interaction in the second portion, the computer system detects a second input corresponding to the indication of the second drug interaction. In some embodiments, in response to detecting the second input corresponding to the indication of the second drug interaction, the computer system displays one or more options (e.g., the edit affordance in FIG. 6Z) to modify (e.g., to deactivate) a state of the first user-selected interaction factor. Displaying an option in a drug interaction user interface that, when selected, causes one or more options to modify user-defined factors provides reduces the number of inputs to modify a lifestyle factor that can trigger an indication of a drug interaction, which reduces the number of inputs necessary to perform an operation and improves how a medication tracker application tracks drug interactions.

In some embodiments, the first set of criteria and/or the second set of criteria includes a criterion that is satisfied when a second user-selected interaction factor (e.g., 652a-652c) (e.g., lifestyle factors, user-defined activities, and/or non-medication factors; a factor that is the same as or different from the first user-selected interaction factor) is in an active state. In some embodiments, prior to displaying the user interface of the medication tracking application, the computer system receives a user input corresponding to a request to set (e.g., to modify) the state of the second user-selected interaction factor (e.g., an input on 652a-652c). Displaying an indication of a drug interaction based on a user-defined factor received prior to displaying the indication improves how the medication tracker application detects a potential risk of taking a medication based on the user's lifestyle, improves how a medication tracker application tracks drug interactions.

In some embodiments, the first set of criteria and/or the second set of criteria includes a criterion that is satisfied when a third user-selected interaction factor (e.g., 652a-652c) (e.g., lifestyle factors, user-defined activities, and/or non-medication factors; a factor that is the same as or different from the first and/or second user-selected interaction factor) is in an active state. In some embodiments, prior to displaying the user interface of the medication tracking application, the computer system receives an input corresponding to a request to initiate a process for adding a new medication to the medication tracking application (e.g., 650b on 608 when the medication tracking application associated with 608 in FIG. 6B has not been set up and/or there are no tracked medications). In some embodiments, in response to receiving the input corresponding to request to initiate a process for adding the new medication to the medication tracking application, the computer system initiates the process for adding the new medication to the medication tracking application (e.g., displays one or more of the user interfaces of FIGS. 6C-6V). In some embodiments, during the process (e.g., at a predefined point in the process; in response to an input received during the process) for adding the new medication to the medication tracking application and in accordance with a determination that the new medication is an initial medication (e.g., the medication tracking application associated with 608 in FIG. 6B is not tracking any medications and/or the medication tracking application does not include an active medication and deactivated medication) (e.g., first medication and/or the very first medication to be tracked by the medication tracking application) being added to the medication tracking application, the computer system displays a user interface (e.g., 604v) that includes one or more selectable options (e.g., 652a-652c) (e.g., an affordance; a text entry field) for modifying a state of the third user-selected interaction factor. In some embodiments, during the process (e.g., at a predefined point in the process; in response to an input received during the process) for adding the new medication to the medication tracking application and in accordance with a determination that the new medication is not an initial medication (e.g., the medication tracking application associated with 608 in FIG. 6B is tracking a medication and/or the medication tracking application does not include an active medication and deactivated medication) (e.g., is a second or later medication to be added) being added to the medication tracking application, the computer system forgoes displaying (e.g., proceeding with the process without displaying) the user interface that includes one or more selectable options (e.g., an affordance; a text entry field) for modifying a state of the third user-selected interaction factor (e.g., 604v is not displayed in response to 650g) (e.g., during processes of adding a medication described in with reference to method 700 of FIGS. 7A-7B and method 800 of FIG. 8). Surfacing a notification to add user-defined factors the first time a medication is added to the medication application, where the user-defined factors are used as a criterion in determining risks for subsequent medications improves how the medication tracker application detects a potential risk of taking a medication based on the user's lifestyle, which improves how a medication tracker application tracks drug interactions.

Note that details of the processes described above with respect to method 900 (e.g., FIG. 9) are also applicable in an analogous manner to the methods described below/above. For example, method 700, 800, 1100, 1300, and/or 1500 optionally includes one or more of the characteristics of the various methods described above with reference to method 900. For example, the process of surfacing a risk of a drug interaction in method 900 optionally occurs before and/or after methods 700, 800, 900, 1100, 1300, and/or 1500. As another example, the selections made within the user interfaces described in methods 700, 800, 1100, 1300, and/or 1500 cause display of the various characteristics of drug interactions described in method 900. For brevity, these details are not repeated below.

FIGS. 10A-10N illustrate exemplary user interfaces for logging medications, in accordance with some embodiments. The medications logged in FIGS. 10A-10N are the same medications that are added and displayed using the techniques of FIGS. 6A-6AD. The user interfaces in these figures are used to illustrate the processes described below, including the processes in FIG. 11.

At FIG. 10A, tracking interface 656 is the same as tracking interface 656 of FIG. 6AD. At FIG. 10A, tracking interface 656 includes log affordance 1010 for the medications of scheduled medication tile 668b and log affordance 1010 for medications of scheduled medication tile 668a. While displaying tracking interface 656, device 600 detects input 1050a (e.g., tap and/or mouse click) directed at log affordance 1010 for schedule medication tile 668b. In response to detecting input 1050a, device 600 displays logging interface 1002a, as depicted in FIG. 10B. While displaying tracking interface 656, device 600 (e.g., a digital assistant of device 1400) detects (e.g., via a microphone) speech input 1051a (e.g., an utterance to log 8:00 AM medications). In response to detecting speech input 1051a, device 600 displays logging interface 1002a, as depicted in FIG. 10B. In some embodiments, device 600 detects speech input 1051a (e.g., an utterance to log 8:00 AM medications) while displaying a user interface other than tracking interface 565. In some embodiments, device 600 detects speech input 1051a (e.g., an utterance to log 8:00 AM medications) while displaying a user interface of a home screen and/or a user interface of an application other than the medication tracker application. In some embodiments, while displaying tracking interface 656 (and/or while displaying a user interface other than tracking interface 656, such as home screen of device 600 or a user interface of a different application), device 600 detects an utterance to log 8:00 AM medications as taken (and/or skipped). In such embodiments, device 600 logs cetirizine and blood pressure med (losartan) as taken (and/or skipped) at a current time of the utterance (e.g., 11:00 AM). In some embodiments, while displaying tracking interface 656 (and/or while displaying a user interface other than tracking interface 656, such as home screen or a user interface of a different application), device 600 detects an utterance to log cetirizine as taken and blood pressure med (losartan) as skipped (and/or skipped). In such embodiments, device 600 logs cetirizine as taken and blood pressure med (losartan) as skipped at a current time of the utterance (e.g., 11:00 AM), similar to how cetirizine is logged as taken and blood pressure med (losartan) is logged as skipped as described with reference to FIG. 10F.

At FIG. 10B, logging interface 1002 includes a logging interface for the medications of scheduled medication tile 668b. Logging interface 1002 includes an indication of a logged time of 11:00 based on the current time being 11:00. Logging interface 1002 includes an indication of a dosage of one tablet for both cetirizine and blood pressure med based on a user configuring the dosage affordance to one tablet while adding the respective medication (e.g., using dosage affordance 640e of FIG. 6O).

At FIG. 10B, logging interface 1002 includes a "mark all as taken" affordance 1004. In some embodiments, in response to detecting a selection of "mark all as taken" affordance 1004, device 600 selects taken affordance 1006 for cetirizine and taken affordance 1006 for blood pressure med. Taken affordance 1006 can be selected if a user wants to record that the user took a medication. Logging interface 1002 further includes skipped affordances 1008a-b, which can be selected if a user wants to record that the user did not take the respective medication.

At FIG. 10B, while displaying logging interface 1002, device 600 detects input 1050b1 (e.g., tap and/or mouse click) directed at taken affordance 1006a for cetirizine. In response to detecting input 1050b1, device 600 displays an indication that taken affordance 1006a for cetirizine has been selected, as depicted in FIG. 10C. While displaying logging interface 1002, device 600 detects input 1050b2 (e.g., tap and/or mouse click) directed at skipped affordance 1008b for blood pressure med. In response to detecting input 1050b2, device 600 displays an indication that skipped affordance 1008b for blood pressure med has been selected, as depicted in FIG. 10C.

At FIG. 10C, while displaying logging interface 1002, device 600 detects input 1050c (e.g., tap and/or mouse click) directed at time affordance 1014a. In response to detecting input 1050c, device 600 displays logging interface 1016, as depicted in FIG. 10D.

Figure 10D:
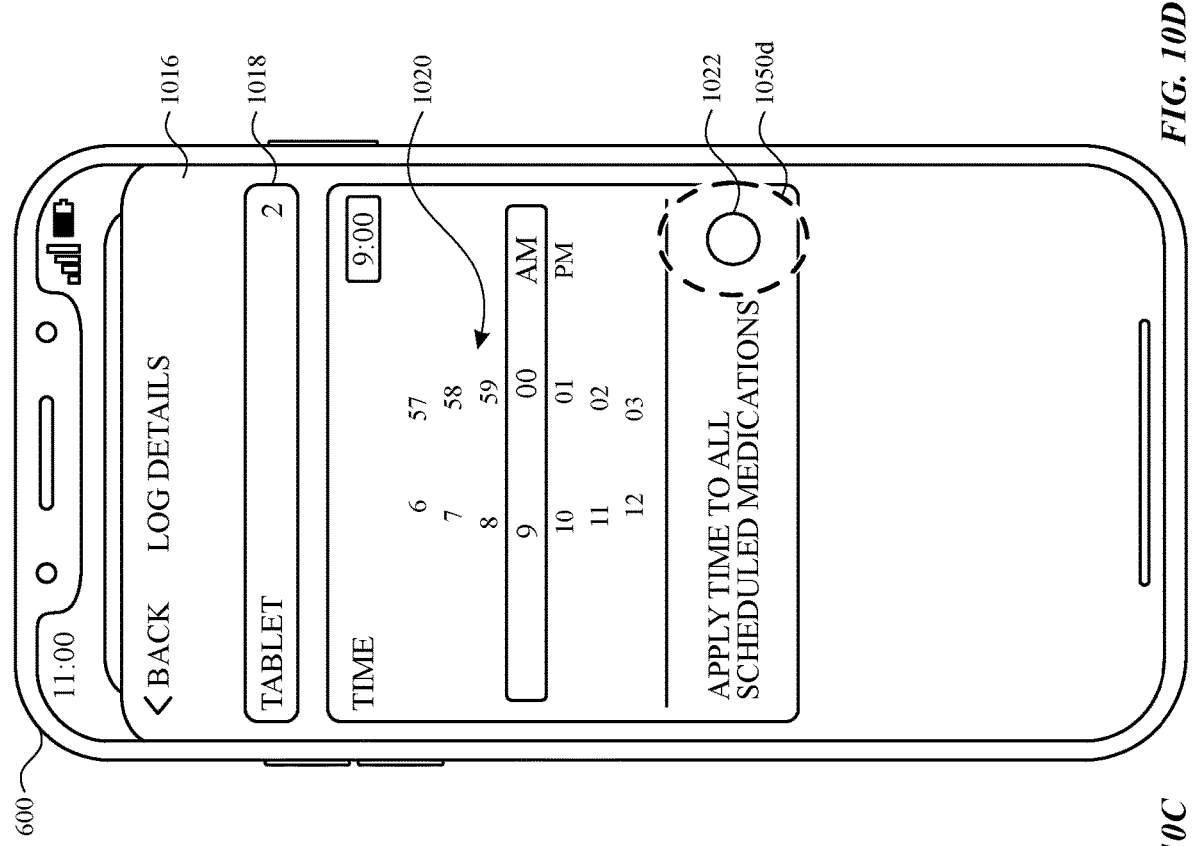
Figure 10C:
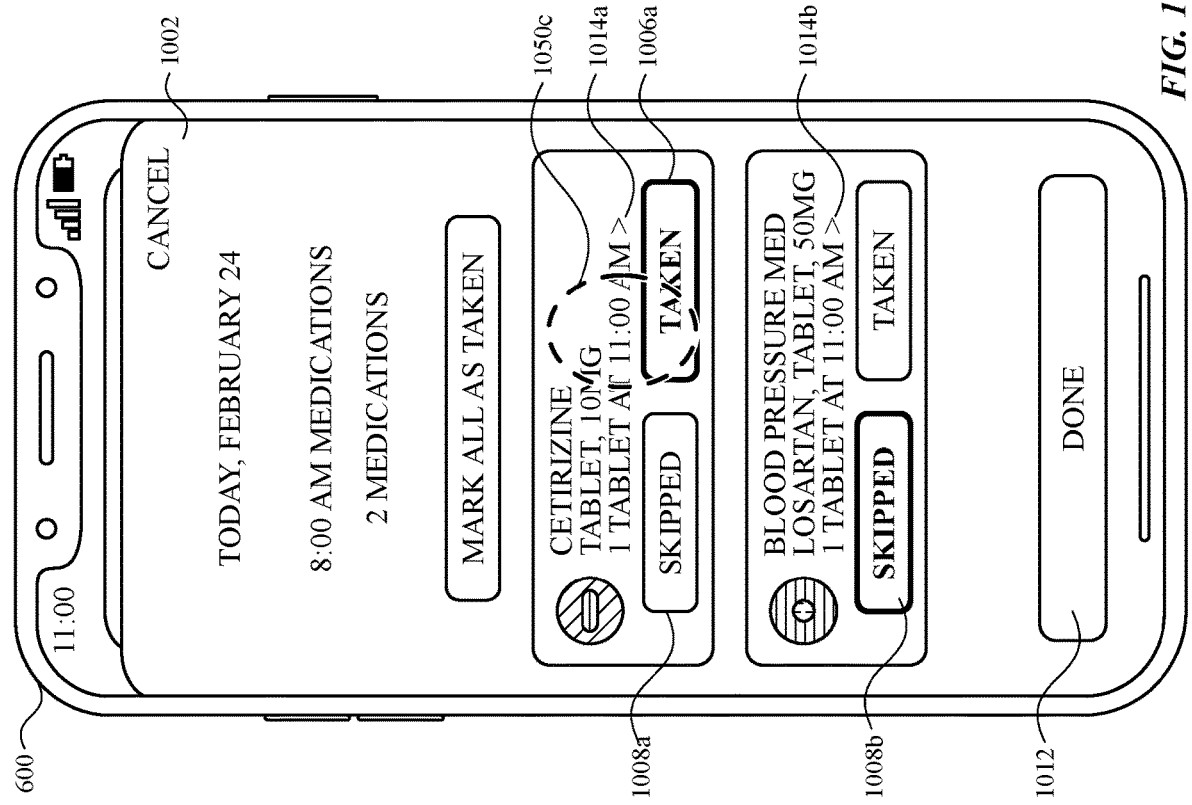

At FIG. 10D, device 600 has updated the dosage from one tablet to two tablets in response to one or more user inputs, as shown by edit dosage affordance 1018. Additionally, device 600 has updated the indication of the logged time to 9:00 AM in response to one or more user inputs directed at time user interface object 1020. Logging interface 1016 includes apply logged time affordance 1022. Selecting apply logged time affordance 1022 applies the logged time of 9:00 AM to both cetirizine and blood pressure med. In some embodiments, selecting logged time affordance 1022 only modifies the log time for the selected medication. In some embodiments, after configuring the logged time of 9:00 AM, device 600 detects a request to apply the time to cetirizine only (e.g., an input on the back affordance and/or an affordance to apply the time to the respective medication only). While displaying logging interface 1016, device 600 detects input 105d (e.g., tap and/or mouse click) directed at apply logged time affordance 1022. In response to detecting input 1050d, device 600 displays logging interface 1002, as depicted in FIG. 10E.

Figure 10E:
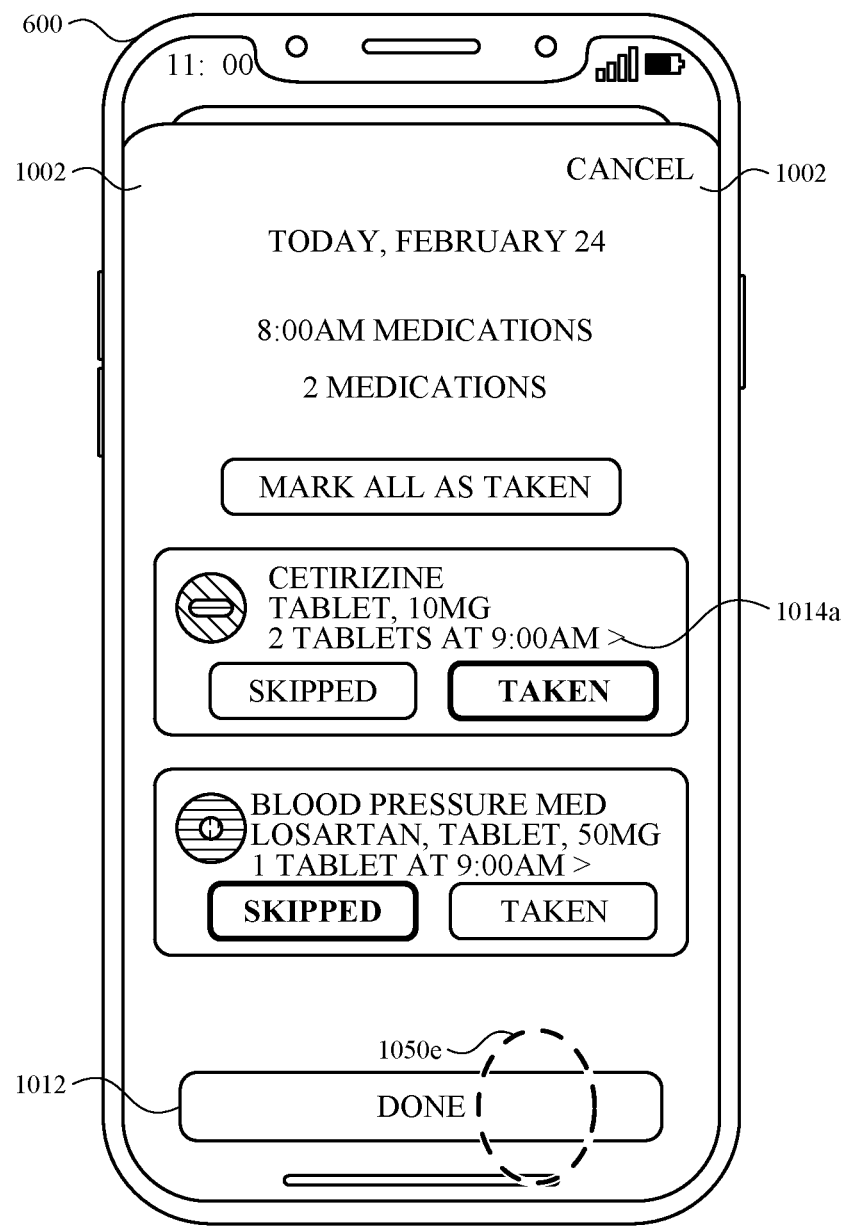

At FIG. 10E, device 600 updates logging interface 1002 to reflect a logged time of 9:00 AM. Additionally, logging interface 1002 includes done affordance 1012. Done affordance 1012 of FIG. 10E is enabled, whereas done affordance 1012 of FIG. 10B is disabled. Done affordance 1012 is enabled in response to detecting input 1050b1 and/or input 1050b2, as depicted in FIG. 10C. In some embodiments, selecting only one medication enables done affordance 1012. In some embodiments, selecting all the scheduled medications enables done affordance 1012. In some embodiments, done affordance 1012 is displayed despite (and/or independently of) device 600 scrolling in a particular direction (e.g., down) so as to display an off-screen medication that is due (and/or scheduled to be logged) (e.g., the done affordance "floats" on the user interface). In some embodiments, the done affordance 1012 is not initially displayed until device 600 scrolls in the particular direction so as to display an off-screen medication that is due. While displaying logging interface 1002, device 600 detects input 1050e (e.g., tap and/or mouse click) directed at done affordance 1012. In response to detecting input 1050e, device 600 displays tracking interface 656, as depicted in FIG. 10F.

Figure 10F:
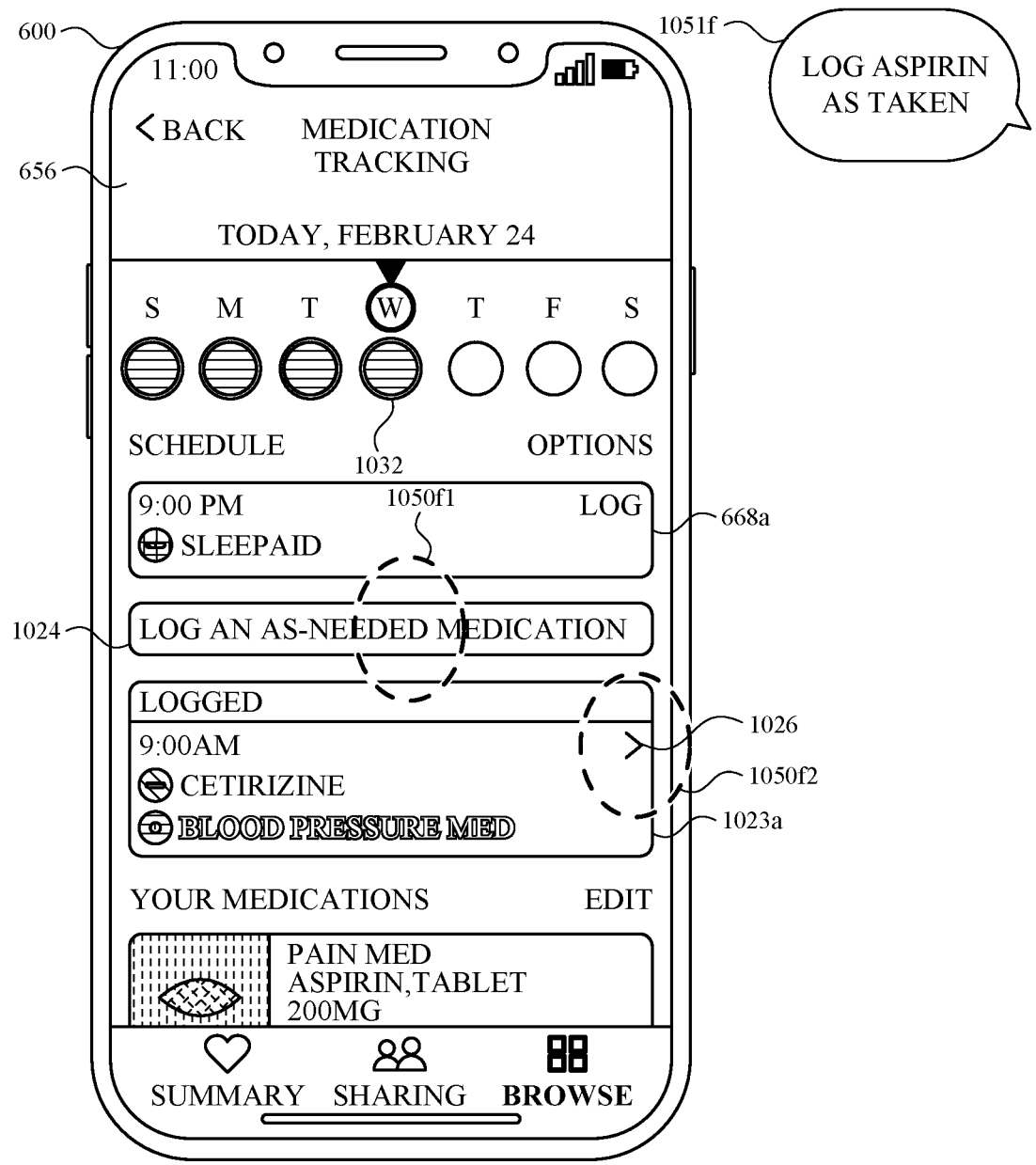

At FIG. 10F, device 600 updates tracking interface 656 based on logging cetirizine and blood pressure med of scheduled medication tile 668a. As illustrated, tracking interface 656 includes logged medication tile 1023a. Logged medication tile 1023a includes an indication that the logged time is 9:00 AM, indicating when the user took cetirizine and skipped blood pressure med. While the user logged the medication at 11:00, the logged time is 9:00 based on when the user took and/or skipped the respective medication. In some embodiments, logged medication tile 1023a includes a logged time that corresponds to the time that the medication was scheduled to be taken, similar to the indication of the logged time in logged tile 1424a of FIG. 14E. In such embodiments, logged medication tile 1023a includes an indication that the logged time is 8:00 AM.

At FIG. 10F, device 600 displays a representation of a medication in a logged medication tile differently based on how the medication was logged (e.g., skipped and/or taken) As illustrated, device 600 displays the text of the medications (cetirizine and blood pressure med) differently (e.g., with different visual appearances) based on whether the medication was logged as taken or skipped. As illustrated, blood pressure med, which was logged as skipped, appears bolded and in different font as compared to cetirizine, which was logged as taken. In some embodiments, device 600 displays the icons associated with a medication differently based on whether the medication was logged as taken or skipped.

At FIG. 10F, logged medication tile 1023a includes modify affordance 1026 that, once selected (e.g., in response to input 1050f2), causes device 600 to display logging interface 1002. As such, modify affordance 1026 allows a user to change a logged time, logged dosage, and even modify whether the medication was taken or skipped.

At FIG. 10F, tracking interface 656 no longer includes scheduled medication tile 668a. As a result, schedule medication tile 668b is moved up. Scheduled medication tile 668b in FIG. 10F is displayed higher than its previous location in FIG. 10A. Additionally, as illustrated, device 600 displays logged medication tile 1023a below scheduled medication tile 668b and below log as-needed medication affordance 1024. As such, tracking interface 656 prioritizes schedule medication tiles over logged tiles so that a user can more easily see which scheduled medications need to be logged.

At FIG. 10F, device 600 updates logging indicator 1032 in tracking interface 656. Logging indicator 1032 has been updated to have an appearance (e.g., a color, a shading, a symbol) to indicate a medication has been logged for Wednesday. As illustrated, logging indicator 1032 of FIG. 10F has a different appearance than logging indicator 1032 of FIG. 10A. In some embodiments, the appearance of logging indicator 1032 is based on logging a single medication (either a scheduled medication or an as-needed medication) for the day. In some embodiments, the appearance of logging indicator 1032 is based on logging multiple (e.g., different) medications for the day (e.g., as opposed to a single medication). In some embodiments, logging indicator 1032 has a different appearance based on whether all scheduled medications for a respective day are logged. In some embodiments, the appearance of logging indicator 1032 is based on what medications are logged (e.g., logging indicator 1032 is updated with a first appearance based on a first medication being logged and a second appearance different from the first appearance based on a second medication different from the first medication being logged). In some embodiments, logging indicator 1032 has a different appearance based on whether no scheduled medications have been logged, at least one (but less than all) scheduled medications have been logged, and all scheduled medication have been logged.

Figure 10G:
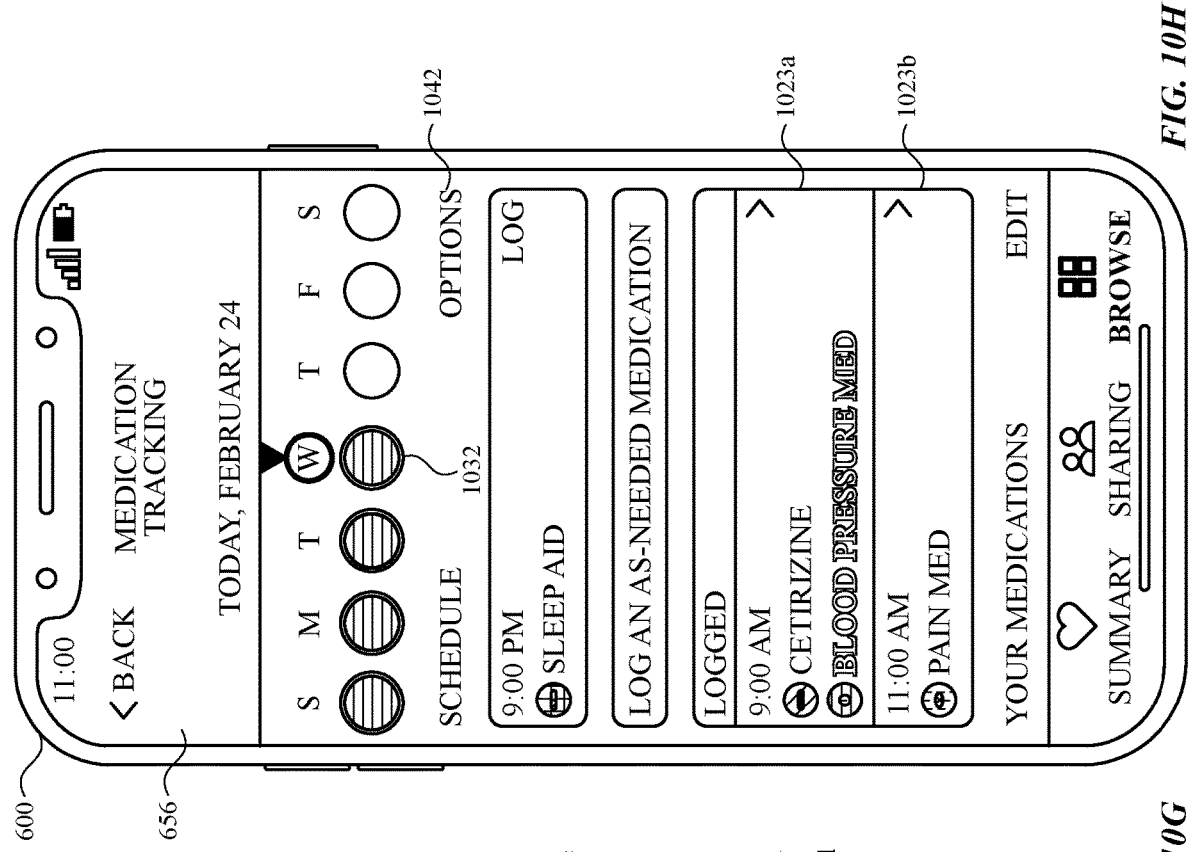
Figure 10H:
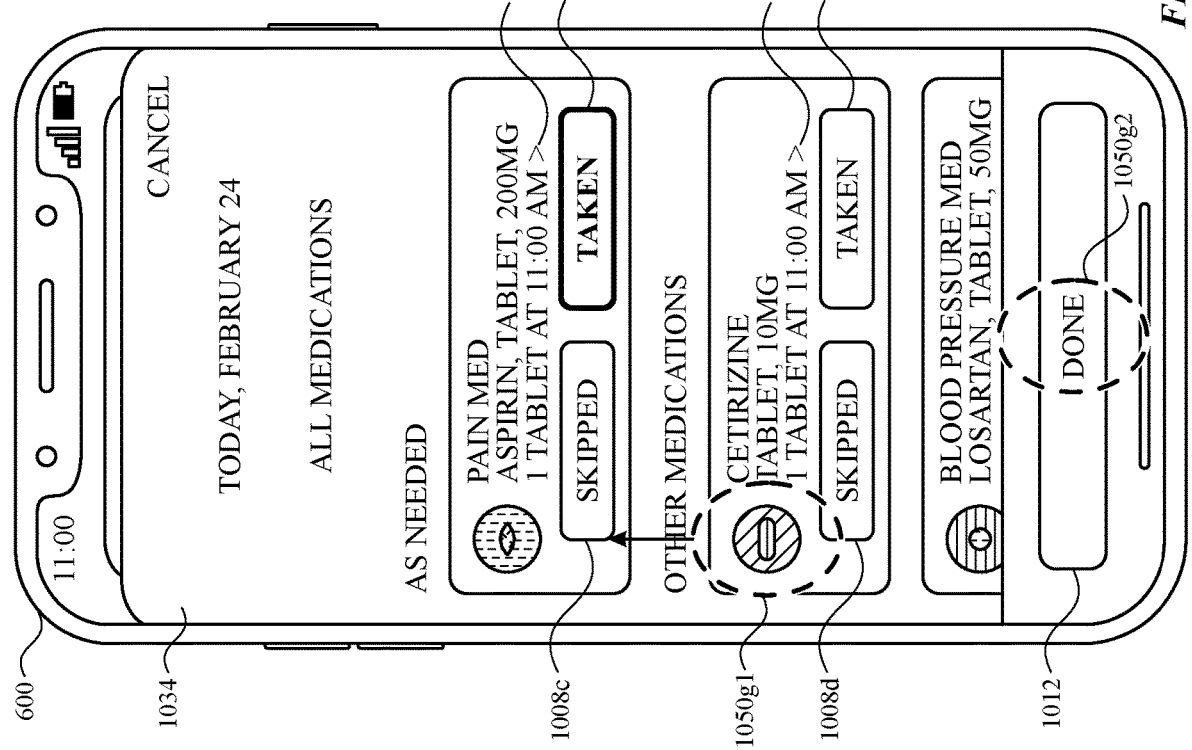
Figure 10J:
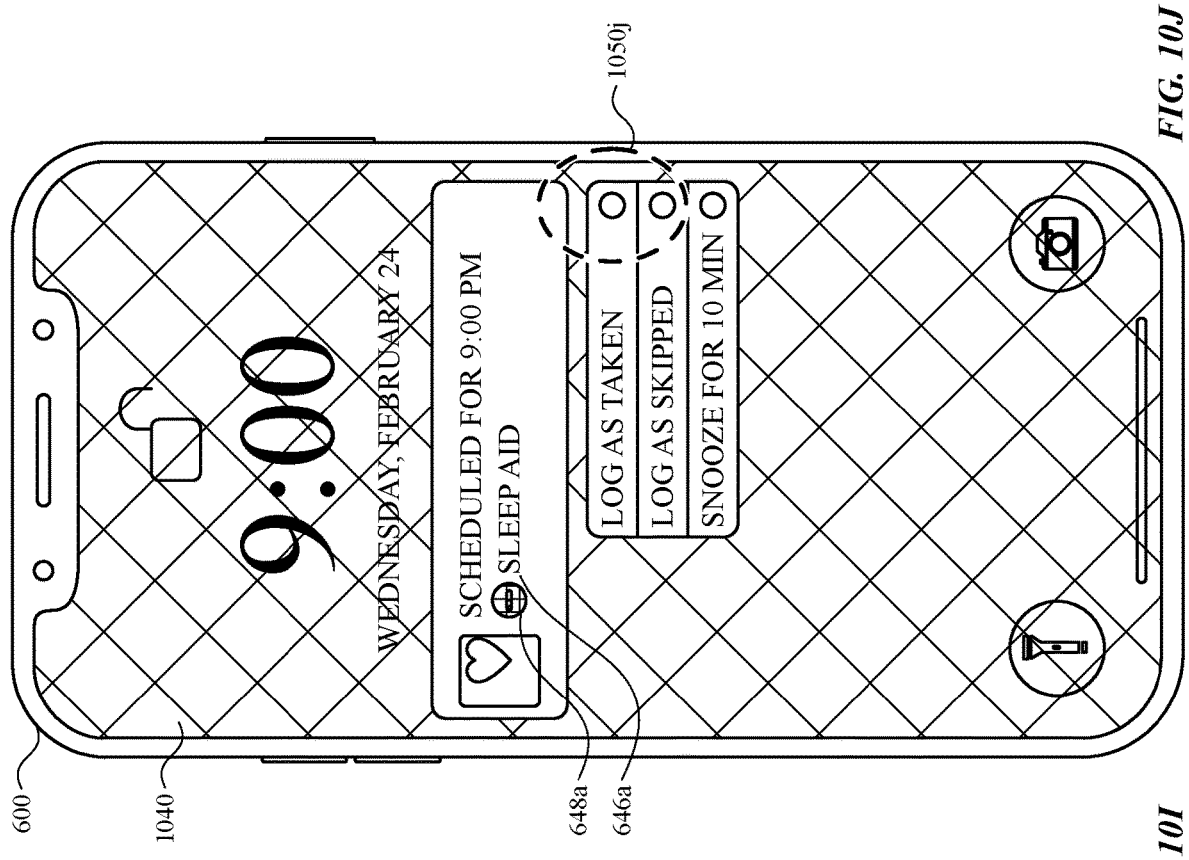

At FIG. 10F, while displaying tracking interface 656, device 600 detects input 1050f1 (e.g., tap and/or mouse click) directed at log as-needed medication affordance 1024. In response to detecting input 1050f1, device 600 displays interface 1034, as depicted in FIG. 10G. While displaying tracking interface 656, device 600 (e.g., a digital assistant of device 1400) detects speech input 1051f (e.g., an utterance to log aspirin as taken) (in some embodiments, speech input 1051f is an utterance to log an as-needed medication, for example, without identifying the medication is aspirin). In response to detecting speech input 1051f, device 600 displays logging interface 1034 of FIG. 10G. In some embodiments, in response to detecting speech input 1051f, device 600 displays tracking interface 656, as depicted in FIG. 10H.

At FIG. 10G, interface 1034 includes active medications, including as-needed medications (e.g., pain med) and scheduled medications (e.g., cetirizine, blood pressure med, and sleep aid). Device 600 can scroll through the active medications based on detecting a scroll input 1050g1 (e.g., swipe and/or tap and drag). In some embodiments, pain med was added as an as-needed medication by device 600 detecting a selection of as needed affordance 640b. In some embodiments, cetirizine, blood pressure med, and sleep aid were added as scheduled medications by device 600 detecting a selection of everyday affordance 640a or custom affordance 640c.

At FIG. 10G, interface 1034 includes taken affordances 1006c-1006d and skipped affordances 1008c-1008d for both pain med and cetirizine. As illustrated, the active medications in interface 1034 further include a scheduled dosage (e.g., one tablet) and a log time. The dosage and log time are configurable based on selecting dosage and time affordances 1014c-1014d. In response to detecting a selection of dosage and time affordances 1014c, device 600 displays an interface similar to logging interface 1016. In some embodiments, log as-needed medication affordance 1024 and interface 1034 provides a shortcut to log not only an as-needed medication, but also log a scheduled medication (e.g., even when it is not scheduled or is instructed by a care provider to take the medication in addition to the scheduled time if needed).

At FIG. 10G, device 600 has already detected a selection of taken affordance 1006 for pain med. While displaying interface 1034, device 600 detects input 1050g2 (e.g., tap and/or mouse click) directed at done affordance 1412. In response to detecting input 1050g2, device 600 displays tracking interface 656, as depicted in FIG. 10H.

At FIG. 10H, as a result of logging pain med, logged tile 1023b is included in tracking interface. As illustrated, logged tile 1023b is positioned below logged medication tile 1023a because logged tiles are ordered based on the logged time. In some embodiments, the appearance of logging indicator 1032 is updated based on the additional logged medication. In some embodiments, the appearance of logging indicator 1032 remains the same regardless of the additional logged medication.

Figure 10I:
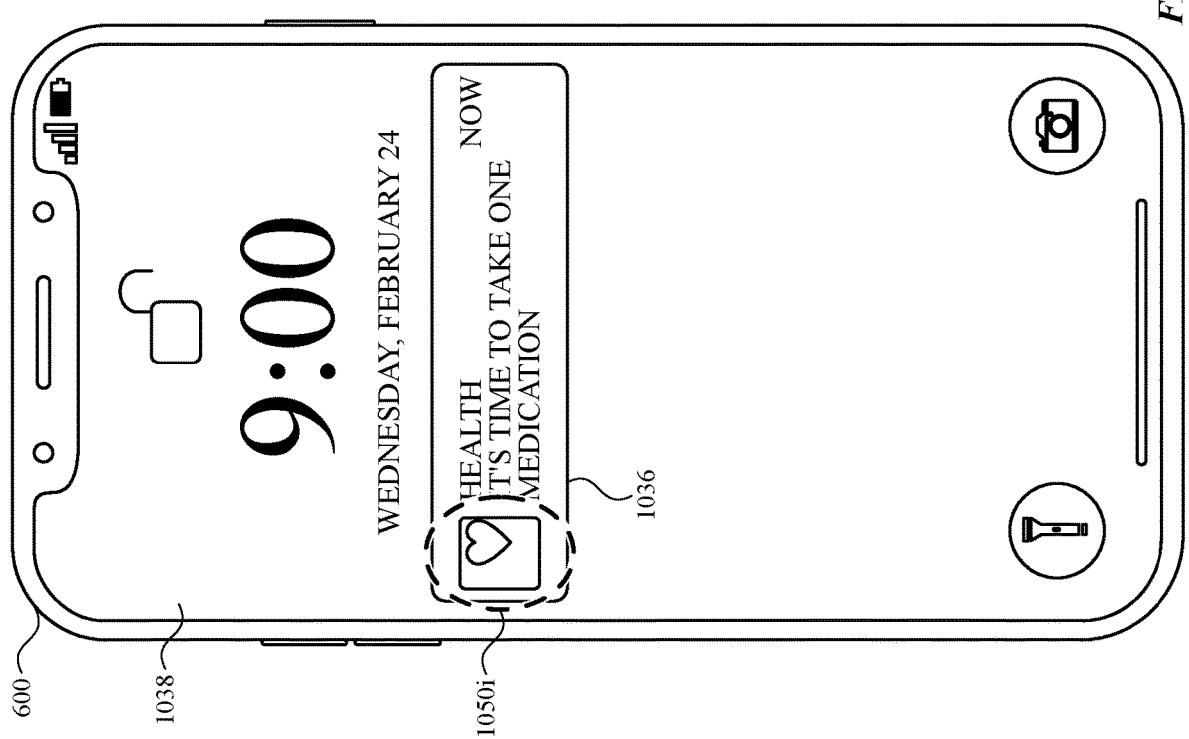

At FIG. 10I, device 600 displays unlocked screen interface 1038 with notification 1036 indicating that a medication is due to be taken. Returning briefly to FIG. 10H, notifications can be configured in response to detecting an input on options affordance 1042. In some embodiments, in response to detecting a selection of options affordance 1042 causes device 600 to display a user interface to control notifications about logging a medication. In some embodiments, notifications user interface to control notifications includes an affordance to add an end-of-day notification to log all unlogged medications that have been scheduled for that day. In some embodiments, notifications user interface provides affordance to disable or enable notifications to log specific medications since a user may be used to logging some medications but needs a reminder to log other medications.

Returning to FIG. 10I, while displaying unlocked screen interface 1038, device 600 detects input 1050i (e.g., a long press and/or swipe) directed at notification 1036. In response to detecting input 1050i, device 600 displays interface 1040, as depicted in FIG. 10J. In some embodiments, in response to detecting a tap on notification 1036, device 600 displays an interface similar to logging interface 1002 for the respective medication that is due.

At FIG. 10J, interface 1040 includes affordances for logging a medication as taken or as skipped and an affordance to snooze the notification. Notification 1036 also includes an indication of the medication that is due, including icon 648a for melatonin and the nickname for melatonin ("sleep aid"). While displaying interface 1040, device 600 detects input 1050j (e.g., tap and/or mouse click) directed at the affordance to log the medication as taken. In response to detecting input 1050j, device 600 logs melatonin as taken.

Figure 10K:
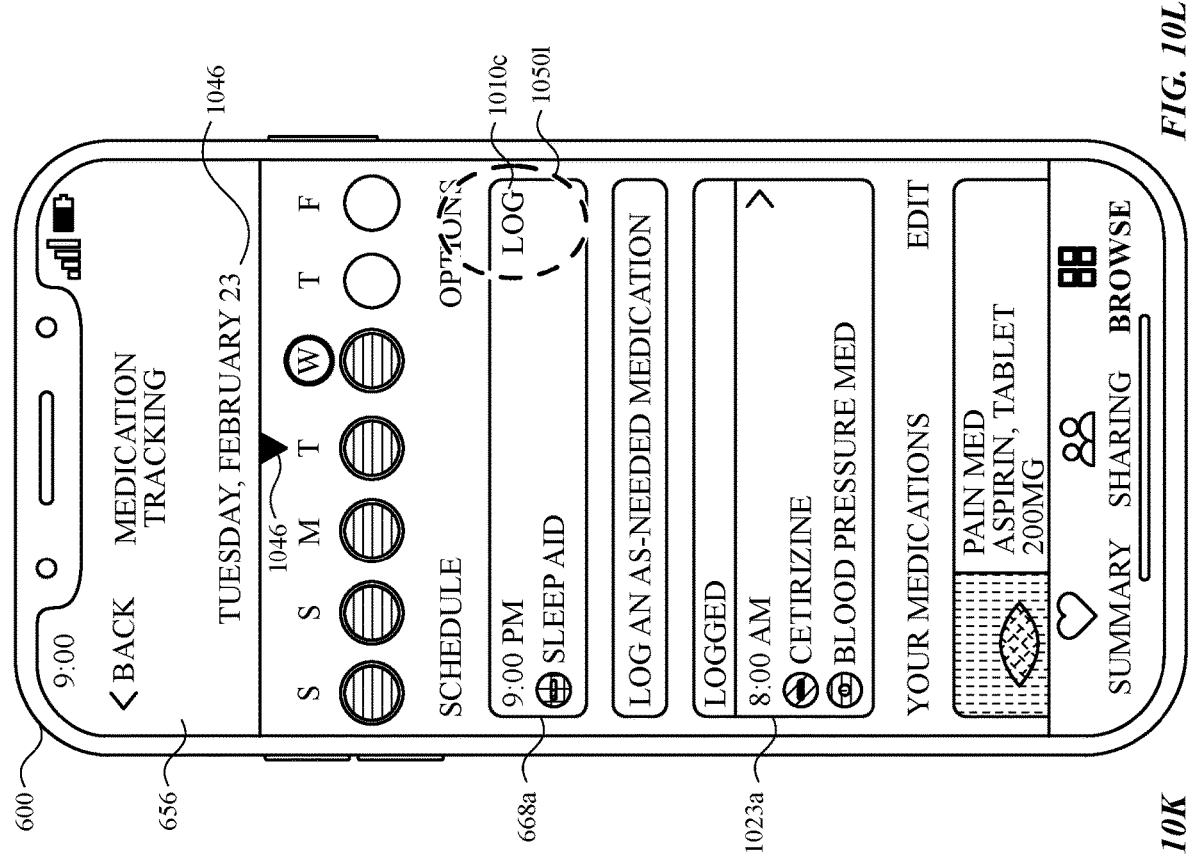

At FIG. 10K, device 600 updates tracking interface 656 to include logged medication tile 1023c, indicating that melatonin was logged and was taken at 9:00 PM. Additionally, because melatonin was the last scheduled medication for the day, tracking interface 656 is updated to include completion indicator 1041 that all scheduled medications have been logged.

At FIG. 10K, tracking interface 656 includes affordances for selecting a particular day to allow a user to view unlogged medications or logged medications. While displaying tracking interface 656, device 600 detects input 1050k (e.g., tap and/or mouse click) directed at Tuesday affordance 1044. In response to detecting input 1050*k*, device 600 displays tracking interface 656 for Tuesday, as depicted in FIG. 10L.

Figure 10L:
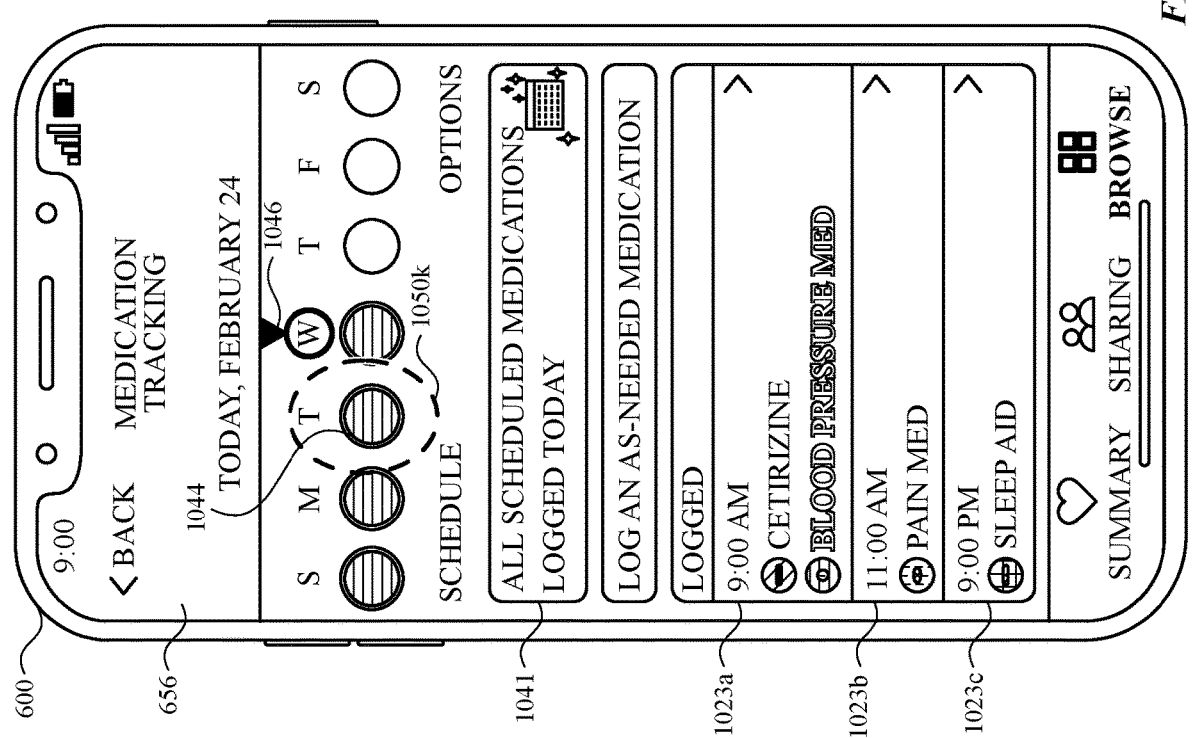
Figure 10N:
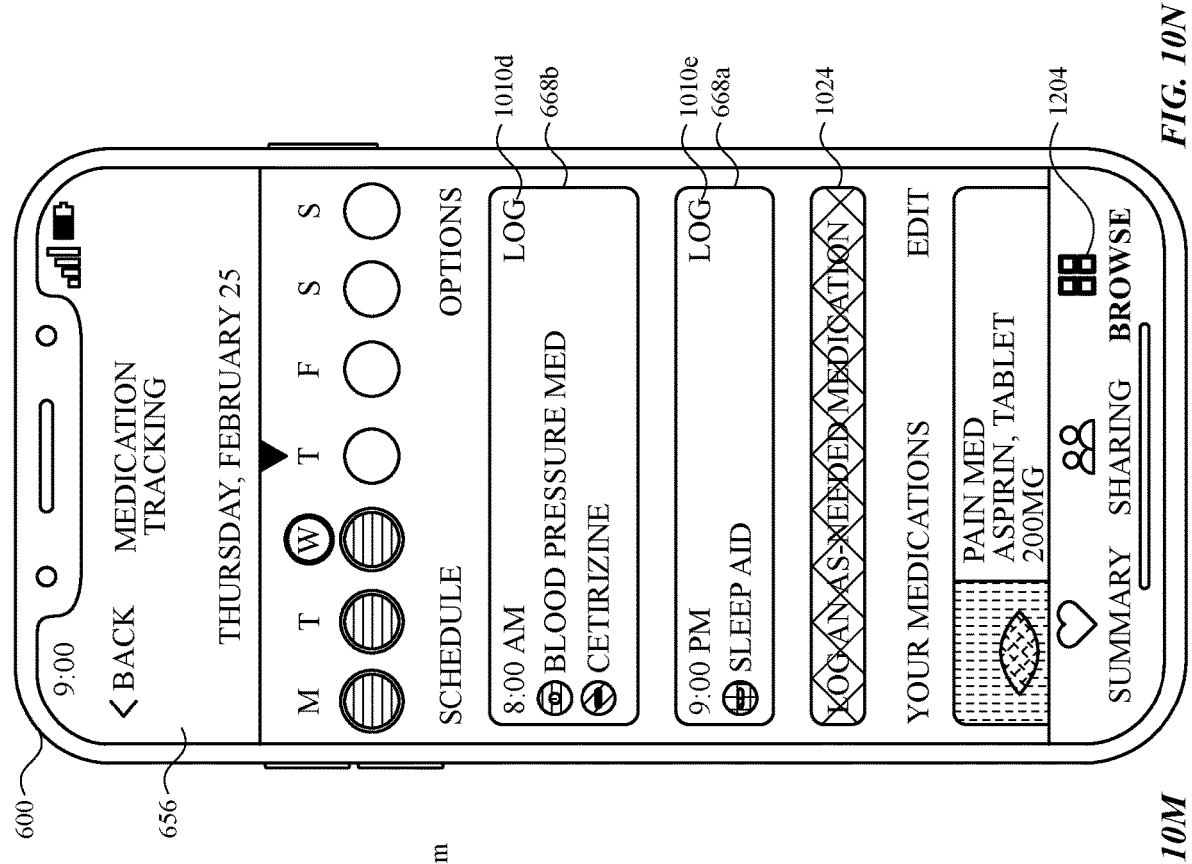

At FIG. 10L, tracking interface 656 for Tuesday includes currently selected day indicator 1046 indicating that tracking interface 656 is for Tuesday. As illustrated, tracking interface 656 includes scheduled medication tile 668*a* and logged medication tile 1023, similar to scheduled medication tile 668*a* and logged medication tile 1023 of FIG. 10F but having different states. While displaying tracking interface 656, device 600 detects input 10501 (e.g., tap and/or mouse click) directed at log affordance 1010*c*. In response to detecting input 10501, device 600 displays a logging interface similar to logging interface 1002, as depicted in FIG. 10B.

Figure 10M:
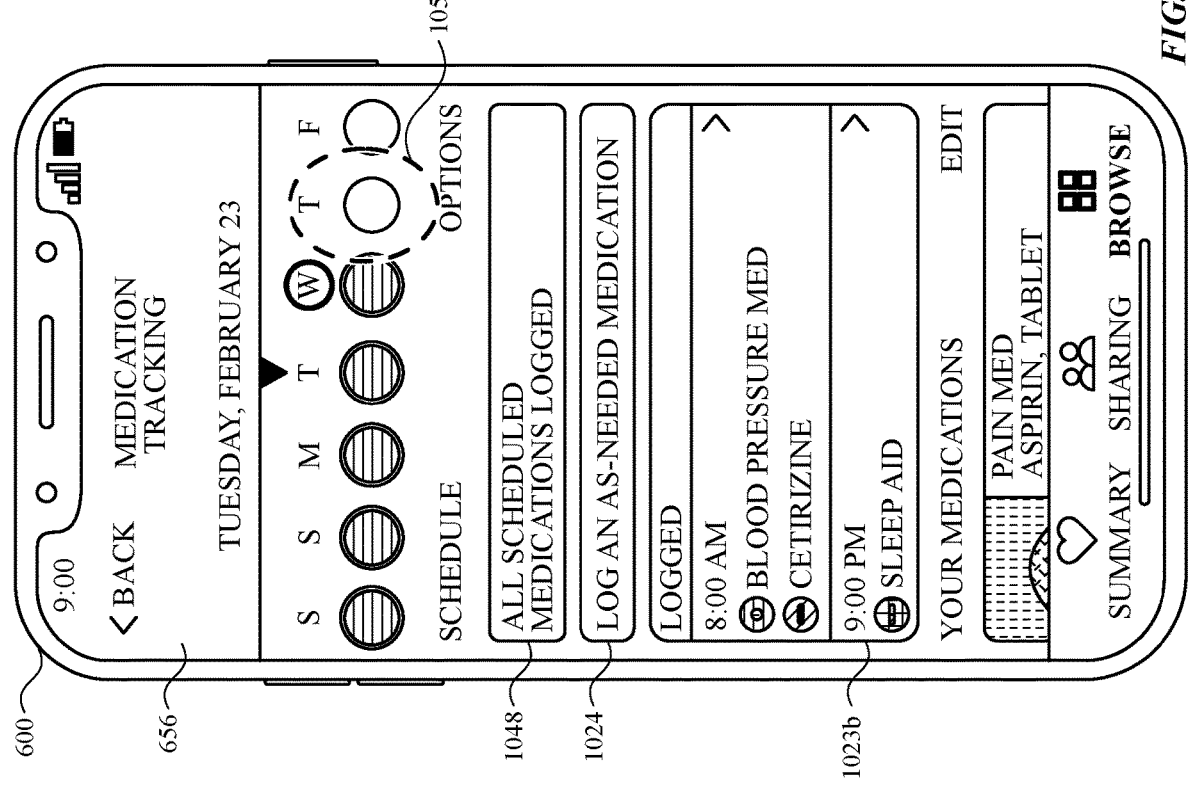

At FIG. 10M, in response to logging melatonin, device 600 updates tracking interface 656 to include logged tile 1023*b*, similar to logged tile 1023*b* of FIG. 10H but having a different state. Tracking interface 656 for Tuesday also includes completion indicator 1048 to indicate all medications are logged for a day other than the current day, where all medications logged indicator 1048 has a different appearance than completion indicator 1041. While displaying tracking interface 656 for Tuesday, device 600 detects input 1050*m* (e.g., tap and/or mouse click) directed at Thursday. In response to detecting input 1050*m*, device 600 displays tracking interface 656 for Thursday, as depicted in FIG. 10N.

At FIG. 10N, tracking interface 656 for Thursday includes schedule medication tiles 668*a-b*, which includes log affordances 1010*d* and 1010*e*. Tracking interface 656 also includes log as-needed medication affordance 1024. Tracking interface 656 prohibits logging future scheduled medication events (e.g., by disabling log affordances). Because the current day is Wednesday, device 600 does not log a medication in response to ducting a request to log a medication in the schedule medication tiles 668*a-b* and a medication under log as-needed medication affordance 1024. As illustrated, log as-needed medication affordance 1024 has a different appearance in FIG. 10N as compared to log as-needed medication affordance 1024 of FIGS. 10F and 10M, which indicates log as-needed medication affordance 1024 of FIG. 10N is disabled. Log affordances 1010*d* and 1010*e* are also disabled. In some embodiments, log affordances 1010*d* and 1010*e* have a different appearance in tracking interface 656 for Thursday to indicate that they are disabled (e.g., different from logging affordances 1010*a*-1010*c*). In some embodiments, log affordances are not displayed in tracking interfaces for future days.

FIG. 11 is a flow diagram illustrating a method for managing logging actions in accordance with some embodiments. Method 1100 is performed at a computer system (e.g., 100, 300, 500, 600, and/or 1400) (e.g., a smartwatch, a smartphone, a tablet, and/or a laptop computer) that is in communication with a display generation component (e.g., 601 and/or 1401) (e.g., a display controller, a touch-sensitive display system, and/or a monitor) and one or more input devices (e.g., 601 and/or 1401) (e.g., a touch-sensitive surface, a keyboard, a controller, a rotatable input device, microphone, and/or a mouse). Some operations in method 1100 are, optionally, combined, the orders of some operations are, optionally, changed, and some operations are, optionally, omitted.

As described below, method 1100 provides an intuitive way for managing logging actions. The method reduces the cognitive burden on a user to manage log actions, thereby creating a more efficient human-machine interface. For battery-operated computing devices, enabling a user to manage logged actions faster and more efficiently conserves power and increases the time between battery charges.

The computer system displays (1102), via the display generation component, a first user interface (e.g., 656 of FIG. 10A) (e.g., of a medication tracking application (e.g., an application that includes a schedule for taking one or more medications and/or an application that notifies a user when a medication is scheduled to be taken)). In some embodiments, displaying (1104) the first user interface includes displaying, in a first portion of the first user interface (e.g., 668*a*-668*b*) (e.g., a scheduled medication portion of the user interface and/or an area of the user interface that includes one or more scheduled medications; in some embodiments, the first portion is closer to indication of the date/and the day of the week than the second portion), a representation (e.g., 648*a* in FIG. 6W and/or as 668*a*-668*b* depicted in FIG. 10A) (e.g., text, such as a medication name, and/or an image, such as an icon of the medication) of a respective medication that is scheduled (e.g., as depicted in FIG. 10A) (e.g., via the medication tracking application) to be taken (e.g., consumed and/or applied) at a scheduled time (e.g., as depicted in FIG. 10A) (e.g., a specific time, a time range, and/or a portion of the day (e.g., morning, evening)).

The computer system detects (1106) a first set of one or more inputs (e.g., 1050*a*, 1050*b*1, 1050*b*2, 1050*c*, and/or 1050*e*) (e.g., a tap, a swipe, a mouse click, a speech input, and/or a key press) corresponding to a request to log an action associated with the respective medication (e.g., log a medication as "taken" or logged as "skipped") that includes at least one detected input while displaying the first user interface.

In response to detecting the first set of one or more inputs corresponding to the request to log an action associated with the respective medication, the computer system moves (1108) (e.g., ceasing to display the medication in the first portion and displaying it in the second portion) the representation of the respective medication from the first portion of the first user interface to a second portion of the first user interface (e.g., 1023*a* and/or 1023*b*) (e.g., a logged medication portion) different from the first portion (in some embodiments, the second portion does not overlap the first portion; in some embodiments, the second portion and the first portion are separated by a distinct third portion). In some embodiments, in response to detecting the set of one or more inputs corresponding to the request to log the action associated with the respective medication, the computer system moves at least one other one or more graphical elements of the first user interface (e.g., one or more other scheduled medications, one or more other logged medications, an option for logging an as-needed medication, and/or one or more active medications). In some embodiments, in response to detecting the set of one or more inputs corresponding to the request to log the action associated with the respective medication, the computer system displays an indication that the respective medication is logged. In some embodiments, moving the respective medication from the first portion of the first user interface to the second portion of the first user interface includes shifting (e.g., rearranging and/or modifying) a position (e.g., location and/or order) of the respective medication relative to a position of at least one other one or more other graphical elements of the first user interface (e.g., one or more other scheduled medications, one or more other logged medications, an option for logging an as-needed medication, and/or one or more active medications). In some embodiments, the first portion of the first user interface includes a second that is scheduled to be taken. In some embodiments, in response to detecting the set of one or more inputs corresponding to the request to log the action associated with the respective medication, the computer system maintains display of the second medication in the first portion of the first user interface (e.g., the scheduled portion of the first user interface) (and/or forgoes moving the second medication to the second portion). In some embodiments, moving the respective medication from the first portion of the first user interface to the second portion of the first user interface includes modifying (increasing and/or decreasing) a distance between the respective medication and at least one other one or more graphical elements of the first user interface (e.g., one or more other scheduled medications, one or more other logged medications, an option for logging an as-needed medication, and/or one or more active medications). Moving a representation of a medication in response to a request to log an action associated with the medication allows the computer system to provide feedback to a user that an action has been logged for the medication, thereby providing improved visual feedback to the user, reducing the number of inputs needed to perform an operation, and performing an operation when a set of conditions has been met without requiring further user input.

In some embodiments, the first user interface includes a second scheduled medication (e.g., 668a in FIG. 10C). In some embodiments, moving the respective medication includes modifying a position (e.g., a location and/or order) of the respective medication with respect to the second scheduled medication (e.g., 668a in FIGS. 10C and 10F). In some embodiments, prior to moving, the respective medication is positioned above the second scheduled medication. In some embodiments, after moving, the respective medication is positioned below the second scheduled medication.

In some embodiments, the first portion of the user interface includes a third scheduled medication (e.g., 668a in FIG. 10C) and the second portion of the user interface is a portion corresponding to logged medications (e.g., 1023a-1023b in FIGS. 10C and 10F). In some embodiments, in response to detecting the first set of one or more inputs corresponding to the request to log the action associated with the respective medication, shifting the position of the third scheduled medication in the first portion of the user interface (e.g., moving it in a first direction (e.g., 1023a-1023b in FIGS. 10C and 10F) (e.g., up and/or down)). In some embodiments, the third scheduled medication is moved up in (e.g., closer to the top of) the first user interface. In some embodiments, prior to moving, the respective medication has a first distance from the top of the first user interface. In some embodiments, after moving, the respective medication has a second distance from the top of the first user interface, the first distance different from (e.g., greater or lesser than) the first distance.

In some embodiments, in response to detecting the first set of one or more inputs corresponding to the request to log the action associated with the respective medication and in accordance with a determination that there are no more scheduled medications (e.g., scheduled to be taken; to be logged) (e.g., all scheduled medications are logged in 656 of FIG. 10K), the computer system replaces the representation of the respective medication in the first portion of the first user interface with an indication that there are no more scheduled medications (e.g., 1041). In some embodiments, in response to detecting the first set of one or more inputs corresponding to the request to log the action associated with the respective medication and in accordance with a determination that there is another (e.g., at least one other) scheduled medication (e.g., sleep aid is still scheduled to logged in 656 of FIG. 10H), forgoing displaying the indication that there are no more scheduled medications. Replacing a medication in a first portion of a user interface with an indication that there are no more scheduled medications allows a computer system to notify a user of a state of a medication tracking application, thereby providing improved visual feedback to the user, reducing the number of inputs needed to perform an operation, and performing an operation when a set of conditions has been met without requiring further user input. Conditionally displaying an indication that there are no more scheduled medications also allows a computer system to notify a user of a state of a medication tracking application, thereby providing improved visual feedback to the user, reducing the number of inputs needed to perform an operation, and performing an operation when a set of conditions has been met without requiring further user input.

In some embodiments, detecting the first set of one or more inputs includes detecting a first input (e.g., 1050a) corresponding to a selection of an option for initiating a logging action for both a fourth scheduled medication (e.g., 668b of FIG. 10A) and the respective medication (e.g., 668b of FIG. 10A). In some embodiments, in response to detecting the input corresponding to the selection of the option for initiating the logging action for both the fourth scheduled medication and the respective medication, the computer system displays a second user interface (e.g., 1002). In some embodiments, the second user interface includes one or more first logging options (e.g., 1006a, 1008a, and/or 1014a) (e.g., one or more user interface objects to record a logging event) for recording a logging action for the fourth scheduled medication. In some embodiments, the second user interface includes one or more second logging options for recording a logging action for the respective medication (e.g., 1006b, 1008b, and/or 1014b). In some embodiments, the second user interface includes a third logging option for recording a logging action for both the fourth scheduled medication and the respective medication (e.g., a logging option for all currently scheduled medications). Displaying a second user interface that includes separate logging options for each of multiple medications and a single logging option for all of the medications allows a user to efficiently log medications, thereby reducing the number of inputs needed to perform an operation and providing additional control options without cluttering the user interface.

In some embodiments, while displaying the second user interface, the computer system detects an input (e.g., 1050C) corresponding to a request to change a time associated with a logged action (e.g., when the respective medication was taken and/or skipped, which may or may not be different from the time the user records the log) for the respective medication. In some embodiments, in response to detecting the input corresponding to the request to change the time associated with the logged action for the respective medication, the computer system displays an option (e.g., 1022) for applying the change in the time associated with the logged action to the fourth scheduled medication (in some embodiments, to all medications that are scheduled for logging and included in the second user interface). Displaying an option for applying a change in a logged time to a fourth medication in response to detecting an input corresponding to a request to change a logged time for a respective medication allows a user to have the choice to efficiently apply changes to multiple medications when changing a time for a particular medication, thereby reducing the number of inputs needed to perform an operation and providing additional control options without cluttering the user interface.

In some embodiments, the one or more first logging options includes an option for modifying a dosage (e.g., 1014a-1014b and/or 1018a-1018b) (e.g., a quantity and/or amount of dosage form (e.g., a shape, formulation (e.g., capsule, suspension, liquid, and/or tablet) taken and/or skipped) of the fourth scheduled medication and an option (e.g., 1014 and/or 1020) for modifying a time associated with a logged action for the fourth scheduled medication. In some embodiments, the one or more second logging options includes an option (e.g., 1014a-1014b) for modifying a dosage of the respective medication and an option for modifying a time associated with a logged action for the respective medication. In some embodiments, the computer system detects an input corresponding to a selection of the third logging option. In some embodiments, in response to detecting the input corresponding to the selection of the third logging option, the computer system displays a respective log option for the fourth medication and the respective medication (e.g., log all as taken and/or log all as skipped) that causes the respective log option to be selected for both the fourth medication and the respective medication (e.g., selecting log all as taken automatically selects taken for each medication and/or selecting log all as skipped automatically selects skipped for each medication). Separately displaying logging options for modifying a dosage and a logged time for different medications allows a computer system to provide a user individualized customizability for logging with respect to the different medications, thereby providing improved visual feedback to the user, reducing the number of inputs needed to perform an operation, and providing additional control options without cluttering the user interface.

In some embodiments, detecting the first set of one or more inputs includes detecting a second input (e.g., 1050c). In some embodiments, in response to detecting the second input, the computer system displays an option (e.g., 1014a-1014b in FIG. 10C and/or 1020 in FIG. 10D) to modify a time associated with a logged action for the respective medication (e.g., a time that the user designated as having taken an action (e.g., recorded taken or skipped) with respect to the one or more medications), wherein the option for modifying the time associated with the logged action for the respective medication defaults to a current time (e.g., not a scheduled time). Displaying an option to modify a time associated with a logged action for a medication that defaults to a current time allows a computer system to intelligently suggest modifications based on a current context, thereby providing improved visual feedback to the user, reducing the number of inputs needed to perform an operation, providing additional control options without cluttering the user interface with additional displayed controls, and performing an operation when a set of conditions has been met without requiring further user input.

In some embodiments, in response to detecting the second input, the computer system displays an option to modify a dosage (e.g., 1014a and/or 1018) (e.g., a quantity and/or amount of dosage form (e.g., a shape, formulation (e.g., capsule, suspension, liquid, and/or tablet) taken and/or skipped) for the respective medication, wherein the option to modify the dosage for the respective medication defaults to a scheduled dosage (e.g., 640e). Displaying an option to modify a dosage for a medication that defaults to a scheduled dosage allows a computer system to intelligently suggest modifications based on a current context, thereby providing improved visual feedback to the user, reducing the number of inputs needed to perform an operation, providing additional control options without cluttering the user interface with additional displayed controls, and performing an operation when a set of conditions has been met without requiring further user input.

In some embodiments, in accordance with a determination that the respective medication corresponds to a first time associated with a logged action, the computer system displays the representation of the respective medication in the second portion with an indication of the first time (e.g., 1023a-1023b in FIG. 10H) (e.g., a time that the user designated as having taken an action (e.g., recorded taken or skipped) with respect to the respective medication). In some embodiments, in accordance with a determination that a medication different from the respective medication corresponds to a second time associated with a logged action, wherein the first time is different from the second time, the computer system displays a representation of the medication in the second portion with an indication of the second time (e.g., 1023a-1023b in FIG. 10H). In some embodiments, the first time is the same as or different from a time in which the respective medication was scheduled to be taken. In some embodiments, the second time is the same as or different from a time in which the medication different from the scheduled medication was scheduled to be taken. Conditionally displaying different medications with an indication of a time associated with a logged action improves a computer system by providing visual feedback to the user that the medications are in fact logged and a time in which the medication was logged, thereby providing improved visual feedback to the user and performing an operation when a set of conditions has been met without requiring further user input.

In some embodiments, the computer system displays the representation of the respective medication in the second portion with an option (e.g., 1026 of FIG. 10F) to modify logged action (e.g., a time that the one or more medications were taken and/or skipped; and/or a type of log (e.g., taken or skipped)). In some embodiments, the option is displayed for a group of logged medications that are grouped according to a time in which they were logged (which can be the same and/or different than how the logged medications were grouped prior to being logged). After moving a medication to a second portion (e.g., a logged portion), displaying a representation of the medication with an option to modify logged option allows a computer system to provide a user the ability to modify a logging action, thereby providing improved visual feedback to the user, reducing the number of inputs needed to perform an operation, and providing additional control options without cluttering the user interface.

In some embodiments, the computer system detects an input (e.g., 10501) corresponding to a selection of the option to modify the logged. In some embodiments, in response to detecting the input, the computer system displays an option for modifying a logged time for respective medication.

In some embodiments, the computer system displays, in the first user interface, an option (e.g., 1024) for displaying a set of medications (e.g., a set of medications that are active (e.g., not disabled and/or not archived) and/or a set of medications that are being tracked by the tracking application). In some embodiments, in response to detecting an input (e.g., 1050f1) corresponding to a selection of the option for displaying a set of medications, the computer system displays an option (e.g., 1006c, 1008c, and/or 1014c) for logging an unscheduled medication (e.g., an "as-needed"

medication and/or a medication that is not saved with a schedule). In some embodiments, in response to detecting an input corresponding to a selection of the option for displaying a set of medications, the computer system displays an option for logging a scheduled medication (e.g., 1006d, 1008d, and/or 1014d) (e.g., a medication that is saved with and/or associated with a schedule). Displaying, with a user interface including a schedule of medications, an option for displaying a set of medications to log both unscheduled and scheduled medications allows a user access to logging medications that are not currently scheduled, thereby reducing the number of inputs needed to perform an operation and providing additional control options without cluttering the user interface with additional displayed controls.

In some embodiments, in accordance with a determination that all scheduled medications (e.g., there are no more medications scheduled) for a first time range (e.g., as depicted in FIG. 10K) (e.g., the current day and/or a period of the current day, a plurality of days, one or more minutes, and/or one or more hours) are logged, the computer system displays (e.g., in the first user interface), a first indication (e.g., 1041) that all the scheduled medications are logged (e.g., that there are no more medications scheduled). In some embodiments, in accordance with a determination that all scheduled medications (e.g., there are no more medications scheduled) for a second time range (e.g., as depicted in FIG. 10M) (e.g., a previous day and/or a period of the current day, a plurality of days, one or more minutes, and/or one or more hours) are logged, the computer system displays a second indication (e.g., 1048) different from the first indication. In some embodiments, a user can log a scheduled medication for previous day and cannot log a future scheduled medication (e.g., a medication scheduled the next day or scheduled later than the current time). In some embodiments, scheduled medications for a time range (e.g., a particular day or 24 hour period) are cleared (e.g., at midnight). In some embodiments, a user cannot log medications for previous day. In some embodiments, a user cannot view a previous day's logged medication. In some embodiments, a user cannot view a next day's scheduled medication. Displaying different indications depending on whether all scheduled medications are logged for a first range or a second range allows the computer system to differentiate between states of a medication logging application with respect to different ranges of logged medications, thereby providing improved visual feedback to the user, reducing the number of inputs needed to perform an operation, and performing an operation when a set of conditions has been met without requiring further user input.

In some embodiments, the first user interface includes a first time period option (e.g., 1032 and/or 1044) (in some embodiments, a selectable graphical object) that corresponds to a first time period (e.g., as depicted in FIGS. 10A and 10K) (e.g., a portion of a day, a day, a week) and that, when selected, causes display of a user interface (e.g., 656 in FIG. 10K) for logging one or more medication logging actions (e.g., logging actions corresponding to multiple medications and/or multiple logging actions for a single medication) scheduled to be logged during the first time period. In some embodiments, in accordance with a determination that a first set of one or more medication logging criteria have been met, wherein the first set of one or more medication logging criteria includes a criterion that is met when at least one medication logging action scheduled to be logged during the first time period has been logged (e.g., 1032 in FIG. 10F), the first time period option has a first appearance (e.g., 1032 as depicted in FIG. 10F). In some embodiments, in accordance with a determination that the first set of one or more medication logging criteria have not been met (in some embodiments, the set of one or more medication logging criteria are not met when no medication logging actions scheduled to be logged during the first time period have been logged), the first time period option has a second appearance different from the first appearance (e.g., 1032 as depicted in FIG. 10F) (e.g., an appearance that corresponds to when no medication logging actions have been logged or an insufficient number of medication logging actions have been logged). Displaying a time period option to navigate between days, the time period option with difference appearances based on a set of one or more medication logging criteria, allows the computer system to have a single user interface element to both present a state of a medication logging application and allow navigation, thereby providing improved visual feedback to the user, providing additional control options without cluttering the user interface with additional displayed controls, and performing an operation when a set of conditions has been met without requiring further user input.

In some embodiments, the first set of one or more medication logging criteria includes a criterion that is met when not more than one medication has corresponding logging actions for the first period of time (e.g., only cetirizine is logged in 656 of FIG. 10F) (e.g., only one medication (e.g., type of medication) has been logged in the first time period (e.g., a single logging action for the one medication or multiple logging actions for the one medication). In some embodiments, in accordance with a determination that a third set of one or more medication logging criteria have been met, wherein the third set of one or more medication logging criteria includes a criterion that is met when a plurality of different medications (e.g., cetirizine and blood pressure med are logged in 656 of FIG. 10F) have corresponding logging actions for the first period of time (e.g., more than one medication (e.g., type of medication) has been logged in the first time period), the first time period option has a third appearance (e.g., as described in reference to FIG. 10F) different from the first appearance and the second appearance. Causing the time period option to have a particular appearance depending on whether logging a single medication or multiple allows for a user to quickly understand a state of a medication logging application, thereby providing improved visual feedback to the user and performing an operation when a set of conditions has been met without requiring further user input.

In some embodiments, the first set of one or more medication logging criteria includes a criterion that is met when less than all medication logging actions scheduled to be logged during the first time period have been logged. In some embodiments, in accordance with a determination that a fourth set of one or more medication logging criteria have been met, wherein the fourth set of one or more medication logging criteria includes a criterion that is met when all medication logging actions scheduled to be logged during the first time period have been logged, the first time period option has a fourth appearance different from the first appearance and the second appearance (e.g., as described in reference to FIG. 10F). Causing the time period option to have different appearances based on a status of logging medications for a day, such as nothing has been logged, some have been logged, or all have been logged, allows a user to quickly understand a state of a medication logging application, thereby providing improved visual feedback to the user and performing an operation when a set of conditions has been met without requiring further user input.

In some embodiments, the first set of one or more medication logging criteria includes a criterion that is met when a medication logging action for a first medication (e.g., cetirizine in FIG. 10F) scheduled to be logged during the first time period has been logged. In some embodiments, in accordance with a determination that a fifth set of one or more medication logging criteria have been met, wherein the fifth set of one or more medication logging criteria includes a criterion that is met when a medication logging action for a second medication (e.g., blood pressure med in FIG. 10F) scheduled to be logged during the first time period has been logged, wherein the second medication is different from the first medication, the first time period option has a fifth appearance different from the first appearance and the second appearance (e.g., as described in reference to FIG. 10F). Having different appearances for the first time period option depending on which medication needs to be logged allows a user to quickly understand a state of a medication logging application, thereby providing improved visual feedback to the user and performing an operation when a set of conditions has been met without requiring further user input.

In some embodiments, the representation of the respective medication is displayed in the second portion with a respective appearance. In some embodiments, in accordance with a determination that the respective medication is associated with a first type of logged action (e.g., taken and/or consumed), the respective appearance is a sixth appearance (e.g., cetirizine is logged as taken in FIG. 10F). In some embodiments, in accordance with a determination that the second medication is associated with a second type of logged action (e.g., blood pressure med in FIG. 10F) (e.g., skipped and/or postponed), the respective appearance includes a seventh appearance different from the sixth appearance (e.g., as described in FIG. 10F). Displaying a medication with a different appearance based on a type of logged action performed for the medication allows a user to quickly understand a state of a medication logging application, thereby providing improved visual feedback to the user and performing an operation when a set of conditions has been met without requiring further user input.

In some embodiments, while the representation of the respective medication is displayed in the first portion of the first user interface, the computer system displays, in a third portion of the first user interface (e.g., 670a-670e in FIG. 6X) (e.g., an active medication area, an area for actively tracked medications, an area for currently enabled medications), an indication that the respective medication is an actively tracked medication (e.g., 670a-670e in FIG. 6X) (e.g., actively tracked medication and/or currently enabled medication). In some embodiments, the third portion is positioned below the first portion of the first user interface and/or the second portion of the first user interface. Displaying a medication in both the first portion (e.g., a scheduled portion) and a third portion (e.g., an active medication portion) allows a user to navigate to different portions of a user interface to find different types of information, thereby providing improved visual feedback to the user, reducing the number of inputs needed to perform an operation, and performing an operation when a set of conditions has been met without requiring further user input.

In some embodiments, while displaying the first user interface, the computer system detects an input (e.g., 650aa) (e.g., selecting an affordance displayed in the user interface; a speech input; and/or selecting a user interface object in the third portion of the user interface) corresponding to a request to initiate deactivation of one or more active medications (e.g., actively tracked medications and/or currently enabled medications). In some embodiments, in response to detecting the input corresponding to the request to initiate deactivation of one or more active medications, the computer system displays a fourth user interface (e.g., 682). In some embodiments, the fourth user interface includes an active medication (e.g., 683a) (e.g., a plurality of active medications) (e.g., actively tracked medications and/or currently enabled medications) with an option (e.g., 684a) (e.g., a plurality of options) to deactivate (e.g., disable) the active medication. In some embodiments, the fourth user interface includes a deactivated medication (e.g., a plurality of deactivated medications) (e.g., archived medications and/or disabled medications) with an option (e.g., a plurality of options) to activate (e.g., enable) the deactivated medication. While displaying a first user interface with a schedule of medications to log, providing an option to request to initiate deactivation of one or more active medications allows the computer system to efficiently allow a user to control active medications for a medication logging application, thereby reducing the number of inputs needed to perform an operation. Displaying a fourth user interface that includes an option to deactivate an active medication and an option to activate a deactivated medication allow a user to control active and deactivated medications for a medication logging application, thereby reducing the number of inputs needed to perform an operation and providing additional control options without cluttering the user interface with additional displayed controls.

In some embodiments, the computer system displays, in the first user interface, an indication that no medications are logged (e.g., 1428 optionally indicates no medications are logged) (e.g., for a time range and/or period of time). In some embodiments, in response to detecting the first set of one or more inputs corresponding to the request to log an action associated with the respective medication, the computer system ceases to display the indication that no medications are logged (e.g., 1428 no longer indicates that no medications are logged). Differentiating between whether any medications were logged in a day or at least one was logged allows a user to quickly understand a state of a medication logging application, thereby providing improved visual feedback to the user and performing an operation when a set of conditions has been met without requiring further user input.

In some embodiments, after moving the representation of the respective medication and in accordance with a determination that a predetermined period of time has elapsed (e.g., 5 minutes, 10 minutes, 1 hour, and/or 2 hours) (e.g., since receiving the first set of one or more inputs), the computer system ceases display of the respective medication in the second portion of the first user interface (e.g., device 1400 ceases to display 1424a and/or 1424b and/or device 600 ceases to display 1023a-1023c) (e.g., the respective medication is not displayed in the first portion and the second portion of the user interface). In some embodiments, all logged medications for a range of time (e.g., a day and/or a period during the day) are ceased to be displayed. Only displaying a medication in the second portion (e.g., a logged portion) for a predetermined period of time allows the computer system to reduce clutter of the user interface while providing information of a state of a medication logging application, thereby providing improved visual feedback to the user, reducing the number of inputs needed to perform an operation, providing additional control options without cluttering the user interface with additional displayed controls, and performing an operation when a set of conditions has been met without requiring further user input.

In some embodiments, after ceasing display of the respective medication in the second portion of the user interface and in accordance with a determination that all scheduled medications for a particular time period (e.g., scheduled medications for a 24-hour period and/or scheduled medications for a 12-hour period) have been logged, the computer system displays an indication that all medications are logged (e.g., as depicted in 14J) (e.g., no more medications are scheduled and/or no more action is needed from the user to log a medication during the particular time period). In some embodiments, after ceasing display of the respective medication in the second portion of the user interface and in accordance with a determination that all scheduled medications for the particular time period have not been logged, forgoing displaying of the indication that all medications are logged.

In some embodiments, the first set of one or more inputs corresponding to the request to log the action associated with the respective medication includes at least one speech input (e.g., an utterance corresponding to a request to the request to log the action associated with the respective medication) (e.g., "Assistant, log a medication, "Assistant, log 500 mg of aspirin as taken," and/or "Assistant, I took 500 mg of aspirin at 9:00 AM today"). In some embodiments, the at least one speech input includes an utterance of a respective logging action (e.g., log a medication, and/or log a medication as taken or skipped). In some embodiments, the at least one speech input includes an utterance of a respective medication (e.g., "log blood pressure medication," log cetirizine," and/or "log sleep aid.") In some embodiments, the at least one speech input includes an utterance of a time (e.g., time of day, day, and/or date) associated with the logged action (e.g., "8:09 AM" and/or "today"). In some embodiments, the at least one speech input includes an utterance of a medication form (e.g., "1 tablet" and/or "oral suspension") (and/or a medicinal strength (e.g., 50 mg (e.g., for a capsule medication form) and/or 250 mg/5 mL (e.g., for a suspension medication form))). Moving a representation of a medication in response to a speech input to log an action associated with the medication improves the computer system by providing feedback to a user that an action has been logged for the medication, providing additional control options without cluttering the user interface with additional displayed controls, reducing the number of inputs needed to perform an operation, and performing an operation when a set of conditions has been met without requiring further user input.

In some embodiments, the computer system displays, via the display generation component, a second user interface (e.g., the same as or different from the first user interface) (in some embodiments, the second user interface is a user interface different from a user interface of the medication tracking application (e.g., the second user interface is a home screen and/or a user interface of an application different from the medication tracking application)). In some embodiments, the second user interface is displayed before or after displaying the first user interface (e.g., the user is logging a medication on a different day or different scheduled time than the scheduled time) (in some embodiments, the second user interface is displayed before or after moving the representation of the respective medication from the first portion of the first user interface to the second portion of the first user interface different from the first portion). In some embodiments, the computer system detects, via the one or more input devices, a second set of one or more inputs (e.g., a tap, a swipe, a mouse click, a speech input, and/or a key press) corresponding to a request to log an action associated with a second respective medication (e.g., log a medication as "taken" or logged as "skipped") (e.g., the same or different as the respective medication) that includes at least one detected speech input while displaying the second user interface (e.g., the user utters a request to log a medication). In response to detecting the second set of one or more inputs, the computer system logs the action associated with a second respective medication (e.g., the medication is logged as being "taken" or logged as being "skipped"). In some embodiments, after (or, in response to) logging the action associated with a second respective medication (and/or after detecting the second set of one or more inputs corresponding to the request to log the action associated with the second respective medication), the computer system displays, via the display generation component, the representation of the second respective medication in the second portion of the first user interface (e.g., a logged medication portion of a medication tracking application) (e.g., while not display the second respective medication in the first portion). In some embodiments, the computer system displays the representation second respective medication in the first portion before detecting the second set of one or more inputs. In some embodiments, the computer system detects an input corresponding to a request to display the first user interface (e.g., the user displays the medication tracking application be) before (or after) the second set of one or more inputs are detected. In some embodiments, the computer system detects an input corresponding to a request to display the first user interface prior to displaying the representation of the second respective medication in the second portion of the first user interface (e.g., the user opens the medication tracking application to see what medications have been logged). Logging the action associated with a second respective medication in response to the second set of one or more inputs to log an action associated with the second medication, where the second set of one or more inputs includes at least one detected speech input while displaying the second user interface, improves the computer system by providing feedback to a user that an action has been logged for the medication and providing additional control options without cluttering the user interface with additional displayed controls.

Note that details of the processes described above with respect to method 1100 (e.g., FIG. 11) are also applicable in an analogous manner to the methods described below/above. For example, the process of controlling how medications are logged in method 1100 optionally occurs before and/or after methods 700, 800, 900, 1300, and 1500. As another example, the user inputs and user interfaces described in methods 700, 800, 900, 1300, and/or 1500 optionally assist in logging medications and/or control when medications are scheduled to be logged. Additionally, method 1300 displays indications of logged actions (and/or the absence thereof) depending on the user inputs received in method 1100. For brevity, these details are not repeated below.

FIGS. 12A-12E illustrate exemplary user interfaces for a summary of logs for a medication, in accordance with some embodiments. The user interfaces in these figures are used to illustrate the processes described below, including the processes in FIG. 13.

Figure 12A:
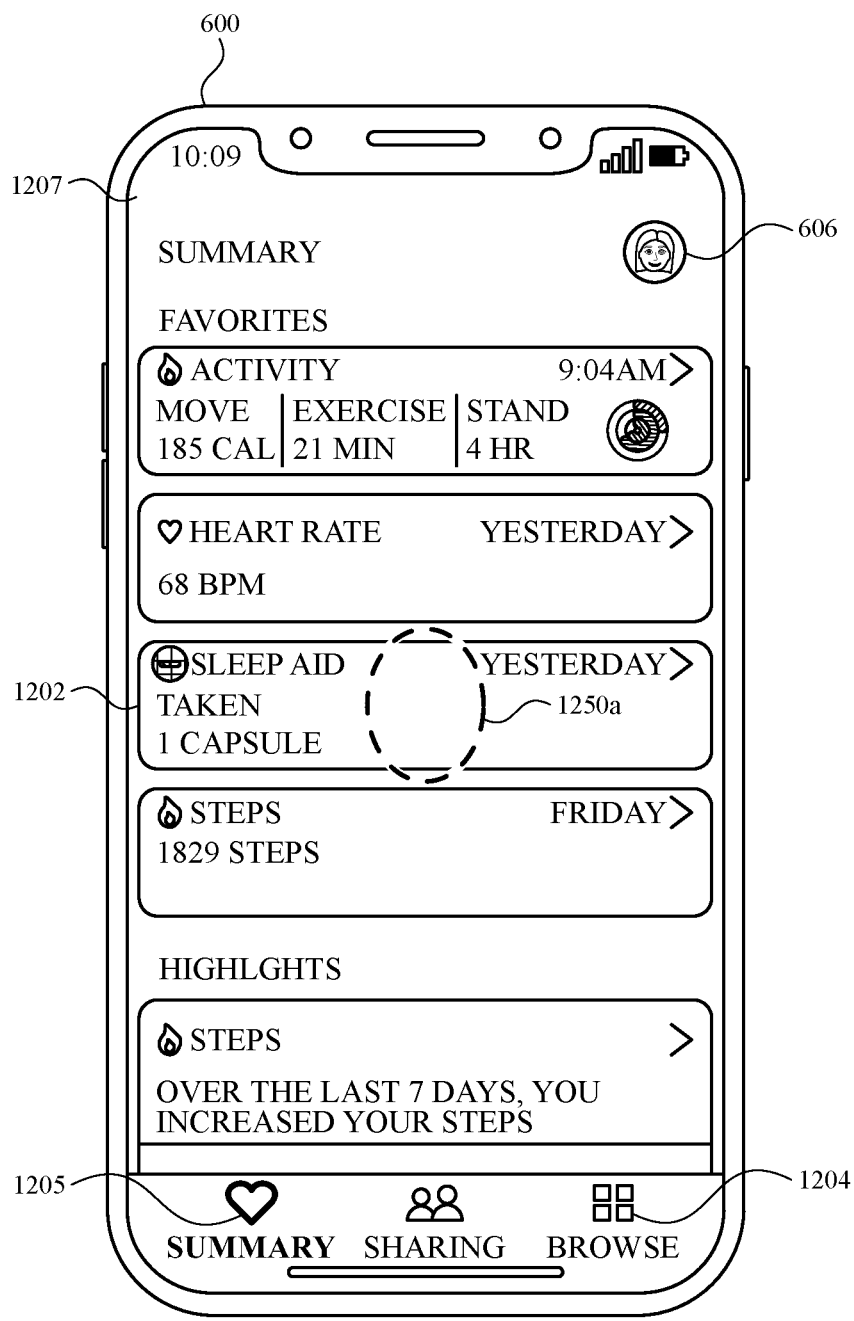
FIGS. 12A-12E illustrate exemplary user interfaces for displaying a summary of tracked medications, in accordance with some embodiments.

At FIG. 12A, device 600 displays health summary interface 1207 including a summary of a user's health-related activity (e.g., the user that is logged into the health application and associated with profile icon 606) tracked by the health application. Health summary interface 1207 includes sleep aid logged tile 1202 among other health-related activity tiles, including a tile for steps and a tile for heart rate. The sleep aid associated with sleep aid logged tile 1202 is the same as sleep aid that was configured by the user and/or tracked in tracking interface 656 (e.g., FIG. 6W and FIG. 10A). In some embodiments, device 600 stops displaying tracking user interface 656 under browse tab 1204 in response to detecting an input on summary tab 1205.

Figure 12B:
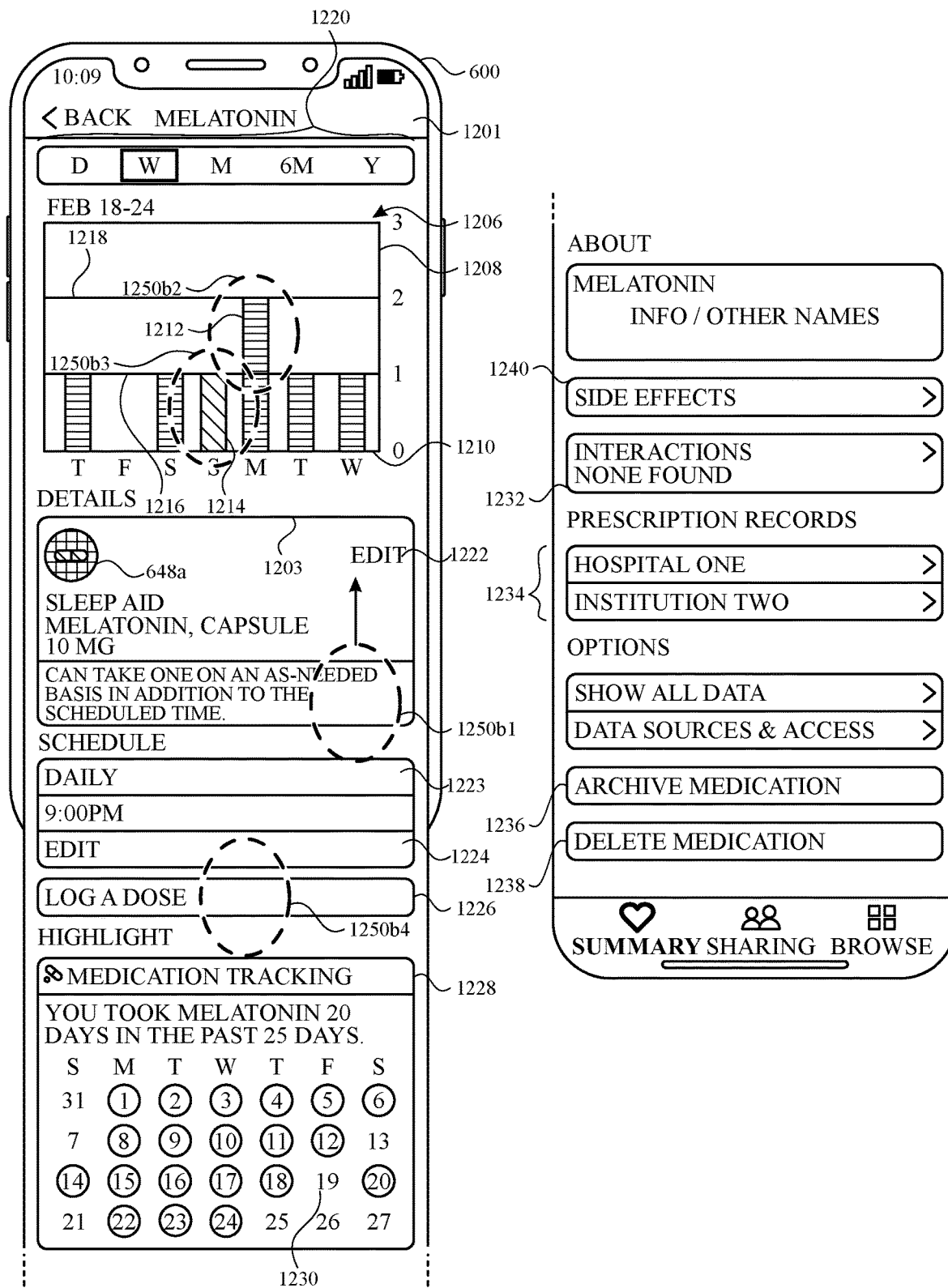

While displaying health summary interface 1207, device 600 detects input 1250*a* (e.g., tap and/or mouse click) directed at sleep aid logged tile 1202. In response to detecting input 1250*a*, device 600 displays medication summary interface 1201, as depicted in FIG. 12B. In some embodiments, in response to detecting an input on active medication tile 670*a* for sleep aid, device 600 displays medication summary interface 1201, as depicted in FIG. 12B.

At FIG. 12B, medication summary interface 1201 includes interactive chart 1206 for sleep aid (melatonin). As illustrated, interactive chart 1206 includes logging information for sleep aid only (e.g., and not other medications). Interactive chart 1206 includes days of the week along the x-axis 1210 and a number of logs along y-axis 1208. Interactive chart 1206 further includes horizontal lines 1216, 1218. Horizontal line 1216 indicates a target number of logs. In some embodiments, horizontal line 1218 is not displayed or, optionally, is displayed with a different appearance (e.g., different color and/or style, such as a dashed line) than horizontal line 1216. As such, a user can quickly identify the target number of logs. In some embodiments, the target number of logs corresponds to a dosage amount (e.g., the dosage configured via dosage affordance 640*e* of FIG. 6O). For instance, one log on the y-axis corresponds to logging one capsule. In some embodiments, the target number of logs corresponds to the number of times the medication is scheduled to be taken (and/or, is independent of dosage amount). For instance, one log on the y-axis corresponds to logging whatever dosage (e.g., one capsule, two capsules, and/or three capsules) that is scheduled. In some embodiments, the x-axis can be modified to show a day time frame, a week time frame, a monthly time frame, a six-month time frame, and/or a yearly time frame, for example, via time frame affordances 1220.

At FIG. 12B, interactive chart 1206 includes taken log bar 1212 and skipped log bar 1214. Taken log bar 1212 indicate that device 600 has a record of the user taking the sleep aid (for example, by detecting a selection of taken affordance 1006*a* in FIG. 10B). Skipped log bar 1214 indicate that device 600 has a record of the user skipping the sleep aid (for example, by detecting a selection of skipped affordance 1008*b* in FIG. 10B). As illustrated, taken log bar 1212 and skipped log bar 1214 have a different appearance. This allows a user to quickly identify how sleep aid was logged, without providing further input.

At FIG. 12B, while displaying interactive chart 1206, device 600 detects scrolling input 1250*b*1 (e.g., swipe and/or tap and drag). In response to detecting scrolling input 1250*b*1, device 600 displays interactive calendar 1228. Interactive calendar 1228 includes a month view and an indicator of when sleep aid was logged as taken. For example, an icon for Monday (22nd) includes a circle around the icon, whereas icon 1230 for Friday (19th) does not include a circle around icon 1230. This is because, as illustrated by the two taken log bars 1212 in interactive chart 1206 for Monday, device 600 has a record of two logs for sleep aid being taken on Monday. Additionally, as illustrated by interactive chart 1206 for Friday, device 600 does not have a record of sleep aid being logged as taken on Friday. As such, icon 1230 for Friday does not include a circle around it.

At FIG. 12B, while device 600 has a record that sleep aid was skipped on Sunday, as indicated by skipped log bar 1214 in interactive chart 1206, interactive calendar 1228 does not have an indication around the icon for Sunday (21st). By displaying both interactive chart 1206 and interactive calendar 1228, a user can quickly identify the number and type of logged events stored on device 600 and provide an indication as to the state of the logged data. In some embodiments, this motivates the user to log additional medications for days that device 600 does not have logging data, for example, using logging affordance 1226. In some embodiments, in response to detecting input 1250*b*4 directed at logging affordance 1226, device 600 displays a logging interface for melatonin similar to logging interface 1002 of FIGS. 10B-10E.

At FIG. 12B, medication summary interface 1201 includes affordances to edit some of the aspects of sleep aid. As illustrated, details tile 1203 includes edit affordance 1222 to configure a nickname and notes for sleep aid, which were originally configured in FIGS. 6O-6U. Schedule tile 1223 includes edit affordance 1224 to configure the schedule for sleep aid, which was originally configured using techniques described in FIGS. 6N-6R. In some embodiments, icon 648*a* in details tile 1203 can also be edited, for example, in response to detecting a selection of edit affordance 1224 and displaying a series of user interfaces, similar to icon edit interfaces 604*s-t* of FIGS. 6S-6T. In some embodiments, device 600 does not allow a user to edit some of aspects of sleep aid that were configured (e.g., selected) by the user while adding sleep aid as an active medication. In some embodiments, the clinical name (melatonin), the form (capsule), and strength (10 MG) cannot be edited (e.g., changed). In some embodiments, the clinical name, the form, and strength are initially configured using the techniques of FIGS. 6C-6M.

At FIG. 12B, medication summary interface 1201 includes CHR affordances 1234. CHR affordances 1234 allow a user to access and/or manage CHR data. In some embodiments, CHR affordances 612*a-b* are based on CHR data that is accessible and/or managed via CHR affordances 1234. In some embodiments, CHR affordances 1234 can be associated with CHR data from the same care provider and/or different providers. In some embodiments, in response to detecting an input directed at one of CHR affordances 1234, device 600 displays CHR data for a prescription of a respective medication (e.g., melatonin).

At FIG. 12B, medication summary interface 1201 includes side effects affordance 1240 that, when selected, causes device 600 to display a user interface that allows a user to record a side effect. Medication summary interface 1201 includes drug interaction tile 1232. Drug interaction tile 1232 indicates that there are no risk of a potential drug interaction with other medications and/or interaction factors associated with affordances 652*a-c* of FIG. 6V. In some embodiments, drug interaction tile 1232 includes indications similar to second risk tile 676. In some embodiments, in response to detecting an input directed at drug interaction tile 1232, device 600 displays an interface similar to risk interface 672*b* of FIG. 6Z. In some embodiments, drug interaction tile 1232 includes all the potential drug interactions that are linked to taking sleep aid.

At FIG. 12B, medication summary interface 1201 includes affordances to modify the state of sleep aid. As illustrated, medication summary interface 1201 includes archive affordance 1236 to deactivate sleep aid, as described in further detail with respect to FIG. 6AB. Medication summary interface 1201 includes delete affordance 1238. In some embodiments, in response to detecting an input directed at delete affordance 1238, device 600 will delete sleep aid. In some embodiments, device 600 will delete all the configurations made while adding the medication. Unlike an archived medication, which can be restored to an active medication, a deleted medication cannot be restored unless added again using the techniques described in FIGS. 6C-6U.

At FIG. 12B, device 600 detects inputs 1250b2, 1250b3, and 1250b4 (e.g., taps or mouse clicks). As illustrated, input 1250b2 is directed at taken log bar 1212. Input 1250b3 is directed at skipped log bar 1214. Input 1250b4 is directed at log affordance 1226.

Figure 12C:
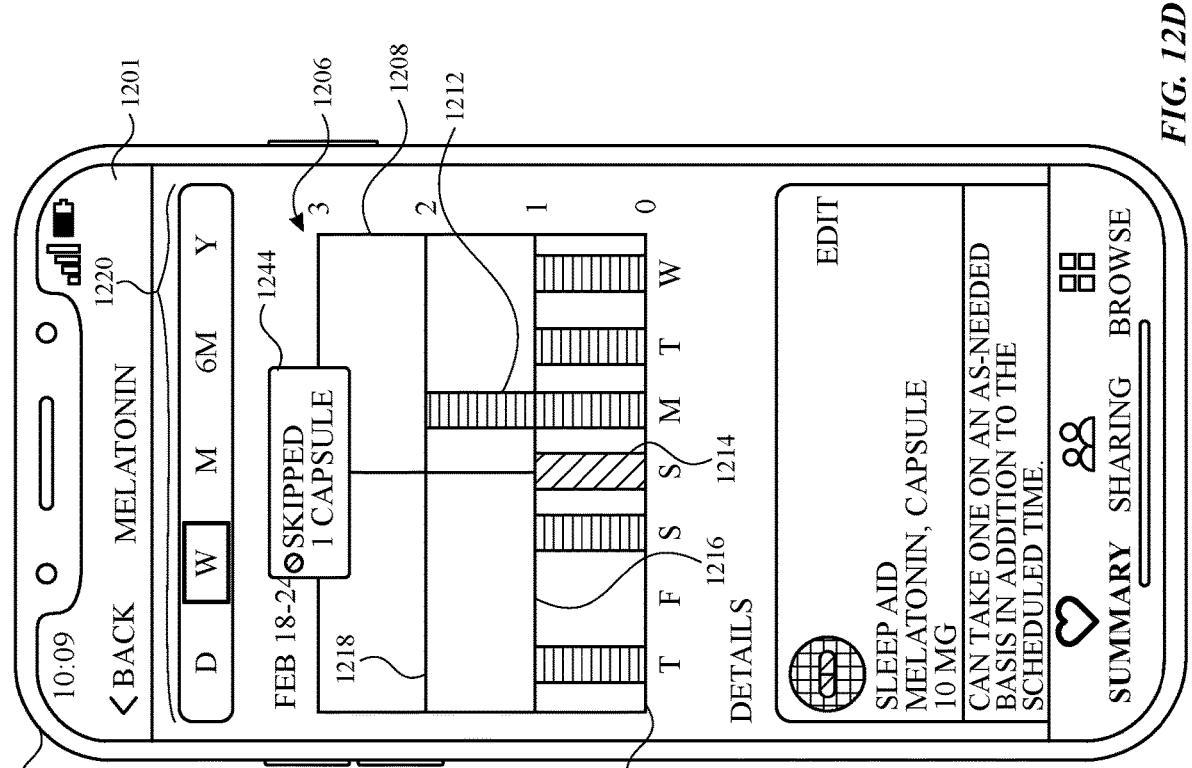

At FIG. 12C, in response to detecting input 1250b2, device 600 displays popup 1242 for two taken log bars 1212 for Monday. Popup 1242 includes an indication that sleep aid was taken. Popup 1242 further indicates the number of doses that were taken (2 capsules).

Figure 12D:
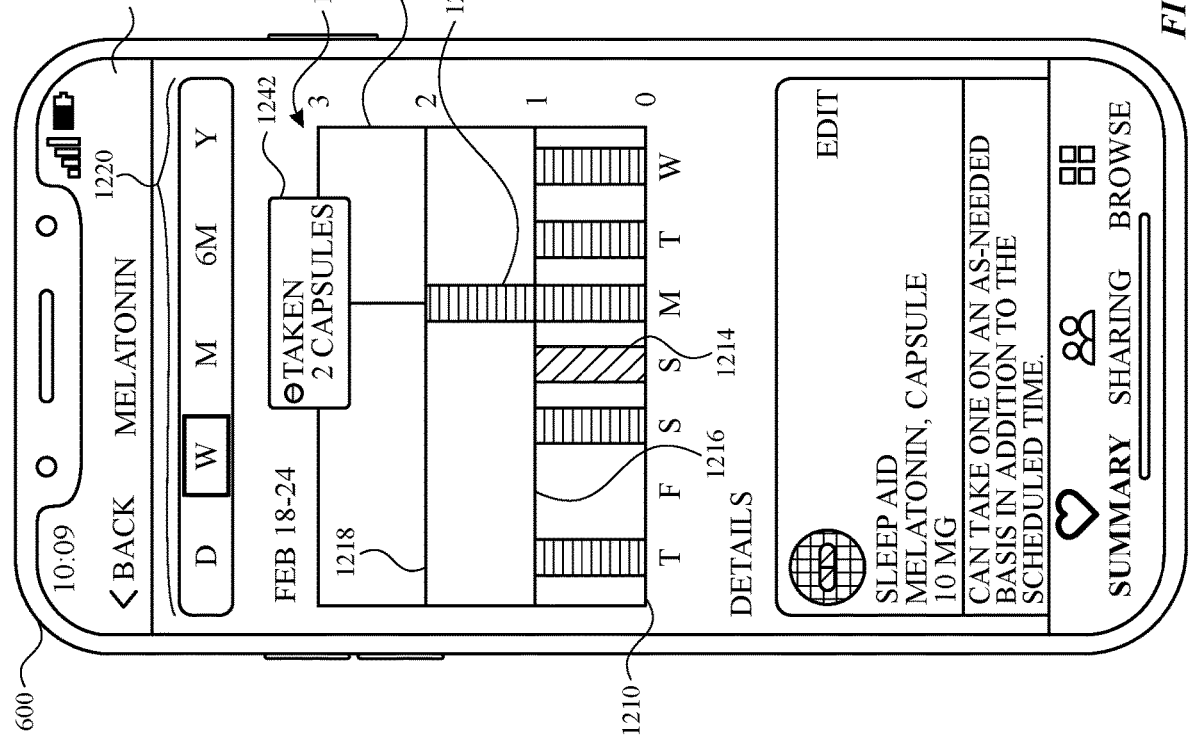

At FIG. 12D, in response to detecting input 1250b3, device 600 displays popup 1244 for skipped log bar 1214 for Sunday. Popup 1244 includes an indication that sleep aid was skipped. Popup 1244 further indicates the number of doses that were skipped (1 capsule).

Figure 12E:
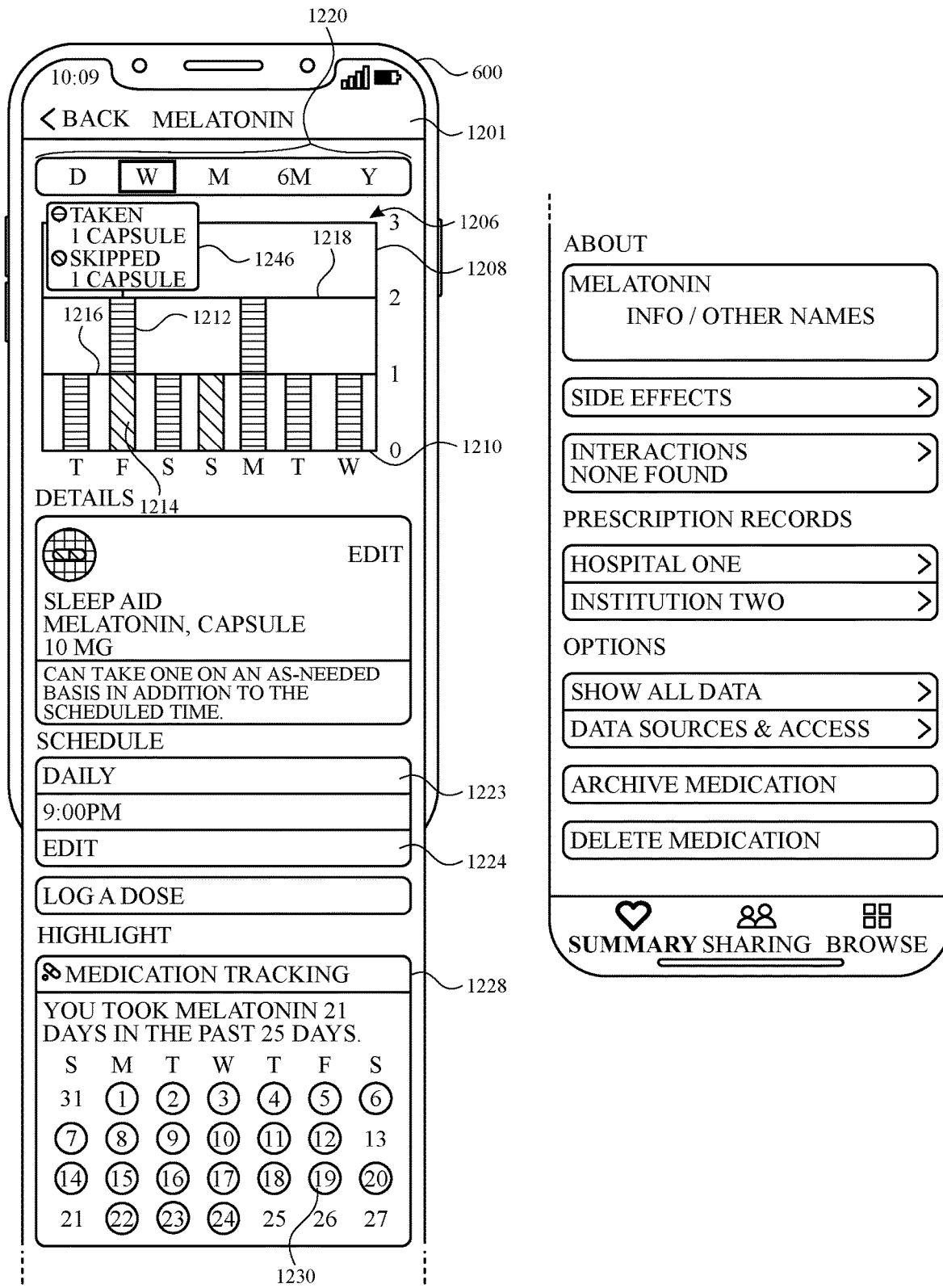

At FIG. 12E, in response to a series of inputs (including input 1250b4 in FIG. 12B) to log melatonin as taken (e.g., similar to the techniques described with respect to FIGS. 10B-10E), device 600 displays medication summary interface 1201 of FIG. 12E. Device 600 has detected user inputs that logged melatonin as skipped and taken and, in response, updates interactive chart 1206 to include taken log bar 1212 and skipped log bar 1214 for Friday. Additionally, device 600 updates interactive calendar 1228. As illustrated, icon 1230 for Friday now includes a circle around it, indicating that device 600 has a record that sleep aid was taken on Friday.

At FIG. 12E, in response to device 600 detecting an input on taken log bar 1212 and/or skipped log bar 1214, device 600 displays popup 1246. As illustrated, popup 1246 includes an indication that one capsule has been taken and one capsule has been skipped.

FIG. 13 is a flow diagram illustrating a method for displaying a summary of logged actions using a computer system in accordance with some embodiments. Method 1300 is performed at a computer system (e.g., 100, 300, 500, 600, and/or 1400) (e.g., a smartwatch, a smartphone, a tablet, and/or a laptop computer) that is in communication with a display generation component (e.g., 601 and/or 1401) (e.g., a display controller, a touch-sensitive display system, and/or a monitor) and one or more input devices (e.g., 601 and/or 1401) (e.g., a touch-sensitive surface, a keyboard, a controller, a rotatable input device, microphone, and/or a mouse). Some operations in method 1300 are, optionally, combined, the orders of some operations are, optionally, changed, and some operations are, optionally, omitted.

As described below, method 1300 provides an intuitive way for displaying a summary of logged actions. The method reduces the cognitive burden on a user for view a summary of logged actions, thereby creating a more efficient human-machine interface. For battery-operated computing devices, enabling a user to view a summary of logged actions faster and more efficiently conserves power and increases the time between battery charges.

The computer system detects (1302), via the one or more input devices, an input (e.g., a tap, a swipe, a mouse click, and/or a speech input) corresponding to a request to display a summary of logs for actions associated with a respective medication (e.g., input 1250a and/or an input directed at active medication tiles 670a-670d) (e.g., in a medication tracking application (e.g., an application that includes a schedule for taking one or more medications and/or an application that notifies a user when a medication is scheduled to be taken)).

In response to detecting the input corresponding to the request to display the summary of logs for actions associated with the respective medication (e.g., logs (in some embodiments, the logs are based on previous user inputs (e.g., a discrete input indicating that the medication was taken or skipped at a scheduled time)), the computer system displays (1304), via the display generation component, a user interface (e.g., 1201) including a time scale (e.g., 1210) (e.g., a graph (e.g., bar graph) including a time scale). In some embodiments, displaying the user interface includes, in accordance with a determination that the respective medication has a first type of logged action (e.g., FIGS. 12A-12E) (or, optionally, a first type of logged event) (e.g., taken, consumed, and/or applied) for a first logged action of the plurality of logged actions (e.g., FIGS. 12A-12E), displaying (1306) a first indicator (e.g., 1212) (e.g., a non-textual indicator (e.g., an object and/or a symbol)) for the first logged action as having a first appearance (e.g., FIG. 12A) on the time scale. In some embodiments, displaying the user interface includes, in accordance with a determination that the respective medication has a second type of logged action (e.g., FIGS. 12A-12E) (or, optionally, a second type of logged event) (e.g., skipped and/or postponed) different from the first type of logged action for the first logged action of the plurality of logged actions, displaying (1308) a second indicator (e.g., 1214) (or, optionally, the first indicator) (and/or the same as the first indicator (e.g., the same shape and/or symbol)) for the first logged action as having a second appearance on the time scale (e.g., FIG. 12A), the second appearance different from the first appearance (e.g., different color, shape, and/or symbol). In some embodiments, the first indicator (and/or the second indicator) are displayed in a particular column (e.g., representing a particular day, week, and/or month) of the time scale. In some embodiments, the first indicator and the second indicator are displayed in a same column. In some embodiments, the first indicator and the second indicator are displayed in different columns. In some embodiments, in accordance with a determination that the respective medication has not been logged, the computer system forgoes display of an (e.g., any indicator, the first indicator, and/or the second indicator). In some embodiments, in accordance with a determination that the respective medication has not been logged for a respective period on the time scale, the computer system forgoes display of an indicator (e.g., any indicator of a log, the first indicator, and/or the second indicator) for the respective period of time on the time scale (e.g., the respective period of time if left blank). In some embodiments, in response to detecting an input, the computer modifies (e.g., increases and/or decreases) the time scale. In some embodiments, the user interface includes a representation of time along an x-axis and a representation of a number of logs along a y-axis. Displaying a user interface in response to a request to display a summary of logged actions for a medication, where the user interface includes a first indicator with a first appearance on a time scale when the medication has a first type of logged action and a second indicator with a second appearance on the time scale when the medication has a second type of logged action, allows the computer system to differentiate the presentation of different types of logged actions for the medication, thereby providing improved visual feedback to the user, reducing the number of inputs needed to perform an operation, and performing an operation when a set of conditions has been met without requiring further user input.

In some embodiments, in accordance with a determination that the respective medication is a first medication (e.g., melatonin of FIG. 12A), the first logged action corresponds to logging of the first medication (e.g., is a previous logging event for the first medication). In some embodiments, in accordance with a determination that the respective medication is a second medication different from the first medication (e.g., a medication different than melatonin of FIG. 12A), the first logged action corresponds to logging of the second medication. In some embodiments, the user interface includes a summary for a single medication. In some embodiments, the input corresponding to the request to display the summary of logs for the respective medication is on a medication (e.g., an active medication) displayed in a user interface including one or more scheduled medications and/or logged medications. Conditionally logging an action for a medication based on which medication is selected improves the computer system because it performs an operation when a set of conditions has been met without requiring further user input.

In some embodiments, the time scale includes (e.g., spans) a first period of time (e.g., Sunday on x-axis 1210 of FIG. 12A) (e.g., a first portion of a day, first day, first week) and a second period of time (e.g., Monday on x-axis 1210 of FIG. 12A) (e.g., a second portion of a day, second day, second week). In some embodiments, the respective medication is scheduled to be taken at a target dosage (e.g., 640e) for the first period of time and the second period of time (e.g., four tablets for any given day of the week and/or four capsules for any given week of the month). In some embodiments, displaying the user interface includes displaying a graphical indicator (e.g., 1216) (e.g., a symbol, an object, a horizontal line, and/or a vertical line) of the target dosage at the first period of time and at the second period of time. Displaying a graphical indicator of a target dosage at different periods of time allows for a computer system to provide additional context from a medication logging application to a user when viewing the user interface, thereby providing improved visual feedback to the user and reducing the number of inputs needed to perform an operation.

In some embodiments, in accordance with a determination that the respective medication is not associated with a logging action (e.g., Friday on x-axis 1210 of FIG. 12A) (e.g., there are no logging events for the respective medication during the period of time covered by the time scale), the computer system forgoes displaying the first indicator and/or the second indicator (in some embodiments, forgoing displaying any indicators of logged events) for the first logged action. Conditionally displaying indicators for different types of logging actions depending on whether there is data for such a logging action allows for the computer system to present information known by the computer system, thereby providing improved visual feedback to the user.

In some embodiments, the user interface includes a first option (e.g., 1226) that, when selected, initiates a process to log the respective medication (e.g., 1002 and/or 1016) (e.g., the process of method 1100 as described in reference to FIG. 11). Displaying an option to initiate a process to log a medication with a user interface including representations of past data allows a user a convenient path to logging medication while being presented past data, thereby reducing the number of inputs needed to perform an operation and providing additional control options without cluttering the user interface with additional displayed controls.

In some embodiments, the computer system detects a second user input (e.g., 150b1 and/or 1250b2) corresponding to the first indicator. In some embodiments, in response to detecting the second user input, the computer system displays a summary (in some embodiments, the summary includes one or more details of the logged action (e.g., a time of the event, a number of doses taken during the event, and/or whether the event corresponds to the respective medication being taken or skipped)) of the first logged action (e.g., at least the first logged action. in some embodiments, a summary of a plurality of logged actions, including the first logged action). Displaying a summary of a logged action in response to detecting user input on an indicator from the user interface allows a user an easy way to get more information from what is being presented in the user interface, thereby providing improved visual feedback to the user, reducing the number of inputs needed to perform an operation, and providing additional control options without cluttering the user interface with additional displayed controls.

In some embodiments, the summary of the first logged action includes an indication of a dosage and medication form for the first logged action (e.g., 1242, 1244, and/or 1246). Displaying an indication of a dosage and medication form in a summary of a logged action allows the computer system to present data stored by the computer system, thereby providing improved visual feedback to the user and reducing the number of inputs needed to perform an operation.

In some embodiments, the user interface includes a scale for a number of logged events (e.g., 1208) (e.g., the user interface includes a graph with the time scale as the first axis (e.g., the x-axis) and the number of logged events as a second axis (e.g., the y-axis)). Displaying a scale for a number of logged events allows a user to quickly understand what is being presented, thereby providing improved visual feedback to the user and reducing the number of inputs needed to perform an operation.

In some embodiments, the respective medication is associated with a plurality of characteristics (e.g., 1203) (e.g., clinical name, medication form, medicinal strength, dosage, nickname, and/or notes) including a first set of characteristics (e.g., as depicted in FIG. 12B) (e.g., nickname, and/or notes) and a second set of characteristics (e.g., as depicted in FIG. 12B) (e.g., clinical name, medication form, medicinal strength, and/or dosage). In some embodiments, the user interface includes a second option (e.g., 1222) that, when selected, initiates a process for editing one or more of the plurality of characteristics (e.g., 604u). In some embodiments, during the process for editing one or more of the plurality of characteristics, the computer systems provides one or more options to edit the first set of characteristics without providing options (e.g., any options) to edit the second set of characteristics (e.g., once melatonin is added the medication tracking application, the user cannot edit clinical name, medication form, medicinal strength, and/or dosage). Providing options to edit a first set of characteristics without providing options to edit a second set of characteristics allows a medication logging application to control what data is editable from a particular user interface, thereby providing improved visual feedback to the user, reducing the number of inputs needed to perform an operation, and providing additional control options without cluttering the user interface with additional displayed controls.

In some embodiments, the respective medication is tracked via a medication tracking function of a medication tracking application and the user interface includes a third option (e.g., 1236 and/or 684*a*) that, when selected, initiates a process to remove (e.g., archive and/or delete) the respective medication from the medication tracking function of the medication tracking application (in some embodiments, the respective medication is removed from the application entirely; in some embodiments, after the respective medication is no longer tracked, it remains as an archived medication in the application). Having the user interface include the third option allows a user to view a single user interface with both indications of different logged actions for the respective medication and an option to remove the respective medication, thereby providing improved visual feedback to the user and reducing the number of inputs needed to perform an operation.

In some embodiments, the user interface includes a fourth option (e.g., one of CHR affordances 1234) that, when selected, causes display of a first clinical health record (e.g., a prescription and/or notes from a care provider) from a first entity (e.g., as depicted in FIG. 12B) (e.g., a care provider, medical facility, hospital, and/or institution) for the respective medication. In some embodiments, the user interface includes a fifth option (e.g., one of CHR affordances 1234) that, when selected, causes display of a second clinical health record from a second entity (e.g., as depicted in FIG. 12B), different from the first entity, for the respective medication. Having the user interface include separate options to display health records from different entities allows a user to have quick access to different information that is not normally so easily accessible, thereby reducing the number of inputs needed to perform an operation.

In some embodiments, the user interface includes a fifth option (e.g., 1224) that, when selected, causes display of a user interface (e.g., 604*n*-604*r*) that includes an option (e.g., 640*a*-640*d* and/or 640*f*-640*k*) to modify a scheduled time for the respective medication and/or a scheduled dose (e.g., 640*e*) for the respective medication. Having the user interface include the fifth option allows a user the ability to easily modify particular types of data while viewing indications of different logged actions, thereby reducing the number of inputs needed to perform an operation.

In some embodiments, the user interface includes a sixth option (e.g., 1240) that, when selected, causes display of a user interface that includes an option to display a side effect for the respective medication (e.g., a side effect for melatonin in FIG. 12B). Having the user interface include the sixth option allows a user the ability to easily view particular types of data while viewing indications of different logged actions, thereby reducing the number of inputs needed to perform an operation.

In some embodiments, the user interface includes a calendar view (e.g., 1228) (e.g., of a respective month and/or of one or more months) that includes an indication for a respective day. In some embodiments, in accordance with a determination that a set of one or more logging criteria are met, the set of one or more logging criteria including a criterion that is met when at least a second logged action (e.g., user has logged medication as taken and/or consumed) of the plurality of logged actions corresponds to the respective day, the indication for the respective day has a first appearance (e.g., in FIG. 12E, there is a circle around icon 1230). In some embodiments, in accordance with a determination that the set of one or more logging criteria are not met (e.g., user has not logged medication as taken and/or consumed), the indication for the respective day has a second appearance (e.g., in FIG. 12B, there is no circle around icon 1230), different from the first appearance. In some embodiments, the third indicator is proximate to (e.g., overlaid on, surrounding, and/or adjacent to) an indicator of the respective day. In some embodiments, the calendar view has a time scale different from the time scale for the first indicator and/or second indicator. Including a calendar view with an indication for a respective day with different appearances depending on whether logging criteria are met allows a user to quickly assess a state of the logging criteria for a particular day, thereby providing improved visual feedback to the user.

Note that details of the processes described above with respect to method 1300 (e.g., FIG. 13) are also applicable in an analogous manner to the methods described below/above. For example, the process displaying a summary of logging actions in method 1100 optionally occurs before and/or after methods 700, 800, 900, 1100, and 1500. As another example, the user inputs and user interfaces described in methods 700, 800, 1100, and/or 1500 affect whether logging actions are displayed and/or the manner in which they are displayed. For brevity, these details are not repeated below.

FIGS. 14A-14K illustrate exemplary watch user interfaces for tracking medications, in accordance with some embodiments. The user interfaces in these figures are used to illustrate the processes described below, including the processes in FIG. 15.

Figure 14A:
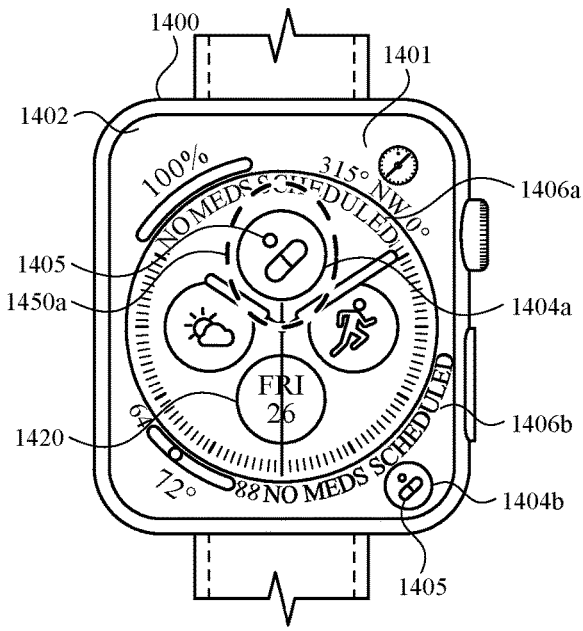
FIGS. 14A-14K illustrate exemplary user interfaces for tracking medications, in accordance with some embodiments.
Figure 15:
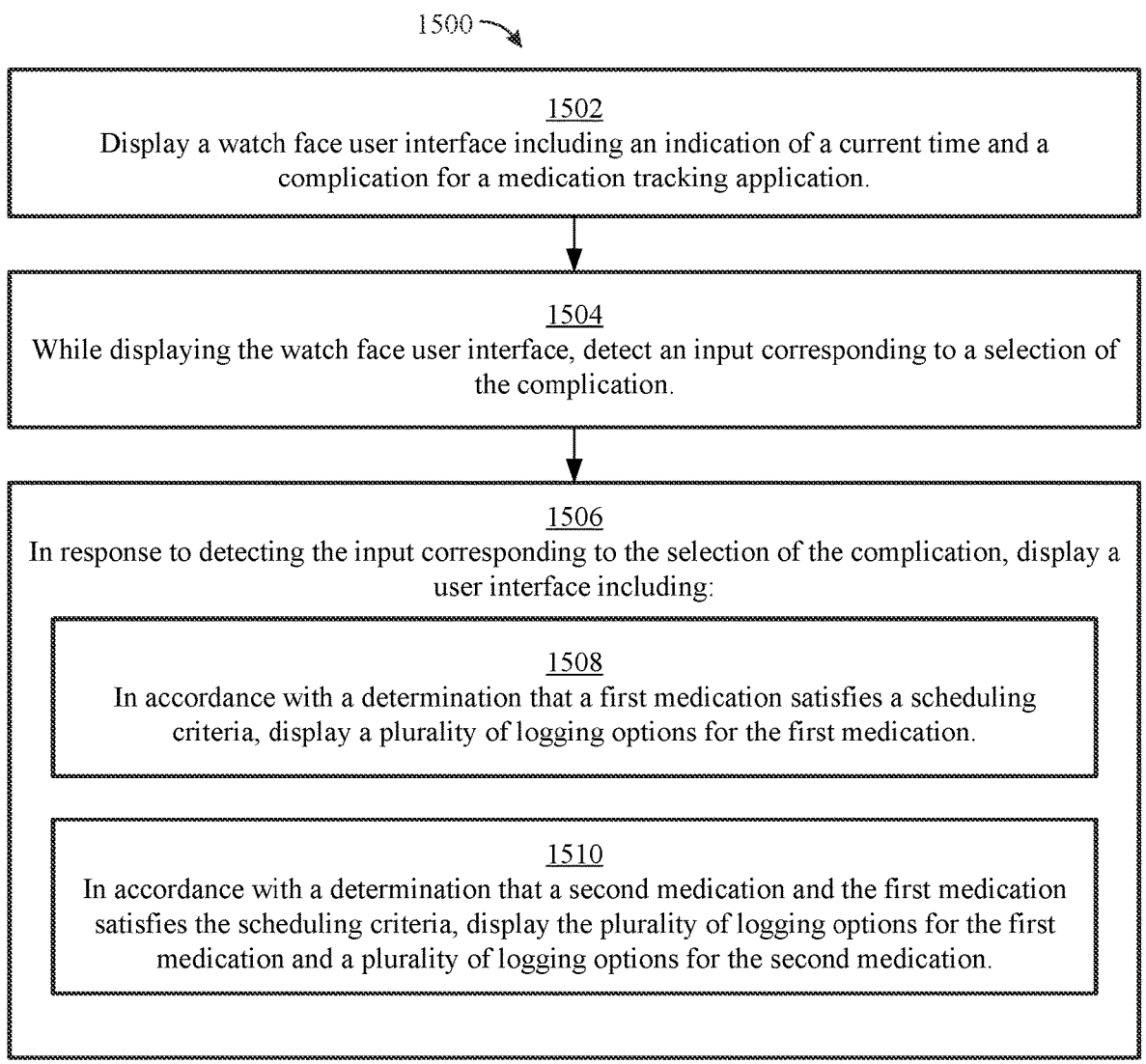
FIG. 15 is a flow diagram illustrating methods for tracking medications, in accordance with some embodiments.

At FIG. 14A, device 1400 displays watch face home screen 1402 on display 1401. The watch face home screen 1402 includes medication complications 1404*a*-1404*b* of a health application (e.g., the same health application associated with health application icon 602 of FIG. 6A and/or related application having one or more functions of the health application associated with health application icon 602 of FIG. 6A). In some embodiments, device 1400 includes one or more features of devices 100, 300, 500, and 600. In some embodiments, the techniques described with respect to device 600 in FIGS. 6A-6AD, FIGS. 10A-10N, and FIGS. 12A-12E are carried out on device 1400.

Figure 14B:
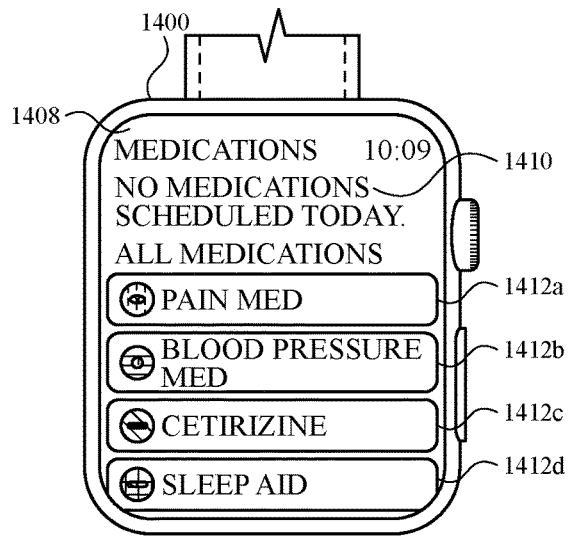

At FIG. 14A, medication complications 1404*a*-1404*b* have different positions with respect an indication of a current time. As illustrated, medication complication 1404*a* is a top-inner complication (e.g., where hour and/or minute hands of a time indicator pass over the complication) and medication complication 1404*b* is a corner complication (e.g., where hour and/or minute hands of a time indicator do not pass over the complication). Medication complications 1404*a*-1404*b* have complication icon 1405, which is a predetermined complication icon for a medication tracking application (e.g., the medication tracking application associated with medication tracker affordance 608 of FIG. 6B). Complication icon 1405 is the representation that is displayed when no medications are due. In some embodiments, complication icon 1405 does not include an icon that is user-configurable (e.g., as described in reference to FIGS. 6S-6T) and/or is not an icon associated with a scheduled medication. Medication complications 1404*a*-1404*b* also include indications 1406*a*-1406*b* that no medications are scheduled for the day. While displaying interface watch face home screen 1402, device 1400 detects tap 1450*a* directed at medication complication 1404*a*. In response to detecting tap 1450*a*, device 1400 displays tracking interface 1408 of the health application, as depicted in FIG. 14B.

At 14B, tracking interface 1408 includes indication 1410 that no medications are scheduled for today and logging tiles 1412*a*-1412*d* for pain med, blood pressure med, cetirizine, and sleep aid. In some embodiments, in response to detecting a selection of one of the logging tiles 1412*a*-1412*d*, device 1400 displays a logging interface that includes an indication of the medication being logged, an indication of a medication form, an indication of a medicinal strength, an affordance to configure the dosage that was taken, an affordance to configured the time the medication was taken, a done affordance (similar to done affordance 1012), and/or a cancel affordance to return to tracking interface 1408.

At 14B, the active medications associated with logging tiles 1412*a*-1412*d* are the same as the active medications associated with active medication tiles 670*c*, 670*d*, 670*e*, and 670*a* of tracking interface 656 in FIG. 6AD, respectively. Tiles 1412*a*-1412*d* also include medication icons having the same visual aspects (e.g., color, shading, and/or symbols) that are included in active medication tiles 670*c*, 670*d*, 670*e*, and 670*e*. In some embodiments, information about the medication stored on device 600 is wirelessly received at device 1400 (e.g., either directly from device 600 through short range wireless communications and/or indirectly from the cloud). As such, in some embodiments, the user-configurations detected by device 600 are communicated to device 1400 or, in some embodiments, vice versa. In some embodiments, device 1400 and device 600 are logged into the same user account, such as a user account for the user associated with profile icon 606 of FIG. 6B.

Figure 14C:
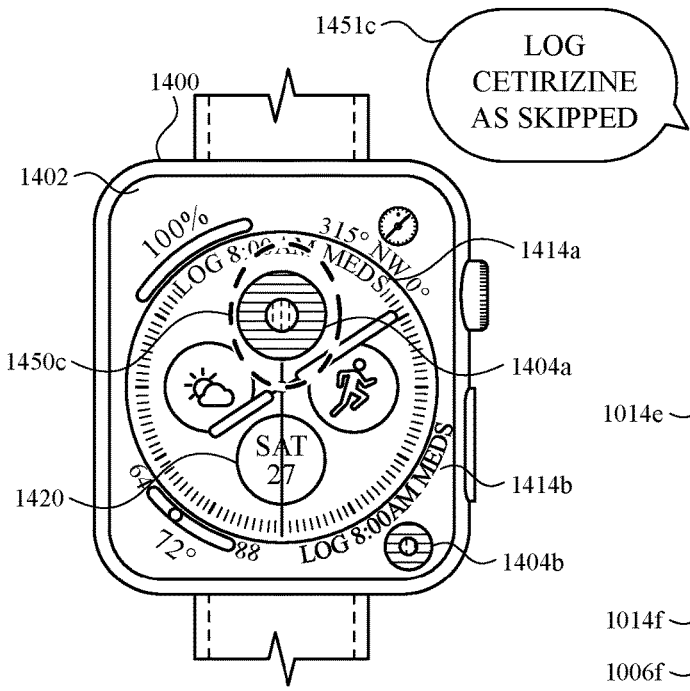

At FIG. 14C, device 1400 displays watch face home screen 1402 that includes medication complications 1404*a*-1404*b*, each having indication 1414*a*-1414*b*, respectively, that a medication is due. Additionally, medication complications 1404*a*-1404*b* have a visual appearance of one of the medications that are due. As illustrate, the icon of 1404*a*-1404*b* has an appearance of the icon for blood pressure med (which is also illustrated in active medication tile 670*d* of FIG. 6AD). Note that the current day is now Saturday as opposed to Friday, as illustrated by calendar complication 1420 of FIGS. 14A and 14C.

Figure 14D:
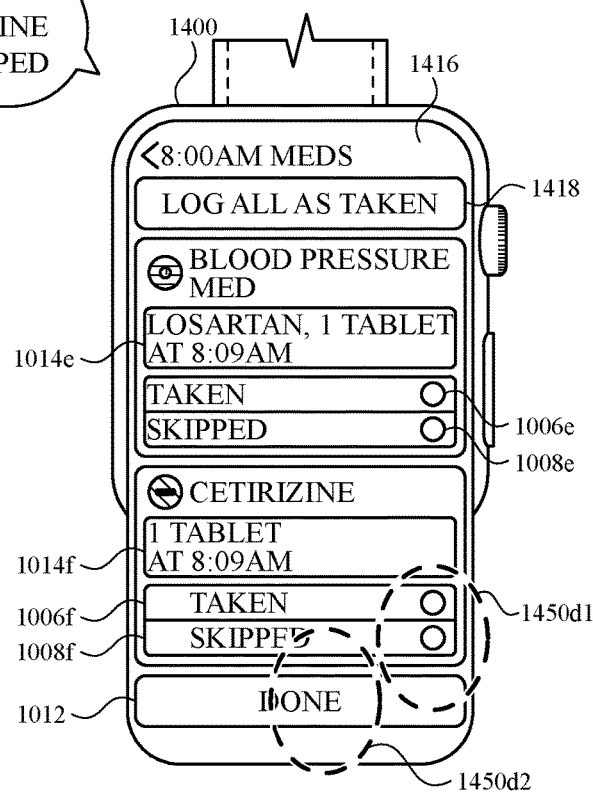

At FIG. 14C, while displaying watch face home screen 1402, device 1400 detects tap 1450*c* directed at medication complication 1404*a*. In response to detecting tap 1450*c*, device 1400 displays logging interface 1416, as depicted in FIG. 14D. While displaying watch face home screen 1402 (or, in some embodiments, a home screen of device 600), device 1400 (e.g., a digital assistant of device 1400) detects speech input 1451*c* (e.g., an utterance to log cetirizine as skipped). In response to detecting speech input 1451*c*, device 1400 logs cetirizine as skipped, as described with reference to FIG. 14E. In some embodiments, while displaying watch face home screen 1402 (or, in some embodiments, a home screen of device 600), device 1400 detects speech input corresponding to an utterance to log a medication (e.g., without identifying the medication). In such embodiments, in response the speech input, device 1400 displays logging interface 1416 (e.g., including a set of one or more medications that are due).

At FIG. 14D, logging interface 1416 includes an indication that both blood pressure med and cetirizine are due. Logging interface 1416 includes similar features as logging interface 1002, including taken affordance 1006 and skipped affordance 1008. Additionally, logging interface 1416 includes dosage and time affordance 1014 to modify the time that the medication was taken or skipped and/or modify the dosage that was taken or skipped. Logging interface 1416 also includes log all as taken affordance 1418. In some embodiments, in response to detecting a selection of log all as taken affordance 1418, device 1400 automatically logs all the medications that are due as taken and displays medication tracking interface 1408. Accordingly, no further input is needed to select done affordance 1012. This limits the number of inputs needed to log multiple medications, which is especially helpful on devices having a smaller touch-screen display. In some embodiments, logging interface 1416 includes other features of logging interface 1002 and logging interface 1016 of FIGS. 10B-10E. In some embodiments, logging interface 1002 and logging interface 1016 of FIGS. 10B-10E includes one or more features of logging interface 1416.

At FIG. 14D, while displaying logging interface 1416, device 1400 detects tap 1450*d*1 directed at skipped affordance 1008 for cetirizine. Device 1400 also detects tap 1450*d*2 directed at done affordance 1012. In response to detecting tap 1450*d*1 and tap 1450*d*2, device 1400 displays tracking interface 1408 of FIG. 14E.

Figure 14E:
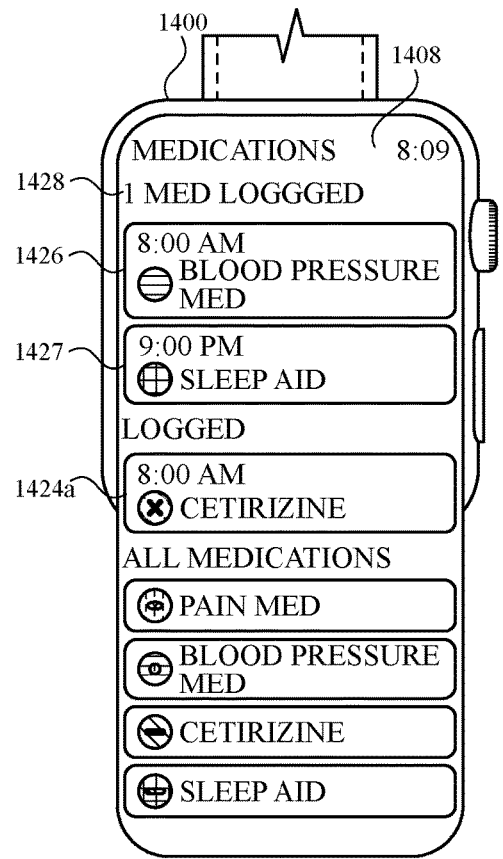

At FIG. 14E, device 1400 has updated tracking interface 1408 to include logged tile 1424*a* that cetirizine was skipped. As illustrated, logged tile 1424*a* includes an indication of a time that cetirizine was scheduled to be taken (8:00 AM). Because a medication was logged, tracking interface 1408 includes indicator 1428 that indicates that one medication has been logged. In some embodiments, indicator 1428 optionally indicates that no medications are logged (e.g., in embodiments where cetirizine was not logged). Tracking interface 1408 also includes scheduled medication tile 1426 for blood pressure (since it was not logged in FIG. 14D) and scheduled medication tile 1427 for sleep aid. In some embodiments, logged tile 1424*a* includes an indication that the medication was logged (e.g., 8:09 AM) (e.g., the time reflected in time affordance 1014*e* of logging interface 1416 of FIG. 14D), as described in reference to logged tile 1023*a* of FIG. 10F. For example, in such embodiments, logged tile 1424*a* includes an indication of time that cetirizine was logged at 8:09 AM.

At FIG. 14E, in some embodiments, device 1400 stops displaying logged tile 1424 in tracking interface 1408. In such embodiments, based on detecting that a threshold amount of time (e.g., 5 minutes, 1 hour, 5 hours) has elapsed, device 1400 stops displaying logged tile 1424.

Figure 14F:
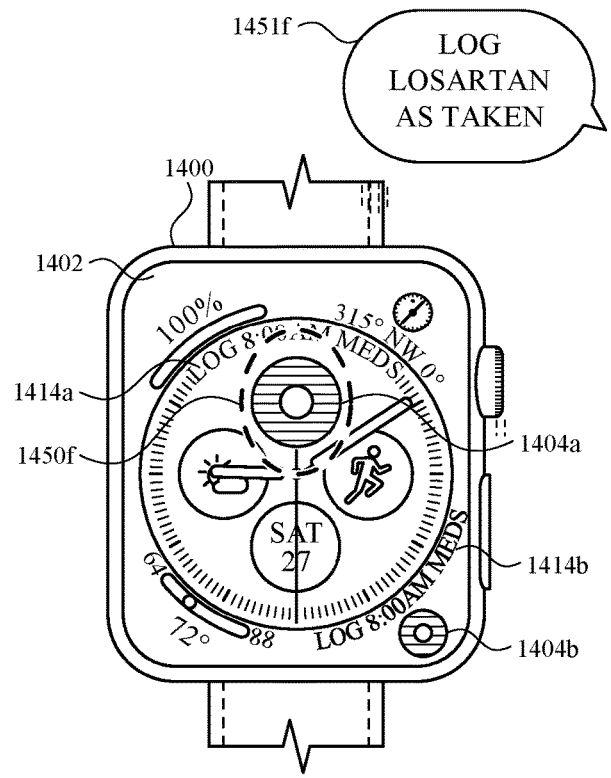

At FIG. 14F, device 600 displays watch face home screen 1402. Watch face home screen 1402 includes indications 1414*a*-1414*b* that a medication is due. As illustrated, medication complications 1404*a*-1404*b* include the visual appearance of the icon for blood pressure med, since it has not been logged as indicated in FIG. 14E. At FIG. 14F, while displaying watch face home screen 1402, device 1400 detects tap 1450*f* directed at medication complication 1404*a*. In response to detecting input 1450*f*, device 600 displays logging interface 1416, as depicted in FIG. 14G.

At FIG. 14F, while displaying watch face home screen 1402 (or, in some embodiments, a home screen of device 600), device 1400 (e.g., a digital assistant of device 1400) detects speech input 1451*f* (e.g., an utterance to log losartan as taken). In response to detecting speech input 1451*f*, device 1400 logs losartan as taken, as described with reference to FIG. 14H. In some embodiments, while displaying watch face home screen 1402 (or, in some embodiments, a home screen of device 600), device 1400 detects speech input corresponding to an utterance to log a medication (e.g., without identifying the medication). In such embodiments, in response the speech input, device 1400 displays logging interface 1416 (e.g., including an indication that losartan is due) of FIG. 14G.

Figure 14G:
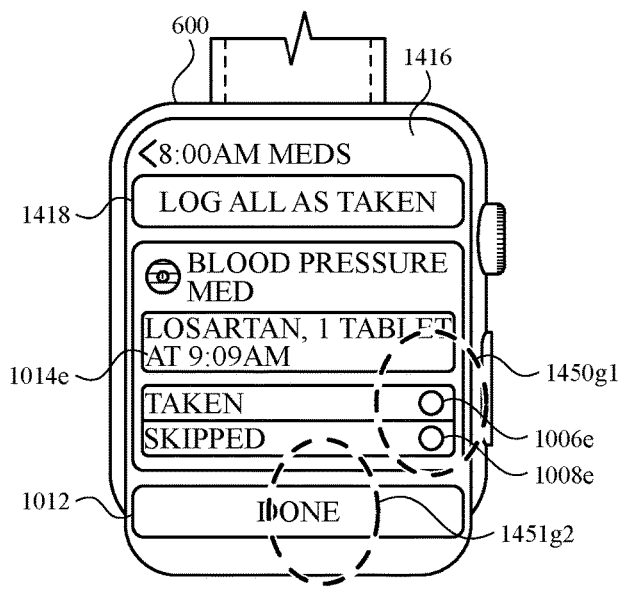

At FIG. 14G, logging interface 1416 includes an indication that only blood pressure med is due (e.g., and not cetirizine). Additionally, the time displayed associated with dosage and time affordance 1014*e* is the current time of 9:09

AM. Logging interface 1416 includes taken affordance 1006e and skipped affordance 1008e. Logging interface 1416 includes log all as taken affordance 1418 to automatically log the blood pressure medication. In some embodiments, logging interface 1416 does not include log all as taken affordance 1418 when only a single medication is due. While displaying interface logging interface 1416, device 1400 detects tap 1450g1 directed at taken affordance 1006e and tap 1450g2 directed at done affordance 1012. In response to detecting tap 1450g1 and tap 1450g2, device 1400 logs blood pressure med, as indicated by log tile 1424a of tracking interface 1408 of FIG. 14J. As illustrated, blood pressure med has been added to the log tile 1424a. In some embodiments, blood pressure med is added to a different log tile based on the log time being 9:09 AM (e.g., a log tile for 9:09 AM).

Figure 14H:
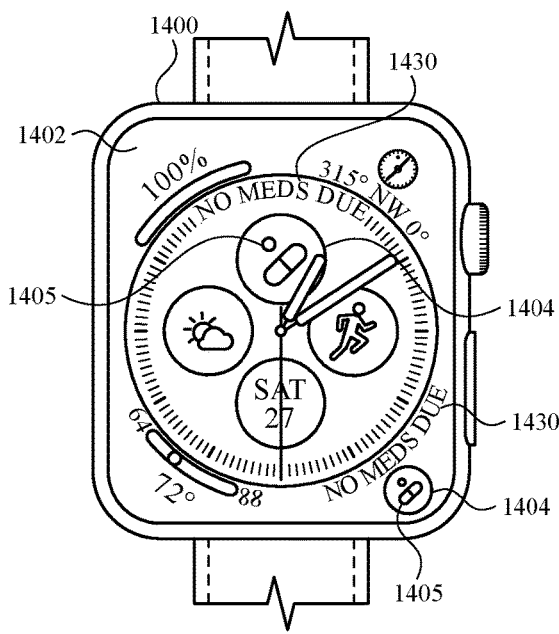

At FIG. 14H, device 1400 displays watch face home screen 1402. The current time is before sleep aid is scheduled to be taken. As such, both medication complications 1404a-1404b include complication icon 1405. Medication complications 1404a-1404b also include indications 1430a-b that no medications are due.

Figure 14I:
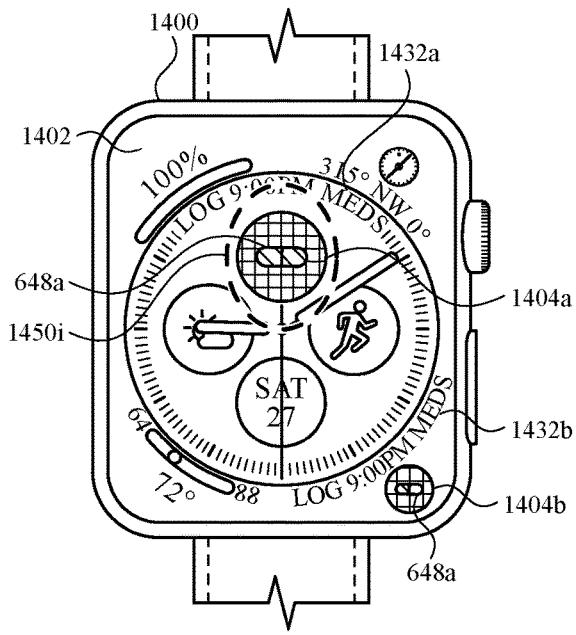

At FIG. 14I, the current time is now past the scheduled time for sleep aid to be taken. As such, both medication complications 1404a-1404b include icon 648a for melatonin and indications 1432a-1432b that it is time to log 9:00 PM medications. While displaying watch face home screen 1402, device 1400 detects tap 1450i directed at medication complication 1404a. In response to detecting tap 1450i, device 1400 displays a logging interface similar to the logging interface of FIG. 14G but for melatonin.

Figure 14J:
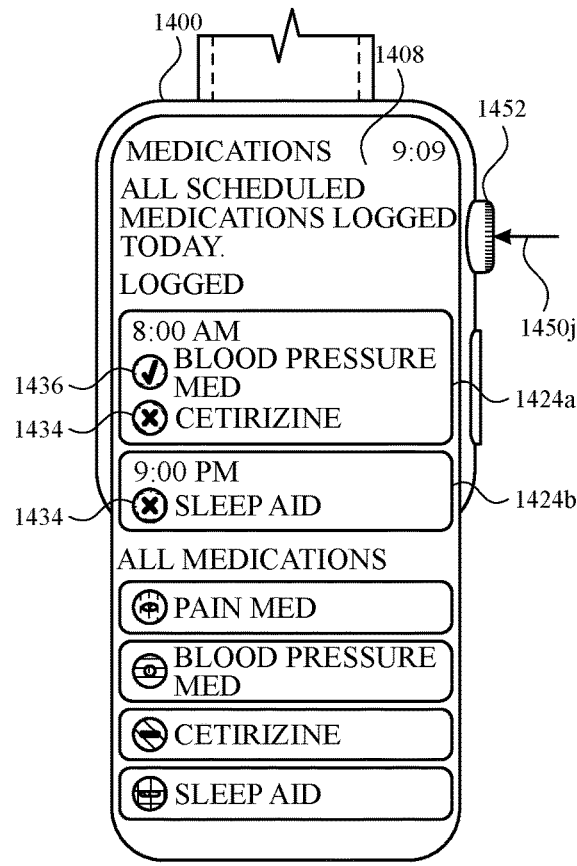

At FIG. 14J, based on logging melatonin as skipped, device 1400 updates tracking interface 1408 to include log tile 1424b. As illustrated, log tile 1424b includes indicator 1434 (an X over the icon for the medication) that melatonin was skipped. Device 1400 displays blood pressure med as being logged in logging tile 1424a. Because blood pressure med was logged as taken, device 1400 displays indicator 1436 (a check mark over the icon for blood pressure med) that blood pressure was taken. In some embodiments, device 1400 displays the medication name differently based on whether the medication was logged as taken or skipped, similar to what is described in 10F. In some embodiments, device 600 displays indicator 1434 or indicator 1436 in logged medication tile 1023a. In some embodiments, in response to device 1400 detecting an input on logged medication tile 1023a, device displays (e.g., re-displays) logging interface 1416 of FIG. 14D to allow a user to modify the logs for the blood pressure med and cetirizine, similar to device 600 displays interface 1034 in response to input 1050f2 on logged medication tile 1023a, as described with respect to FIG. 10F. While displaying tracking interface 1408 of FIG. 14J, device 1400 detects an input 1450j (e.g., a depress of rotational input device 1452). In response to detecting input 1450j, device 1400 displays watch face home screen 1402 of FIG. 14K.

Figure 14K:
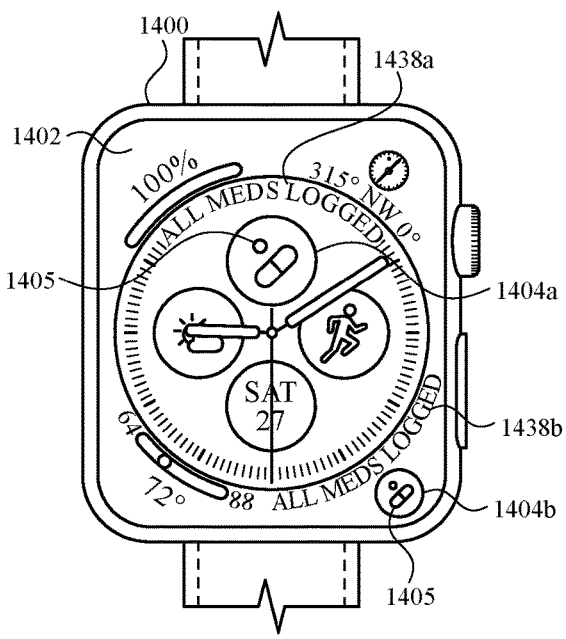

At FIG. 14K, device 1400 displays watch face home screen 1402. All scheduled medications for the day have been logged. As illustrated, because there are no medications due, both medication complications 1404a-1404b include complication icon 1405. Medication complications 1404a-1404b also include indications 1438a-1438b that all medications have been logged.

In some embodiments, a digital assistant operates on device 1400 (and/or device 600). The digital assistant is in communication with the medication tracker application of FIGS. 6A-6AD, 7A-7B, 8, 9, 10A-10N, 11, 12A-12E, 13, 14A-14K, and 15. Accordingly, the digital assistant (e.g., the computer system, via the digital assistant) is capable of accessing and/or modifying the data (e.g., data associated with active and/or as-needed medications, data associated with logged medications, data associated with upcoming medications that are due, summary of logged and/or unlogged medications, and/or data associated with drug interactions between different medications) stored in association with the medication tracker application in response to a request (e.g., a current or previous spoken request) from a user. In some embodiments, the digital assistant is capable of causing a respective function of the medication tracker application to be executed (e.g., logging a medication, adding a medication, removing a medication, and/or archiving an active medication). In some embodiments, the digital assistant responds to a request from the user to access or modify the data stored in association with the medication tracker application or a request to execute the function of the medication tracker application. In some embodiments, the digital assistant responds to an event triggered by information provided by the medication tracker application (e.g., the digital assistant reminds the user to log a medication in response to the medication tracker application providing the information to the digital assistant).

For example, in some embodiments, the digital assistant (of device 1400 and/or of device 600) detects a speech input corresponding to a request for data associated with the medication tracker application (e.g., "What medications am I currently taking?"; "Are there any risk of interactions by taking a pain medication?"; "Are there any drug interactions if I start taking Nitroglycerin?"; "When did I last take my blood pressure medication?"; "Have I logged all my medications for today?"; and/or "How many days have I taken melatonin in the past 25 days?"). In response to detecting the request for data associated with the medication tracker application, the digital assistant accesses data of the medication tracker application and provides a response to the request (e.g., "You are currently taking a pain medication, blood pressure medication, cetirizine, and a sleep aid"; "There is a moderate interaction risk of taking pain medication and alcohol"; "There could be a sever interaction risk with alcohol if you start taking Nitroglycerin?"; "You logged your blood pressure medication as taken at 8:00 AM today"; "You have logged all your medications for today"; and/or "You have taken melatonin 20 days in the past 25 days?"). Accordingly, a user can utilize the digital assistant to access data that is also accessible via the graphical user interfaces of the medication application described with respect to FIGS. 6A-6AD, 7A-7B, 8, 9, 10A-10N, 11, 12A-12E, 13, 14A-14K, and 15.

As a further example, in some embodiments, the digital assistant (of device 1400 and/or of device 600) detects an event associated with the medication tracker application and, in response, provides an output (e.g., audible and/or visual) regarding the event. In some embodiments, the event is triggered by information for one or more upcoming medications that need to be logged, information about a reminder to log all the medications that are due for that respective day, and/or information about a risk of interaction by taking a medication. Accordingly, the digital assistant is capable of providing alerts and notifications that can also be displayed via the graphical user interfaces of the medication application described with respect to FIGS. 6A-6AD, 7A-7B, 8, 9, 10A-10N, 11, 12A-12E, 13, 14A-14K, and 15.

As an additional example, in some embodiments, the digital assistant modifies data associated with the medication tracker application. For example, in some embodiments, the digital assistant (of device 1400 and/or of device 600) detects a speech input corresponding to a request to modify data associated with the medication tracker application and/or execute a function of the medication tracker application (e.g., "Log aspirin as taken today at 8:00 AM"; "Add melatonin in capsule form at 10 MG to be taken every night at 9:00 PM as a scheduled medication"; "Remove nitroglycerin from my current medications"; and/or "Remove alcohol from my interaction factors"). In response to detecting the speech input corresponding to a request to modify data associated with the medication tracker application, the digital assistant causes data of the medication tracker application to be modified (e.g., the digital assistant causes aspirin to be logged as taken today at 8:00 AM in the medication tracking application; the digital assistant causes melatonin to be added in capsule form at 10 MG as an medication to be taken every night at 9:00 PM; the digital assistant causes nitroglycerin to be removed from being an active medication, for example, as described with respect to FIG. 6AB; the digital assistant causes alcohol to be removed from the interaction factors, for example, as described with respect to FIG. 6V) (and, optionally, provides a response to the request). Accordingly, a user can utilize the digital assistant to execute the functions that are otherwise executable using the graphical user interfaces of the medication application described with respect to FIGS. 6A-6AD, 7A-7B, 8, 9, 10A-10N, 11, 12A-12E, 13, 14A-14K, and 15.

FIG. 15 is a flow diagram illustrating a method for tracking medications using a computer system in accordance with some embodiments. Method 1500 is performed at a computer system (e.g., 100, 300, 500, 600, and/or 1400) (e.g., a smartwatch and/or an electronic watch) that is in communication with a display generation component (e.g., 601 and/or 1401) (e.g., a display controller, a touch-sensitive display system, and/or a monitor) and one or more input devices (e.g., 601 and/or 1401) (e.g., a touch-sensitive surface, a keyboard, a controller, a rotatable input device, microphone, and/or a mouse). Some operations in method 1500 are, optionally, combined, the orders of some operations are, optionally, changed, and some operations are, optionally, omitted.

As described below, method 1500 provides an intuitive way for tracking medications. The method reduces the cognitive burden on a user for tracking medications, thereby creating a more efficient human-machine interface. For battery-operated computing devices, enabling a user to tracking medications faster and more efficiently conserves power and increases the time between battery charges.

The computer system displays (1502) a watch face user interface (e.g., 1402) including an indication of a current time (e.g., clock hands in FIG. 14A) and a complication (1404*a*) for a medication tracking application (e.g., a medication tracking application associated with medication tracker affordance 608) (e.g., an application that includes a schedule for taking one or more medications and/or an application that notifies a user when a medication is scheduled to be taken);

While displaying the watch face user interface, the computer system detects (1504) an input (e.g., 1450*c*) (e.g., a tap, a swipe, a mouse click, and/or a speech input) corresponding to a selection of the complication. In some embodiments, while displaying the watch face user interface (and/or the complication), the computer system detects an input (e.g., a tap, a swipe, a mouse click, and/or a speech input) corresponding to a request to log an action associated with a set of one or more medications.

In response to detecting the input corresponding to the selection of the complication, the computer system displays (1506) a user interface including (in some embodiments, in response to the input corresponding to the request to log the action associated with the set of one or more medications): in accordance with a determination that a first medication (e.g., blood pressure med in FIG. 14D) satisfies a scheduling criteria (e.g., schedule at 8:00 AM as depicted in FIG. 14B), the computer system displays (1508) a plurality of logging options for the first medication (e.g., 1006*e* and/or 1008*e*) (e.g., an option to log the first medication, an option to modify a time associated with logging the first medication (e.g., a time that the first medication was taken and/or skipped), an option to modify a number of doses associated with logging the first medication (e.g., an option to change the number of doses taken and/or skipped and/or an option to change the number of scheduled doses), and/or an option that, when selected, completes the logging of the first medication); and in accordance with a determination that a second medication (e.g., cetirizine in FIG. 14D) (e.g., different from the first medication) and the first medication satisfies the scheduling criteria, the computer system displays (1510) the plurality of logging options for the first medication and a plurality of logging options for the second medication (e.g., 1006*f* and/or 1008*f*) (e.g., an option to log the second medication, an option to modify a time associated with logging the second medication (e.g., a time that the second medication was taken and/or skipped), an option to modify a number of doses associated with logging the second medication, and/or an option that, when selected, completes the logging of the second medication). In some embodiments, the scheduling criteria is satisfied based on comparing the current time to a scheduled time for a respective medication. In some embodiments, the scheduling criteria is satisfied when the current time corresponds to the scheduled time and/or the current time is past (e.g., later and/or is after) the scheduled time. In some embodiments, the scheduling criteria is not satisfied when the current time does correspond to the scheduled time and/or the current time is before the scheduled time. In some embodiments, the scheduling criteria is satisfied when a current day corresponds to a day that a respective medication is scheduled to be taken. In some embodiments, the scheduling criteria is not satisfied when a current day does not correspond to a day that the respective medication is scheduled to be taken. In some embodiments, in accordance with a determination that the second medication (alternatively, the first medication) does not satisfy the scheduling criteria, the computer system forgoes display of the one or more logging options for the second medication (alternatively, the first medication). In some embodiments, the scheduling criteria is received from an external device (e.g., a second device logged into the same account as the computer system and/or a second device that is paired with the computer system). Displaying a watch face user interface including a complication for a medication tracking application that, when selected, causes display of a user interface with logging options for either (1) the first medication or (2) the first medication and the second medication allows the computer system to use the same complication in different ways depending on a state of the medication tracking application, thereby providing improved visual feedback to the user, reducing the number of inputs needed to perform an operation, providing additional control options without cluttering the user interface with additional displayed controls, and performing an operation when a set of conditions has been met without requiring further user input.

In some embodiments, while the complication for the medication tracking application is displayed with a first appearance (e.g., 1405) (e.g., a default icon for the complication and/or default appearance of the complication) and while the first medication does not satisfy the scheduling criteria (e.g., blood pressure med in FIG. 14D is not due to be logged), in accordance with a determination that the first medication satisfies (e.g., now satisfies, has transitioned to satisfying) the scheduling criteria (e.g., blood pressure med in FIG. 14D is due to be logged), the computer system updates the complication for the medication tracking application from being displayed with the first appearance to being displayed with a second appearance that is different from the first appearance and that includes a representation (e.g., color, dosage shape, symbol, emoji, and/or alphanumeric text) of the first medication (e.g., 1404*a*). In some embodiments, in accordance with a determination that the first medication continues to not satisfy the scheduling criteria (in some embodiments, a determination that no medication satisfies the scheduling criteria), maintaining display of the complication for the medication tracking application with the first appearance.) In some embodiments, in accordance with the determination that the second medication and the first medication satisfies the scheduling criteria, the computer system displays the complication as having a third appearance (e.g., the same as and/or different from the first appearance and/or the second appearance). In some embodiments, in accordance with the determination that the second medication and the first medication satisfies the scheduling criteria, the computer system displays the complication as having the second appearance. Updating the complication for the medication tracking application from being displayed with the first appearance to being displayed with a second appearance that includes a representation of the first medication allows the computer system to reflect a state of the medication tracking application, thereby providing improved visual feedback to the user, reducing the number of inputs needed to perform an operation, and performing an operation when a set of conditions has been met without requiring further user input.

In some embodiments, while the complication for the medication tracking application is displayed with the first appearance and while the first medication and the second medication do not satisfy the scheduling criteria (e.g., 1405 of FIG. 14A and/or FIG. 14H), in accordance with a determination that the first medication and the second medication satisfy (e.g., now satisfies, has transitioned to satisfying) the scheduling criteria (e.g., blood pressure med and cetirizine are scheduled to be logged in FIGS. 14C-14D), the computer system updates the complication for the medication tracking application from being displayed with the first appearance to being displayed with a second appearance different from the first appearance (e.g., as depicted FIG. 14C), wherein the second appearance includes a representation of the first medication (e.g., a representation of blood pressure med, as depicted in FIG. 14C) without including a representation of the second medication (e.g., a representation of cetirizine) (in some embodiments, the third appearance and the second appearance are the same). Updating the complication for the medication tracking application to include a representation of the first medication without including a representation of the second medication when the first medication and the second medication satisfy the scheduling criteria allows the computer system to reflect a state of the medication tracking application without cluttering a display with too much information, thereby providing improved visual feedback to the user and performing an operation when a set of conditions has been met without requiring further user input.

In some embodiments, the representation of the first medication has a visual characteristic (e.g., color (e.g., background color and/or color of a medication form), medication form, and/or emoji) that is user-configurable (e.g., FIGS. 6S-6T) (e.g., edited and/or selected).

In some embodiments, the complication is user-configurable to have different positions relative to the indication of the current time (e.g., 1404*a*-1404*b*).

In some embodiments, displaying the watch face user interface includes, in accordance with a determination that no medications satisfy the scheduling criteria for a first respective time period (e.g., FIG. 14A) (e.g., the current calendar day and/or a 12-hour period), displaying, in the watch face user interface, a graphical object (e.g., 1406*a*-1406*b*) indicating that there are no medications scheduled for the first respective time period (e.g., symbol, icon, and/or text (e.g., text indicating no medications are scheduled and/or no action is needed to log a medication for the first respective time period)). Displaying, in the watch face user interface, a graphical object indicating that there are no medications scheduled for the first respective time period when no medications satisfy the scheduling criteria for the first respective time period allows the computer system to reflect a state of the medication tracking application, thereby providing improved visual feedback to the user and performing an operation when a set of conditions has been met without requiring further user input.

In some embodiments, while displaying the watch face user interface with the graphical object indicating that there are no medications scheduled for the first respective time period, the computer systems detects a second input (e.g., 1450*a*) corresponding to a selection of the complication. In some embodiments, in response to detecting the second input corresponding to the selection of the complication, the computer system displays a user interface (e.g., 1408 and/or 656) that includes one or more indications of one or more active (e.g., medications that are currently scheduled for tracking via the medication tracking application) medications (e.g., 1412*a*-1412*d* and/or 670*a*-670*d*) (e.g., similar to the process of method 900 as described in reference to FIG. 9 and similar to the process of method 1100 as described in reference to FIG. 11). In some embodiments, selecting a respective medication of the one or more active medications causes one or more logging options (e.g., time of log and/or a number of dosages taken/skipped) to be displayed. In some embodiments, selecting a respective medication of the one or more active medications causes a summary of logging data for the respective medication to be displayed (similar to the process of method 1300 as described in reference to FIG. 13. Adding additional functionality to the complication for the medication tracking application (e.g., when no medications satisfy the scheduling criteria for the first respective time period, selection of the complication does not display logging options for a medication but rather displays indications of active medications) reduces clutter on a display and provides increased control to a user, thereby reducing the number of inputs needed to perform an operation, providing additional control options without cluttering the user interface with additional displayed controls, and performing an operation when a set of conditions has been met without requiring further user input.

In some embodiments, displaying the watch face user interface includes, in accordance with a determination that a third medication (e.g., sleep aid in FIG. 14E) is scheduled to be logged at a first time after the current time (e.g., sleep aid in FIG. 14E is scheduled to be logged at 9:00 PM) (e.g., the current time is 10 AM and the medication is scheduled for 3 PM) and that no scheduled medications (e.g., at least the first, second, and third medications) satisfy the scheduling criteria at the current time (e.g., blood pressure med and cetirizine are logged and, such, no medications are due in FIG. 14H), displaying, on the watch face user interface, a second graphical object indicating no medications are due at the current time (e.g., symbol, icon, and/or text (e.g., text indicating no action is needed to log a medication and/or no medications are due)). Displaying, on the watch face user interface, a second graphical object indicating no medications are due at the current time when a third medication is scheduled to be logged at a first time after the current time and no scheduled medications satisfy the scheduling criteria at the current time allows the computer system to reflect a state of the medication tracking application, thereby providing improved visual feedback to the user and performing an operation when a set of conditions has been met without requiring further user input.

In some embodiments, while displaying the watch face user interface with the second graphical object indicating that there are no medications scheduled at the current time, the computer system detects a third input corresponding to a selection of the complication (e.g., an input directed at 1404 in FIG. 14H). In some embodiments, in response to detecting the third input corresponding to the selection of the complication, the computer system displays a user interface (e.g., 1408) that includes the third medication that is scheduled to be logged at the first time (e.g., similar to the process of method 900 as described in reference to FIG. 9 and similar to the process of method 1100 as described in reference to FIG. 11). Adding additional functionality to the complication for the medication tracking application (e.g., when there are no medications scheduled at the current time, selection of the complication does not display logging options for a medication but rather displays a medication scheduled for later) reduces clutter on a display and provides increased control to a user, thereby reducing the number of inputs needed to perform an operation, providing additional control options without cluttering the user interface with additional displayed controls, and performing an operation when a set of conditions has been met without requiring further user input.

In some embodiments, the user interface that includes the first medication that is scheduled to be logged at the third time further includes an option (e.g., 1427 and/or 1412*d*) corresponding to the third medication that, when selected, initiates a process for logging the third medication (e.g., logging interface 1416 and/or logging interfaces 1002, 1016) (e.g., similar to the process of method 1100 as described in reference to FIG. 11). Displaying an option corresponding to the third medication that, when selected, initiates a process for logging the third medication allows for a user to easily and quickly initiate a process for logging even when the medication is not due yet, thereby providing additional control options without cluttering the user interface with additional displayed controls, and performing an operation when a set of conditions has been met without requiring further user input.

In some embodiments, displaying the watch face user interface includes, in accordance with a determination that the first medication (e.g., blood pressure med and/or cetirizine of FIG. 14D) (in some embodiments, at least the first medication) satisfies the scheduling criteria (e.g., the first medication is currently scheduled for logging), displaying, on the watch face user interface, a third graphical object (e.g., 1414*a*-1414*b*) indicating that one or more medications are due to be logged at a second time (e.g., 8:00 AM as depicted in FIG. 14C) (e.g., a current time, a scheduled time for logging the first medication) (e.g., symbol, icon, and/or text (e.g., text indicating a time the medication is scheduled to be taken and/or logged (e.g., "log 8:30 am medications"), action is needed to log a medication, and/or a medication is due)). Displaying, on the watch face user interface, a third graphical object indicating that one or more medications are due to be logged at a second time when the first medication satisfies the scheduling criteria allows the computer system to reflect a state of the medication tracking application, thereby providing improved visual feedback to the user and performing an operation when a set of conditions has been met without requiring further user input.

In some embodiments, a fourth medication (e.g., sleep aid in FIG. 14I) is scheduled to be logged at a third time (e.g., 9:00 PM as depicted in 14I). In some embodiments, while displaying the third graphical object indicating that one or more medications are due at the second time; in accordance with a determination that the current time is the third time, the computer system replaces the third graphical object with a fourth graphical object (e.g., 1432*a*-1432*b*) indicating that one or more medications are due to be logged at the third time (e.g., symbol, icon, and/or text (e.g., text indicating a time the medication is scheduled to be taken and/or logged (e.g., "log 9:30 am medications"), action is needed to log a medication, and/or a medication is due)). Replacing the third graphical object with a fourth graphical object indicating that one or more medications are due to be logged at the third time as the current time reaches the third time allows the computer system to reflect a state of the medication tracking application, thereby providing improved visual feedback to the user and performing an operation when a set of conditions has been met without requiring further user input.

In some embodiments, displaying the watch face user interface includes, in accordance with a determination that all medications that are scheduled to be logged during a second respective time period (e.g., during the current day) are logged (e.g., FIGS. 14J-14K), displaying, in the watch face user interface, a fifth graphical object indicating all medications have been logged (e.g., 1438*a*-1438*b*) (e.g., symbol, icon, and/or text (e.g., text indicating no action is needed to log a medication and/or no medications are due)). Displaying, in the watch face user interface, a fifth graphical object indicating all medications have been logged when all medications that are scheduled to be logged during the second respective time period are logged allows the computer system to reflect a state of the medication tracking application, thereby providing improved visual feedback to the user and performing an operation when a set of conditions has been met without requiring further user input.

Note that details of the processes described above with respect to method 1500 (e.g., FIG. 15) are also applicable in an analogous manner to the methods described above. For example, the process of controlling how medications are logged and how logged actions are displayed in method 1500 optionally occurs before and/or after methods 700, 800, 900, 1100, and/or 1300. As another example, the user inputs and user interfaces described in methods 700, 800, 900, 1100, and/or 1300 optionally assist in logging medications and/or controlling when medications are scheduled to be logged. Additionally, method 1300 displays indications of how logged actions are recorded (and/or the absence thereof) based on the inputs detected in method 1500. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how track medications. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide information about tracking medications. Accordingly, use of such personal information data enables users to have calculated control of the information about tracking medications. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of medication tracking, the present technology can be configured to allow users to select to "opt in" or "opt out" of participation in the collection of personal information data during registration for services or anytime thereafter. In another example, users can select not to provide medication tracking information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, medication tracking information can be selected and delivered to users by inferring preferences based on non-personal information data or a bare minimum amount of personal information, such as the content being requested by the device associated with a user, other non-personal information available to the medication tracking application, or publicly available information.

What is claimed is:

1. A computer system configured to communicate with a display generation component and one or more input devices, comprising:
    one or more processors; and
    memory storing one or more programs configured to be executed by the one or more processors, the one or more programs including instructions for:

displaying, via the display generation component, a first user interface, wherein displaying the first user interface includes:
displaying, in a first portion of the first user interface, a representation of a respective medication that is scheduled to be taken at a scheduled time;
detecting a first set of one or more inputs corresponding to a request to log an action associated with the respective medication that includes at least one detected input while displaying the first user interface, wherein detecting the first set of one or more inputs includes detecting a first input;
in response to detecting the first input:
displaying, via the display generation component, an option to modify a time associated with a logged action for the respective medication, wherein the option for modifying the time associated with the logged action for the respective medication defaults to a current time; and
in response to detecting the first set of one or more inputs corresponding to the request to log an action associated with the respective medication, moving the representation of the respective medication from the first portion of the first user interface to a second portion of the first user interface different from the first portion.

2. The computer system of claim 1, the one or more programs further including instructions for:
in response to detecting the first set of one or more inputs corresponding to the request to log the action associated with the respective medication:
in accordance with a determination that there are no more scheduled medications, replacing the representation of the respective medication in the first portion of the first user interface with an indication that there are no more scheduled medications; and
in accordance with a determination that there is another scheduled medication, forgoing displaying the indication that there are no more scheduled medications.

3. The computer system of claim 1, wherein detecting the first set of one or more inputs includes detecting a second input corresponding to a selection of an option for initiating a logging action for both a fourth scheduled medication and the respective medication, the one or more programs further including instructions for:
in response to detecting the second input corresponding to the selection of the option for initiating the logging action for both the fourth scheduled medication and the respective medication:
displaying a second user interface that includes:
one or more first logging options for recording a logging action for the fourth scheduled medication;
one or more second logging options for recording a logging action for the respective medication; and
a third logging option for recording a logging action for both the fourth scheduled medication and the respective medication.

4. The computer system of claim 3, the one or more programs further including instructions for:
while displaying the second user interface, detecting an input corresponding to a request to change a time associated with a logged action for the respective medication; and
in response to detecting the input corresponding to the request to change the time associated with the logged action for the respective medication, displaying an option for applying the change in the time associated with the logged action to the fourth scheduled medication.

5. The computer system of claim 3, wherein:
the one or more first logging options includes an option for modifying a dosage of the fourth scheduled medication and an option for modifying a time associated with a logged action for the fourth scheduled medication; and
the one or more second logging options includes an option for modifying a dosage of the respective medication and an option for modifying a time associated with a logged action for the respective medication.

6. The computer system of claim 1, the one or more programs further including instructions for:
in response to detecting the first input:
displaying an option to modify a dosage for the respective medication, wherein the option to modify the dosage for the respective medication defaults to a scheduled dosage.

7. The computer system of claim 1, the one or more programs further including instructions for:
displaying the representation of the respective medication in the second portion with an option to modify the action associated with the respective medication that was logged.

8. The computer system of claim 1, the one or more programs further including instructions for:
displaying, in the first user interface, an option for displaying a set of medications; and
in response to detecting an input corresponding to a selection of the option for displaying a set of medications:
displaying an option for logging an unscheduled medication; and
displaying an option for logging a scheduled medication.

9. The computer system of claim 1, the one or more programs further including instructions for:
in accordance with a determination that all scheduled medications for a first time range are logged, displaying, a first indication that all the scheduled medications are logged; and
in accordance with a determination that all scheduled medications for a second time range are logged, displaying a second indication different from the first indication.

10. The computer system of claim 1, wherein the first user interface includes:
a first time period option that corresponds to a first time period and that, when selected, causes display of a user interface for logging one or more medication logging actions scheduled to be logged during the first time period, wherein:
in accordance with a determination that a first set of one or more medication logging criteria have been met, wherein the first set of one or more medication logging criteria includes a criterion that is met when at least one medication logging action scheduled to be logged during the first time period has been logged, the first time period option has a first appearance; and
in accordance with a determination that the first set of one or more medication logging criteria have not been met, the first time period option has a second appearance different from the first appearance.

11. The computer system of claim 10, wherein the first set of one or more medication logging criteria includes a criterion that is met when not more than one medication has corresponding logging actions for the first time period, and wherein:
    in accordance with a determination that a third set of one or more medication logging criteria have been met, wherein the third set of one or more medication logging criteria includes a criterion that is met when a plurality of different medications have corresponding logging actions for the first time period, the first time period option has a third appearance different from the first appearance and the second appearance.

12. The computer system of claim 10, wherein the first set of one or more medication logging criteria includes a criterion that is met when less than all medication logging actions scheduled to be logged during the first time period have been logged, and wherein:
    in accordance with a determination that a fourth set of one or more medication logging criteria have been met, wherein the fourth set of one or more medication logging criteria includes a criterion that is met when all medication logging actions scheduled to be logged during the first time period have been logged, the first time period option has a fourth appearance different from the first appearance and the second appearance.

13. The computer system of claim 10, wherein the first set of one or more medication logging criteria includes a criterion that is met when a medication logging action for a first medication scheduled to be logged during the first time period has been logged, wherein:
    in accordance with a determination that a fifth set of one or more medication logging criteria have been met, wherein the fifth set of one or more medication logging criteria includes a criterion that is met when a medication logging action for a second medication scheduled to be logged during the first time period has been logged, wherein the second medication is different from the first medication, the first time period option has a fifth appearance different from the first appearance and the second appearance.

14. The computer system of claim 1, wherein the representation of the respective medication is displayed in the second portion with a respective appearance, wherein:
    in accordance with a determination that the respective medication is associated with a first type of logged action, the respective appearance is a sixth appearance; and
    in accordance with a determination that the respective medication is associated with a second type of logged action, the respective appearance includes a seventh appearance different from the sixth appearance.

15. The computer system of claim 1, the one or more programs further including instructions for:
    while displaying the first user interface, detecting an input corresponding to a request to initiate deactivation of one or more active medications; and
    in response to detecting the input corresponding to the request to initiate deactivation of one or more active medications, displaying a fourth user interface that includes:
        an active medication with an option to deactivate the active medication; and
        a deactivated medication with an option to activate the deactivated medication.

16. The computer system of claim 1, the one or more programs further including instructions for:
    after moving the representation of the respective medication and in accordance with a determination that a predetermined period of time has elapsed, ceasing display of the respective medication in the second portion of the first user interface.

17. The computer system of claim 1, wherein the first set of one or more inputs corresponding to the request to log the action associated with the respective medication includes at least one speech input.

18. The computer system of claim 1, the one or more programs further including instructions for:
    displaying, via the display generation component, a second user interface;
    detecting, via the one or more input devices, a second set of one or more inputs corresponding to a request to log an action associated with a second respective medication that includes at least one detected speech input while displaying the second user interface; and
    in response to detecting the second set of one or more inputs, logging the action associated with the second respective medication.

19. A non-transitory computer-readable storage medium storing one or more programs configured to be executed by one or more processors of a computer system that is in communication with a display generation component and one or more input devices, the one or more programs including instructions for:
    displaying, via the display generation component, a first user interface, wherein displaying the first user interface includes:
        displaying, in a first portion of the first user interface, a representation of a respective medication that is scheduled to be taken at a scheduled time;
    detecting a first set of one or more inputs corresponding to a request to log an action associated with the respective medication that includes at least one detected input while displaying the first user interface, wherein detecting the first set of one or more inputs includes detecting a first input;
    in response to detecting the first input:
        displaying, via the display generation component, an option to modify a time associated with a logged action for the respective medication, wherein the option for modifying the time associated with the logged action for the respective medication defaults to a current time; and
    in response to detecting the first set of one or more inputs corresponding to the request to log an action associated with the respective medication, moving the representation of the respective medication from the first portion of the first user interface to a second portion of the first user interface different from the first portion.

20. The non-transitory computer-readable storage medium of claim 19, the one or more programs further including instructions for:
    in response to detecting the first set of one or more inputs corresponding to the request to log the action associated with the respective medication:
        in accordance with a determination that there are no more scheduled medications, replacing the representation of the respective medication in the first portion of the first user interface with an indication that there are no more scheduled medications; and
        in accordance with a determination that there is another scheduled medication, forgoing displaying the indication that there are no more scheduled medications.

21. The non-transitory computer-readable storage medium of claim 19, wherein detecting the first set of one or more inputs includes detecting a second input corresponding to a selection of an option for initiating a logging action for both a fourth scheduled medication and the respective medication, the one or more programs further including instructions for:
- in response to detecting the second input corresponding to the selection of the option for initiating the logging action for both the fourth scheduled medication and the respective medication:
- displaying a second user interface that includes:
  - one or more first logging options for recording a logging action for the fourth scheduled medication;
  - one or more second logging options for recording a logging action for the respective medication; and
  - a third logging option for recording a logging action for both the fourth scheduled medication and the respective medication.

22. The non-transitory computer-readable storage medium of claim 21, the one or more programs further including instructions for:
- while displaying the second user interface, detecting an input corresponding to a request to change a time associated with a logged action for the respective medication; and
- in response to detecting the input corresponding to the request to change the time associated with the logged action for the respective medication, displaying an option for applying the change in the time associated with the logged action to the fourth scheduled medication.

23. The non-transitory computer-readable storage medium of claim 21, wherein:
- the one or more first logging options includes an option for modifying a dosage of the fourth scheduled medication and an option for modifying a time associated with a logged action for the fourth scheduled medication; and
- the one or more second logging options includes an option for modifying a dosage of the respective medication and an option for modifying a time associated with a logged action for the respective medication.

24. The non-transitory computer-readable storage medium of claim 3, the one or more programs further including instructions for:
- in response to detecting the first input:
  - displaying an option to modify a dosage for the respective medication, wherein the option to modify the dosage for the respective medication defaults to a scheduled dosage.

25. The non-transitory computer-readable storage medium of claim 19, the one or more programs further including instructions for:
- displaying the representation of the respective medication in the second portion with an option to modify the action associated with the respective medication that was logged.

26. The non-transitory computer-readable storage medium of claim 19, the one or more programs further including instructions for:
- displaying, in the first user interface, an option for displaying a set of medications; and
- in response to detecting an input corresponding to a selection of the option for displaying a set of medications:
  - displaying an option for logging an unscheduled medication; and
  - displaying an option for logging a scheduled medication.

27. The non-transitory computer-readable storage medium of claim 19, the one or more programs further including instructions for:
- in accordance with a determination that all scheduled medications for a first time range are logged, displaying, a first indication that all the scheduled medications are logged; and
- in accordance with a determination that all scheduled medications for a second time range are logged, displaying a second indication different from the first indication.

28. The non-transitory computer-readable storage medium of claim 19, wherein the first user interface includes:
- a first time period option that corresponds to a first time period and that, when selected, causes display of a user interface for logging one or more medication logging actions scheduled to be logged during the first time period, wherein:
  - in accordance with a determination that a first set of one or more medication logging criteria have been met, wherein the first set of one or more medication logging criteria includes a criterion that is met when at least one medication logging action scheduled to be logged during the first time period has been logged, the first time period option has a first appearance; and
  - in accordance with a determination that the first set of one or more medication logging criteria have not been met, the first time period option has a second appearance different from the first appearance.

29. The non-transitory computer-readable storage medium of claim 28, wherein the first set of one or more medication logging criteria includes a criterion that is met when not more than one medication has corresponding logging actions for the first time period, and wherein:
- in accordance with a determination that a third set of one or more medication logging criteria have been met, wherein the third set of one or more medication logging criteria includes a criterion that is met when a plurality of different medications have corresponding logging actions for the first time period, the first time period option has a third appearance different from the first appearance and the second appearance.

30. The non-transitory computer-readable storage medium of claim 28, wherein the first set of one or more medication logging criteria includes a criterion that is met when less than all medication logging actions scheduled to be logged during the first time period have been logged, and wherein:
- in accordance with a determination that a fourth set of one or more medication logging criteria have been met, wherein the fourth set of one or more medication logging criteria includes a criterion that is met when all medication logging actions scheduled to be logged during the first time period have been logged, the first time period option has a fourth appearance different from the first appearance and the second appearance.

31. The non-transitory computer-readable storage medium of claim 28, wherein the first set of one or more medication logging criteria includes a criterion that is met when a medication logging action for a first medication scheduled to be logged during the first time period has been logged, wherein:

in accordance with a determination that a fifth set of one or more medication logging criteria have been met, wherein the fifth set of one or more medication logging criteria includes a criterion that is met when a medication logging action for a second medication scheduled to be logged during the first time period has been logged, wherein the second medication is different from the first medication, the first time period option has a fifth appearance different from the first appearance and the second appearance.

32. The non-transitory computer-readable storage medium of claim 19, wherein the representation of the respective medication is displayed in the second portion with a respective appearance, wherein:

in accordance with a determination that the respective medication is associated with a first type of logged action, the respective appearance is a sixth appearance; and in accordance with a determination that the respective medication is associated with a second type of logged action, the respective appearance includes a seventh appearance different from the sixth appearance.

33. The non-transitory computer-readable storage medium of claim 19, the one or more programs further including instructions for:

while displaying the first user interface, detecting an input corresponding to a request to initiate deactivation of one or more active medications; and in response to detecting the input corresponding to the request to initiate deactivation of one or more active medications, displaying a fourth user interface that includes:

an active medication with an option to deactivate the active medication; and a deactivated medication with an option to activate the deactivated medication.

34. The non-transitory computer-readable storage medium of claim 19, the one or more programs further including instructions for:

after moving the representation of the respective medication and in accordance with a determination that a predetermined period of time has elapsed, ceasing display of the respective medication in the second portion of the first user interface.

35. The non-transitory computer-readable storage medium of claim 19, wherein the first set of one or more inputs corresponding to the request to log the action associated with the respective medication includes at least one speech input.

36. The non-transitory computer-readable storage medium of claim 19, the one or more programs further including instructions for:

displaying, via the display generation component, a second user interface;

detecting, via the one or more input devices, a second set of one or more inputs corresponding to a request to log an action associated with a second respective medication that includes at least one detected speech input while displaying the second user interface; and in response to detecting the second set of one or more inputs, logging the action associated with the second respective medication.

37. A method, comprising:

at a computer system that is in communication with a display generation component and one or more input devices:

displaying, via the display generation component, a first user interface, wherein displaying the first user interface includes:

displaying, in a first portion of the first user interface, a representation of a respective medication that is scheduled to be taken at a scheduled time;

detecting a first set of one or more inputs corresponding to a request to log an action associated with the respective medication that includes at least one detected input while displaying the first user interface, wherein detecting the first set of one or more inputs includes detecting a first input;

in response to detecting the first input:

displaying, via the display generation component, an option to modify a time associated with a logged action for the respective medication, wherein the option for modifying the time associated with the logged action for the respective medication defaults to a current time; and in response to detecting the first set of one or more inputs corresponding to the request to log an action associated with the respective medication, moving the representation of the respective medication from the first portion of the first user interface to a second portion of the first user interface different from the first portion.

38. The method of claim 37, further comprising:

in response to detecting the first set of one or more inputs corresponding to the request to log the action associated with the respective medication:

in accordance with a determination that there are no more scheduled medications, replacing the representation of the respective medication in the first portion of the first user interface with an indication that there are no more scheduled medications; and in accordance with a determination that there is another scheduled medication, forgoing displaying the indication that there are no more scheduled medications.

39. The method of claim 37, wherein detecting the first set of one or more inputs includes detecting a second input corresponding to a selection of an option for initiating a logging action for both a fourth scheduled medication and the respective medication, the method further comprising:

in response to detecting the second input corresponding to the selection of the option for initiating the logging action for both the fourth scheduled medication and the respective medication:

displaying a second user interface that includes:

one or more first logging options for recording a logging action for the fourth scheduled medication;

one or more second logging options for recording a logging action for the respective medication; and a third logging option for recording a logging action for both the fourth scheduled medication and the respective medication.

40. The method of claim 39, further comprising:

while displaying the second user interface, detecting an input corresponding to a request to change a time associated with a logged action for the respective medication; and in response to detecting the input corresponding to the request to change the time associated with the logged action for the respective medication, displaying an option for applying the change in the time associated with the logged action to the fourth scheduled medication.

41. The method of claim 39, wherein:
the one or more first logging options includes an option for modifying a dosage of the fourth scheduled medication and an option for modifying a time associated with a logged action for the fourth scheduled medication; and
the one or more second logging options includes an option for modifying a dosage of the respective medication and an option for modifying a time associated with a logged action for the respective medication.

42. The method of claim 37, further comprising:
in response to detecting the first input:
displaying an option to modify a dosage for the respective medication, wherein the option to modify the dosage for the respective medication defaults to a scheduled dosage.

43. The method of claim 37, further comprising:
displaying the representation of the respective medication in the second portion with an option to modify the action associated with the respective medication that was logged.

44. The method of claim 37, further comprising:
displaying, in the first user interface, an option for displaying a set of medications; and
in response to detecting an input corresponding to a selection of the option for displaying a set of medications:
displaying an option for logging an unscheduled medication; and
displaying an option for logging a scheduled medication.

45. The method of claim 37, further comprising:
in accordance with a determination that all scheduled medications for a first time range are logged, displaying, a first indication that all the scheduled medications are logged; and
in accordance with a determination that all scheduled medications for a second time range are logged, displaying a second indication different from the first indication.

46. The method of claim 37, wherein the first user interface includes:
a first time period option that corresponds to a first time period and that, when selected, causes display of a user interface for logging one or more medication logging actions scheduled to be logged during the first time period, wherein:
in accordance with a determination that a first set of one or more medication logging criteria have been met, wherein the first set of one or more medication logging criteria includes a criterion that is met when at least one medication logging action scheduled to be logged during the first time period has been logged, the first time period option has a first appearance; and
in accordance with a determination that the first set of one or more medication logging criteria have not been met, the first time period option has a second appearance different from the first appearance.

47. The method of claim 46, wherein the first set of one or more medication logging criteria includes a criterion that is met when not more than one medication has corresponding logging actions for the first time period, and wherein:
in accordance with a determination that a third set of one or more medication logging criteria have been met, wherein the third set of one or more medication logging criteria includes a criterion that is met when a plurality of different medications have corresponding logging actions for the first time period, the first time period option has a third appearance different from the first appearance and the second appearance.

48. The method of claim 46, wherein the first set of one or more medication logging criteria includes a criterion that is met when less than all medication logging actions scheduled to be logged during the first time period have been logged, and wherein:
in accordance with a determination that a fourth set of one or more medication logging criteria have been met, wherein the fourth set of one or more medication logging criteria includes a criterion that is met when all medication logging actions scheduled to be logged during the first time period have been logged, the first time period option has a fourth appearance different from the first appearance and the second appearance.

49. The method of claim 46, wherein the first set of one or more medication logging criteria includes a criterion that is met when a medication logging action for a first medication scheduled to be logged during the first time period has been logged, wherein:
in accordance with a determination that a fifth set of one or more medication logging criteria have been met, wherein the fifth set of one or more medication logging criteria includes a criterion that is met when a medication logging action for a second medication scheduled to be logged during the first time period has been logged, wherein the second medication is different from the first medication, the first time period option has a fifth appearance different from the first appearance and the second appearance.

50. The method of claim 37, wherein the representation of the respective medication is displayed in the second portion with a respective appearance, wherein:
in accordance with a determination that the respective medication is associated with a first type of logged action, the respective appearance is a sixth appearance; and
in accordance with a determination that the respective medication is associated with a second type of logged action, the respective appearance includes a seventh appearance different from the sixth appearance.

51. The method of claim 37, further comprising:
while displaying the first user interface, detecting an input corresponding to a request to initiate deactivation of one or more active medications; and
in response to detecting the input corresponding to the request to initiate deactivation of one or more active medications, displaying a fourth user interface that includes:
an active medication with an option to deactivate the active medication; and
a deactivated medication with an option to activate the deactivated medication.

52. The method of claim 37, further comprising:
after moving the representation of the respective medication and in accordance with a determination that a predetermined period of time has elapsed, ceasing display of the respective medication in the second portion of the first user interface.

53. The method of claim 37, wherein the first set of one or more inputs corresponding to the request to log the action associated with the respective medication includes at least one speech input.

54. The method of claim 37, further comprising:
- displaying, via the display generation component, a second user interface;
- detecting, via the one or more input devices, a second set of one or more inputs corresponding to a request to log an action associated with a second respective medication that includes at least one detected speech input while displaying the second user interface; and
- in response to detecting the second set of one or more inputs, logging the action associated with the second respective medication.

* * * * *